(12) United States Patent
Naoi et al.

(10) Patent No.: US 6,850,645 B2
(45) Date of Patent: Feb. 1, 2005

(54) PATTERN RECOGNIZING APPARATUS

(75) Inventors: Satoshi Naoi, Kawasaki (JP); Misako Suwa, Kawasaki (JP); Yoshinobu Hotta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 449 days.

(21) Appl. No.: 10/000,525

(22) Filed: Dec. 4, 2001

(65) Prior Publication Data

US 2003/0113016 A1 Jun. 19, 2003

Related U.S. Application Data

(62) Division of application No. 09/363,020, filed on Jul. 29, 1999, now Pat. No. 6,335,986, which is a division of application No. 08/778,621, filed on Jul. 3, 1997, now Pat. No. 6,104,833.

(30) Foreign Application Priority Data

Jan. 9, 1996 (JP) ............................................. 8-001730
Sep. 27, 1996 (JP) ............................................. 8-255217

(51) Int. Cl.$^7$ ................................................ G06K 9/46
(52) U.S. Cl. ....................................... 382/190; 382/176
(58) Field of Search .................................. 382/190, 173, 382/176, 180, 310, 311, 309; 358/464, 462

(56) References Cited

U.S. PATENT DOCUMENTS

| 5,197,107 | A |   | 3/1993 | Katsuyama et al. ........ 382/209 |
| 5,253,303 | A |   | 10/1993 | Nishijama et al. .......... 382/209 |
| 5,481,621 | A |   | 1/1996 | Kuratomi et al. ........... 382/199 |
| 5,524,065 | A | * | 6/1996 | Yagasaki ..................... 382/226 |
| 5,581,633 | A |   | 12/1996 | Hotta et al. ................. 382/171 |
| 5,621,818 | A |   | 4/1997 | Tashiro ........................ 382/304 |
| 5,684,891 | A |   | 11/1997 | Tanaka et al. ............... 382/179 |
| 5,745,599 | A |   | 4/1998 | Uchiyama et al. .......... 382/202 |
| 5,754,686 | A |   | 5/1998 | Harada et al. ............... 382/187 |
| 5,793,932 | A |   | 8/1998 | Kuratomi et al. ........... 382/199 |
| 5,949,906 | A | * | 9/1999 | Hontani et al. .............. 382/177 |
| 6,512,848 | B2 | * | 1/2003 | Wang et al. ................. 382/176 |

FOREIGN PATENT DOCUMENTS

| JP | 60057477 A | 4/1985 |
| JP | 06-309498 | 11/1994 |
| JP | 06/309501 | 11/1994 |
| JP | 07-073270 | 3/1995 |
| JP | 08-52219 | 2/1996 |
| JP | 08-171609 | 7/1996 |

OTHER PUBLICATIONS

U.S. patent application Ser. No. 08/778,621, Naoi, et al., filed Jan. 1997.
U.S. patent application Ser. No. 09/363,020, Naoi et al., filed Jul. 29, 1999.
An Japanese and English language copy of Japanese Office Action.

* cited by examiner

Primary Examiner—Yon J. Couso
(74) Attorney, Agent, or Firm—Staas & Halsey LLP

(57) ABSTRACT

A pattern recognizing apparatus having a character extractor that extracts a character from an input image, a non-character extractor that extracts a non-character from an input image, a character recognizer that recognizes a character, a non-character recognizer that recognizes a non-character and an environment recognizer that instructs the character recognizer to perform a recognition process when the character extractor extracts a character, and that instructs the non-character recognizer to perform a recognition process when the non-character recognizer extracts a non-character.

2 Claims, 95 Drawing Sheets

FIG. 3 (PRIOR ART)

| | (A) | (B) | (C) | (D) |
|---|---|---|---|---|
| RESULT OF CONVENTIONAL OCR READING | REJECT | REJECT | REJECT | REJECT |
| CORRECT READ RESULT | 8 | 8 | 4 | 6 |

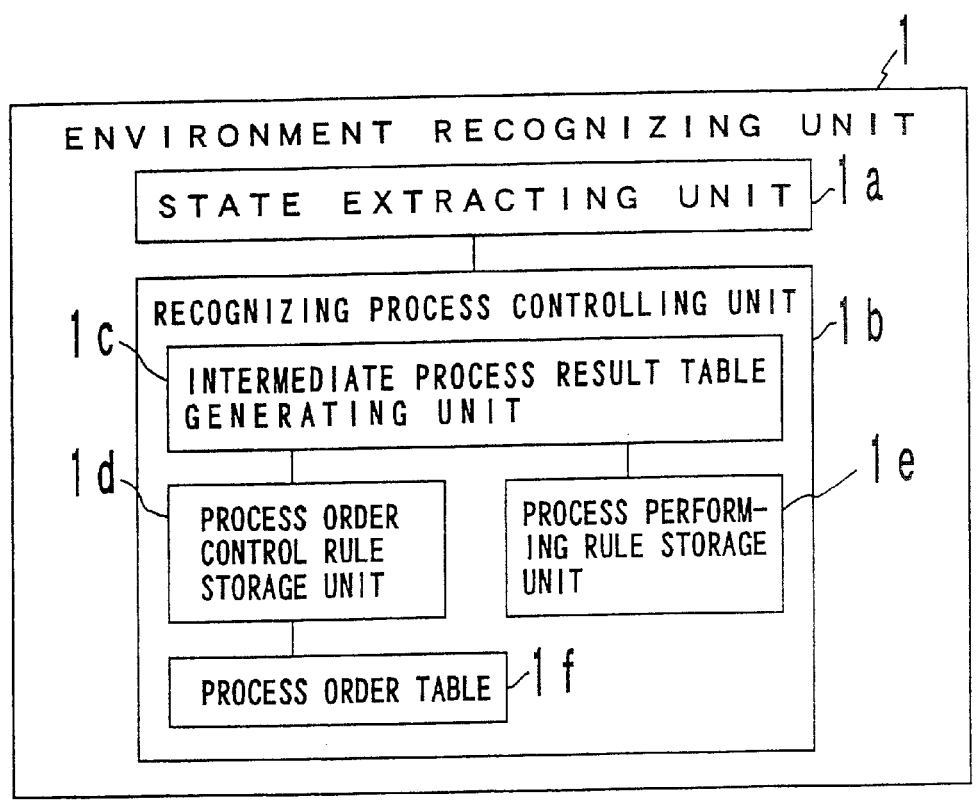
F I G. 6

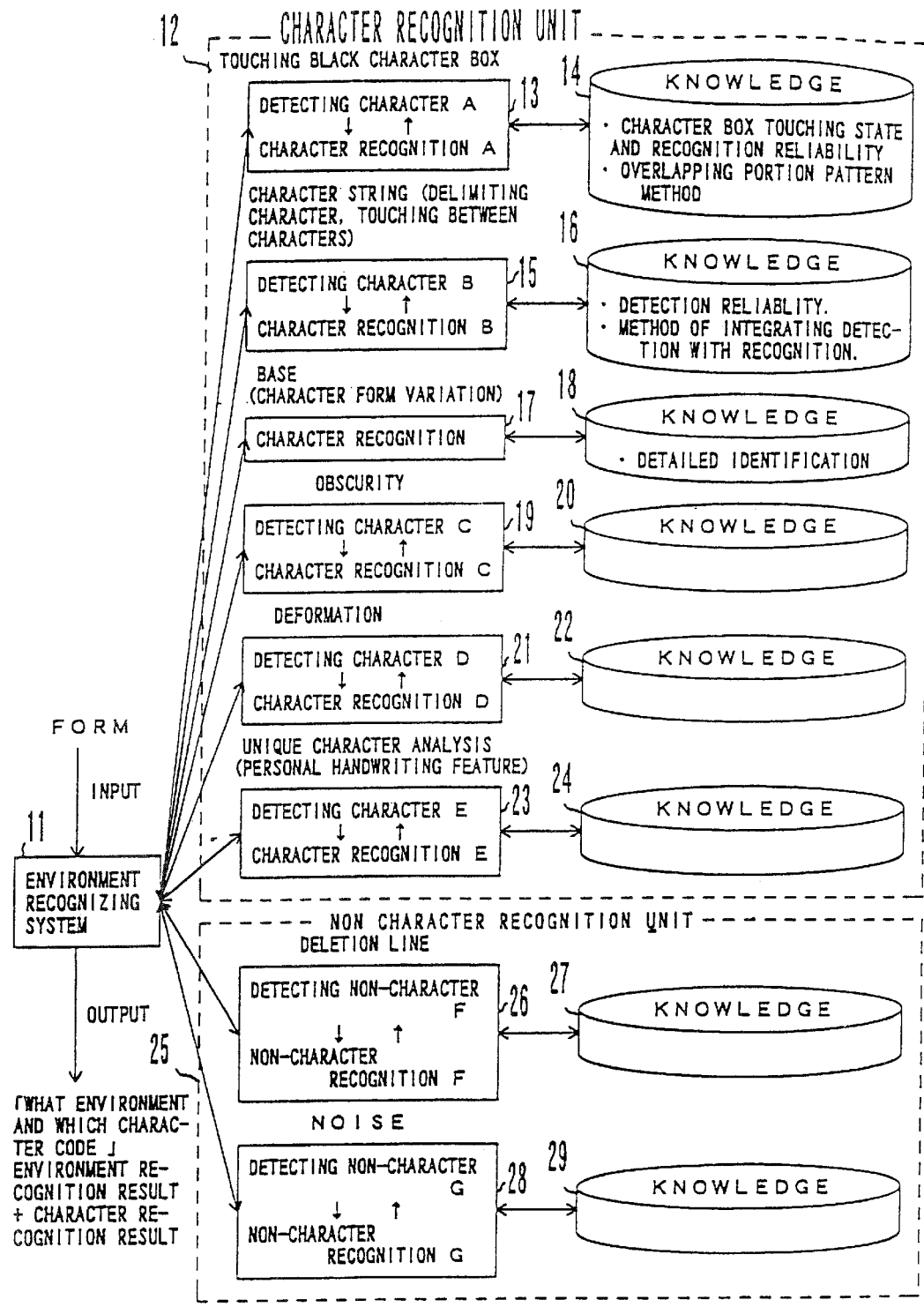
F I G. 7

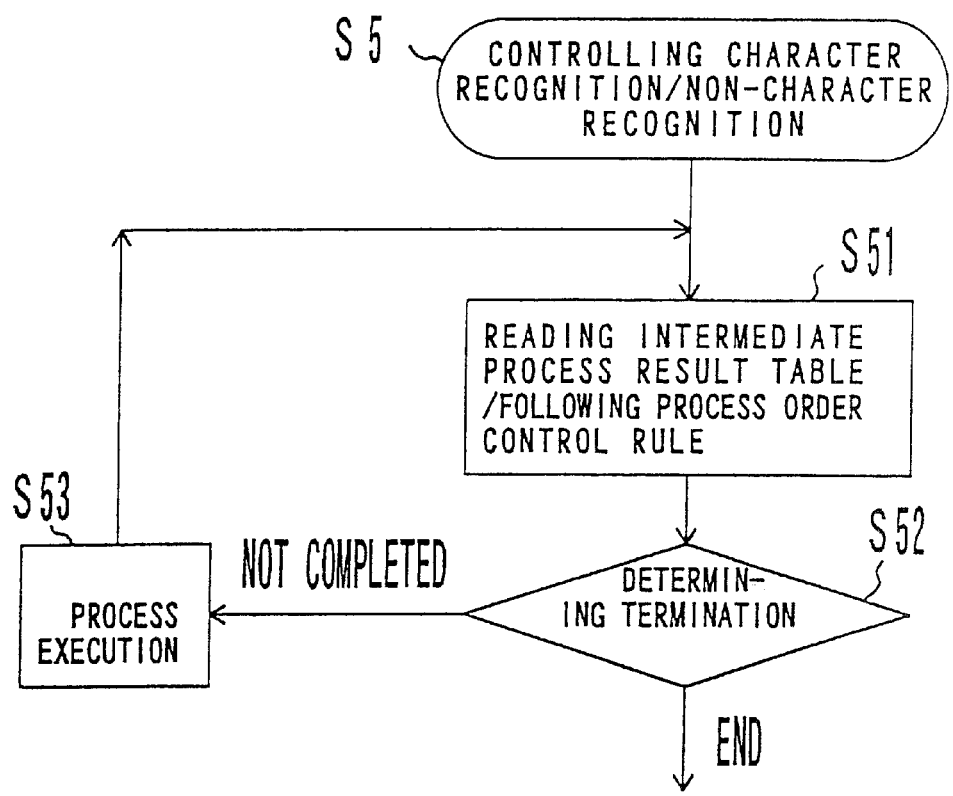
F I G. 1 3

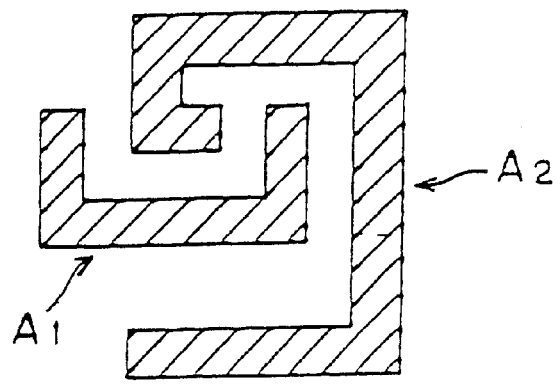
FIG. 17A
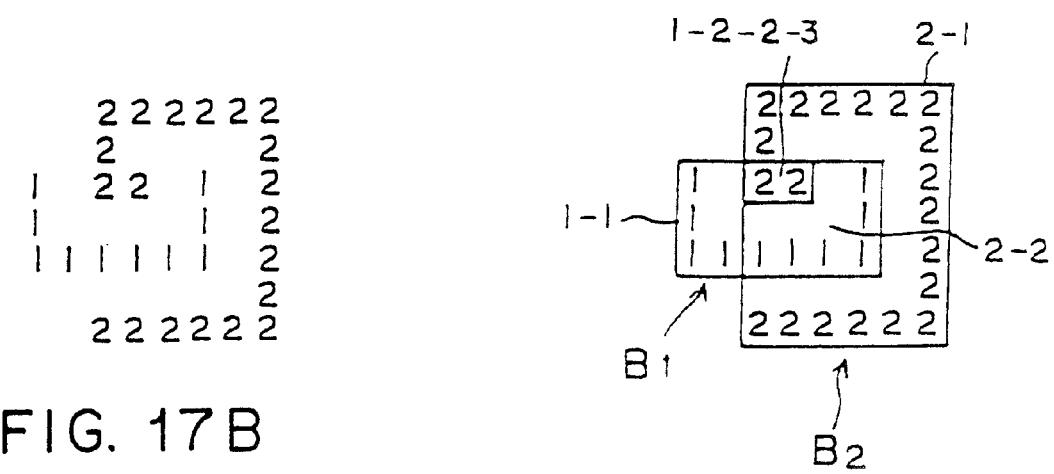
FIG. 17B
FIG. 17C
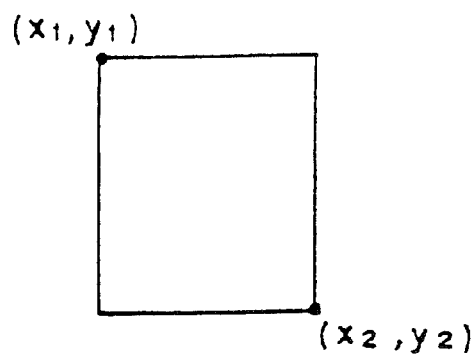
FIG. 17D

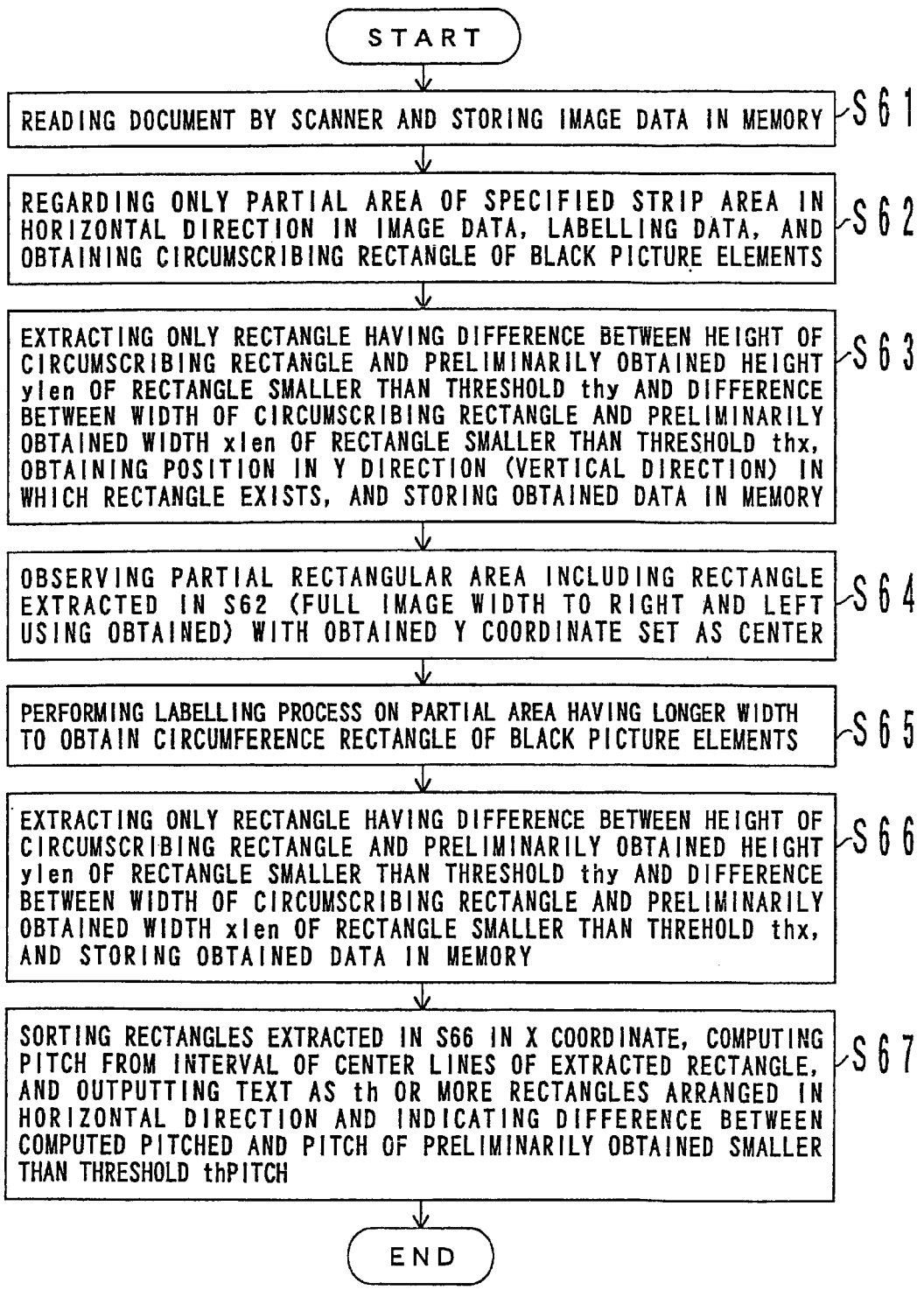
F I G. 1 8

FIG. 20

LINE NUMBER

PROJECTION VALUE
$p(i-1)$
$p(i)$
$p(i+1)$

CONTIGUOUS PROJECTION VALUE
$P(i) = p(i-1) + p(i) + p(i+1)$

FIG. 29A  1-CHARACTER BOX
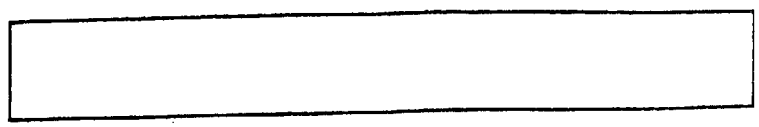
FIG. 29B  FREE-PITCH CHARACTER BOX
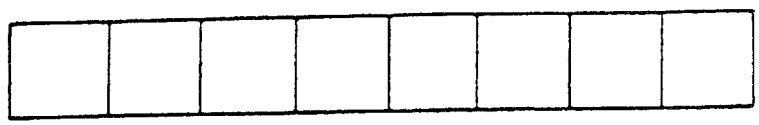
FIG. 29C  BLOCK CHARACTER BOX
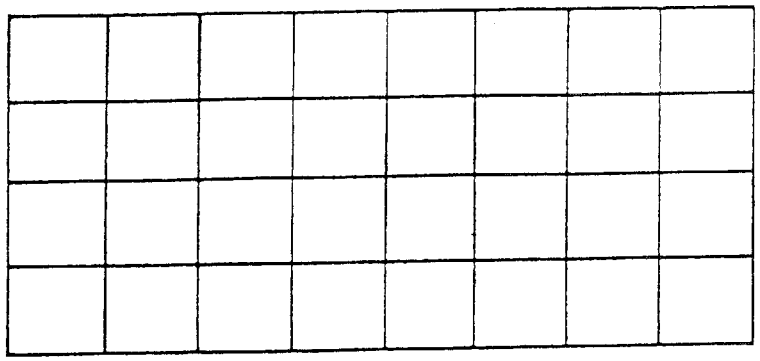
FIG. 29D  REGULAR TABLE
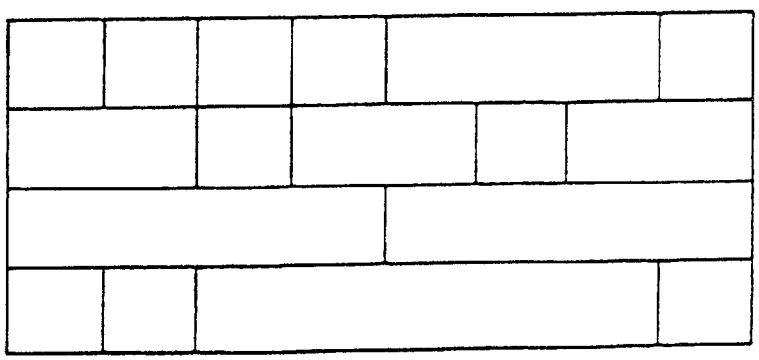
FIG. 29E  IRREGULAR TABLE

EXTRACTING
CHARACTER BOX

SEARCHING FOR
CHARACTER PATTERN

DETERMINING AREA TO BE
TRANSMITTED TO CHARACTER
COMPLETING PROCESS

CONVERTING COORDINATES OF
CHARACTER AREA AND LINE
AREA INTO COORDINATES OF
ORIGINAL IMAGE TO PERFORM
PROJECTING PROCESS ON LINE
AREA

CHARACTER RANGE AND BOX AREA
TO BE TRANSMITTED TO CHARACTER
COMPLETING PROCESS

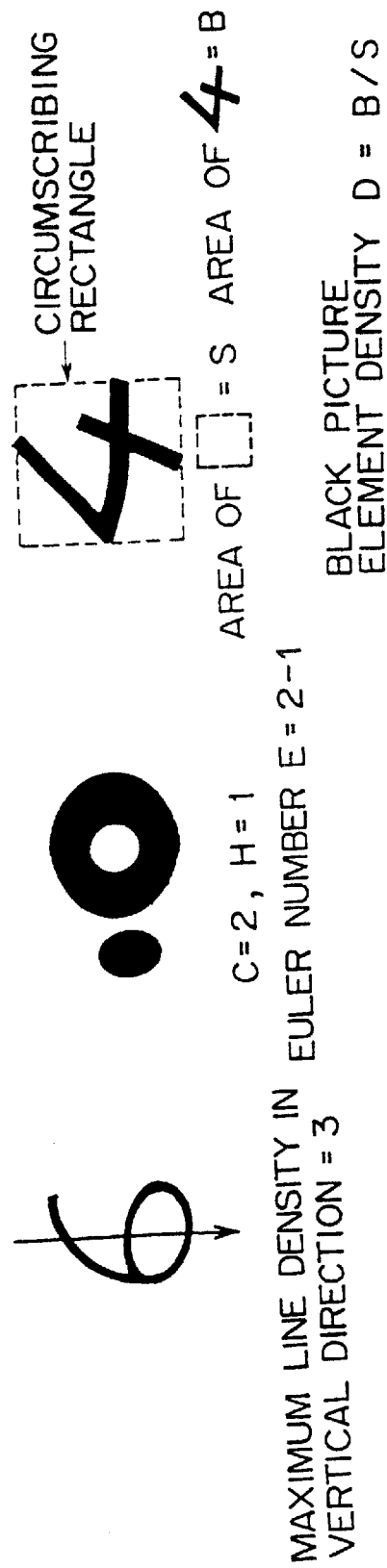

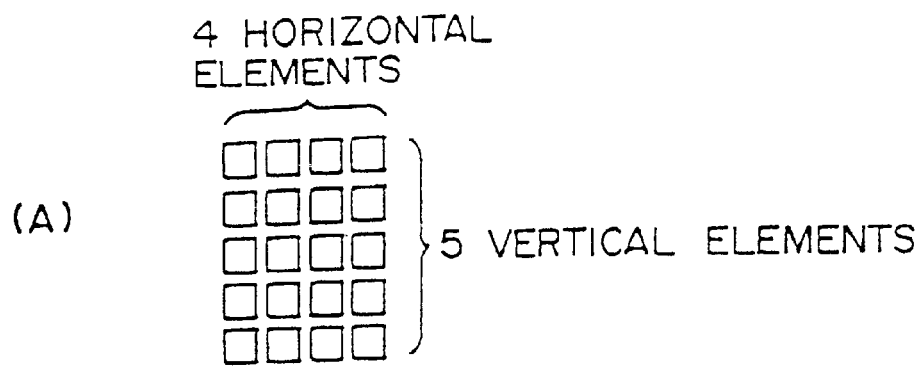
(A)
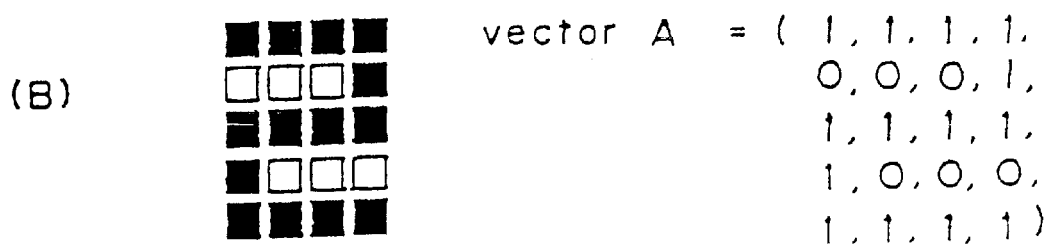
(B) vector A = ( 1, 1, 1, 1,
0, 0, 0, 1,
1, 1, 1, 1,
1, 0, 0, 0,
1, 1, 1, 1 )
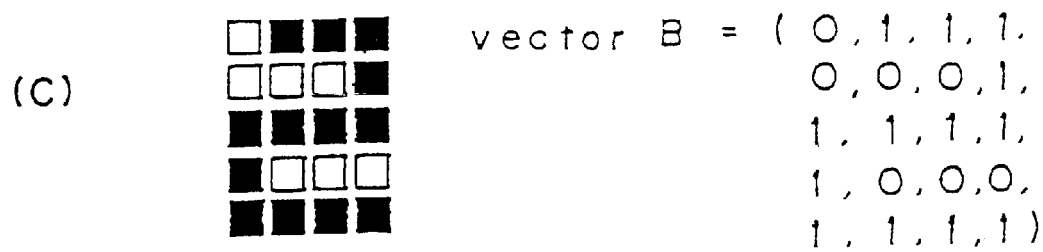
(C) vector B = ( 0, 1, 1, 1,
0, 0, 0, 1,
1, 1, 1, 1,
1, 0, 0, 0,
1, 1, 1, 1 )
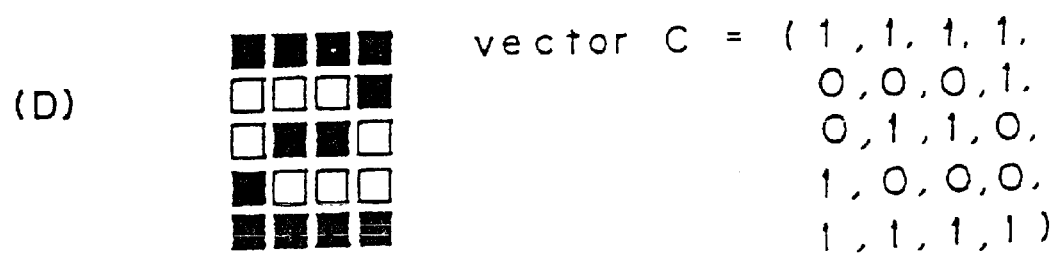
(D) vector C = ( 1, 1, 1, 1,
0, 0, 0, 1,
0, 1, 1, 0,
1, 0, 0, 0,
1, 1, 1, 1 )
FIG. 36

INPUT
CHARACTER

FEATURE
VECTOR vector = (0, 1, 1, 1,
0, 0, 0, 1,
1, 1, 1, 1,
1, 0, 0, 0,
1, 1, 1, 1)

DICTIONARY-
ENTERED
CHARACTER

FEATURE
VECTOR

DISTANCE FROM INPUT
CHARACTER IN VECTOR vector 1 = (0, 1, 1, 0,
0, 1, 1, 0,
0, 1, 1, 0,
0, 1, 1, 0,
0, 1, 1, 0)

$d(i,j) = |vector - vector\,1|$
$= |0-0|+|1-1|+|1-1|+|1-0|+$
....
$= 11$ vector 2 = (1, 1, 1, 1,
0, 0, 0, 1,
1, 1, 1, 1,
1, 0, 0, 0,
1, 1, 1, 1)

$d(i,j) = |vector - vector\,2|$
$= 1$ → MINIMUM VALUE vector 3 = (1, 1, 1, 1,
0, 0, 0, 1,
1, 1, 1, 1,
0, 0, 0, 1,
1, 1, 1, 1)

$d(i,j) = |vector - vector\,3|$
$= 3$ vector 4 = (1, 0, 1, 0,
1, 0, 1, 0,
1, 1, 1, 1,
0, 0, 1, 0,
0, 0, 1, 0)

$d(i,j) = |vector - vector\,4|$
$= 11$

FIG. 37

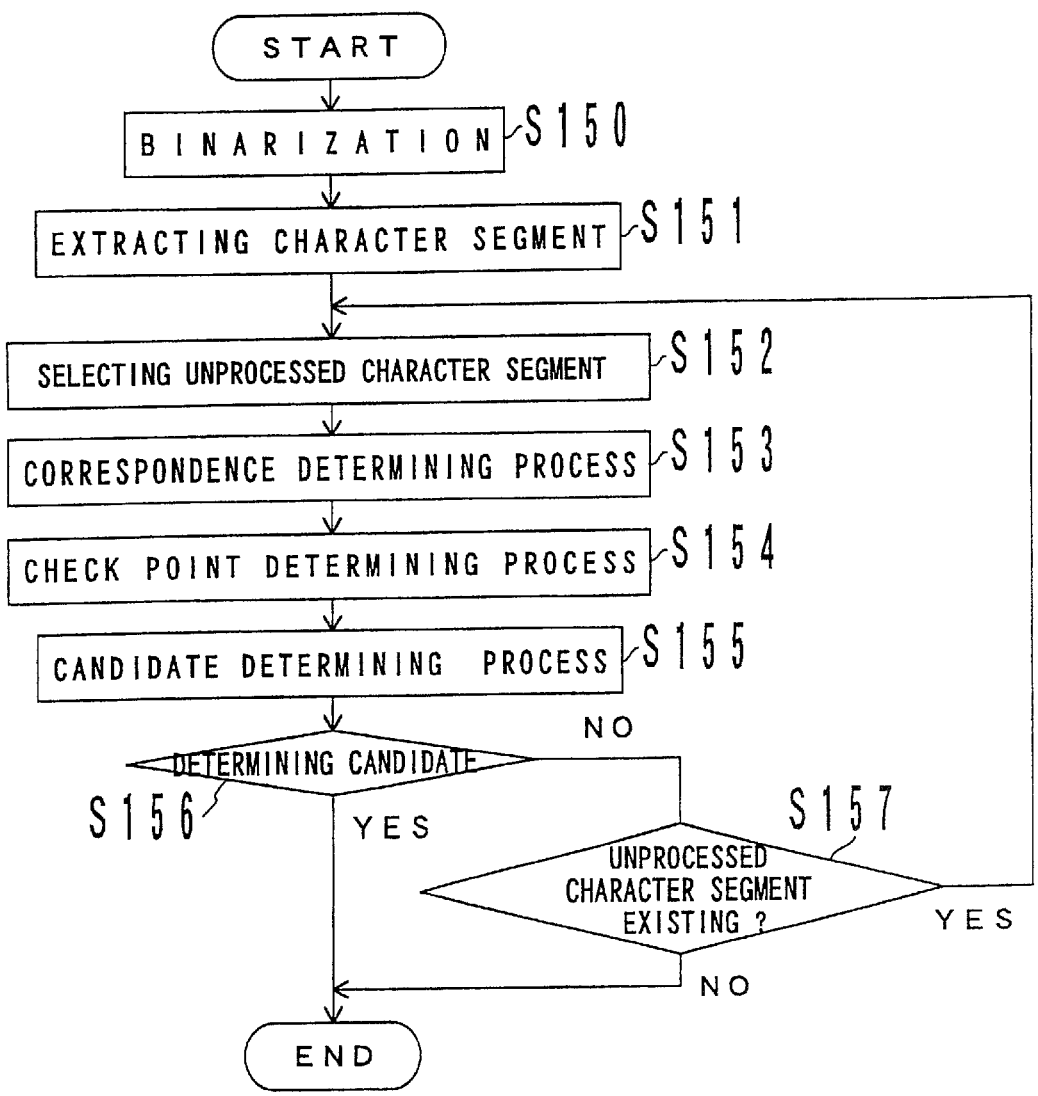
F I G. 4 2

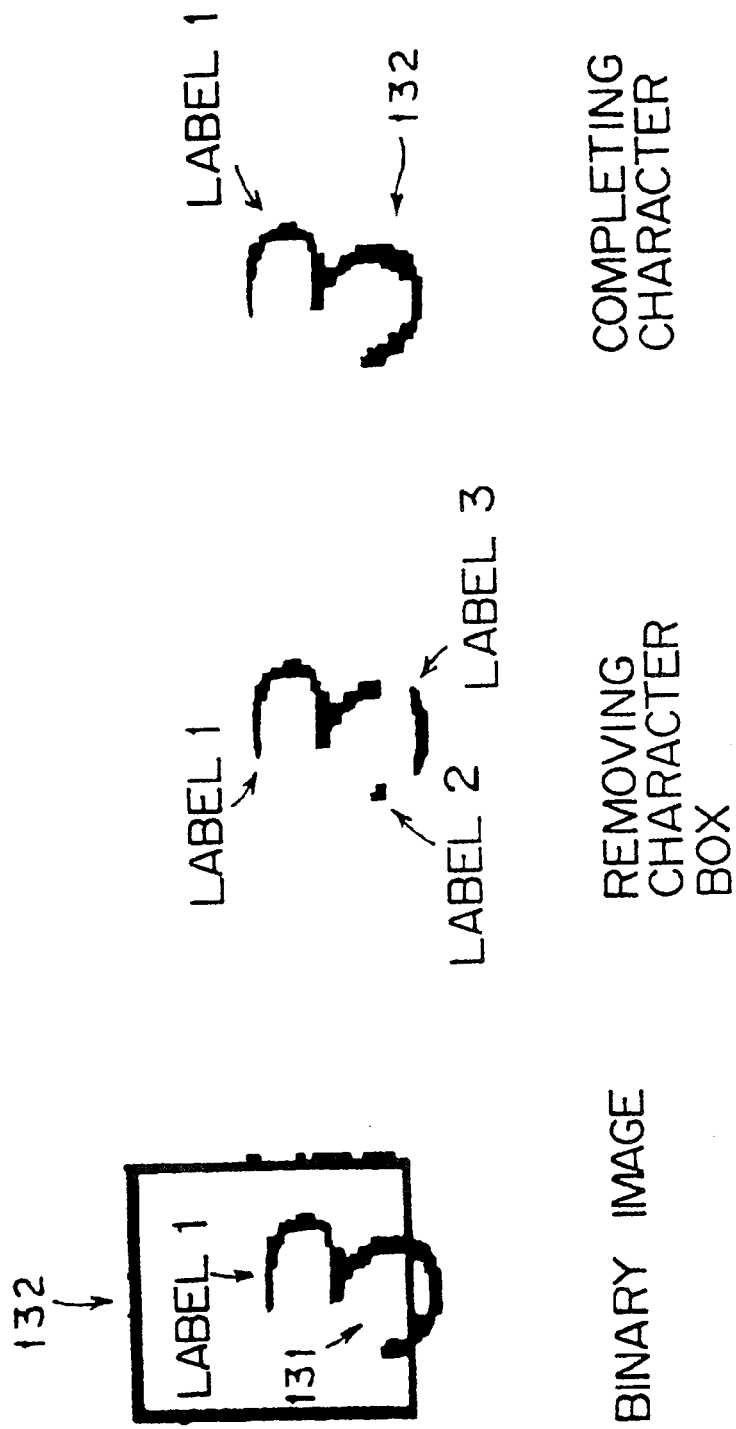
FIG. 43A BINARY IMAGE
FIG. 43B REMOVING CHARACTER BOX
FIG. 43C COMPLETING CHARACTER

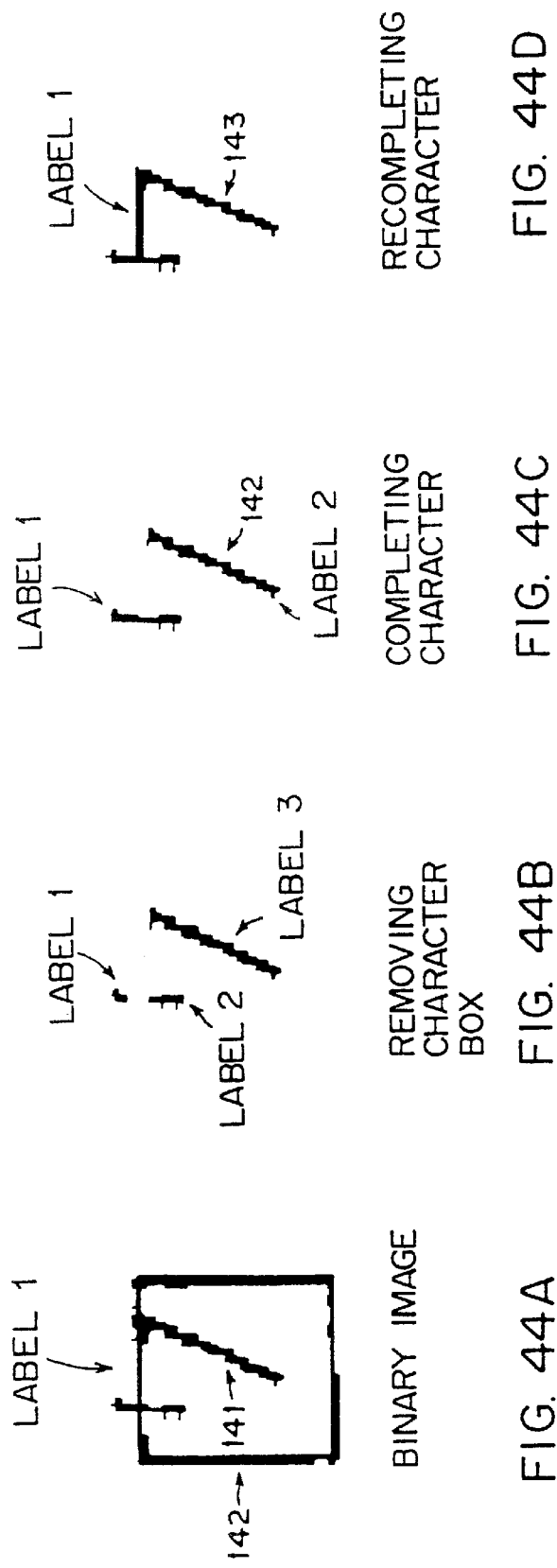

BOX-TOUCHING CHARACTER   REMOVING CHARACTER BOX   MIS-COMPLETING CHARACTER

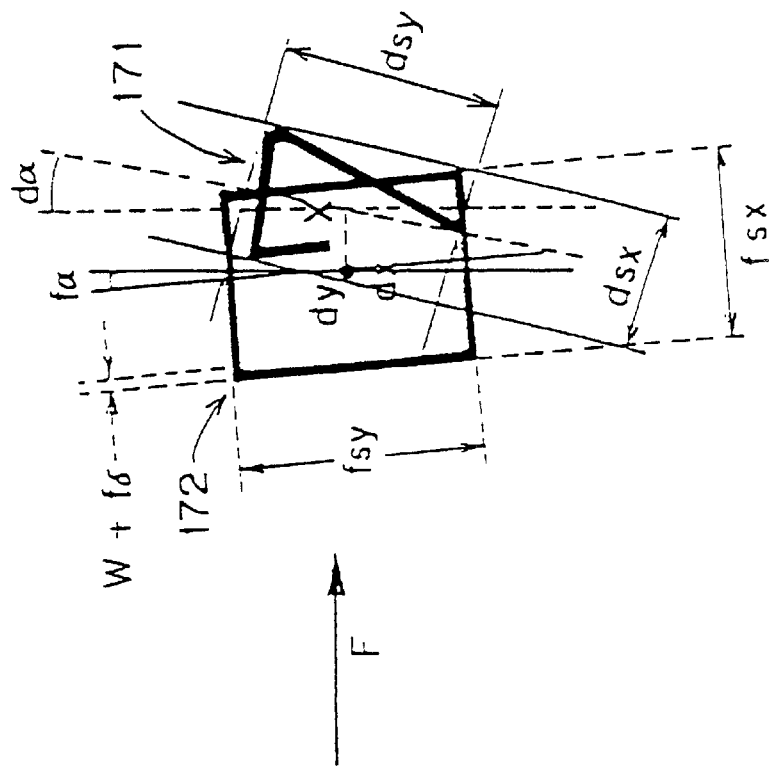
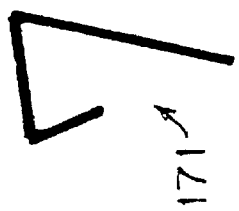
$F(dx, dy, dsx, dsy, d\alpha, w, fsx, fsy, f\alpha, f\delta)$
FIG. 47

(A) INCORRECT POSITION
dx = 0
dy > 0
VARIATIONS OF
CHARACTER RELATIVE
TO CHARACTER BOX
(B) INCORRECT SIZE
dsx = fsx
dsy = fsy
(C) INCORRECT POSE
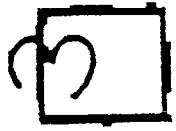
dα = 10 DEGREES
(D) INCORRECT POSE
fα = −10 DEGRESS
VARIATIONS OF
CHARACTER BOX
(E) VARIATION IN THINNESS OF CHARACTER BOX
w = 5
(F) UNEVEN CHARACTER BOX
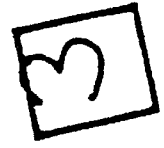
fs CONTROL
FIG. 48

167 KNOWLEDGE TABLE

| TYPE OF VARIATIONS | AMOUNT OF VARIATION | | | PAIR OF MIS-READ CHARACTERS | RELIABILITY | RE-RECOGNIZING METHOD | RE-RECOGNIZING AREA | RE-RECOGNIZING RELIABILITY |
|---|---|---|---|---|---|---|---|---|
| INCORRECT DOWNWARD POSITION | $dy=5$ | $w=5$ | · | $(2, 7)$ | 77% | HIGHLIGHTED AREA | $m/2 \times n$ | 95% |
| · | · | · | · | · | · | | · | · |
| INCORRECT UPWARD POSITION | · | · | · | · | · | | · | · |
| · | · | · | · | · | · | | · | · |
| INCORRECT RIGHTWARD POSITION | · | · | · | · | · | | · | · |
| · | · | · | · | · | · | | · | · |
| INCORRECT LEFTWARD POSITION | · | · | · | · | · | | · | · |
| · | · | · | · | · | · | | · | · |

FIG. 49

| TYPE OF VARIATIONS | AMOUNT OF VARIATIONS |
|---|---|
| INCORRECT DOWNWARD POSITION | dx=3~+3, dy=5 w=5 dsx=1 dsy=1 dα=-10~+10, fα=-10~+10 fδ NONE |
| ......... | ......... |
| ......... | ......... |
| INCORRECT POSE OF CHARACTER(TOUCHING LEFT SIDE OF CHARACTER BOX) | dx=3~+3, dy=-3~+3 w=5 dsx=1 dsy=1 dα=-20 -10, fα=-10~+10 fδ NONE |
| ......... | ......... |
| ......... | ......... |
| ......... | ......... |

F I G. 5 0

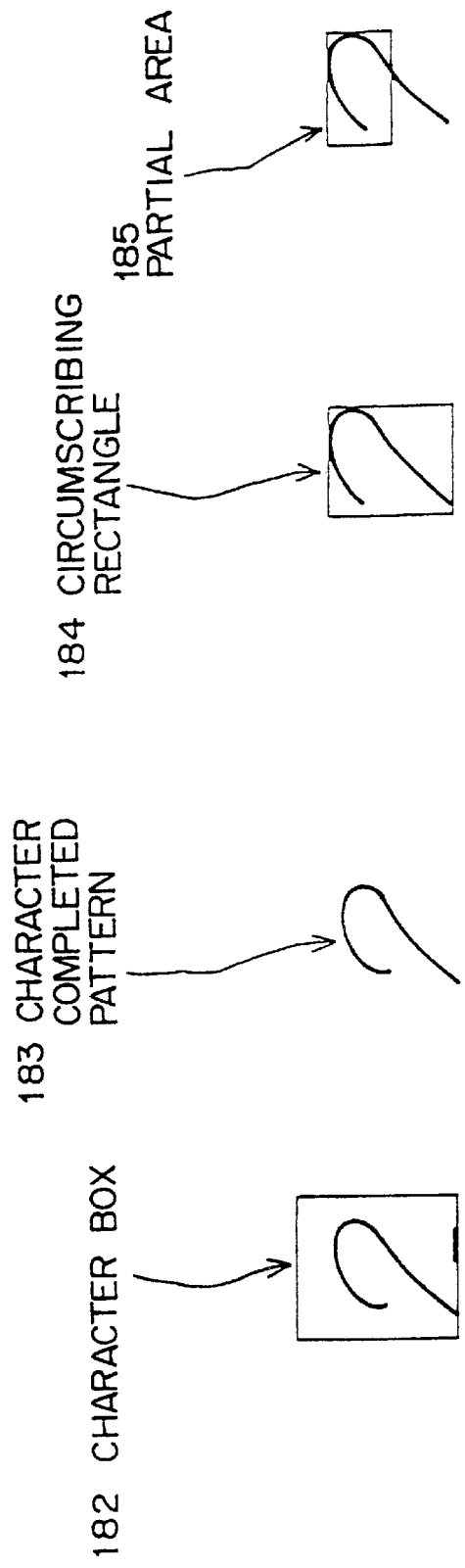

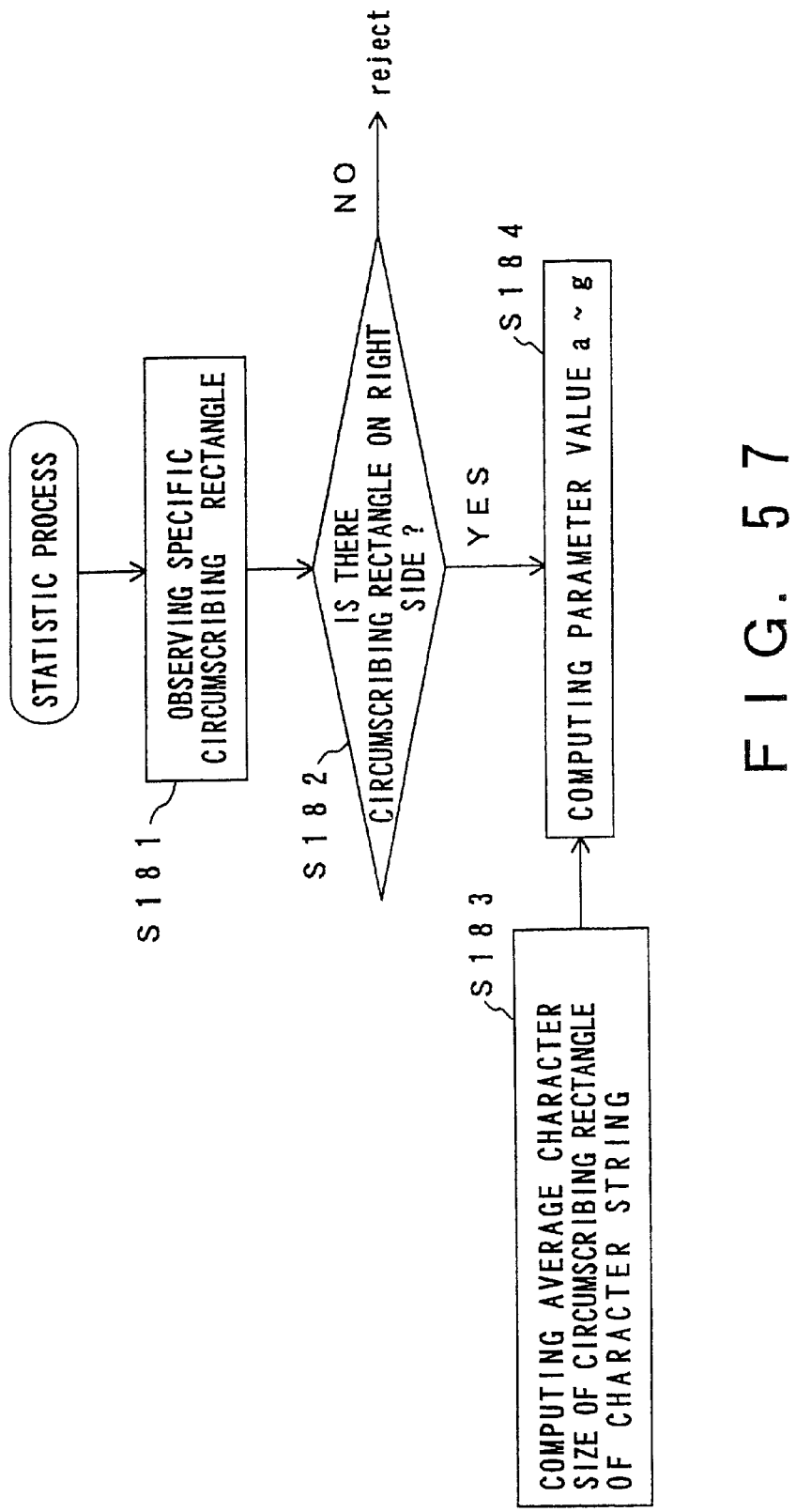
F I G. 57 c, d : AREA OF CIRCUMSCRIBING RECTANGLE

MX : AVERAGE WIDTH OF CIRCUMSCRIBING RECTANGLE

MY : AVERAGE HEIGHT OF CIRCUMSCRIBING RECTANGLE $p = a / b$
$q = b / MX$
$r = (c \times d) / (MX \times MY)^2$

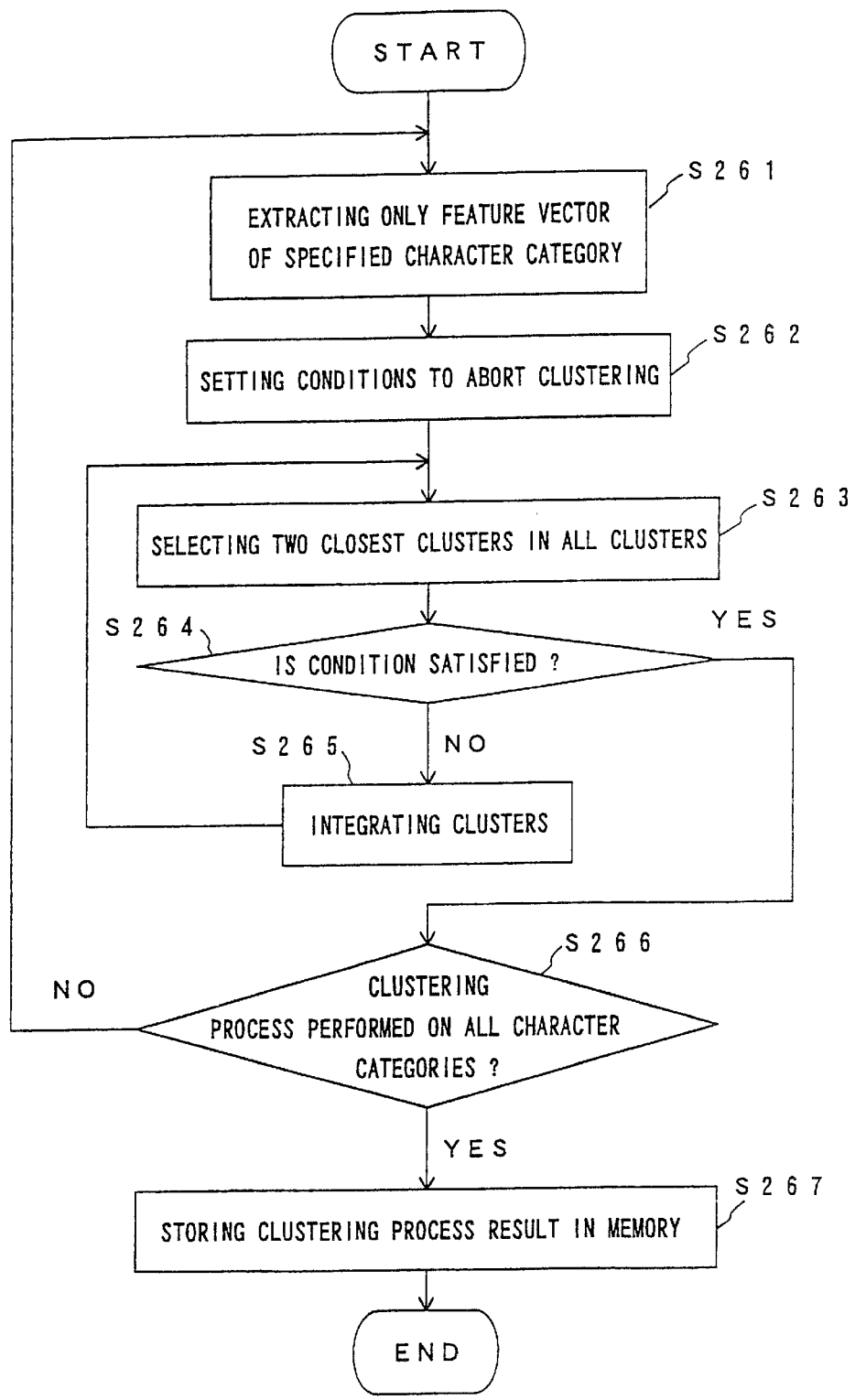
F I G. 7 3

FIG. 77

INTERMEDIATE PROCESS RESULT OF ENVIRONMENT RECOGNIZING SYSTEM (UP TO PROCESS OF CORRECTION ANALYZING UNIT)

| BOX NUMBER | TYPE OF CHARACTER BOX | BOX-TOUCH-ING CHARA-CTER? | WITH DELETION LINE? | QUALITY | NUMBER OF CHARACTERS | CHAR-ACTER CODE | RELIA-BILITY | CALLING PROCESS | COMPLETION OF PROCESS | PROCESS INSTRUCTION | PROCESS ORDER |
|---|---|---|---|---|---|---|---|---|---|---|---|
| 1 | FREE-PITCH | | | | 8? | | | | | | |
| | | YES | YES 2 | NORMAL | | | | | | | |
| | | YES | NO | NORMAL | | ⋮ | | | | | |
| | | ⋮ | ⋮ | ⋮ | | | | | | | |
| | | YES | NO | NORMAL | | | | | | | |
| 2 | ONE CHAR-ACTER | NO | YES 2 | NORMAL | 1 | | | | | | |
| 3 | ONE CHAR-ACTER | NO | NO | NORMAL | 1 | | | | | | |
| 4 | ONE CHAR-ACTER | YES | YES 2 | NORMAL | 1 | | | | | | |
| 5 | INDIVIDUAL CHARACTER BOXES | | | | 3 | | | | | | |
| 5-1 | ONE CHAR-ACTER | NO | YES 2 | NORMAL | 1 | | | | | | |
| 5-2 | ONE CHAR-ACTER | YES | NO | NORMAL | 1 | | | | | | |
| 5-3 | ONE CHAR-ACTER | NO | NO | NORMAL | 1 | | | | | | |
| 6 | TABLE | | | | | | | | | | |
| 6-1-1 | FREE-PITCH | YES | YES 1 | NORMAL | | | | | ⋮ | | ⋮ |
| ⋮ | ⋮ | ⋮ | ⋮ | ⋮ | ⋮ | | | | | | |
| 6-1-2 | FREE-PITCH | NO | YES 1 | NORMAL | | | | | | | |

YES 1 PLURAL CHARACTER (COLLECTIVE)
YES 2 ONE CHARACTER

\* OPTIONAL PROCESS

| CALLING PROCESS | COMPLETION OF PROCESS | PROCESS INSTRUCTION | PROCESS ORDER |
|---|---|---|---|
| SINGLE PROCESS * | | | PROCESS * |
| BLACK-CHARACTER-BOX/FREE-PITCH | | | BLACK-CHARACTER-BOX → FREE-PITCH |
| DELETION LINE (YES 2)/ BLACK-CHARACTER-BOX | | | BLACK-CHARACTER-BOX → ONE-CHARACTER DELETION LINE |
| BLACK-CHARACTER-BOX/FREE-PITCH /DELETION LINE (YES 2) | | | BLACK-CHARACTER-BOX → ONE-CHARACTER DELETION LINE → FREE-PITCH |
| BLACK-CHARACTER-BOX/FREE-PITCH /DELETION LINE (YES 1) | | | PLURAL-CHARACTER DELETION LINE → BLACK-CHARACTER-BOX → FREE-PITCH |
| FREE-PITCH/DELETION LINE (YES 1) | | | PLURAL-CHARACTER DELETION LINE →FREE-PITCH |
| OPTIONAL PROCESS A, B, AND C | PROCESS B | | UPDATING TO PROCESS A → PROCESS C WHEN PROCESS ORDER IS B→A→C |
| . | | | . |
| OPTIONAL PROCESS A, B, AND C . | PROCESS B | SKIPPING TO PROCESS C | SKIPPING TO PROCESS C WHEN PROCESS ORDER IS B→A→C |
| . | | | . |
| OPTIONAL PROCESS A, B, AND C . | PROCESS B | INVERTING ORDER BETWEEN PROCESSES C AND A | EXCHANGING ORDER TO PROCESS C → PROCESS A WHEN PROCESS ORDER IS B→A→C |
| . | | | . |
| OPTIONAL PROCESS B AND A | PROCESS A | TERMINATION | TERMINATION |

INTERMEDIATE PROCESS RESULT OF ENVIRONMENT RECOGNIZING SYSTEM
(GRADING FIRST INTERMEDIATE PROCESS RESULT TABLE/UP TO EXECUTION OF PROCESS ORDER CONTROL RULE)

| BOX NUMBER | TYPE OF CHARACTER BOX | BOX-TOUCH-ING CHARA-CTER? | WITH DELETION LINE? | QUALITY | NUMBER OF CHARACTERS | CHAR-ACTER CODE | RELI-ABIL-ITY | CALLING PROCESS | COMPLE-TION OF PROCESS | PROCESS INSTRUC-TION | PROCESS ORDER |
|---|---|---|---|---|---|---|---|---|---|---|---|
| 1 | FREE-PITCH | | | | 8? | | | | | | |
| | | YES | YES 2 | NORMAL | | | | BLACK-CHARACTER-BOX/ FREE-PITCH/ DELETION LINE (YES 2) | | | BLACK-CHARACTER-BOX → ONE-CHARACTER DELETION LINE FREE-PITCH |
| | | YES | NO | NORMAL | | | | BLACK-CHARACTER-BOX/ FREE-PITCH | | | BLACK-CHARACTER-BOX → FREE-PITCH |
| | | ... | ... | ... | ... | ... | ... | ... | ... | | |
| | | YES | NO | NORMAL | | | | BLACK-CHARACTER-BOX/ FREE-PITCH | | | BLACK-CHARACTER-BOX → FREE-PITCH |
| 2 | ONE CHAR-ACTER | NO | YES 2 | NORMAL | 1 | | | DELETION LINE (YES 2) | | | ONE-CHARACTER DELETION LINE |
| 3 | ONE CHAR-ACTER | NO | NO | NORMAL | 1 | | | BASIC | | | BASIC |
| 4 | ONE CHAR-ACTER | YES | YES 2 | NORMAL | 1 | | | BLACK-CHARACTER-BOX/ DELETION LINE (YES 2) | | | BLACK-CHARACTER-BOX → ONE-CHARACTER DELETION LINE |
| 5 | INDIVIDUAL CHARACTER BOXES | | | | 3 | | | | | | |
| 5-1 | ONE CHAR-ACTER | NO | YES 2 | NORMAL | 1 | | | DELETION LINE (YES 2) | | | ONE-CHARACTER DELETION LINE |
| 5-2 | ONE CHAR-ACTER | YES | NO | NORMAL | 1 | | | BLACK-CHARACTER-BOX | | | BLACK-CHARACTER-BOX |
| 5-3 | ONE CHAR-ACTER | NO | NO | NORMAL | 1 | | | BASIC | | | BASIC |
| 6 | TABLE | | | | | | | | | | |
| 6-1-1 | FREE-PITCH | YES | YES 1 | NORMAL | | | | BLACK-CHARACTER-BOX/ FREE-PITCH/ DELETION LINE (YES 1) | | | PLURAL-CHARACTER DELETION LINE · BLACK-CHARACTER-BOX → FREE-PITCH |
| ... | | ... | ... | ... | ... | ... | ... | ... | ... | | |
| 6-2-2 | FREE-PITCH | NO | YES 1 | NORMAL | | | | FREE-PITCH/ DELETION LINE (YES 1) | | | PLURAL-CHARACTER DELETION LINE → FREE-PITCH |

YES 1 PLURAL-CHARACTER DELETION LINE
YES 2 ONE CHARACTER

INTERMEDIATE PROCESS RESULT OF ENVIRONMENT RECOGNIZING SYSTEM
(READING SECOND INTERMEDIATE PROCESS RESULT TABLE/UP TO EXECUTION OF PROCESS ORDER CONTROL RULE)

| BOX NUMBER | TYPE OF CHARACTER BOX | BOX-TOUCH-ING CHARACTER? | WITH DELETION LINE? | QUALITY | NUMBER OF CHARACTERS | CHARACTER CODE | RELIABILITY | CALLING PROCESS | COMPLETION OF PROCESS | PROCESS INSTRUCTION | PROCESS ORDER |
|---|---|---|---|---|---|---|---|---|---|---|---|
| 1 | FREE-PITCH | YES | YES 2 | NORMAL | 8 ? | REJECT | BLACK-CHARACTER-BOX 20% | BLACK-CHARACTER-BOX/FREE-PITCH/DELETION LINE (YES 2) | BLACK-CHARACTER-BOX | | ONE-CHARACTER DELETION LINE FREE-PITCH |
| | | | | | | | | | | | |
| | | | NO | NORMAL | | 3 | BLACK-CHARACTER-BOX 60% | BLACK-CHARACTER-BOX/FREE-PITCH | BLACK-CHARACTER-BOX | | FREE-PITCH |
| | | | ... | ... | ... | ... | ... | ... | ... | | |
| | | | NO | NORMAL | 1 | 4 | BLACK-CHARACTER-BOX 95% | BLACK-CHARACTER-BOX/FREE-PITCH | BLACK-CHARACTER-BOX | | FREE-PITCH |
| | | | YES 2 | NORMAL | 1 | | DELETION LINE 10% | DELETION LINE (YES 2) | DELETION LINE | | |
| | | | NO | NORMAL | 1 | 3 | 95% | BASIC | BASIC | BASIC | BASIC |
| | | | YES 2 | NORMAL | 3 | REJECT | BLACK-CHARACTER-BOX 15% | BLACK-CHARACTER-BOX/DELETION LINE (YES 2) | BLACK-CHARACTER-BOX | | ONE-CHARACTER DELETION LINE |
| 5 | INDIVIDUAL CHARACTER BOXES | | | | | | | | | | |
| 5-1 | ONE CHARACTER | NO | YES 2 | NORMAL | 1 | 1 | 95% | DELETION LINE (YES 2) | DELETION LINE | TERMINATION | |
| 5-2 | ONE CHARACTER | YES | NO | NORMAL | | 2 | 95% | BLACK-CHARACTER-BOX | BLACK-CHARACTER-BOX | | |
| 5-3 | ONE CHARACTER | NO | NO | NORMAL | | 6 | 90% | BASIC | BASIC | | |
| 6 | TABLE | | | | | | | | | | |
| 6-1-1 | FREE-PITCH | YES | YES 1 | NORMAL | | DELETION LINE | 98% | BLACK-CHARACTER-BOX/FREE-PITCH/DELETION LINE (YES 1) | DELETION LINE | TERMINATION | |
| ... | ... | ... | ... | ... | ... | ... | ... | ... | ... | ... | ... |
| 6-2-2 | FREE-PITCH | NO | YES 1 | NORMAL | | DELETION LINE | 98% | FREE-PITCH/DELETION LINE (YES 1) | DELETION LINE | TERMINATION | |

YES 1 PLURAL-CHARACTER DELETION LINE
YES 2 ONE CHARACTER

FIG. 80

INTERMEDIATE PROCESS RESULT

| BOX NUMBER | TYPE OF CHARACTER BOX | BOX-TOUCHING CHARACTER? | WITH DELETION LINE? | QUALITY | NUMBER OF CHARACTERS | CHARACTER CODE | RELIABILITY | CALLING PROCESS | COMPLETION OF PROCESS | PROCESS INSTRUCTION | PROCESS ORDER |
|---|---|---|---|---|---|---|---|---|---|---|---|
| 1 | FREE-PITCH | | | | 7 | | | | | | |
| | | YES | YES 2 | NORMAL | 1 | DELETION LINE | 96% | BLACK-CHARACTER-BOX/FREE-PITCH/DELETION LINE (YES 2) | BLACK-CHARACTER-BOX/DELETION LINE | TERMINATION | |
| | | YES | NO | NORMAL | 1 | 3 | 95% | BLACK-CHARACTER-BOX/FREE-PITCH | BLACK-CHARACTER-BOX/FREE-PITCH | PERSONAL HANDWRITING FEATURES | |
| | | ... | ... | ... | ... | ... | ... | ... | ... | ... | |
| 2 | ONE CHARACTER | YES | NO | NORMAL | 1 | 4 | 98% | BLACK-CHARACTER-BOX/FREE-PITCH | BLACK-CHARACTER-BOX/FREE-PITCH | PERSONAL HANDWRITING FEATURES | |
| 3 | ONE CHARACTER | NO | YES 2 | NORMAL | 1 | 5 | 97% | BLACK-CHARACTER-BOX/FREE-PITCH | DELETION LINE/BASIC | PERSONAL HANDWRITING FEATURES | |
| 4 | ONE CHARACTER | YES | YES 2 | NORMAL | 1 | 3 | 95% | DELETION LINE (YES 2)/BASIC | BASIC | PERSONAL HANDWRITING FEATURES | |
| 5 | INDIVIDUAL CHARACTER BOXES | | | | 3 | | | BASIC | | TERMINATION | |
| 5-1 | ONE CHARACTER | NO | YES 2 | NORMAL | 1 | DELETION LINE | 95% | BLACK-CHARACTER-BOX/DELETION LINE (YES 2) | BLACK-CHARACTER-BOX/FREE-PITCH | TERMINATION | |
| 5-2 | ONE CHARACTER | YES | NO | NORMAL | 1 | 2 | 95% | DELETION LINE (YES 2) | DELETION LINE | PERSONAL HANDWRITING FEATURES | |
| 5-3 | ONE CHARACTER | NO | NO | NORMAL | 1 | 6 | 90% | BLACK-CHARACTER-BOX | BLACK-CHARACTER-BOX | BASIC | |
| 6 | TABLE | | | | | | | | | | |
| 6-1-1 | FREE-PITCH | YES | YES 1 | NORMAL | 1 | DELETION LINE | 98% | BASIC | DELETION LINE | TERMINATION | |
| ... | ... | ... | ... | ... | ... | ... | ... | BLACK-CHARACTER-BOX/FREE-PITCH/DELETION LINE (YES 1) | | | |
| 6-2-2 | FREE-PITCH | NO | YES 1 | NORMAL | 1 | DELETION LINE | 98% | FREE-PITCH/DELETION LINE (YES 1) | DELETION LINE | TERMINATION | |

YES 1 PLURAL-CHARACTER DELETION LINE
YES 2 ONE CHARACTER

FIG. 81

FINAL RESULT

| BOX NUMBER | TYPE OF CHARACTER BOX | BOX-TOUCHING CHARACTER | WITH DELETION LINE | QUALITY | NUMBER OF CHARACTER | CHARACTER CODE | RELIABILITY | CALLING PROCESS | COMPLETION OF PROCESS | PROCESS INSTRUCTION | PROCESS ORDER |
|---|---|---|---|---|---|---|---|---|---|---|---|
| 1 | FREE-PITCH | | | | 7 | | | | | | |
| | | YES | YES 2 | NORMAL | 1 | DELETION LINE | 96% | BLACK-CHARACTER-BOX/FREE-PITCH/DELETION LINE (YES 2) | BLACK-CHARACTER-BOX | TERMINATION | |
| | | YES | NO | NORMAL | 1 | 3 | 97% | BLACK-CHARACTER-BOX/FREE-PITCH | BLACK-CHARACTER-BOX/FREE-PITCH/ PERSONAL HANDWRITING FEATURES | TERMINATION | |
| | | : | : | : | : | : | : | : | : | | |
| | | YES | NO | NORMAL | 1 | 4 | 98% | BLACK-CHARACTER-BOX/FREE-PITCH | BLACK-CHARACTER-BOX/FREE-PITCH/ PERSONAL HANDWRITING FEATURES | TERMINATION | |
| 2 | ONE CHARACTER | NO | YES 2 | NORMAL | 1 | 5 | 97% | DELETION LINE (YES 2)/BASIC | DELETION LINE/BASIC/ PERSONAL HANDWRITING FEATURES | TERMINATION | |
| 3 | ONE CHARACTER | NO | NO | NORMAL | 1 | 3 | 97% | BASIC | BASIC/PERSONAL HANDWRITING FEATURES | TERMINATION | |
| 4 | ONE CHARACTER | YES | YES 2 | NORMAL | 1 | DELETION LINE | 95% | BLACK-CHARACTER-BOX/DELETION LINE(YES 2) | BLACK-CHARACTER-BOX/DELETION LINE | TERMINATION | |
| 5 | INDIVIDUAL CHARACTER BOXES | | | | 3 | | | | | | |
| 5-1 | ONE CHARACTER | NO | YES 2 | NORMAL | 1 | DELETION LINE | 95% | DELETION LINE(YES 2) | DELETION LINE | TERMINATION | |
| 5-2 | ONE CHARACTER | YES | NO | NORMAL | 1 | 2 | 97% | BLACK-CHARACTER-BOX | BLACK-CHARACTER-BOX/ PERSONAL HANDWRITING FEATURES | TERMINATION | |
| 5-3 | ONE CHARACTER | NO | NO | NORMAL | 1 | 6→4 | 96% | BASIC | BASIC/PERSONAL HANDWRITING FEATURES | TERMINATION | |
| 6 | TABLE | | | | | | | | | | |
| 6-1-1 | FREE-PITCH | YES | YES 1 | NORMAL | | DELETION LINE | 98% | BLACK-CHARACTER-BOX/ FREE-PITCH/ DELETION LINE(YES 1) | DELETION LINE | TERMINATION | |
| : | : | : | : | : | : | : | : | : | : | | |
| 6-2-2 | FREE-PITCH | NO | YES 1 | NORMAL | | DELETION LINE | 98% | FREE-PITCH/ DELETION LINE(YES 1) | DELETION LINE | TERMINATION | ⋯ |

YES 1 PLURAL-CHARACTER DELETION LINE
YES 2 ONE CHARACTER

F I G . 8 2

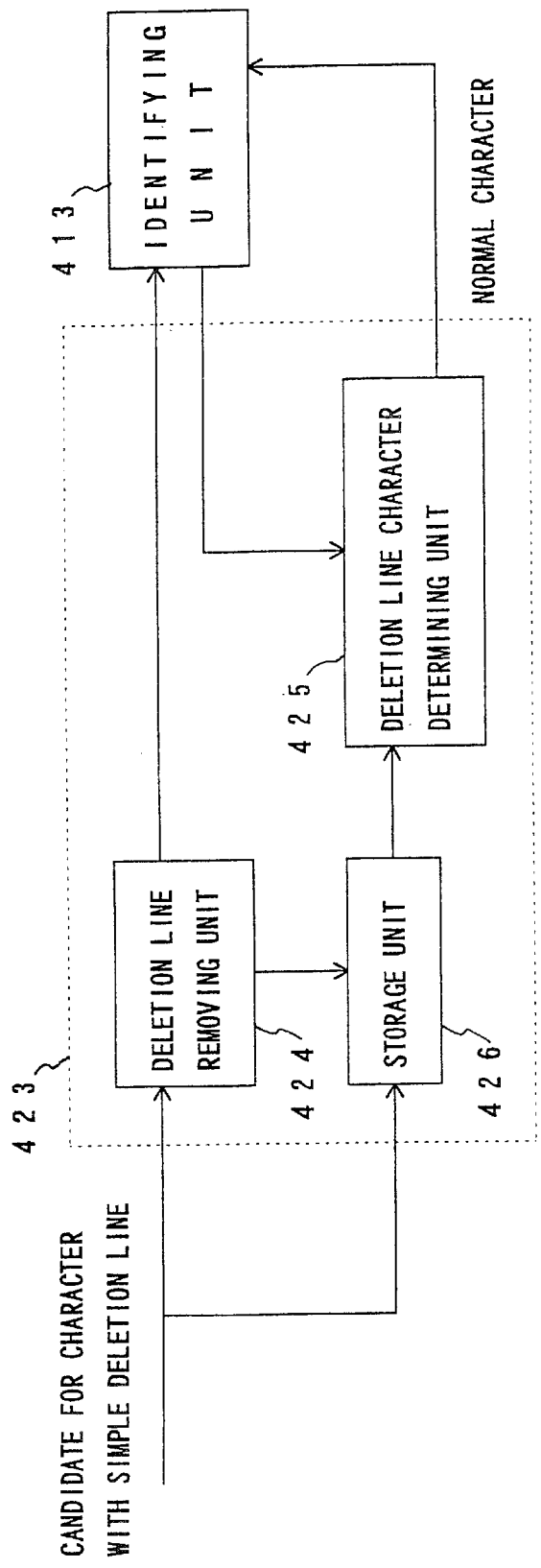
F I G. 87

PATTERN RECOGNIZING APPARATUS

CROSS-REFERENCE TO RELATED APPLICATION

This application is a division of and claims priority to U.S. application entitled Pattern Recognizing Apparatus and Method having Ser. No. 09/363,020, filed Jul. 29, 1999 now U.S. Pat. No. 6,335,986 which is a divisional of U.S. patent application Ser. No. 08/778,621, filed Jul. 3, 1997, now issued U.S. Pat. No. 6,104,833 the contents of, both incorporated by reference herein.

BACKGROUND OF THE INVENTION

1. Field of the Invention

The present invention relates to an apparatus and method for recognizing a pattern, and realizes to recognize characters, graphics, and symbols correctly depending on various states of input images when used with a printed character recognizing apparatus and a graphics recognizing apparatus as well as a handwritten character recognizing apparatus.

2. Description of the Related Art

Conventional handwritten character recognizing apparatuses such as an optical character reader (OCR) are designed to automatically reading characters written on an accounting list, etc. and automatically inputting the characters to eliminate the necessity of manually finding characters written on the accounting list, etc. and inputting the characters through a keyboard.

FIG. 1 is a block diagram showing the configuration of the conventional handwritten character recognizing apparatus.

In FIG. 1, a form/document 311 is read using a scanner to obtain a multiple-value image of the form/document 311.

A preprocessing unit 312 binarizes a multiple-value image; removes noises, and amends the position of the form/document 311.

Then, a character detecting unit 313 detects each character according to information about preliminarily defined ruled lines and positional information about a character.

A character recognizing unit 314 recognizes each character and outputs a character code. The character is recognized by collating each feature of an unknown character pattern detected by the character detecting unit 313 with the feature of each character category preliminarily entered in a recognizing dictionary 315.

For example, a distance between feature vectors in a feature space is computed by converting a 2-dimensional character pattern into a feature vector in a feature space representing the feature of the character, as a similarity between the unknown character pattern and the character category preliminarily entered in the recognizing dictionary 315. When the shortest distance is obtained between the feature vector of the unknown character pattern and the feature vector of the character category preliminarily entered in the recognizing dictionary 315, the character category is recognized corresponding to the unknown character pattern.

A threshold is set for a distance between two feature vectors to avoid mistakenly recognizing a non-character such as a deletion line, a noise, a symbol, etc. for a character and outputting a character code for a non-character. If the distance between the two feature vectors is larger than the threshold, a reject code is output by determining that the unknown character pattern has no corresponding character category preliminarily entered in the recognizing dictionary 315, or that the unknown character pattern refers to a non-character.

The recognizing dictionary 315 also contains the features of the character categories of high-quality characters, obscure characters, and deformed characters. A high-quality character recognizing dictionary 315 is referred to for high quality characters. An obscure character recognizing dictionary 315 is referred to for obscure characters. A deformed-character recognizing dictionary 315 is referred to for deformed characters. Thus, the difference in quality of the characters in the form/document 311 can be processed correspondingly.

FIG. 2 shows the configuration of the character recognizing apparatus for recognizing a character with a deletion line.

The character recognizing apparatus shown in FIG. 2 comprises an image input unit 491 for inputting an original image, containing a character and detecting or preprocessing a character from the input image, and an identifying unit 492 for identifying a character by extracting the feature of the character and comparing the extracted feature with the feature of the standard pattern stored in the recognizing dictionary.

When a character mistakenly entered in a form is removed with a deletion line, for example, six or more horizontal lines are entered on the character. It is determined that the character provided with six or more horizontal lines cannot be identified, and the character is rejected by the identifying unit 492 because it does not match any standard pattern stored in the recognizing dictionary.

However, the handwritten character recognizing apparatus shown in FIG. 1 equally processes a detected character among obscure characters, deformed characters, high-quality characters using the same recognizing dictionary 315.

Accordingly, there has been a problem that information about an obscure character entered in the recognizing dictionary 315 has a bad influence on the high-quality character recognizing process, and the obscure character entered in the recognizing dictionary 315 prevents high quality characters from being successful read.

In addition to obscure and deformed states, there are various environments for characters. For example, a character may touch its character box. When a single recognizing dictionary 315 is referred to in various environments, they affect each other, thereby generating a problem that the recognizing process cannot be performed with enhanced precision.

When the character recognizing apparatus shown in FIG. 2 recognizes a character, six or more horizontal lines are required to delete an entered character using a deletion line. This is a heavy load to a user and therefore cannot be completely observed. As a result, a character with an apparent deletion line makes a small distance from a standard pattern stored in the recognizing dictionary and fails to be clearly distinguished from a character without a deletion line. Thus, the character to be deleted cannot be rejected and mistakenly read.

For example, as indicated by (A) shown in FIG. 3, the '0' to be deleted is not rejected but recognized as '8'. As indicated by (B) shown in FIG. 3, the '1' to be deleted is not rejected but recognized as '8'. As indicated by (C) shown in FIG. 3, the '7' to be deleted is not rejected but recognized as '4'. As indicated by (D) shown in FIG. 3, the '6' to be deleted is not rejected but recognized as '6'.

SUMMARY OF THE INVENTION

The present invention aims at providing a pattern recognizing apparatus and method capable of appropriately recognizing a character with high precision depending on the environment of the character.

According to the feature of the present invention, an input pattern is recognized by extracting the first predetermined feature from the input pattern and extracting the second predetermined feature from the input pattern from which the first feature has been extracted.

As a result, a recognizing process can be performed depending on each environment of a character.

According to other features of the present invention, a pattern is recognized by extracting the state of a process object from an input image and selecting a recognizing process suitable for the state for each process object.

Thus, a pattern recognizing process can be performed appropriately for each state on the input image having various states, thereby realizing the recognizing process with high precision.

According to other feature of the present invention, a state of a process object is extracted from an input image, and a pattern recognizing process exclusively for the first state is performed on the process object in the first state, and a pattern recognizing process exclusively for the second state is performed on the process object in the second state.

Thus, the recognizing process on the process object, in the first state interacts with the recognizing process on the process object in the second state, thereby successfully performing the recognizing processes with high precision.

According to other feature of the present invention, recognizing dictionaries are appropriately selected for an input image in various states.

For example, even if obscure characters, deformed characters, and high-quality characters are mixed in the input image, the recognizing process can be performed with high precision by using an obscure character recognizing dictionary for obscure characters, a deformed-character recognizing dictionary for deformed characters, and high-quality character recognizing dictionary for high-quality characters.

According to other feature of the present invention, identification functions are appropriately selected for an input image in various states.

The recognizing process can be performed with high precision by, for example, recognizing a character using a city block distance on a character written in a one-character box, and recognizing a character using a discriminant function on a character written in a free-pitch box in consideration of the character detection reliability.

According to other feature of the present invention, knowledge is appropriately selected for an input image in various states.

The recognizing process can be performed with high precision by, for example, setting a correspondence between an unknown character and a character category by dividing a character into character segments when an unknown character is considerably deformed and has no correspondence with a character category stored in the recognizing dictionary, computing the detection reliability using a discriminant function generated based on a learning pattern when a character is detected from a character string, and evaluating the recognition reliability on a box-touching character using the reliability obtained through a learning pattern when the box-touching character is recognized.

According to other feature of the present invention, the recognizing process is performed according to priority until the reliability of the recognizing process reaches a predetermined value when a plurality of recognizing processes are called for a specified process object.

Thus, the reliability of the recognizing process can be enhanced and the precision of the process can be successfully improved.

According to other feature of the present invention, a non-character is extracted from an input image and a non-character recognizing process and a character recognizing process are performed separately on the extracted non-character.

As a result, the recognizing process can be performed with a high precision with less characters mistaken for non-characters and with less non-characters mistaken for characters.

According to other feature of the present invention the first predetermined feature is extracted from an input pattern, and the input pattern is recognized by extracting the second predetermined feature from the input pattern from which the first predetermined feature has not been extracted.

Thus, a character with a deletion line can be distinguished from a character without a deletion line, and only the character without a deletion line can be recognized. Therefore, it is possible to prevent a character with a deletion line from being mistakenly recognized for any other character.

According to other feature of the present invention, the first predetermined feature is extracted from an input pattern, a portion contributing to the first predetermined feature can be removed from the input pattern from which the first predetermined feature has been extracted, and the input pattern is recognized based on a pattern from which the portion contributing to the first predetermined feature has been removed.

Therefore, only a deletion line can be removed from the character with the deletion line when the character is recognized, thereby improving the precision in recognizing the character.

BRIEF DESCRIPTION OF THE DRAWINGS

FIG. 3 shows an example of recognizing a character with a deletion line;

FIG. 6 is a block diagram showing an embodiment of the practical configuration of the environment recognizing unit shown in FIG. 5;

FIG. 7 is a block diagram showing an embodiment of the practical configuration of the pattern recognizing apparatus shown in FIG. 5;

FIG. 13 is a flowchart showing an embodiment of the operations of the control unit for controlling character/non-character recognizing processes shown in FIG. 8;

FIGS. 17A through 17D show the representations of compressing the labelling process of the pattern recognizing apparatus according to an embodiment of the present invention;

FIG. 18 shows an example of the text extracting process of the pattern recognizing apparatus according to an embodiment of the present invention;

FIG. 20 shows the contiguous projecting method in the ruled line extracting process of the pattern recognizing apparatus according to an embodiment of the present invention;

FIGS. 29A through 29E show the types of boxes and tables used in the pattern recognizing apparatus according to an embodiment of the present invention;

FIGS. 34A through 34C show the method of computing the feature of a corrected character used in the pattern recognizing apparatus according to an embodiment of the present invention;

FIG. 36 shows an example of the method of computing a feature vector in the basic character recognizing unit shown in FIG. 7;

FIG. 37 shows an example of the method of computing the distance between the feature vectors in the basic character recognizing unit shown in FIG. 7;

FIG. 42 is a flowchart showing the process of the detailed identifying method for use with the basic character recognizing unit shown in FIG. 7;

FIGS. 43A through 43C show the method of completing a character by the box-touching character recognizing unit shown in FIG. 7;

FIGS. 44A through 44D show the re-completing method by the box-touching character recognizing unit shown in FIG. 7;

FIG. 47 shows the method of generating a box-touching character by the box-touching character recognizing unit shown in FIG. 7;

FIG. 48 shows an example of generating a box-touching character by the box-touching character recognizing unit shown in FIG. 7;

FIG. 49 shows an example of a knowledge table for use in the box-touching character recognizing unit shown in FIG. 7;

FIG. 50 shows an example of the type and amount of a change entered on the knowledge table for use in the box-touching character recognizing unit shown in FIG. 7;

FIGS. 52A through 52D show the re-recognizing method using an emphasized area by the box-touching character recognizing unit shown in FIG. 7;

FIG. 57 is a flowchart showing the statistic process performed by the character string recognizing unit shown in FIG. 7;

FIG. 73 is a flowchart showing the clustering process performed by the unique character analyzing unit shown in FIG. 7;

FIG. 77 shows an example of the intermediate process result table for use in the pattern recognizing apparatus according to an embodiment of the present invention;

FIG. 78 shows an example of the process order table for use in the pattern recognizing apparatus according to an embodiment of the present invention;

FIG. 79 shows an example of the intermediate process result table for use in the pattern recognizing apparatus according to an embodiment of the present invention;

FIG. 80 shows an example of the intermediate process result table for use in the pattern recognizing apparatus according to an embodiment of the present invention;

FIG. 81 shows an example of the intermediate process result table for use in the pattern recognizing apparatus according to an embodiment of the present invention;

FIG. 82 shows an example of the intermediate process result table for use in the pattern recognizing apparatus according to an embodiment of the present invention;

FIG. 87 is a block diagram showing the function of the pattern recognizing apparatus according to the seventh embodiment of the present invention;

DETAILED DESCRIPTION OF THE PREFERRED EMBODIMENTS

The pattern recognizing apparatus according to the first embodiment of the present invention is described by referring to the attached drawings.

Figure 4:
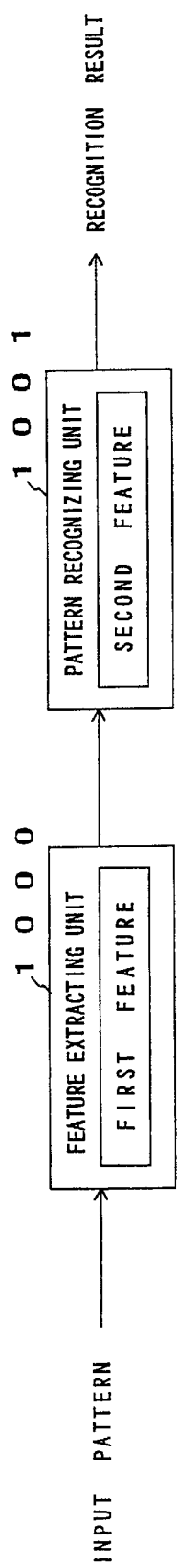
FIG. 4 is a block diagram showing the configuration of the pattern recognizing apparatus according to the first embodiment of the present invention.

FIG. 4 is a block diagram showing the functions of the pattern recognizing apparatus according to the first embodiment of the present invention.

In FIG. 4, a feature extracting unit 1000 extracts the first predetermined feature from an input pattern. A pattern recognizing unit 1001 recognizes an input pattern by extracting the second predetermined feature from the input pattern from which the feature extracting unit 1000 has extracted the first feature.

Thus, the pattern recognizing unit 1001 can recognize only an input pattern having the first predetermined feature, and can perform a recognizing process on each environment of the input pattern, thereby improving the precision of the recognizing process.

The pattern recognizing unit 1001 can also recognize an input pattern by extracting the second predetermined feature from the input pattern from which the feature extracting unit 1000 has not extracted the first feature.

The pattern recognizing unit 1001 can remove the input pattern having the first predetermined feature from a process object, and only an appropriate process object can be selected and recognized, thereby improving the precision of the recognizing process.

The pattern recognizing apparatus according to the second embodiment of the present invention is described by referring to the attached drawings.

Figure 5:
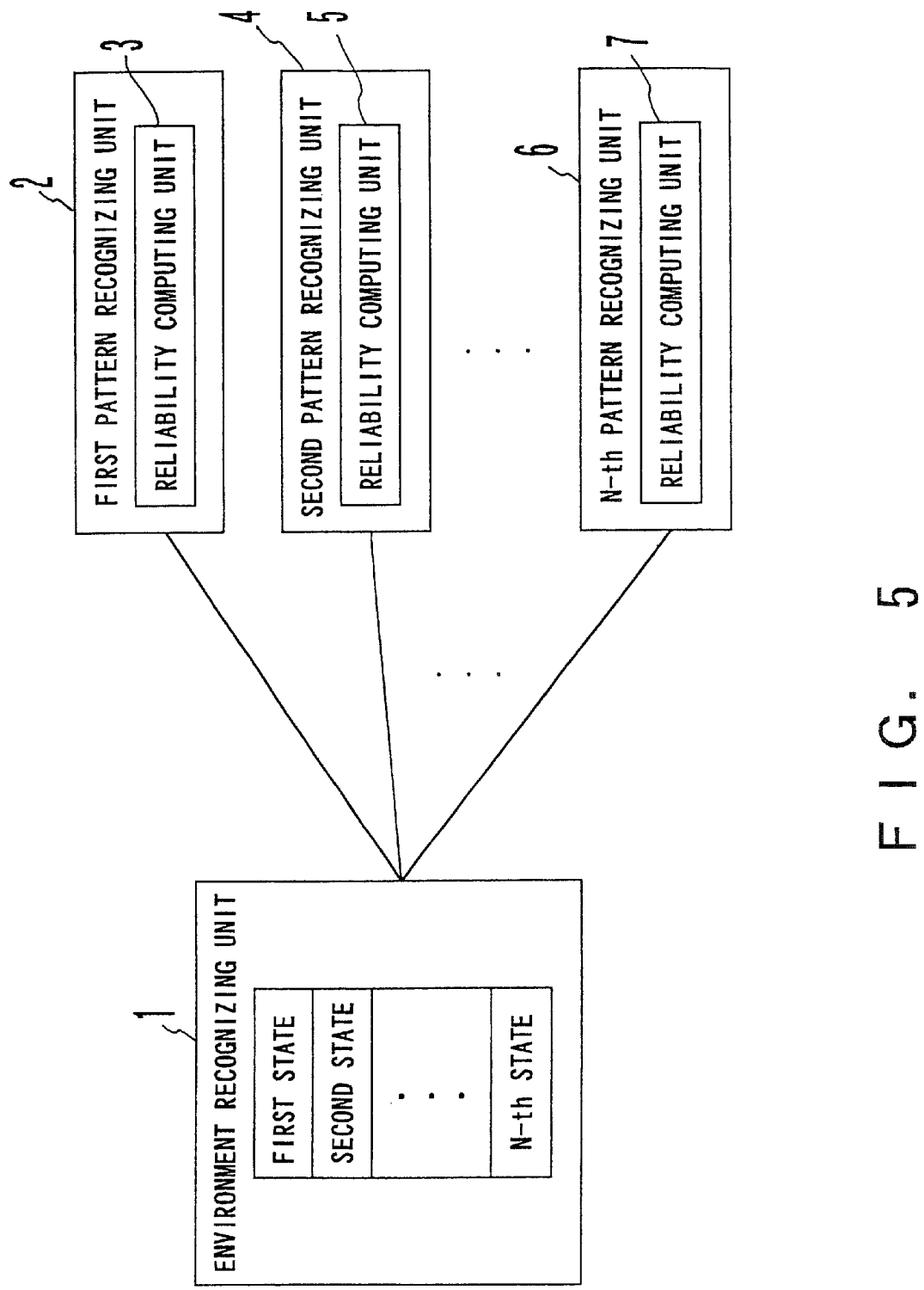
FIG. 5 is a block diagram showing the functions of the pattern recognizing apparatus according to the second embodiment of the present invention.

FIG. 5 is a block diagram showing the functions of the pattern recognizing apparatus according to the second embodiment of the present invention.

In FIG. 5, a environment recognizing unit 1 extracts the first through N-th states from an input image. A state extracted from the input image refers to, for example, the format such as a one-character box, a free-pitch box, table, etc. in which characters are written; the relationship between a character and its box; the obscurity of a character; the deformation of a character; the deletion of a character using a deletion line, etc.

A first pattern recognizing unit 2 exclusively recognizes a pattern of a process object in the first state. A second pattern recognizing unit 4 exclusively recognizes a pattern of a process object in the second state. An N-th pattern recognizing unit 6 exclusively recognizes a pattern of a process object in the N-th state.

The first through N-th pattern recognizing units 2, 4, and 6 respectively comprise reliability computing units 3, 5, and 7, and compute the reliability of the recognition results obtained by the first through N-th pattern recognizing units 2, 4, and 6.

The environment recognizing unit 1 calls any of the first through N-th pattern recognizing units 2, 4, and 6 corresponding to the first through N-th state to perform a recognizing process.

For example, when the environment recognizing unit 1 extracts the first state from the input image, the pattern recognizing process to be performed by the first pattern recognizing unit 2 is called for the process object in the first state. When the second state is extracted from the input image, the pattern recognizing process to be performed by the second pattern recognizing unit 4 is called for the process object in the second state. When the N-th state is extracted from the input image, the pattern recognizing process to be performed by the N-th pattern recognizing unit 6 is called for the process object in the N-th state.

When the environment recognizing unit 1 extracts, for example, the first and second states for a single process object, the pattern recognizing processes to be respectively performed by the first pattern recognizing unit 2 and second pattern recognizing unit 4 are called for the process object.

Assume that the first state refers to the state in which characters are written in one-character boxes, the second state refers to the state in which characters are written in free-pitch character boxes, the third state refers to the state in which a character touches its character box, the fourth state refers to the state in which a character is obscure, the fifth state refers to the state in which a character is deformed, and the sixth state refers to the state in which a character is corrected using deletion lines. With the above described states defined above, the first pattern recognizing unit 2 recognizes a character written in a one-character box, the second pattern recognizing unit 4 recognizes a character string written in a free-pitch box, the third pattern recognizing unit recognizes a box-touching character, the fourth pattern recognizing unit recognizes an obscure character, the fifth pattern recognizing unit recognizes a deformed character, and the sixth pattern recognizing unit recognizes a corrected character.

When the environment recognizing unit 1 extracts a one-character box from the input image, the first pattern recognizing unit 2 performs the recognizing process on the character written in the one-character box. When the environment recognizing unit 1 extracts a free-pitch box from the input image, the second pattern recognizing unit 4 performs the recognizing process on the character written in the free-pitch box. When the environment recognizing unit 1 extracts a box-touching character from the input image, the third pattern recognizing unit performs the recognizing process on the box-touching character. When the environment recognizing unit 1 extracts an obscure character from the input image, the fourth pattern recognizing unit performs the recognizing process on the obscure character. When the environment recognizing unit 1 extracts a deformed character from the input image, the fifth pattern recognizing unit performs the recognizing process on the deformed character. When the environment recognizing unit 1 extracts a candidate for a corrected character from the input image, the sixth pattern recognizing unit performs the recognizing process on the candidate for the corrected character.

For example, when the environment recognizing unit 1 extracts a box-touching character touching a free-pitch box from the input image, the pattern recognizing unit 2 and the pattern recognizing unit 3 perform the recognizing processes on the box-touching character touching the free-pitch box. When the environment recognizing unit 1 extracts a box-touching character with deletion lines which touches a free-pitch box from the input image, the second pattern recognizing unit 4, the third pattern recognizing unit, and the sixth pattern recognizing unit perform the recognizing processes on the box-touching character with deletion lines which touches the free-pitch box.

When a plurality of states are extracted from a single process object and a plurality of pattern recognizing units 2, 4, and 6 are called, the order of the recognizing processes to be performed by the plurality of pattern recognizing units 2, 4, and 6 is determined according to the process order table storing the order of calling the plurality of pattern recognizing units 2, 4, and 6. Thus, the recognizing processes to be performed by the plurality of pattern recognizing units 2, 4, and 6 are sequentially performed in the calling order until the reliability larger than a predetermined threshold can be obtained by the reliability computing units 3, 5, and 7 in the recognizing processes performed by the pattern recognizing units 2, 4, and 6.

For example, when the environment recognizing unit 1 extracts a box-touching character which touches a free-pitch box from an input image, the third pattern recognizing unit first performs the recognizing process and then the second pattern recognizing unit performs the recognizing process on the box-touching character which touches the free-pitch box. When the environment recognizing unit 1 extracts a box-touching character with deletion lines which touches a free-pitch box from an input image, the third pattern recognizing unit first performs the recognizing process, the sixth pattern recognizing unit performs the recognizing process, and then the second pattern recognizing unit 4 performs the recognizing process on the box-touching character with deletion lines which touches the free-pitch box.

Figure 1:
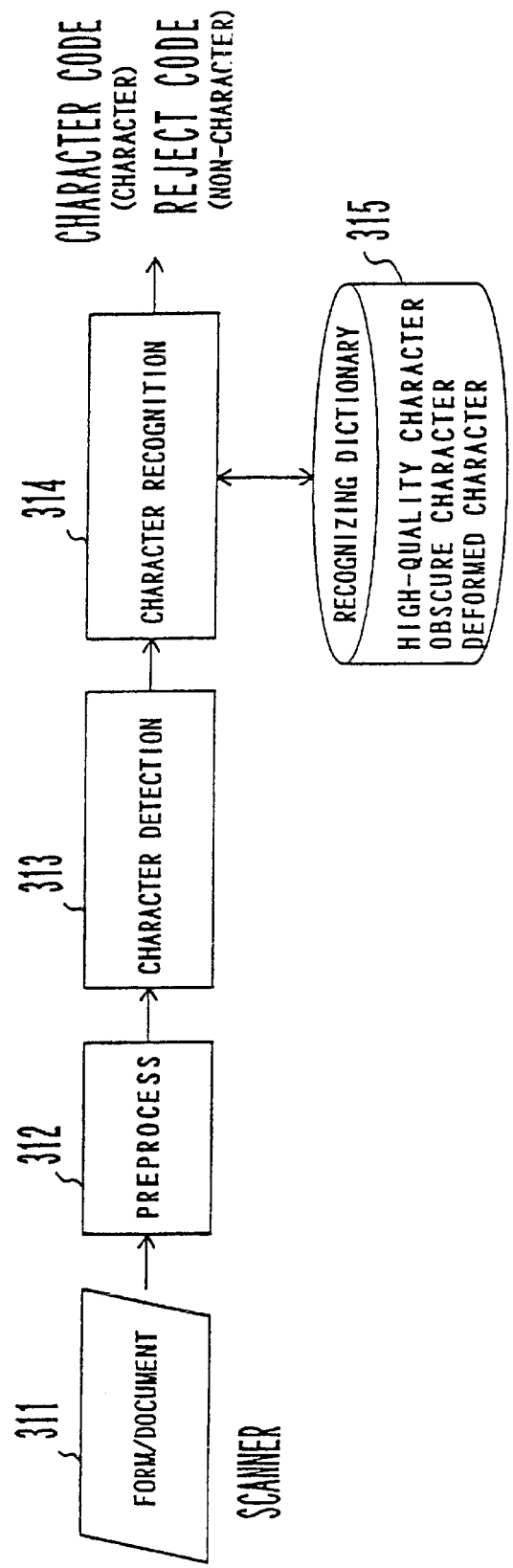
FIG. 1 is a block diagram showing the configuration of the conventional character recognizing apparatus.
Figure 2:
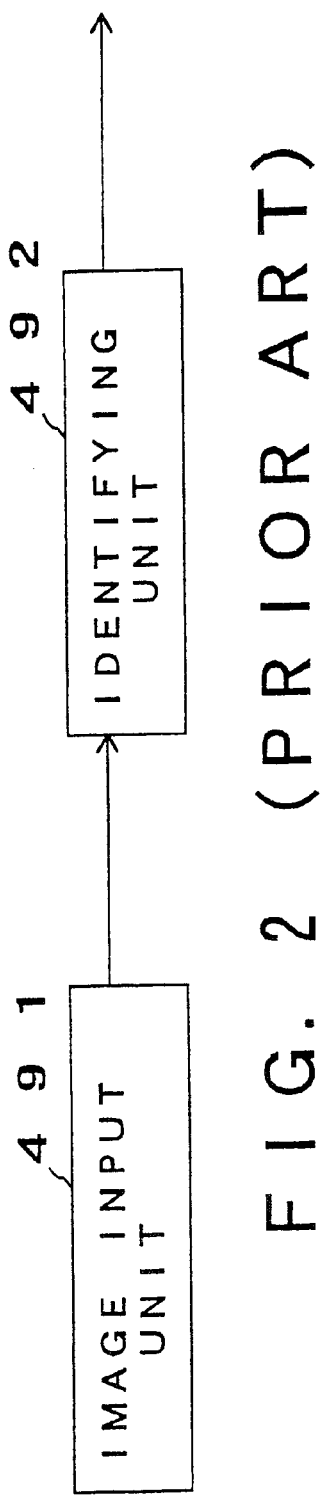
FIG. 2 is a block diagram showing the configuration of the conventional character recognizing apparatus.

FIG. 6 is a block diagram showing the configuration of an embodiment of the environment recognizing unit 1 shown in FIG. 1.

In FIG. 6, a state extracting unit 1a extracts the first through the N-th states from an input image.

A recognizing process controlling unit 1b calls one or a plurality of the first through N-th pattern recognizing units 2, 4, and 6 shown in FIG. 5 corresponding to the first through N-th states extracted by the state extracting unit 1a for use in a recognizing process.

A process order table 1f stores the process order indicating the process order of the first through N-th pattern recognizing units 2, 4, and 6 when the plurality of recognizing units are called from among the first through N-th pattern recognizing units 2, 4, and 6.

A process order control rule storage unit 1d stores the calling procedure indicating the recognizing unit to be called from among the first through N-th pattern recognizing units 2, 4, and 6 based on the first through N-th states extracted by the state extracting unit 1a.

An intermediate process result table generating unit 1c generates an intermediate process result table indicating the process order of the first through N-th pattern recognizing units 2, 4, and 6 according to the calling procedure stored in the process order control rule storage unit 1d and the process order stored in the process order table 1f.

A process performing rule storage unit 1e stores the procedure indicating the next process to be performed based on the result of the recognizing process entered in the intermediate process result table.

As described above, the pattern recognizing apparatus shown in FIG. 5 extracts the state of a process object from an input image, selects an appropriate recognizing process for the state for each process object so that an appropriate pattern recognizing process can be performed for each state on an input image having various states, thereby performing the recognizing process with high precision. Since the process object is evaluated when the state is extracted and also when a recognizing process is performed on the process object, the precision of the recognizing process can be furthermore improved.

For example, extracting the state of a process object from an input image, performing the pattern recognizing process exclusively for the first state on the process object having the first state, and performing the pattern recognizing process exclusively for the second state on the process object having the second state suppress the mutual influence between the recognizing process on the process object having the first state and the recognizing process on the process object having the second state, thereby realizing a recognizing process with high precision.

Furthermore, performing a plurality of recognizing processes on a single process object until the reliability of the recognizing process reaches a predetermined value improves the reliability of the recognizing process with enhanced precision.

FIG. 7 is a block diagram showing a practical configuration of the pattern recognizing apparatus according to an embodiment of the present invention.

In FIG. 7, an environment recognizing system 11 extracts the state of an input image, and calls one or a plurality of a basic character recognizing unit 17, a character string recognizing unit 15, a box-touching character recognizing unit 13, an obscure character recognizing unit 19, a deformed character recognizing unit 21 of a character recognizing unit 12 and a deletion line recognizing unit 26 and noise recognizing unit 28 of a non-character recognizing unit 25 based on the extracted state.

The character recognizing unit 12 performs a character recognizing process for each state of an input image and comprises the basic character recognizing unit 17 for recognizing a character, the character string recognizing unit 15 for performing a character recognizing process B and a character detecting process B on a character string, the box-touching character recognizing unit 13 for performing a character recognizing process A and a character detecting process A on a box-touching character, the obscure character recognizing unit 19 for performing a character recognizing process C and a character detecting process C on an obscure character, the deformed character recognizing unit 21 for performing a character recognizing process D and a character detecting process D on a deformed character, and the unique character recognizing unit 23 for performing a unique character recognizing process E and a unique character detecting process E on a unique character.

The basic character recognizing unit 17, character string recognizing unit 15, box-touching character recognizing unit 13, obscure character recognizing unit 19, deformed character recognizing unit 21, and unique character recognizing unit 23 respectively comprise knowledge tables 14, 16, 18, 20, 22 and 24 storing the knowledge of the character recognizing method. The knowledge table 14 stores the knowledge of a box-touching state and reliability of a recognizing process and the knowledge of the overlapping portion pattern method. The knowledge table 16 stores, for example, the knowledge of the reliability of a detecting process and the knowledge of the method of combining a detecting process and a recognizing process. The knowledge table 18 stores, for example, the knowledge about a detail recognizing method.

With the above described configuration, a recognizing process can be performed on an input image having various states by selecting and referring to appropriate knowledge for each state, thereby improving the precision of the recognizing process.

Furthermore, a recognizing process can be performed on an input image having various states by selecting and referring to appropriate recognizing dictionary for each state, thereby improving the precision of the recognizing process.

Additionally, a recognizing process can be performed on an input image having various states by selecting appropriate identification function for each state, thereby improving the precision of the recognizing process.

The non-character recognizing unit 25 performs a non-character recognizing process for each state of an input image, and comprises the deletion line recognizing unit 26 for performing a non-character recognizing process F and a non-character detecting process F on a character with a deletion line, and the noise recognizing unit 28 for performing a non-character recognizing process G and a non-character detecting process G on a noise.

The deletion line recognizing unit 26 and noise recognizing unit 28 respectively comprise knowledge tables 27 and 29 storing the knowledge of non-character recognizing methods.

Thus, the recognizing process can be performed with high precision with less characters mistaken for non-characters and with less non-characters mistaken for characters by performing the recognizing process on characters and non-characters separately.

Figure 8:
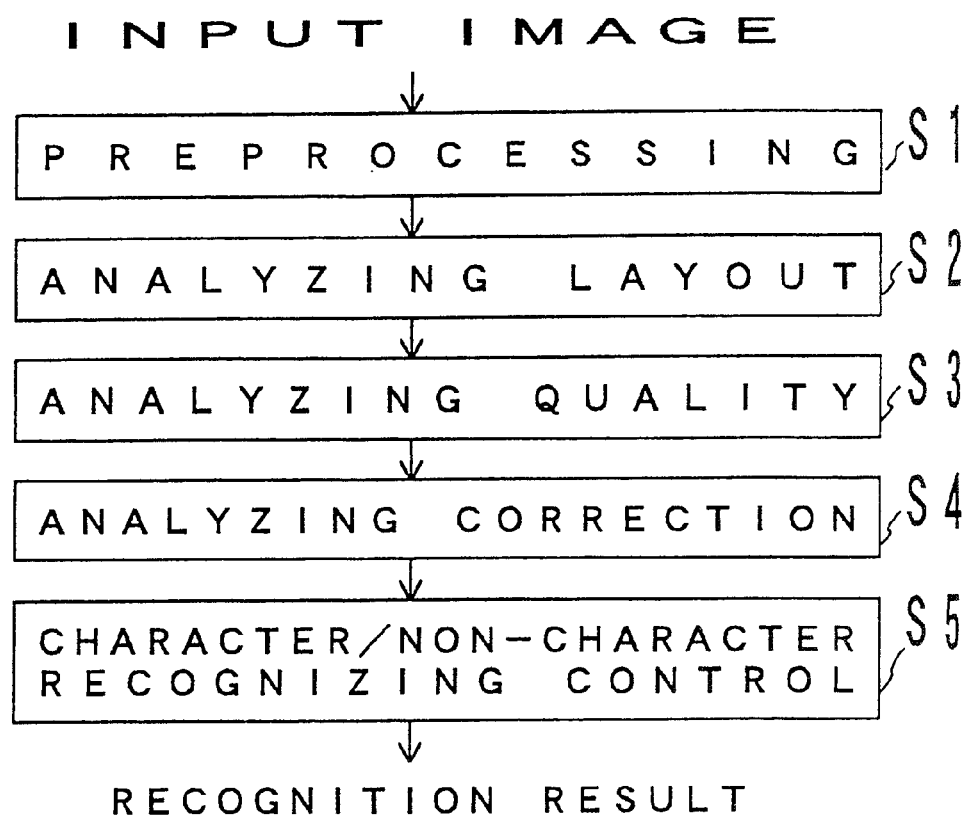
FIG. 8 is a flowchart showing an embodiment of the entire operations of the environment recognizing system shown in FIG. 1.

FIG. 8 is a flowchart showing an example of the entire process of the environment recognizing system 11.

In FIG. 8, an input image is pre-processed in step S1. The pre-process of the input image is performed by labelling the input image binarized by a facsimile, a scanner, etc., and the input image and the labelled image are stored. The input image and the labelled image are stored in a way that they can be accessed at any time in the subsequent processes.

Figure 9:
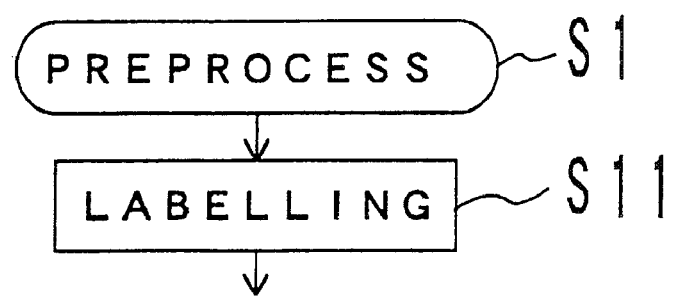
FIG. 9 is a flowchart showing an embodiment of the operations of the preprocessing unit shown in FIG. 8.

FIG. 9 is a flowchart showing the pre-process of the input image shown in FIG. 8.

In FIG. 9, a binarized input image is labelled in step S11 so that a link pattern can be extracted and labelled, and the extracted labelled image and the input image are stored. At this time, the memory capacity can be saved by compressing the labelled link pattern by adding and subtracting the circumscribing rectangle. By compressing the labelled link pattern, a document/form of the size A4 (about 3000×4000 pixel) entered by a scanner at the high resolution of, for example, 400 dpi can be represented within, several hundred kilobytes.

Next, a layout is analyzed in step S2 shown in FIG. 8. The analysis of the layout is performed by recognizing a text, extracting a ruled line, extracting a character box, determining the type of box and table, determining the existence of a box-touching character, and recognizing a drawing based on the size, the arrangement, etc. of a labelled link pattern.

Figure 10:
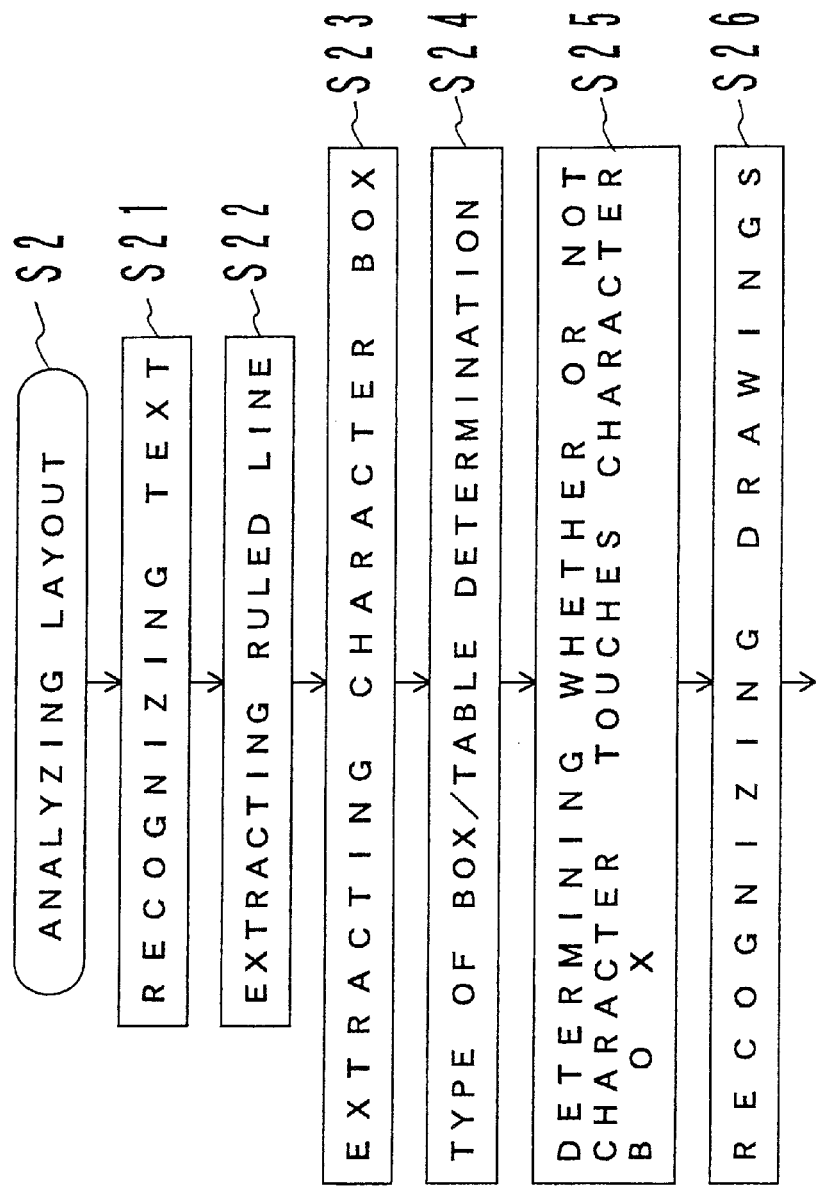
FIG. 10 is a flowchart showing an embodiment of the operations of the layout analyzing unit shown in FIG. 8.

FIG. 10 is a flowchart showing the layout analysis shown in FIG. 8.

In FIG. 10, the text is recognized in step S21. In this text recognition, the size of the labelled link pattern is analyzed, and a link pattern of a relatively small size is extracted and defined as a candidate for a character. Then, a text is extracted by integrating the candidate with the adjacent character candidate.

Then, a ruled line is extracted in step S22. The ruled line can be extracted by searching a pattern indicating a larger histogram value in the vertical or horizontal direction for the link patterns which are not recognized as text in step S21.

Then, a character box is extracted in step S23. The character box is extracted by detecting ruled lines corresponding to the four sides of the box from the ruled lines extracted in step S22.

Then, in step S24, the type of box and table is discriminated. By discriminating the type of box and table, the type of the character box extracted in step S23 is discriminated and the attribute of the type of the character box is assigned. The attribute of the type of the character box can be a one-character box, a block character box, a free-pitch character box, a table, etc.

In step S25, it is determined whether or not a box-touching character exists. The determination of the box-touching character is performed by detecting a crossing pattern when the character box is searched along the character box line. If a crossing pattern exists, it is determined that the character touches the character box. Another character in the adjacent character box may be partly out of its box and enters the present box. Therefore, in such cases, the character partly out of its own box and entering the present box is not defined as a box-touching character to the present character box.

Then, a drawing is recognized in step S26. In the recognition of the drawing, a link pattern of a relatively large size which has not been assigned the attribute such as a text, character box, table, etc. is assigned an attribute of the drawing.

A quality is analyzed in step S3 shown in FIG. 8. In the quality analysis, obscurity, deformation, etc. is detected if any in the input image. The analysis can be a global quality analysis and a local quality analysis.

In this quality analysis, it is determined that an obscure character is detected in a predetermined area if the value obtained by dividing (the number of link areas having the sizes of the area, length, and width smaller than the respectively predetermined threshold values) by (the number of all link areas in the predetermined area) is larger than a predetermined value.

It is also determined that an obscurity is detected in a predetermined area if the value obtained by dividing (the total length of the completed portion when the obscure ruled line is completed) by (the total length of each ruled line) is larger than a predetermined value according to the information into which an obscure ruled line in extracting the ruled line is partly integrated.

Furthermore, it is determined that deformation is detected in a predetermined area if the value obtained by dividing (the number of link areas indicating the black picture element density larger than a predetermined threshold) by (the total number of link areas in the predetermined area) is larger than a predetermined value.

Figure 11:
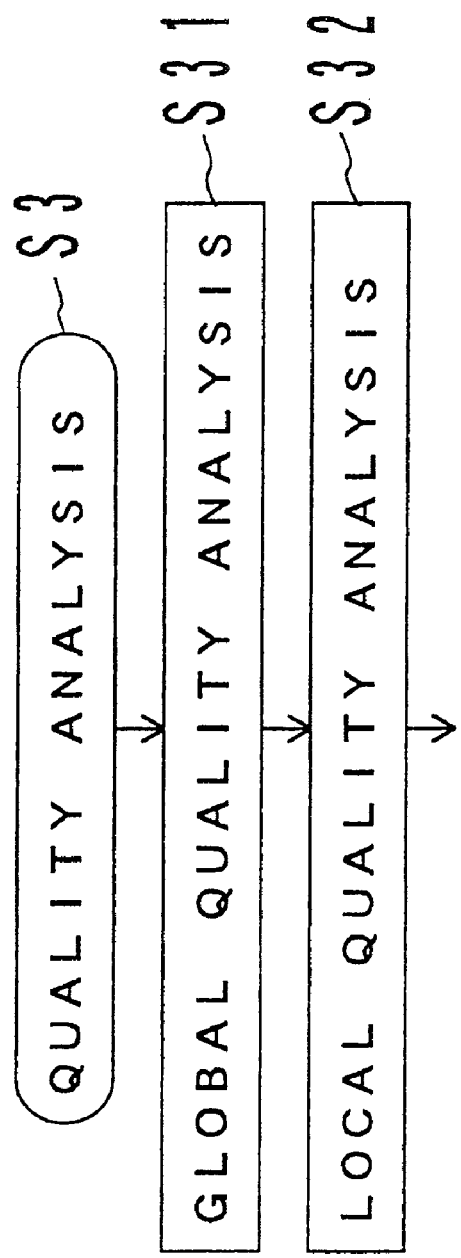
FIG. 11 is a flowchart showing an embodiment of the operations of the quality analyzing unit shown in FIG. 8.

FIG. 11 is a flowchart of the quality analysis shown in FIG. 8.

In FIG. 11, a global quality analysis is performed instep S31. The global quality analysis is performed on the entire document/form, and determines whether or not the threshold used in binarizing the input image is appropriate, whether or not the quality of the document/form with noises given to them after transmitted through facsimile is acceptable, and whether or not obscurity or deformation has been generated.

Then, a local quality analysis is performed in step S32. The local quality analysis is performed by checking whether or not obscurity or deformation has been generated or whether or not noises have been generated in each of the areas assigned attributes of a one-character box, a text, a free-pitch character box, a table, etc. in the layout analysis.

Next, a correction analysis is performed in step S4 shown in FIG. 8. In the correction analysis, a deletion line is extracted from an input image, and a character recognizing process can be omitted for the character corrected with the deletion line.

Figure 12:
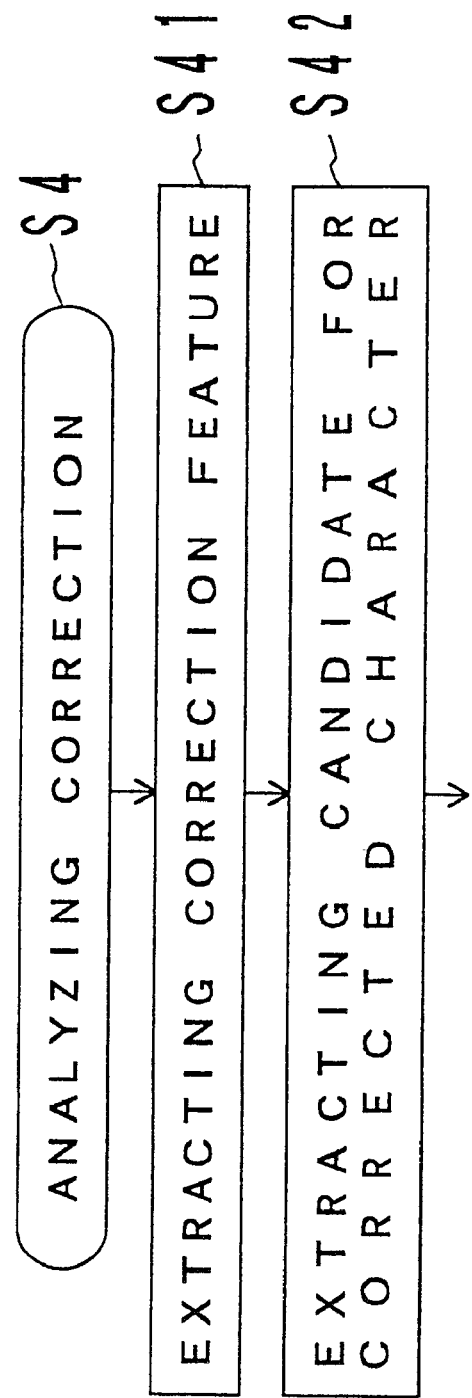
FIG. 12 is a flowchart showing an embodiment of the operations of the correction analyzing unit shown in FIG. 8.

FIG. 12 is a flowchart showing the correction analysis shown in FIG. 8.

In FIG. 12, a correction feature is extracted in step S41. In this correction feature extraction, a feature of a corrected character is extracted. The corrected character can be one of the four types of character, that is, a deformed character, a character removed with double lines, a character removed with a diagonal line, and a character removed with a symbol 'x'. The feature of each of the corrected characters can be extracted by computing the black picture element density, line density, Euler number, histogram value, etc.

Then, a correction character candidate extracting process is performed in step S42. A candidate for a corrected character is extracted based on the difference between the corrected character and the non-corrected normal character in a feature space representing the features of the corrected character.

Next, a character/non-character recognizing control is performed in step S5 shown in FIG. 8. In the character/non-character recognizing control, it is determined which should be called from among the basic character recognizing unit 17, character string recognizing unit 15, box-touching character recognizing unit 13, obscure character recognizing unit 19, deformed character recognizing unit 21 of the character recognizing unit 12 and the deletion line recognizing unit 26 and noise recognizing unit 28 of the non-character recognizing unit 25, based on the state of an input image extracted in step S2 through S4 shown in FIG. 8. In this control, the intermediate process result table is read, process order control rule is followed and terminated, and the process is performed under process execution rules.

The process order control rule shows the procedure of calling which should be called from among the basic character recognizing unit 17, character string recognizing unit 15, box-touching character recognizing unit 13, obscure character recognizing unit 19, and deformed character recognizing unit 21 of the character recognizing unit 12 and the deletion line recognizing unit 26 and noise recognizing unit 28 of the non-character recognizing unit 25, based on the state extracted by the environment recognizing system 11.

The process execution rule indicates the procedure of the process to be performed next, based on the result of the recognizing process called according to the process order control rule.

The intermediate process result table includes the state of the input image extracted in step S2 through S4 shown in FIG. 8 for each of the areas assigned the attributes of a one-character box, text, free-pitch character box, table, etc. through the layout analysis. On the intermediate process result table, the processes called according to the input process order control rule are entered in the process order stored in the process order table.

For example, when the environment recognizing system 11 extracts a character, the basic character recognizing unit 17 is called to perform a recognizing process on the character. When the environment recognizing system 11 extracts a text in step S21 shown in FIG. 10, the character string recognizing unit 15 is called to perform a recognizing process on the text. When the environment recognizing system 11 extracts a box-touching character in step S25 shown in FIG. 10, the box-touching character recognizing unit 13 is called to perform a recognizing process on the box-touching character. When the environment recognizing system 11 determines in step S32 that the value obtained by dividing (the number of link areas having the sizes of the area, length, and width smaller than the respectively predetermined threshold values) by (the number of all link areas in the predetermined area) is larger than a predetermined value, the obscure character recognizing unit 19 is called to perform a recognizing process on the character in this area. When the environment recognizing system 11 determines in step S32 that the value obtained by dividing (the number of link areas indicating the black picture element density larger than a predetermined threshold) by (the total number of link areas in the predetermined area) is larger than a predetermined value, the deformed character recognizing unit 21 is called to perform a recognizing process on the character in this area. When the environment recognizing system 11 extracts a candidate for a corrected character in step S42 shown in FIG. 12, the deletion line recognizing unit 26 is called to perform a recognizing process on the candidate for a corrected character. When the environment recognizing system 11 detects a noise in step S32 shown in FIG. 11, the noise recognizing unit 28 is called to perform a recognizing process on the noise.

FIG. 13 is a flowchart showing the control of character recognizing process/non-character recognizing process shown in FIG. 8.

In FIG. 13, the intermediate process result table is read and the process order control rules are executed in step S51.

Then, it is determined in step S52 whether or not the process has been completed. It is determined that the process has been completed when all processes on the intermediate process result table have been completed based on the process order control rules, and all process instruction columns on the intermediate process result table contain completion entries. If it is determined that the process has not been completed yet, then control is passed to step S53, returned to step S51 after performing the process according to the process execution rules, and the above described processes are repeated until it is determined in step S52 that the process has been completed.

Figure 14:
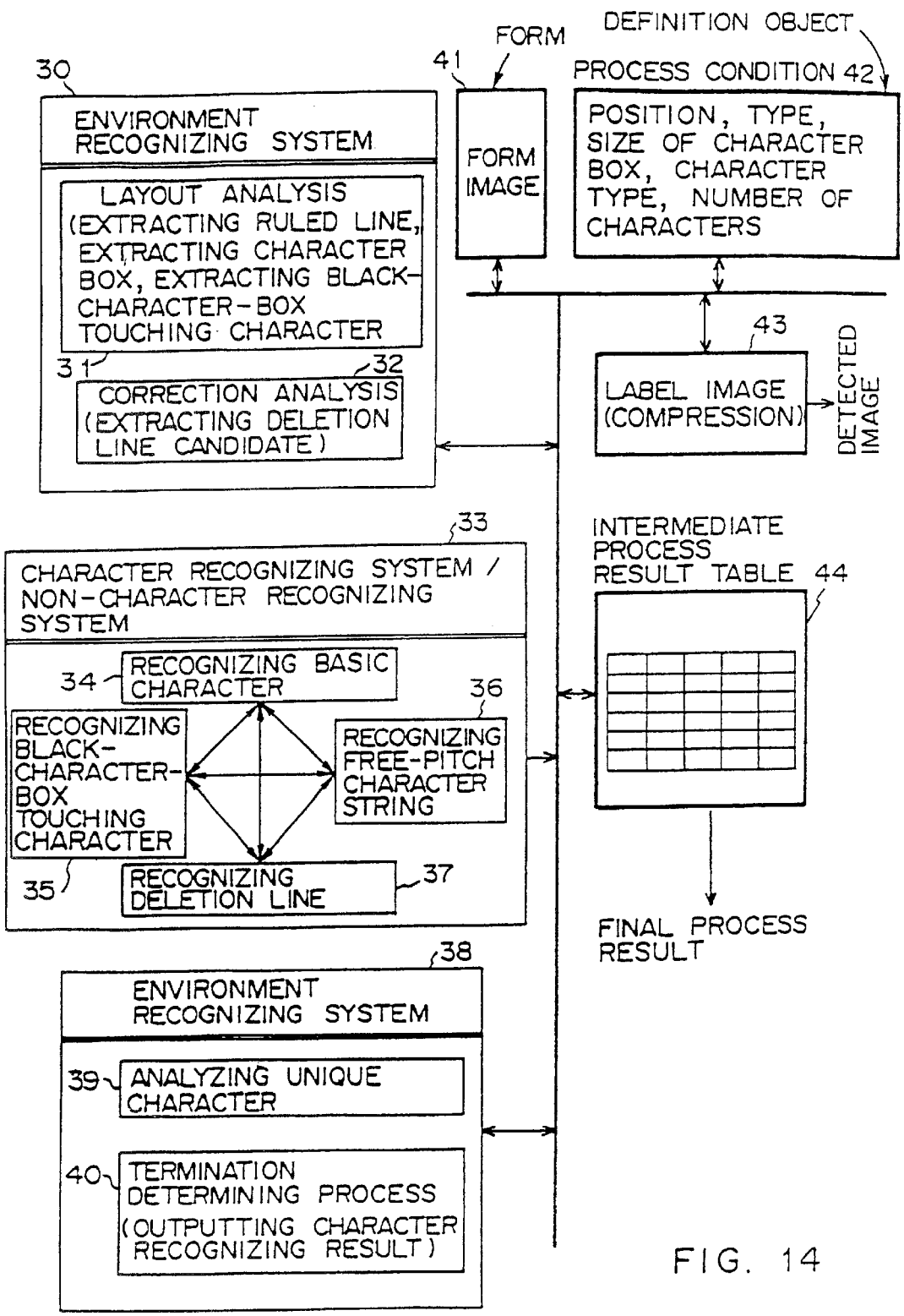
FIG. 14 is a block diagram showing the configuration of the pattern recognizing apparatus according to an embodiment of the present invention.

FIG. 14 is a block diagram showing the configuration of the pattern recognizing apparatus according to an embodiment of the present invention.

In FIG. 14, an image storage unit 41 stores a form image. A process condition storage unit 42 stores definitions such as the layout structure of the form and read character information, for example, the position, type, and size of a character box, type of characters, number of characters, etc. A labelled image storage unit 43 stores compressed and labelled images.

An environment recognizing system 30 comprises a layout analyzing unit 31 and correction analyzing unit 32. An environment recognizing system 38 comprises a unique character analyzing unit 39 and a completion determining unit 40. A character recognizing system/non-character recognizing system 33 comprises a basic character recognizing unit 34, a black-character-box touching character recognizing unit 35, a free-pitch character string recognizing unit 36, and a deletion line recognizing unit 37.

The layout analyzing unit 31 refers to the definitions stored in the process condition storage unit 42 for a labelled image stored in the labelled image storage unit 43, and extracts ruled lines, character boxes, and black-character-box touching character. The method of preliminarily storing format information about the position and size of a character box and information about the pose of a character box as list data, and extracting ruled lines and character boxes according to the list data is disclosed by, for example, Tokukaisho 62-21288 and Tokukaihei 3-126186.

As described in, for example, Tokukaihei 6-309498 and Tokukaihei 7-28937, ruled lines and character boxes can be extracted without entering format information such as the position and size of a character box.

The correction analyzing unit 32 extracts a candidate for a deletion line. The unique character analyzing unit 39 analyzes a unique character having a personal handwritten feature. The completion determining unit 40 determines the completion of a character recognizing process, and outputs a character recognition result when it is determined that the process has been completed.

The basic character recognizing unit 34 recognizes characters detected one by one. The black-character-ox touching character recognizing unit 35 removes a character box from a black-character-box touching character, completes an obscure character by removing the character box, and then recognizes the character. The free-pitch character string recognizing unit 36 recognizes a character in a character string in consideration of the detection reliability when the character is detected from the character string. The deletion line recognizing unit 37 recognizes a deletion line based on the black picture element density of a corrected character, line density, Euler number, histogram, etc.

An intermediate process result table 44 stores the process order indicating which process is to be performed, the character recognizing system or the non-character recognizing system 33, and the result of the process, based on the state extracted by the environment recognizing systems 30 and 38.

Figure 15:
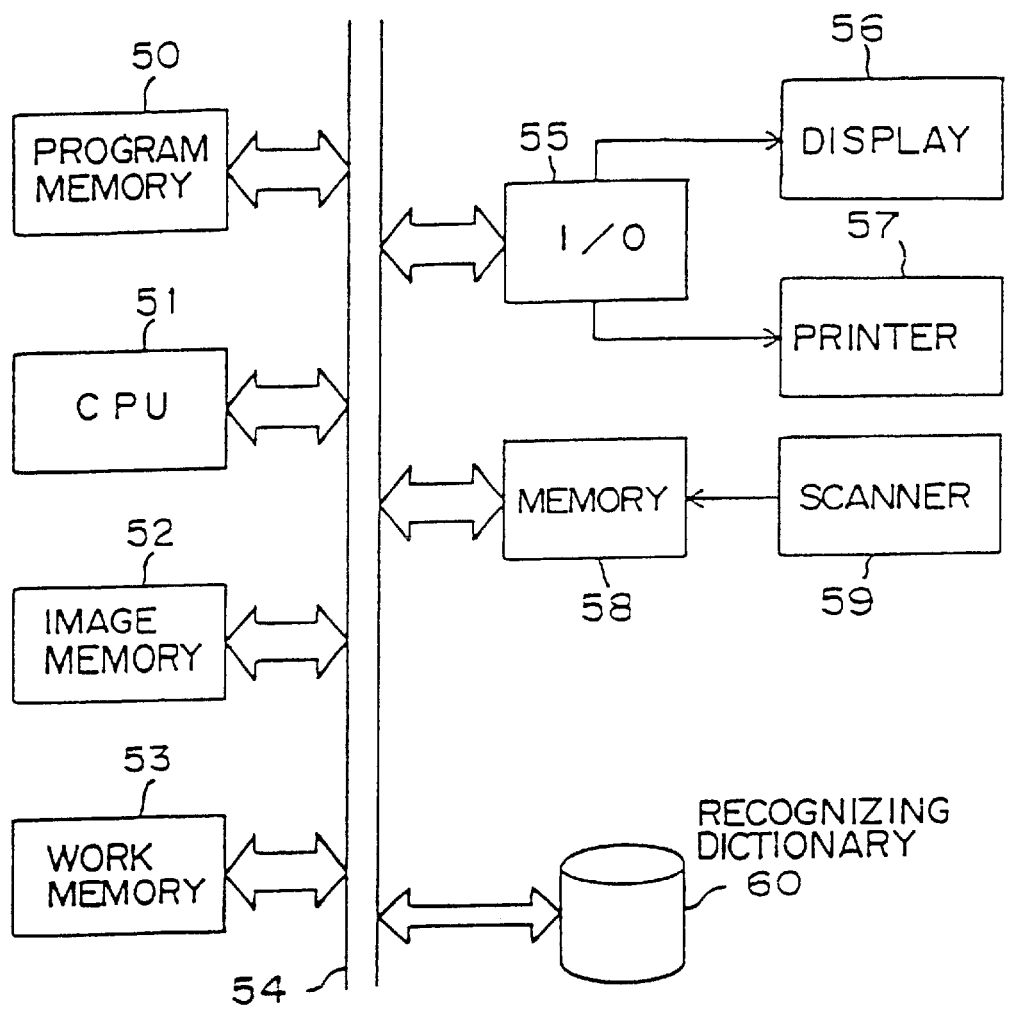
FIG. 15 is a block diagram showing a practical configuration of the pattern recognizing apparatus according to an embodiment of the present invention.

FIG. 15 is a block diagram showing a practical configuration of the character recognizing system to which the pattern recognizing apparatus shown in FIGS. 5 through 7 is applied.

In FIG. 15, a central processing unit (CPU) 51 performs various processes. A program memory 50 stores a program to be executed by the CPU 51. A image memory 52 stores image data in a bit map format. A work memory 53 is used in processing an image. A scanner 59 optically reads an image. A memory 58 temporarily stores information read by the scanner 59. A dictionary file 60 stores the feature of each character image. A display 56 displays a recognition result. A printer 57 prints a recognition result. An interface circuit 55 functions for the display 56 and printer 57. A bus 54 connects the CPU 51, program memory 50, image memory 52, work memory 53, memory 58, dictionary file 60, and interface circuit 55.

The character recognizing system temporarily stores image data read by the scanner 59 in the memory 58, and develops the image data in the bit map format into the image memory 52. Then, a pattern extracting process is performed on the binary image data copied from the image memory 52 to the work memory 53. Based on the result, a character image is detected from the image data read by the scanner 59. The feature of the detected character image is compared with the feature data stored in the dictionary file 60 to recognize a character. Then, the recognition result is output to the display 56 or printer 57.

With this character recognizing system, the pattern recognizing apparatus shown in FIGS. 5 through 7 can be realized as having the function of the CPU 51 for performing the process according to the program stored by the program memory 50.

The configurations of the environment recognizing system 11, character recognizing unit 12, and non-character recognizing unit 25 shown in FIG. 7 are practically described below.

Figure 16:
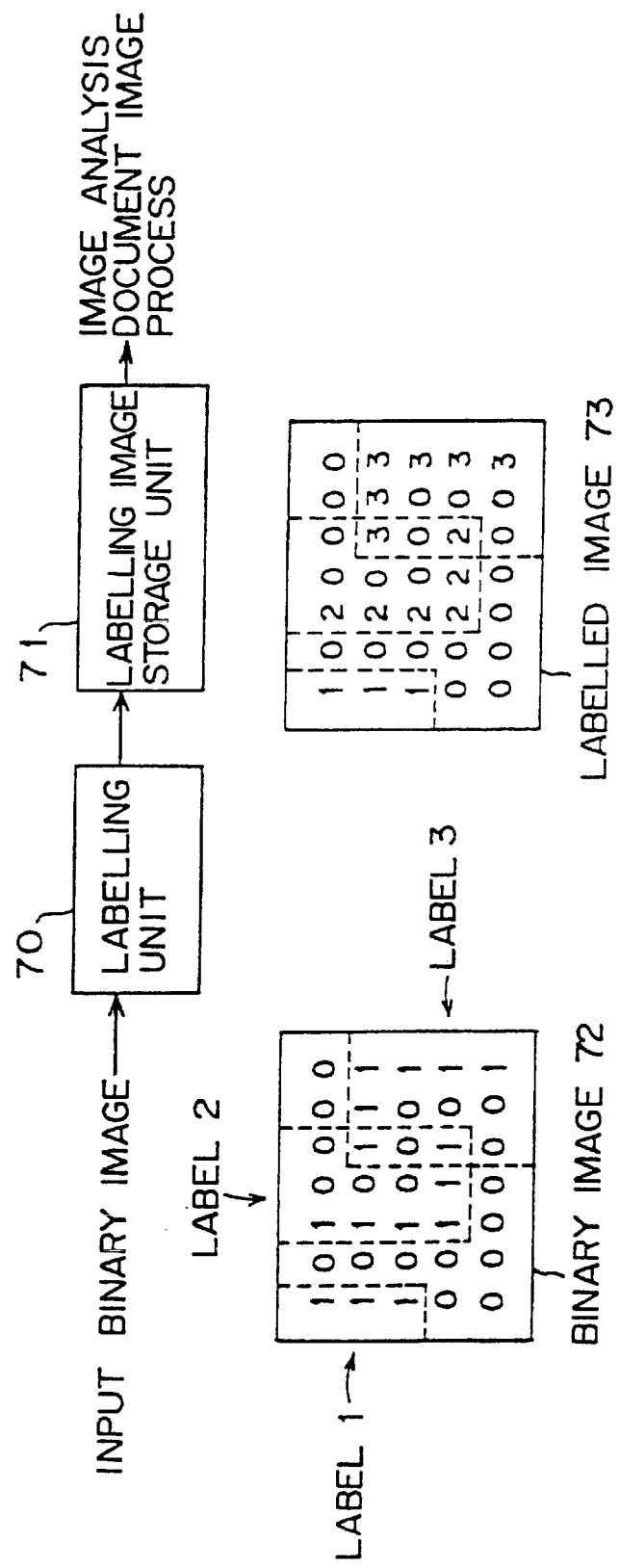
FIG. 16 is an example of the labelling process of the pattern recognizing apparatus according to an embodiment of the present invention.

FIG. 16 shows the labelling process performed in step S11 shown in FIG. 9.

When a binary image comprising '0' and '1' is input to a labelling unit 70 as shown in FIG. 16, the labelling unit 70 extracts a link pattern comprising link picture elements from the input binary image, generates a labelled image assigned a label for each link pattern, and stores the image in a labelled image storage unit 71. For example, when a binary image 72 comprising '0' and '1' is input, a labelled image 73 is generated with labels '1', '2', and '3' assigned to each link pattern.

If a single image contains 255 link patterns, a total of 255 labels are required. Since one picture element requires 8 bits, the storage capacity of the labelled image storage unit 71 equals 8 times of the number of picture elements of the entire image, thereby requiring a large storage capacity to store the labelled image.

FIG. 17 shows the method of reducing the storage capacity required for the labelled image storage unit 71 by compressing the labelled image 73 shown in FIG. 16.

In FIG. 17, labels '1' and '2' are respectively assigned to link patterns $A_1$ and $A_2$ shown in FIGS. 17A and 17B. Rectangle $B_1$ circumscribes link pattern $A_1$ and rectangle $B_2$ circumscribes link pattern $A_2$ as shown in FIG. 17C. Circumscribing rectangles $B_1$ and $B_2$ can be specified by the coordinate $(x_1, y_1)$ of the left-top vertex and the coordinate $(x_2, y_2)$ of the right-bottom vertex of circumscribing rectangles $B_1$ and $B_2$ as shown in FIG. 17D.

Then, it is determined whether or not rectangle $B_1$ circumscribing link pattern $A_1$ overlaps rectangle $B_2$ circumscribing link pattern $A_2$. If rectangle $B_1$ circumscribing link pattern $A_1$ does not overlap rectangle $B_2$ circumscribing link pattern $A_2$ then the coordinates $(x_1, y_1)$ of the left-top vertexes and the coordinates $(x_2, y_2)$ of the right-bottom vertex of circumscribing rectangles $B_1$ and $B_2$ respectively are stored.

On the other hand, if rectangle $B_1$ circumscribing link-pattern $A_1$ overlaps rectangle $B_2$ circumscribing link pattern $A_2$, then circumscribing rectangles, $B_1$ and $B_2$ are divided into smaller rectangular areas so that these circumscribing rectangles may not further overlap another circumscribing rectangle. Then, it is determined to which does each of the divided rectangular areas belongs, the original circumscribing rectangle $B_1$ and $B_2$. Link patterns $A_1$ and $A_2$ are represented by arithmetic operations such as addition, subtraction, etc.

For example, as shown in FIG. 17C, link pattern $A_1$ can be represented by the difference between rectangular area (1-1) and rectangular areas (1-2) as shown by the following equation where (1-1) indicates the maximum rectangular area belonging to link pattern $A_1$, and (1-2) indicates rectangular areas contained in rectangular area (1-1).

$$A_1 = (1\text{-}1) - (1\text{-}2)$$

Similarly, link pattern $A_2$ can be represented by the difference between rectangular area (2-1) and rectangular areas (2-2) plus rectangular area (2-3) as shown by the following equation where (2-1) indicates the maximum rectangular area belonging to link pattern $A_2$, (2-2) indicates rectangular area contained in rectangular area (2-1), and (2-3) 25 indicates rectangular areas contained in rectangular areas (2-2).

$$A_2 = (2\text{-}1) - (2\text{-}2) + (2\text{-}3)$$

Thus, the storage capacity required to store labelled images can be smaller by reducing the volume of information representing link patterns by representing the link pattern by a rectangle circumscribing a series of picture elements.

The method of compressing labelled images is disclosed by Tokukaihei 8-55219.

FIG. 18 is a flowchart showing an embodiment of the text recognizing process in step S21 shown in FIG. 10.

As shown in FIG. 18, a document is read by a scanner and the image data of the read document is stored in memory in step S61.

Then, in step S62, only a specified strip portion in the horizontal direction is observed among the image data read in step S61, the labelling process is performed on the observed portion, and a circumscribing rectangle of black link picture elements is obtained.

Figure 19A:
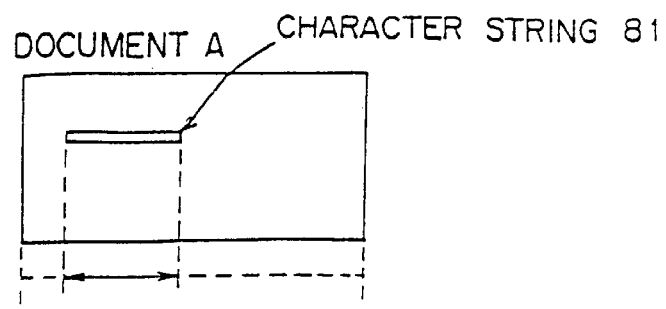
FIGS. 19A through 19D show examples of the partial area in the text extracting process of the pattern recognizing apparatus according to an embodiment of the present invention.
Figure 19B:
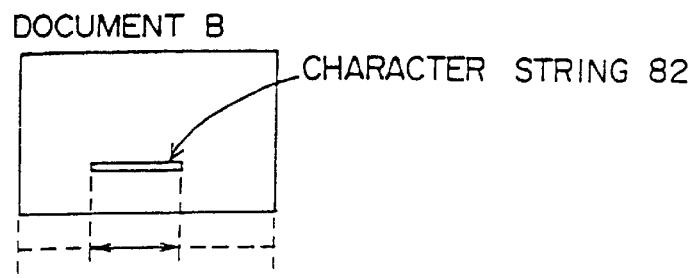
Figure 19C:
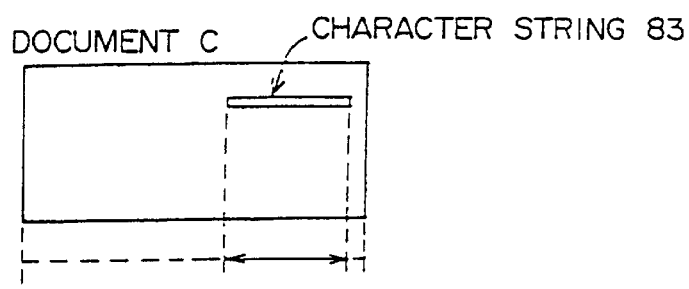
Figure 19D:
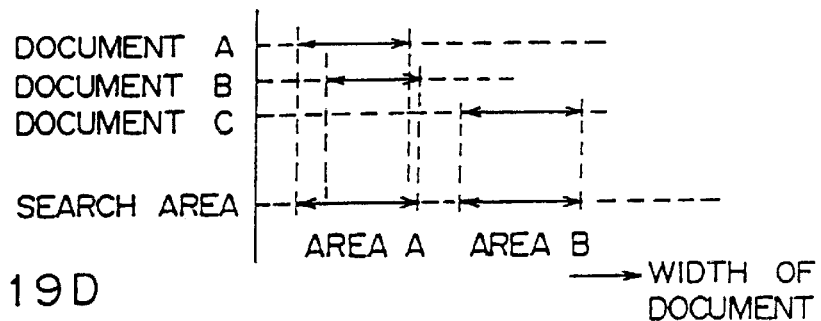

For example, if plural documents A, B, and C are processed as process objects, the area of a character string 81 of document A as shown in FIG. 19A is within section A as shown in FIG. 19D, the area in character string 82 of document B shown in FIG. 19B is within section A as shown in FIG. 19D, and the area in character string 83 of document C shown in FIG. 19C is within section B as shown in FIG. 19D, then only the portions in sections A and B are observed and the labelling processes are performed in the strip portion only to obtain a rectangle circumscribing of linked black picture elements.

Extracted next in step S63 is only a circumscribing rectangle indicating the difference, smaller than the threshold thy, between the height obtained in step S62 and a predetermined height ylen, and indicating the difference, smaller than the threshold thx, between the width obtained in step S62 and the width xlen preliminarily obtained. Then, the coordinate of the circumscribing rectangle in the y direction (vertical direction) is obtained and stored in the memory.

Next, in step S64, a wide area having the coordinate as a center point along the y direction obtained in step S63 is observed with the width of the rectangle extracted in step S62 equaling the width of an image.

In step S65, a circumscribing rectangle of linked black picture elements is obtained by labelling the wide area obtained in step S64.

Extracted next in step S66 is only a circumscribing rectangle indicating the difference, smaller than the threshold thy, between the height obtained in step S65 and a predetermined height ylen, and indicating the difference, smaller than the threshold thx, between the width obtained in step S65 and the width xlen preliminarily obtained. The extracted circumscribing rectangle is stored in the memory.

Next, in step S67, rectangles extracted in step S66 are sorted based on the x coordinate. The pitch is computed from the intervals of the center lines of the extracted rectangle. When a predetermined number th or more of rectangles indicating the difference between the computed pitch and a preliminarily obtained pitch smaller than the threshold thpitch are arranged in the horizontal direction, they are output as text.

This text extracting method is described by, for example, Tokukaihei 8-171609.

Described below is an embodiment of the ruled line extracting process in step S22 shown in FIG. 10.

In the ruled line extracting process, the linked pattern obtained in the labelling process is divided into plural sections in the horizontal and vertical directions. The contiguous projection value of the linked pattern is computed within each section of the pattern divided horizontally and vertically. Thus, ruled lines are extracted by detecting a portion of a predetermined length of line through the approximation of a rectangle.

A contiguous projection in this example refers to a sum of a projection value of an object row or column and a projection value of a surrounding row or column. The projection values of the object row or column are obtained by computing the total number of black picture elements in the row or column.

FIG. 20 shows the contiguous projection process.

In FIG. 20, the projection value in row i is p(i), and the contiguous projection value P(i) can be computed by the following equation (1).

$$P(i)=p(i-j)+\ldots+p(i)+\ldots+p(i+j) \qquad (1)$$

In the example shown in FIG. 20, j=1 in the equation (1).

Figure 21:
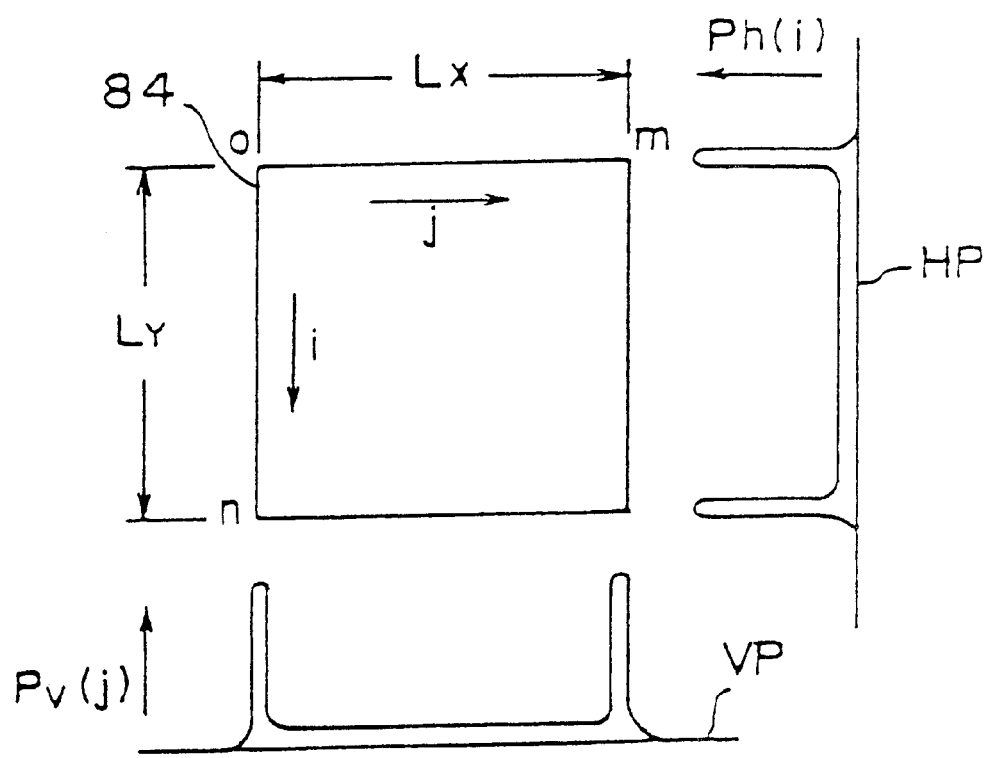
FIG. 21 shows the pattern projection result in the ruled line extracting process of the pattern recognizing apparatus according to an embodiment of the present invention.

FIG. 21 shows an example of the projection value of a partial pattern.

Assuming that the projection value Ph(i) in the horizontal direction j is HP(i) and the projection value Pv(j) in the vertical direction i is VP(j) in the rectangle 84 having the length $L_y$ and the width $L_x$ in FIG. 21, HP(1)=HP(n)=m, HP(2)~HP(n−1)=2, VP(1)=VP(m)=n, VP(2)~VP(m−1)=2.

If straight lines forming part of the rectangle 84 exist, the projection value is large. Therefore, the straight lines forming part of ruled lines can be extracted.

For example, a candidate for a straight line forming part of ruled lines can be extracted by detecting a partial pattern indicating the ratio, equal to or smaller than a predetermined threshold, of a contiguous projection value to each of the lengths of vertical and horizontal divisions.

Figure 22:
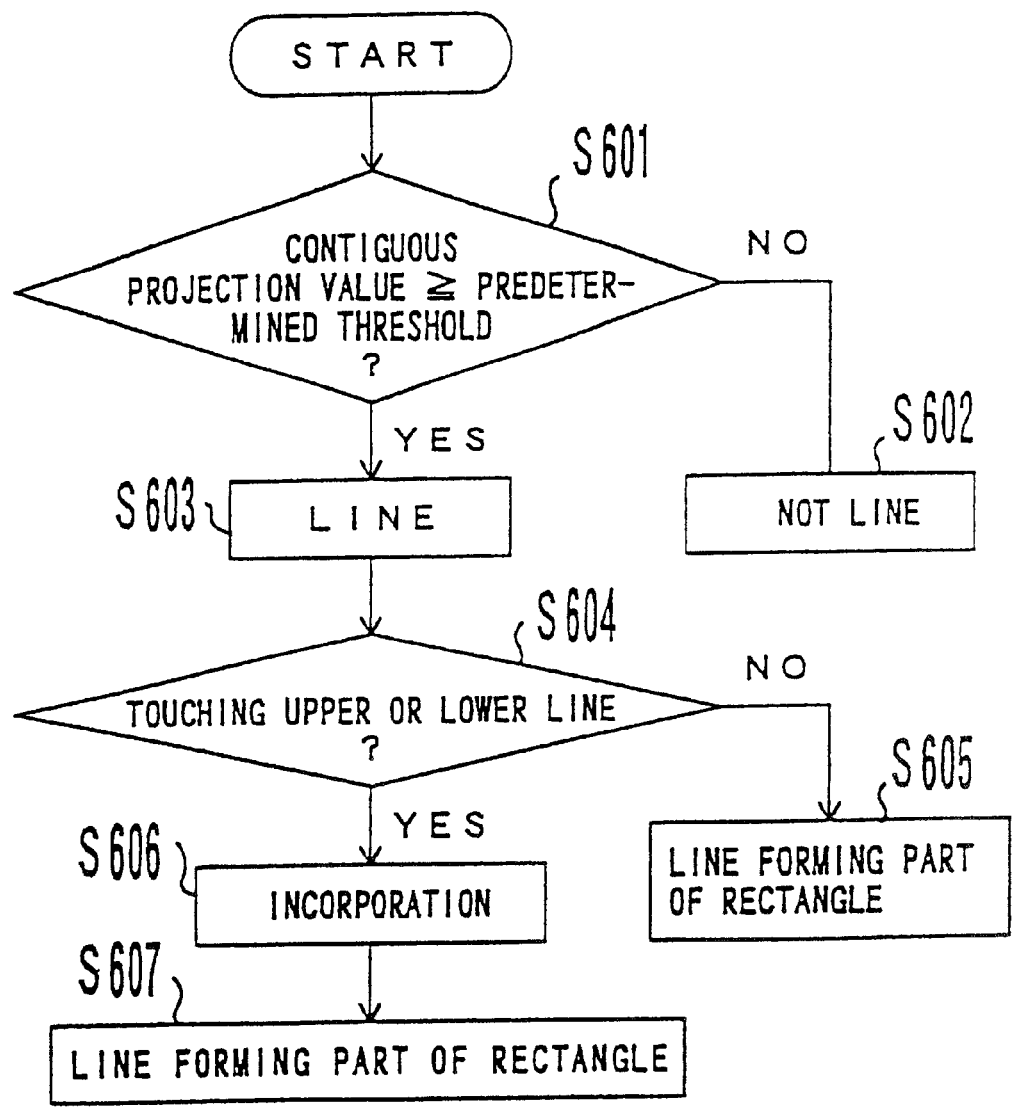
FIG. 22 is a flowchart showing the ruled line extracting process of the pattern recognizing apparatus according to an embodiment of the present invention.

FIG. 22 is a flowchart showing the ruled line extracting process.

In FIG. 22, it is determined in step S601 whether or not the ratio of a contiguous projection value to each of the lengths of vertical and horizontal divisions is equal to or larger than a predetermined threshold. If it is not equal to or larger than the predetermined threshold, then control is passed to step S602, and it is assumed that no lines forming part of ruled lines exist.

If it is determined in step S601 that the ratio of a contiguous projection value to each of the lengths of vertical and horizontal divisions is equal to or larger than a predetermined threshold, then control is passed to step S603, and it is assumed that lines forming part of the ruled lines exist.

It is determined in step S604 whether or not the pattern regarded as a line in step S603 touches a line above or below the pattern. If it is determined that the pattern does not touch a line above or below the pattern, control is passed to step S605, and the pattern is defined as a line forming part of a rectangle.

Figure 23:
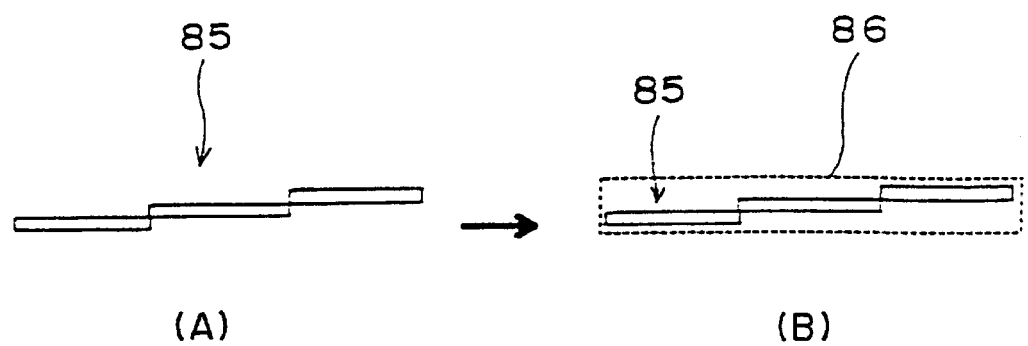
FIG. 23 shows the ruled line extracting process of the pattern recognizing apparatus according to an embodiment of the present invention.
Figure 25:
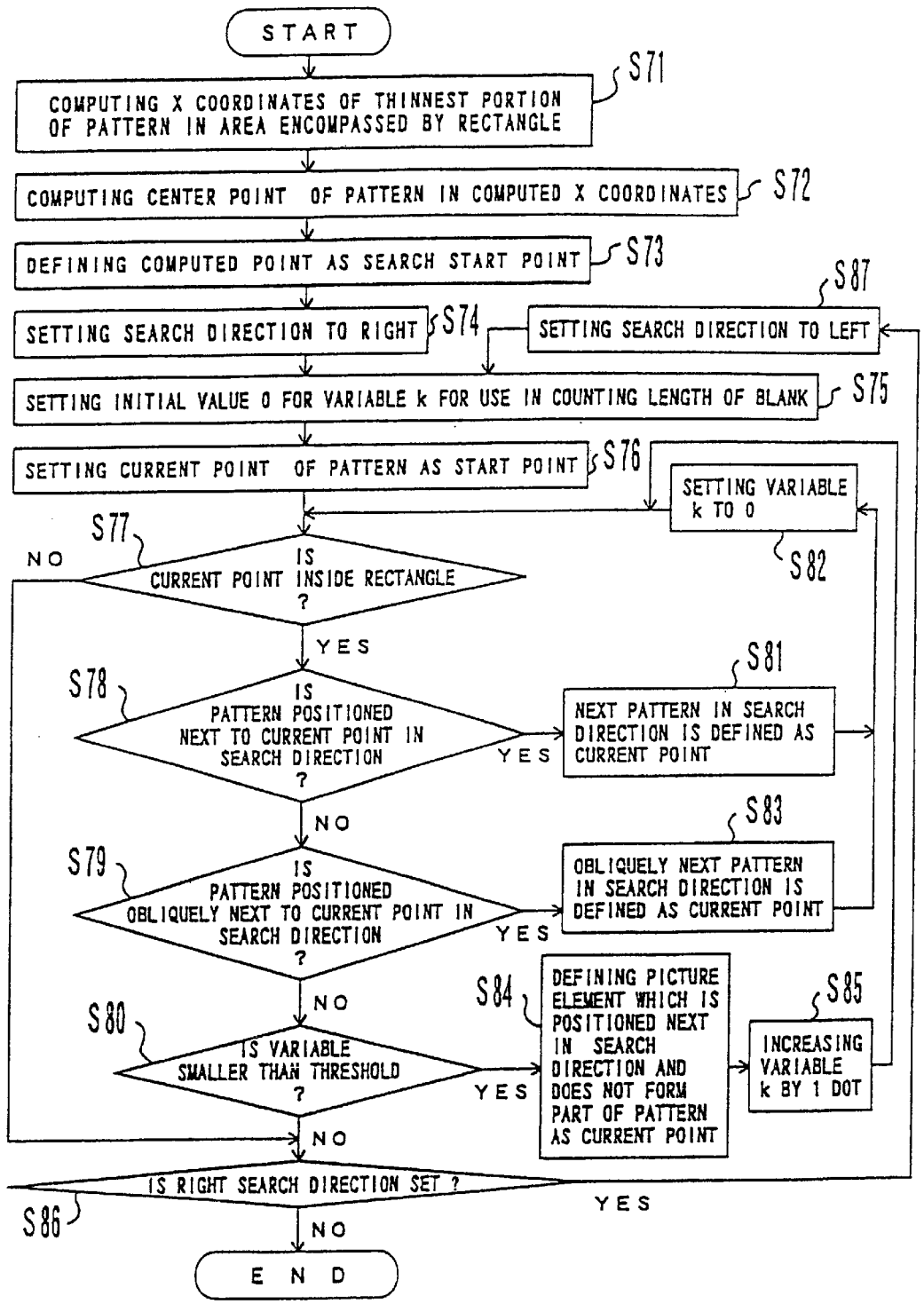
FIG. 25 is a flowchart showing the method of completing an obscure ruled line of the pattern recognizing apparatus according to an embodiment of the present invention.

If it is determined in step S604 that the pattern regarded in step S603 as a line touches the lines above and below the pattern, then control is passed to step S606 and the pattern is integrated into the lines above and below the pattern. In step S607, the lines integrated in step S606 are detected as rectangular lines. For example, the three rectangular lines 85 as shown by (A) in FIG. 23 are integrated, and a rectangular line 86 indicated by (B) in FIG. 23 25 is obtained. Then, ruled lines are extracted by searching for the rectangular lines obtained in step S605 or S607.

The above described ruled line extracting process is described by Tokukaihei 6-309498.

Figure 24:
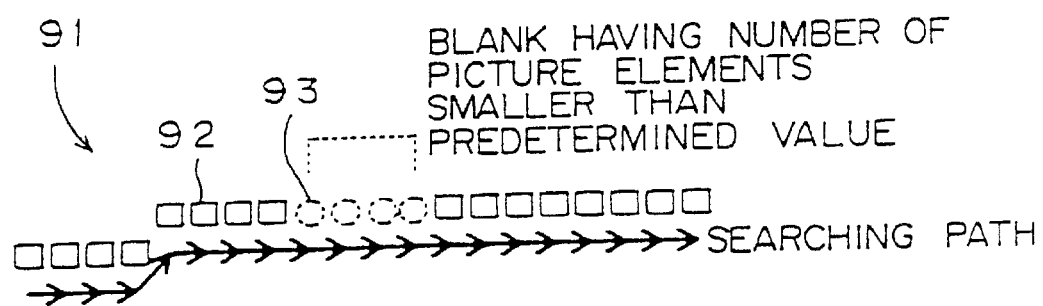
FIG. 24 shows the method of completing an obscure ruled line in the ruled line extracting process of the pattern recognizing apparatus according to an embodiment of the present invention.

FIG. 24 shows the search method performed while completing obscure ruled lines in the ruled line extracting process in step S22 shown in FIG. 10.

The method of completing the obscure ruled lines is followed to search for a pattern forming a straight line. Even if an area without a pattern exists in the searching direction, it is assumed that a pattern exists in a blank area containing the number of picture element smaller than a predetermined value.

For example, when a picture element 92 forming part of a straight line 91 is retrieved from the straight line 91 as shown in FIG. 24, a blank area 93 containing the number of picture elements smaller than a predetermined value is searched with the picture elements 92 assumed to exist.

FIG. 25 is a flowchart showing the method of completing an obscure ruled line in the ruled line extracting process.

In FIG. 25, the X coordinate of the thinnest portion of the pattern in a predetermined rectangular range is computed in step S71.

In step S72, a center point of a pattern at the X coordinate computed in step S71 is computed. In step S73, the center point of the pattern computed in step S72 is set as a search start point. The search start point is set at the thinnest portion of the pattern because there is a small possibility that the thinnest portion is a character, and the straight line forming part of the character box can be more probably detected.

In step S74, the search direction for a straight line is set to 'right'.

Then, the initial value of the variable K is set to 0 to count the length of the blank area in step S75.

In step S76, the start point obtained in step S73 is set as the current position of a pattern search.

In step S77, it is determined whether the current search position set in step S76 is in the range of the rectangle recognized in step S71. If the current search position is not in the range of the rectangle observed in step S71, control is passed to stp S86.

Figure 26:
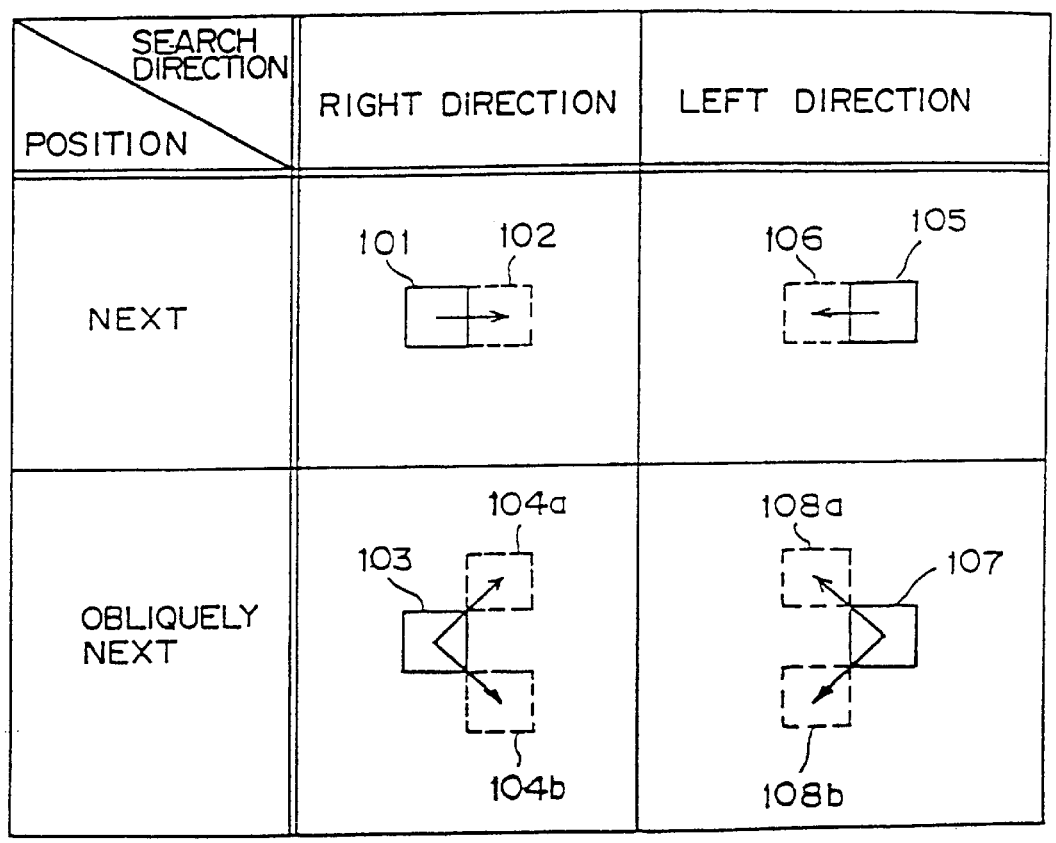
FIG. 26 shows the searching direction when an obscure ruled line is completed by the pattern recognizing apparatus according to an embodiment of the present invention.

If it is determined in step S77 that the current search position is in the range of the rectangle observed in step S71, control is passed to step S78, and it is determined whether or not a pattern is positioned next to the current search position in the search direction. A pattern positioned next to the current search position in the search direction refers to a pattern 102 next to the right of a pattern 101 as shown in FIG. 26. If it is determined that the pattern 102 is positioned next to the current search position in the search direction, then control is passed to step S81, and the pattern 102 next to the current position in the search direction is set as the current position.

If it is determined in step S78 that a pattern is not positioned next to the current position in the search direction, control is passed to step S79, and it is determined whether or not a pattern is positioned diagonally above or below the current position in the search direction.

A pattern positioned diagonally above or below the current position in the search direction refers to a pattern 104*a* or a pattern 104*b* diagonally above or below a pattern 103 as shown in FIG. 26. If it is determined that the patterns 104*a* and 104*b* are positioned diagonally above or below the current position in the search direction, then control is passed to step S83, and the patterns 104*a* and 104*b* diagonally above or below the current position are defined as the current position. If there are two patterns 104*a* and 104*b* positioned diagonally above or below the current position in the search direction, then one of the patterns 104*a* and 104*b* is set as the current search position.

If it is determined in step S79 that the patterns 104*a* and 104*b* are not positioned diagonally above or below the current position in the search direction, then control is passed to step S80, and it is determined whether or not the variable K for use in counting the length of a blank area is equal to or smaller than a predetermined threshold. If the variable K for use in counting the length of a blank area is equal to or smaller than a predetermined threshold, then control is passed to step S84, and the picture element adjacent in the search direction and not forming part of the pattern is defined as the current position. For example, It is assumed that there is a pattern for a blank area 93 having a predetermined number of or less picture elements as shown in FIG. 24, and a searching process is performed.

In step S85, the variable K for use in counting the length of a blank area is increased by 1 dot, and control is returned to step S77.

If it is determined in step S80 that the variable K for use in counting the length of a blank area is not equal to or smaller than a predetermined threshold, then control is passed to step S86, and it is determined whether or not the search direction is set to 'right'. If it is not set to 'right', then the process terminates.

When the search direction is set to 'right' in step S86, then control is passed to step S87 and the search direction is set to 'left'. Then, the processes in step S75 through S85 are similarly repeated as performed when the search direction is set to 'right'.

When a process is performed with a search direction set to 'left', a pattern positioned next to the current search position in the search direction refers to a pattern 106 next to the left of a pattern 105 as shown in FIG. 26. A pattern positioned diagonally above or below the current position in the search direction refers to a pattern 108*a* or a pattern 108*b* diagonally above or below a pattern 107 as shown in FIG. 26.

Next, the character box extracting process in step S23 is described below.

Figure 27:
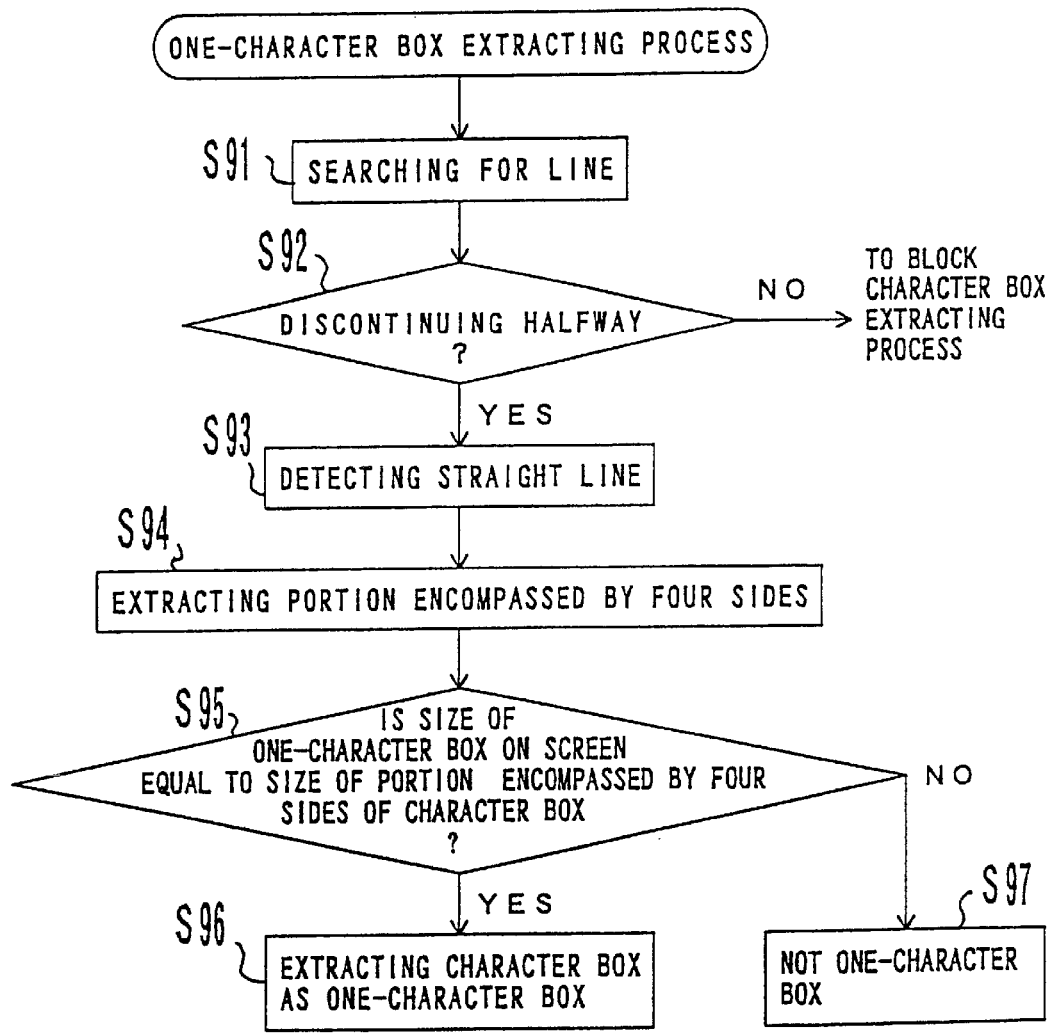
FIG. 27 is a flowchart showing the one-character box extracting process of the pattern recognizing apparatus according to an embodiment of the present invention.

FIG. 27 is a flowchart showing an embodiment of the one-character box extracting process.

As shown in FIG. 27, a searching process is performed on a pattern detected in the process shown in FIG. 22 as a line of a rectangle in step S91. At this time, a searching process is performed on a blank area of a predetermined length assuming that a pattern exists as shown in the flowchart in FIG. 25, and an obscurity problem can be solved.

Next, it is determined in step S92 after a search in step S91 whether or not a pattern is disconnected at a predetermined length. If it is not disconnected at the predetermined length, then control is passed to the block character box extracting process shown in FIG. 28. If the pattern is disconnected at a predetermined length, then control is passed to step S93, and a searched lines are combined into a straight line.

Next, as shown in step S94, straight lines forming a rectangle are extracted from the straight lines detected in step S93.

It is determined in step S95 whether or not the size of a portion encompassed by four straight lines is within a predetermined range for a one-character box in an image. If it is determined that the size of the portion encompassed by four straight lines is within the predetermined range for the one-character box in the image, then control is passed to step S96 and the portion encompassed by the four straight lines is regarded as a one-character box. If it is determined that the size of the portion encompassed by four straight lines is not within the predetermined range for the one-character box in the image, then control is passed to step S97 and the portion encompassed by the four straight lines is not regarded as a one-character box.

Figure 28:
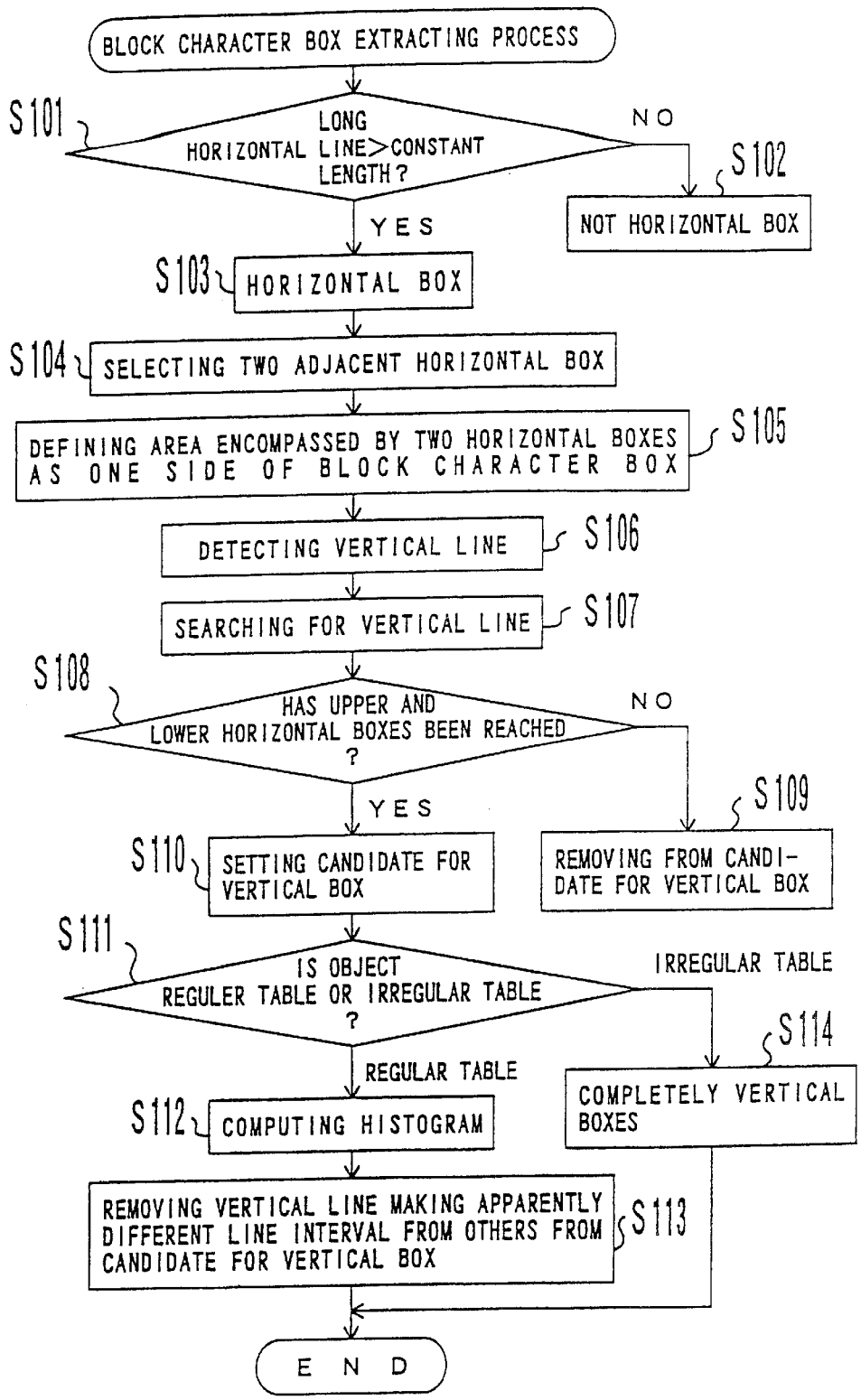
FIG. 28 is a flowchart showing the block character box extracting process of the pattern recognizing apparatus according to an embodiment of the present invention.

FIG. 28 is a flowchart showing an embodiment of the block character box extracting process.

As shown in FIG. 28, it is determined in step S101 whether or not a horizontal line detected in a searching process is longer than a predetermined value. If the horizontal line detected in a searching process is shorter than a predetermined value, then control is passed to step S102, and the horizontal line is not regarded as a horizontal line forming part of a character box. If it is determined that the horizontal line detected in a searching process is equal to or larger than a predetermined value, then control is passed to step S102, and the horizontal line detected in the searching process is regarded as a horizontal line forming part of the character box.

Two adjacent horizontal lines forming part of a character box are extracted from the horizontal lines extracted in step S103 as shown in step S104.

Then, a range encompassed by the two horizontal lines forming part of the character box extracted in step S104 is regarded as a block character box for one row in step S105.

In step S106, vertical lines are detected by extracting the lines forming a rectangle detected in the process shown in FIG. 22.

Then, in step S107, the vertical lines detected in step S106 is searched. It is determined in step S108 whether or not the vertical lines have reached the horizontal lines which form part of the character box and are detected in step S104. If the vertical lines have not reached the horizontal lines forming part of the character box, then control is passed to step S109, the vertical lines are removed from the candidates for vertical lines. When the vertical lines touch the upper and lower sides of the character box, control is passed to S110 and the vertical lines are regarded as candidates for the vertical lines forming part of the character box.

In step S111, it is determined whether a process object is a regular table-form block character box or an irregular table-form block character box if the process object is a regular table-form block character box, then control is passed to step S112, and the interval between the vertical lines regarded as candidates for vertical lines forming part of a character lines is computed in step S10, and a histogram indicating the relationship between the interval of the computed vertical lines and the frequency of the vertical lines is computed.

In step S113, the vertical lines making intervals different from other intervals are removed from candidates for the vertical lines forming part of the character box within a range encompassed by two adjacent horizontal lines forming part of the character box. The remaining vertical lines are regarded as vertical lines forming part of the character box, thereby terminating the process.

If it is determined in step S11 that the process object is an irregular table-form block character box, then all candidates determined in step S110 for the vertical lines are regarded as vertical lines forming part of the character box, thereby terminating the process.

Described below is the character-box type/table discriminating process in step S24 shown in FIG. 10.

FIG. 29 shows an example of the character box and table extracted in the character box extracting process in step S23 shown in FIG. 10.

FIG. 29A shows a one-character box. FIG. 29B shows a free-pitch character box. FIG. 29C shows a block character box. FIG. 29D shows a regular table. FIG. 29E shows an irregular table. The one-character box is assigned an attribute of a one-character box. The free-pitch character box is assigned an attribute of a free-pitch character box. The block character box is assigned an attribute of a block character box. The table is assigned an attribute of a table.

The character box extracting process and the character-box type/table discriminating process are described by Tokukaihei 7-28937.

Described next is the process of determining the existence of a character touching a character box in step S25 shown in FIG. 10. In this process, an original input image is reduced using the reduction ratio of 1/n in the OR process, and the process of determining the existence of a box-touching character is then performed. The coordinate is set corresponding to each picture element of the image. The X coordinate is set along the horizontal direction of the image. The Y coordinate is set along the vertical direction of the image. The X coordinate increases in the right direction, and the Y coordinate increases downward.

Figure 30:
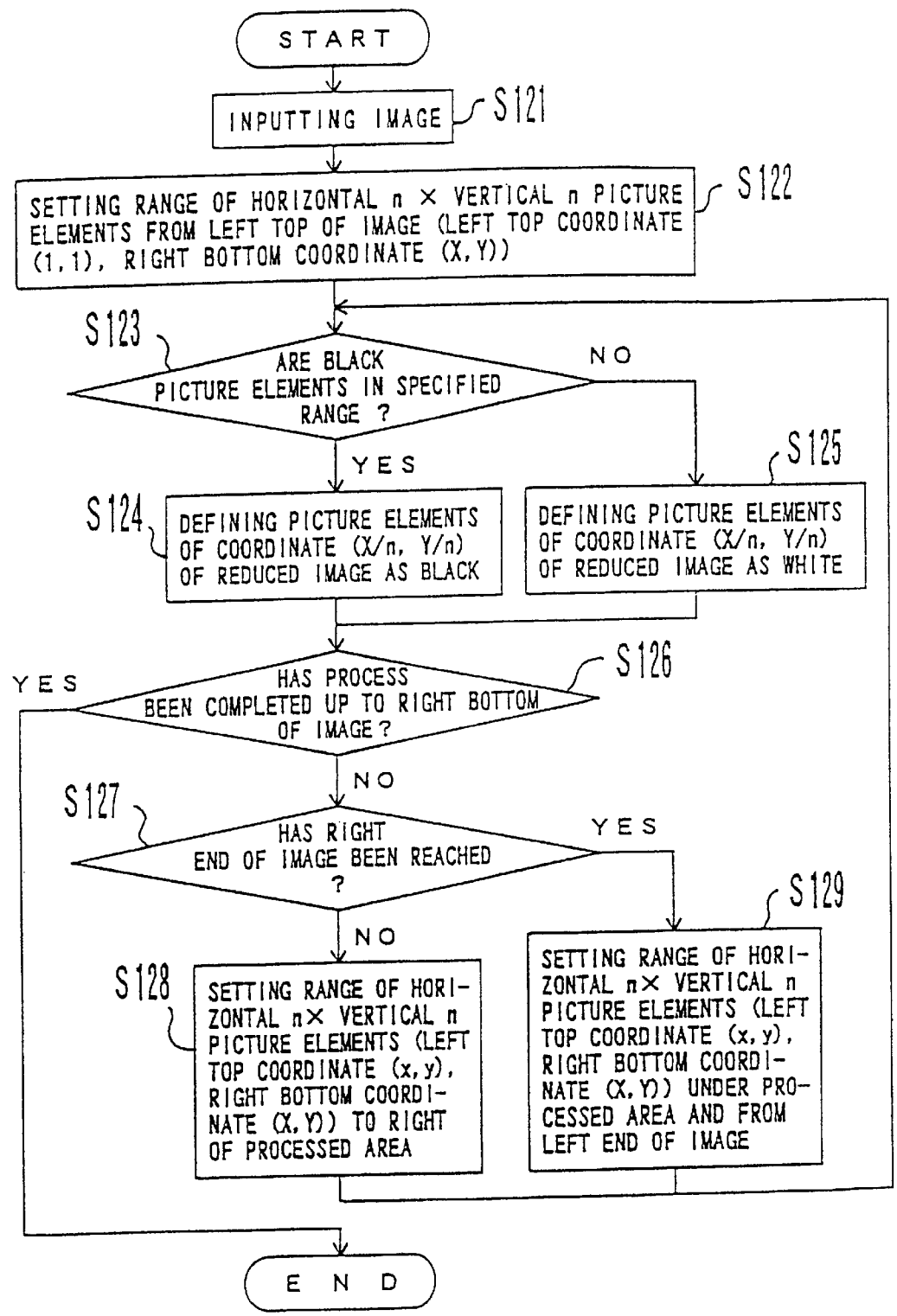
FIG. 30 is a flowchart showing the image reducing process of the pattern recognizing apparatus according to an embodiment of the present invention.

FIG. 30 is a flowchart showing an embodiment of reducing an input image.

In FIG. 30, an original image is input in step S121.

Then, a range of n horizontal picture elements x n vertical picture elements from the left top point of the original image (left top coordinate (1, 1), right bottom coordinate (X, Y)) is set in step S122.

It is determined in step S123 whether or not black picture elements exist in the determined range of the original image. If there are black picture elements in the determined range of the original image, then control is passed to step S124 and the picture elements at the coordinate (X/n, Y/n) of a reduced image are defined as black picture elements. If there are no black picture elements in the determined range of the original image, then control is passed to step S125 and the picture elements at the coordinate (X/n, Y/n) of a reduced image are defined as white picture elements.

Then, it is determined in step S126 whether or not the process has been performed up to the right bottom of the original image if the process has not been performed up to the right bottom of the original image, then control is passed to step S127, and it is determined whether or not the process has been performed up to the rightmost portion.

If the process has not been performed up to the rightmost portion, then a range of n horizontal picture elements x n vertical picture elements (left top coordinate (x, y), right bottom coordinate (X, Y)) is set to the right of the processed range. If the process has been performed up to the rightmost portion, then a range of n horizontal picture elements x n vertical picture elements (left top coordinate (x, y), right bottom coordinate (X, Y)) is set below the processed range and to the right of the original image. Then, control is returned to step S123, and the above described processes are repeated until the reducing process has been completed on the entire range of the original image.

It is determined whether or not a character touches a character box by performing a searching process on compressed image data processed in an input image reducing process along and inside the lines forming part of a character box. A rectangular area is enlarged at the side touching the character outside by a predetermined distance. The coordinate of the enlarged rectangular area is converted into the coordinate of the original image data.

Figure 31A:
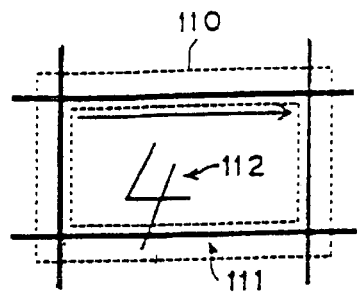
FIGS. 31A through 31E show the box-touching state determining process of the pattern recognizing apparatus according to an embodiment of the present invention.

For example, assume that a range 110 of a character box for the compressed image data is extracted, a character 112 of '4' exists in the rectangular area encompassed by the character box, and the character 112 of '4' touches a lower side 111 of the character box as shown in FIG. 31A.

Figure 31B:
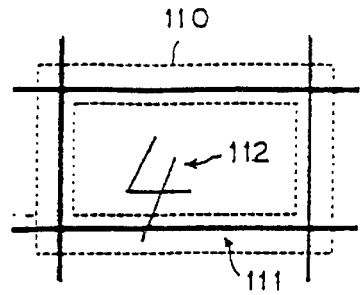

As shown in FIG. 31B, a searching process is performed straight along the inside of the character box. If the search line crosses any pattern, it is assumed that a character exists near the character box, the character possibly touches the character box, and that the character 112 of '4' in the rectangular area encompassed by the character box touches the character box. In this example, the character 112 of '4' is assumed to touch the lower side 111 of the character box.

Figure 31C:
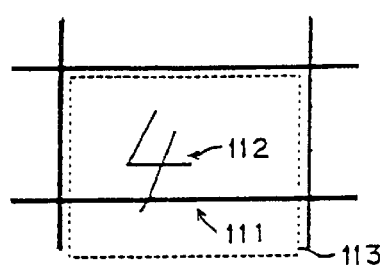

Then, the searching process is performed along the inside of the side 111 of the character box. When the character 112 is regarded as touching the side 111 of the character box, the rectangular area enclosed by the sides of the character box is enlarged outward from the side 111 of the character box touching the character 112 as shown in FIG. 31C. An enlarged rectangular area 113 is defined as a character area containing the character 112. If it is assumed that the character does not touch the side of a character box, the portion enclosed by the character box is assumed to be a character area.

Figure 31D:
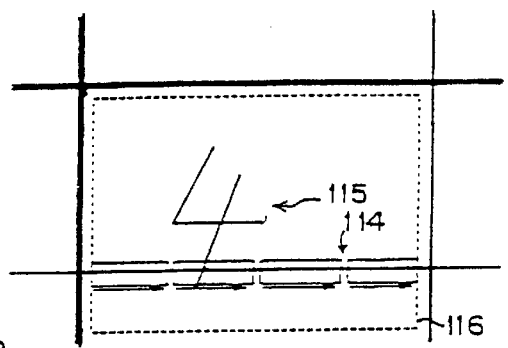

Then, the coordinates of the rectangular area 113 shown in FIG. 31C is converted into the coordinate in the original image data to obtain the character area in the original image data from the character area in the compressed image data. Thus, a rectangular area 116 can be obtained in the original image data as shown in FIG. 31D.

Figure 31E:
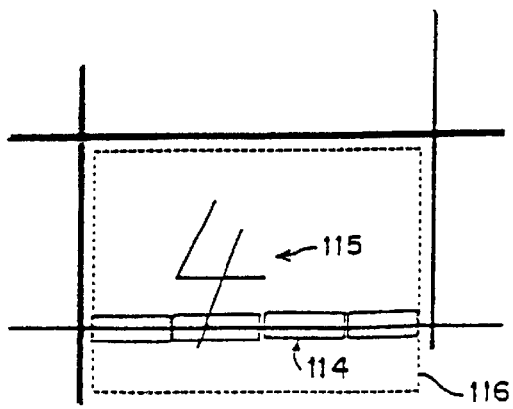

A projecting process is performed on a side 114 of the character box in the rectangular area 116, and the coordinate of the side 114 is computed from the original image data. At this time, the side 114 of the character box is represented by a rectangle in the form of a predetermined length of strip. As shown in FIG. 31E, the pattern in the rectangular area 116 is transmitted to be processed in a character completing process, and a completing process is performed on a character 115 touching the side 114 of the character box based on the coordinate of the side 114 of the character box computed according to the original image data.

Figure 32:
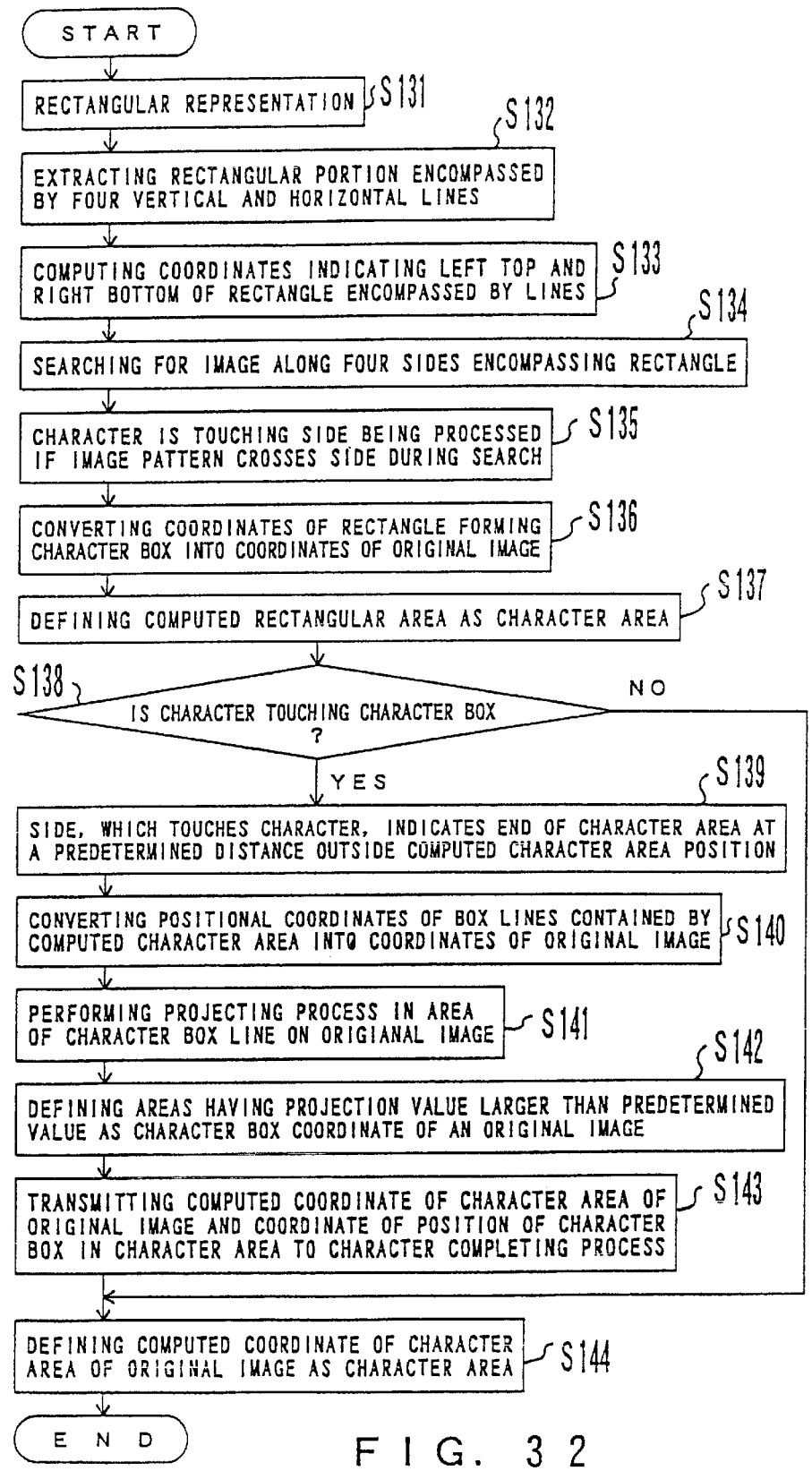
FIG. 32 is a flowchart showing the box-touching state determining process of the pattern recognizing apparatus according to an embodiment of the present invention.

FIG. 32 is a flowchart showing an embodiment of the process of determining the existence of a character touching a character box.

In FIG. 32, a rectangle is represented in compressed image data in step S131 in, for example, r the process shown in FIG. 30.

A rectangular portion encompassed by four vertical and horizontal lines is extracted in step S132.

Then, the coordinates indicating the left top corner and right bottom corner inside the rectangle are computed in step S133.

In step S134, the compressed image is searched for along the four sides (upper horizontal side, lower horizontal side, right vertical side, and left vertical side) of the rectangle inside the character box.

If one of the four sides crosses the image pattern during the searching process in step S135, then it is assumed that a character touches the side currently being searched.

The coordinates of the rectangle inside the character box are converted into the coordinates in the original image data in step S136 so that a rectangular area in the original image data can be computed from the rectangular area in the compressed image data.

In step S137, the rectangular area computed in step S136 is defined as a character area in the original image data.

It is determined in step S138 whether or hot a character touches the character box in the process in step S135. When a character touches the character box, the box touching character range obtaining process is performed in step S139 through S143.

In the box touching character range obtaining process, the character area is enlarged outward from the side touching a character in step S139, and the position at a predetermined distance outside the position of the character area computed in step S137 is defined as the end of the character area.

In step S140, the coordinate of the position of the side of the character box in the original image data is computed from the coordinate of the position of the side of the character box in the compressed image data by converting the coordinate of the position of the side of the character box contained in the character area computed in step S139 into the coordinate in the original image.

In step S141, a projecting process is performed in the horizontal direction for horizontal sides and in the vertical direction for vertical sides on the character box area in the original image data obtained based on the coordinate of the position of the character box in the original image data computed in step S140.

Next, in step S142, it is assumed that the area indicating projection values larger than a predetermined value refers to the coordinates of the character box in the original image.

Then, in step S143, the computed coordinate of the character area in the original image and the coordinate indicating the position of the character box in the character area are transmitted to the character completing process.

In step S144, the computed coordinate of the character area in the original image is defined as a character area.

Described below are the correction feature extracting process in step S41 and the correction character candidate extracting process in step S42 shown in FIG. 12.

FIG. 33 shows an embodiment of a corrected character.

Figures 33A, 33B, 33C, 33D, 33E:
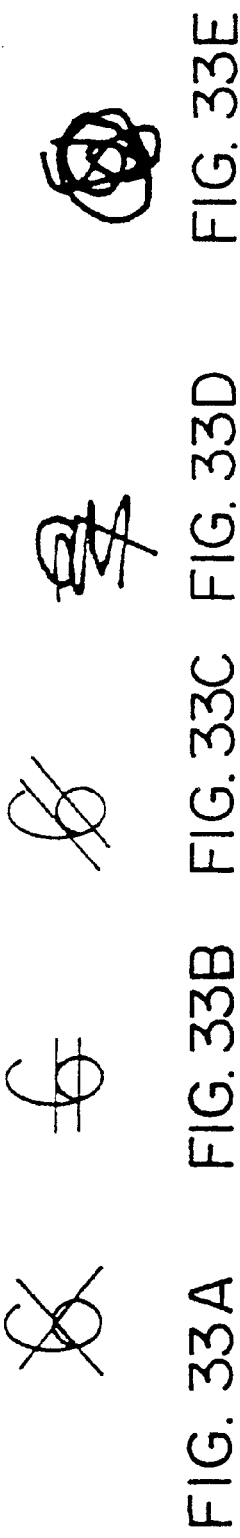
FIGS. 33A through 33E show the types of deletion lines used in the pattern recognizing apparatus according to an embodiment of the present invention.

In FIG. 33, a character is corrected with deletion lines. A character can be deleted with 'x' as shown in FIG. 33A; with double horizontal lines as shown in FIG. 33B; with diagonal lines as shown in FIG. 33C; with random lines as shown in FIG. 33D; and by painting black as shown in FIG. 33E.

The features of a deleted character can be extracted from the above described deleted character. The features can be the line density in a predetermined direction, an Euler number, and the density of black picture elements.

The 'line density in a predetermined direction' is obtained by counting the changes from white picture elements into black picture elements (or black picture elements into white picture elements) while an image in a rectangular area is scanned in a predetermined direction. The predetermined direction refers to the direction vertical to the line predicted as a deletion line.

For example, FIG. 34A shows an example of counting the maximum line density about the character '6' in the vertical direction. In this example, the maximum line density in the vertical direction is 3.

The 'line density in a predetermined direction' of a deleted character tends to increase as compared with the 'line density in a predetermined direction' of a normal character. Computing the 'line density in a predetermined direction' extracts a candidate for a deleted character.

An Euler number 'E' is obtained by subtracting the number H of holes in an image from the number C of the elements linked in the image.

For example, FIG. 34B shows an example of two elements linked in an image and only one hole in the image. The Euler number E in this example is E=C−H=2−1=1.

The Euler number of a corrected character tends to be a negative number indicating a large absolute number while the Euler number of a normal character tends to be a number (2~−1) indicating a small absolute number. Therefore, computing the Euler number extracts a candidate for a deleted character.

The density D of black picture elements refers to a ratio of the area B (number of black picture elements) of an object image to the area S of the rectangle circumscribing the object image.

For example, FIG. 34C shows an example of the case where the density D of black picture elements is computed about the character '4'. Assuming that S indicates the area of a rectangle circumscribing the character '4', and B indicates the area of the character '4', the equation D=B/S is expressed.

The 'density of black picture elements' of a deleted character tends to be higher than the 'density of black picture elements' of a deleted character. Computing the 'density of black picture elements' extracts a candidate for a deleted character.

Described below in the concrete is the basic character recognizing unit 17 shown in FIG. 7.

Figure 35:
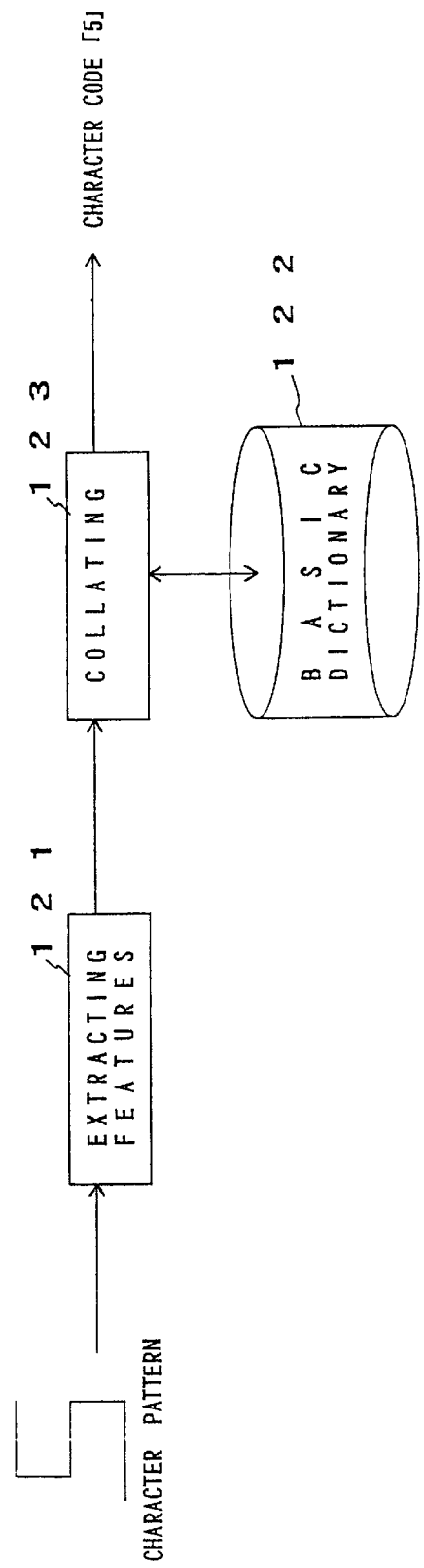
FIG. 35 is a block diagram showing an example of the configuration of the basic character recognizing unit shown in FIG. 7.

FIG. 35 is a block diagram showing an embodiment of the configuration of the basic character recognizing unit 17.

In FIG. 35, a feature extracting unit 121 extracts the features of a character from an unknown input character pattern, and represents the extracted features by the feature vectors. On the other hand, a basic dictionary 122 stores the feature vectors of each character category.

A collating unit 123 collates the feature vector of an unknown character pattern extracted by the feature extracting unit 121 with the feature vector of each character category stored in the basic dictionary 122, and computes the distance $D_{ij}$ (i indicates the feature vector of the unknown character, and j indicates the feature vector of the category of the basic dictionary 122) between feature vectors in a feature space. As a result, the category j indicating the shortest distance $D_{ij}$ between the feature vectors as an unknown character i.

The distance $D_{ij}$ between the feature vectors in the feature space can be computed using a Euclidean distance $\Sigma(i-j)^2$, a city block distance $\Sigma|i-j|$, or an identification function such as a discriminant function.

Assuming that the distance from the first category is $D_{ij1}$, and the distance from the second category is $D_{ij2}$ table 1 are preliminarily generated using the first category j1, the second category j2, the distance ($D_{ij2}-D_{ij1}$), and the reliability between the categories. Additionally, a second table 2 is also generated using the distance from the first category $D_{ij}$, the first category j1 and the reliability. The smaller reliability obtained from table 1 or 2 is stored in the intermediate process result table.

FIG. 36 shows an example of computing a feature vector.

In this example, the character '2' is written in a column of 20 blocks (5 in vertical direction and 4 in horizontal direction). A black-painted block indicates '1' and a white-painted block indicates '0'. The blocks are checked sequentially from the left-top block to the right-bottom block. The characters '1' or '0' are rearranged as feature vectors.

For example, the feature vector A indicated by (B) in FIG. 36 is represented by vector A=(1,1,1,1,0,0,0,1,1,1,1,1,1,0,0, 0,1,1,1,1,) The feature vector B indicated by (C) in FIG. 36 is represented by vector B=(0,1,1,1,0,0,0,1,1,1,1,1,1,0,0,0, 1,1,1,1,). The feature vector C indicated by (D) in FIG. 36 is represented by vector C=(1,1,1,1,0,0,0,1,0,I,1,0, 1,0,0,0, 1,1,1,1,).

FIG. 37 shows an example of computing the distance $D_{ij}$ between the feature vectors using the city block distance d (i, j).

Assuming that N indicates the number of dimensions of a feature vector, and i indicates the number of the feature vector, the i-th feature vector $x_i$ is represented as $x_i=(xi_{i1}\ X_{i2}, x_{i3} \ldots, x_{iN})$, and the j-th feature vector $x_j$ is represented as $x_j=(x_{1j}, x_{j2}, x_{j3}, \ldots, x_{jN})$ in the city block d (i, j). The city block distanced (i, j) between the i-th feature vector $x_i$ and the j-th feature vector $x_j$ is defined as follows.

$$d(i,j)=|x_1-x_2| \qquad (2)$$

For example, in FIG. 37, the basic dictionary 12; contains the feature vectors of the character: categories of '1', '2', '3', and '4'. The feature vector 1 of the character category of '1' is represented as vector 1=(0,1,1,0,0,1,1,0,0,1,1,0,0 1,1,0,0,1,1,0,). The feature vector 2 of the character category of '2' is represented as vector 2=(1,1,1,1,0,0,0,1,1,1,1,1, 0,0,0,1,1,1,1,). The feature vector 3 of the character category of '3' is represented as vector 3=(1,1,1,1,0,0,0,1,1,1,1,0, 0,0,1,1,1,1,). The feature vector 4 of the character category of '4' is represented as vector 4=(1,0,1,0,1,0,1,0,1,1,1,1,0, 0,1,0,0,0,1,0,).

If an unknown character having the feature vector is vector=(0,1,1,1,0,0,0,1,1,1,1,1,1,0,0,0,1,1,1,1) is input, then the city block distances d (i, j) between the feature vector and each of the feature vector 1 of the character category of '1', the feature vector 2 of the character category of '2', the feature vector 3 of the character category of '3', and the feature vector 4 of the character category of '4' entered in the basic dictionary 122 is computed by equation (2) above.

That is, the city block distance d (i, j) between the vector of the unknown character and the feature vector 1 of the character category of '1' is represented as d(i, j)=|vector−vector 1|=|0-0|+1-1|+|1-1|+|1-0|+|0-0|+|0-1|+|−01|+|1-0|+|1-0|+|1-1|+|1-1|+|1-0|+|1-0|+|0-1|+|0-1|+|0-0|+|1-0|+|1-1|+|1-1|+|1-0|=11.

Similarly, the city block distance d (i, j) between the vector of the unknown character and the feature vector 2 of the character category of '2' is represented as d (i, j)=|vector−vector 2|=1. The city block distance d (i, j) between the vector of the unknown character and the feature vector 3 of the character category of '3' is represented as d (i, j)=|vector−vector 3|=3. The city block distance d (i, j) between the vector of the unknown character and the feature vector 4 of the character category '4' is represented by d (i, j)=|vector−vector 4|=11.

Of the city block distances d (i, j) between the feature vector and each of the feature vector 1 of the character category of '1', the feature vector 2 of the character category of '2', the feature vector 3 of the character category of '3', and the feature vector 4 of the character category of '4', the city block distances d (i, j) between the feature vector and the feature vector 2 of the character category of '2' indicates the minimum value.

Therefore, it is determined that an unknown character whose feature vector=(0,1,1,1,1,0,0,0,1,1,1,1,1,1,0,0,0,1,1, 1,1,) belongs to the character category of '2'.

Described next is the method of identifying the details stored in the knowledge table 18 of the basic character recognizing unit 17 shown in FIG. 7. In this method of identifying the details, a local partial pattern is extracted as a character segment, and the change in position and angle of the character segment of an unknown character is compared with the change in position and angle of the character segment preliminarily stored in the segment dictionary. Thus, the character can be recognized by making the unknown character correspond to character categories.

FIG. 38 shows the method of extracting a character segment.

Figure 38A:
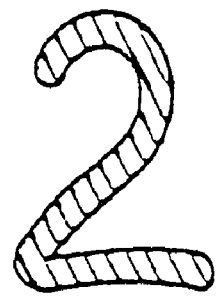
FIGS. 38A through 38C show the method of extracting a character segment by the detailed identifying method for use with the basic character recognizing unit shown in FIG. 7.

FIG. 38A shows a binary image pattern about the character '2', and the portion with diagonal lines refers to a character represented by black picture elements.

Figure 38B:
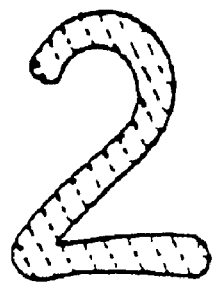

FIG. 38B shows the outline of the character extracted from the binary image pattern shown in FIG. 38A. The dotted-line portion indicates the original binary image pattern.

Figure 38C:
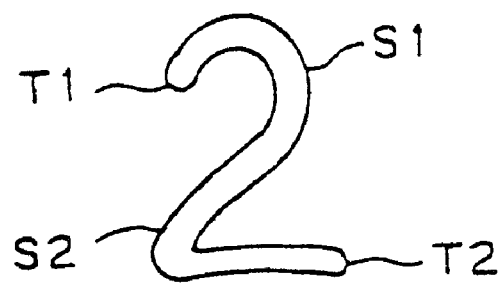

FIG. 38C shows the outline shown in FIG. 38B into the character segments S1 and S2 and the end portions T1 and T2. The end portions T1 and T2 correspond to the start and end of the character '2' shown in FIG. 38A.

Figure 39:
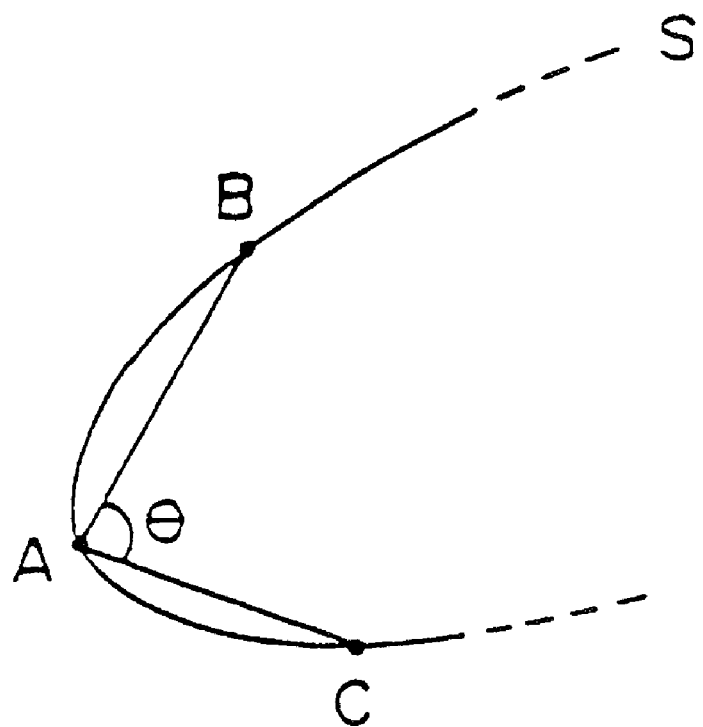
FIG. 39 shows the method of detecting an end point in the detailed identifying method for use with the basic character recognizing unit shown in FIG. 7.

FIG. 39 shows the method of detecting an end point.

In FIG. 39, the end point is detected as a portion where the slope of the outline indicates a sudden change. Actually, the three points A, B, and C at predetermined intervals are set on the outline S. The area making an angle of θ smaller than a predetermined value at the point A on the outline between the points B and C is detected as an end portion.

When a character segment is extracted from a binary image pattern by dividing an outline of a character at the end portion, the representative points X, Y, and Z are set, for example, at predetermined intervals on the character segment. The angles made at the consecutive representative points X, Y, and Z are obtained, and an accumulative value of angle changes from the first representative point to each of the other representative points on the character segment is obtained as the features at the representative points X, Y, and Z.

Figure 40:
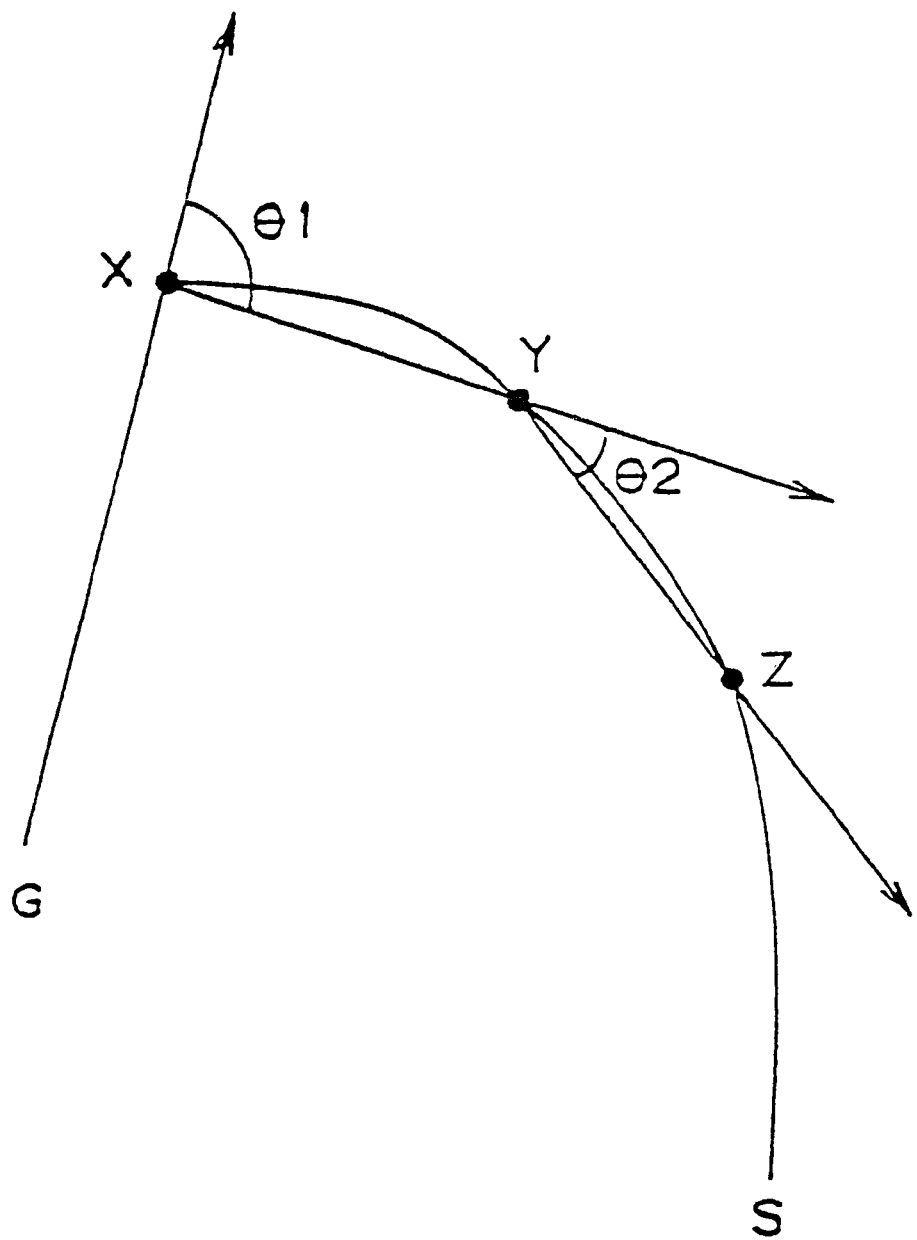
FIG. 40 shows the method of detecting a change in angle in the detailed identifying method for use with the basic character recognizing unit shown in FIG. 7.

FIG. 40 shows the method of detecting a change in angle.

In FIG. 40, the representative points X, Y, and Z are set at predetermined intervals on the outline S. The vector XY from the representative point X to the representative point Y and the vector YZ from the representative point Y to the representative point Z are generated. The angle $\theta_2$ between the vectors XY and YZ is defined as a change in angle at the representative point Y.

The change in angle at the representative point X on the outline S as an initial value of a change in angle refers to the angle $\theta_1$ made by the vector GX from the center of the gravity G of a character to the representative point X and the vector XY.

The feature at each of the representative points X, Y, and Z is represented by an accumulative value of changes in angle from the representative point X having the initial value of a change in angle to each of the representative points Y and Z. For example, the feature at the representative point Y is expressed as $\theta_1+\theta_2$.

After obtaining the accumulative value of changes in angle at the representative point on a character segment of an unknown character, the representative point of a character segment of the unknown character is made to correspond to the representative point on the character segment stored in the segment dictionary. That is, the distance between the r accumulative value of changes in angle at the representative point on the character segment of the unknown character and the accumulative value of changes in angle of the representative point on the character segment stored in the segment dictionary is computed. The representative point on the character segment in the segment dictionary indicating the shortest distance is made to correspond to the representative point of a character segment of the unknown character.

Figure 41A:
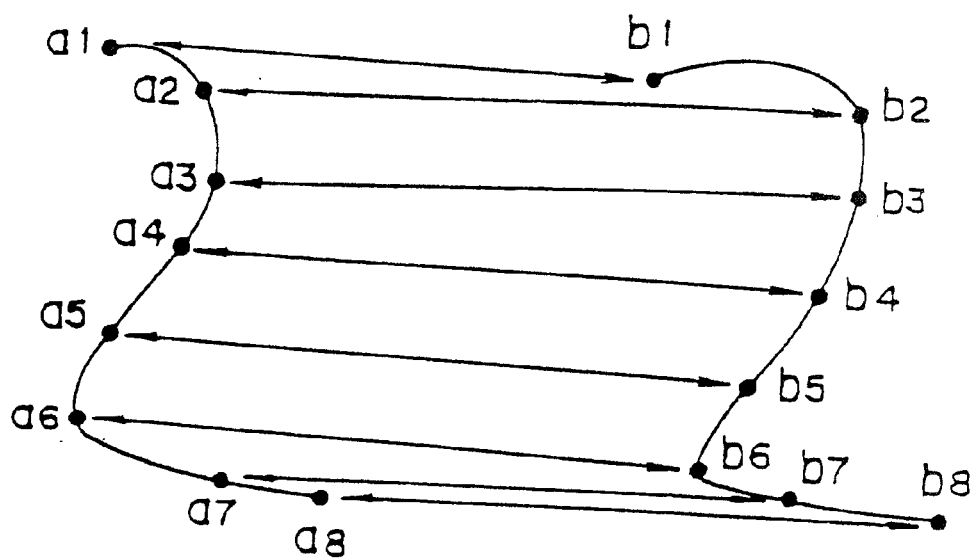
FIGS. 41A and 41B show the correspondence among character segments in the detailed identifying method for use with the basic character recognizing unit shown in FIG. 7.

FIG. 41A shows the correspondence between the representative point of the character segment on an unknown character and the representative point on the character segment of the segment dictionary.

In FIG. 41A, the representative points $a_1$ through $a_8$ refer to the representative points on the character segment of an unknown character. The representative points $b_1$ through $b_8$ refer to the representative points on the character segment stored in the segment dictionary. Each of the representative points $a_1$ through $a_8$ on the character segment of the unknown character corresponds to one of the representative points $b_1$ through $b_8$ on the character segment stored in the segment dictionary.

After obtaining the correspondence between the representative points on the character segment of an unknown character and the representative points on the character segments of the segment dictionary, the representative point on the character segment of the unknown character corresponding to the reference point on the character segment stored in the segment dictionary is set as a check point.

Figure 41B:
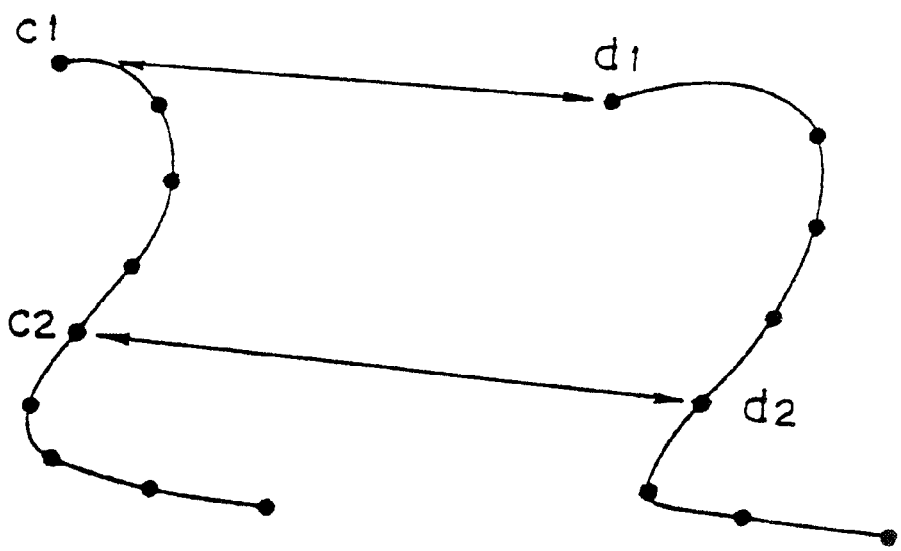

FIG. 41B shows the correspondence between the reference point and the check point.

In FIG. 41B, the reference points $d_1$ and $d_2$ of the character segment stored in the segment dictionary correspond respectively to the check points $c_1$ and $c_2$ of the character segment of the unknown character.

After obtaining the correspondence between the reference points and the check points, the check information about the check points $c_1$ and $c_2$ of the character segment of the unknown character is computed.

The check information can be, for example, absolute positional information about an individual check point as to where the check point exists in the entire character image; relative positional information about two check points indicating the distance, direction, etc. between the two check points; and information on two or more check points about the changes in angle, linearity, etc. among the check points.

If predetermined conditions are satisfied after computing the check information on the check points, then the character category of the character segment which satisfies the condition and is stored in the segment dictionary is output as a recognition result of the unknown character.

For example, using the change in angle from the check point $c_1$ to the check point $c_2$ on the character segment shown in FIG. 41,B along the character segment as the check information under the determination conditions, the character pattern shown in FIG. 38A can be recognized as belonging to the character category of '2' by computing the change in angle from the check point $c_1$ to the check point $c_2$ on the character segment shown in FIG. 41B along the character segment when a character image of the character segment indicating the change in angle of 60 degrees or more belongs to the character category of '2' in the segment dictionary stored corresponding to the character segment.

FIG. 42 is a flowchart showing the character recognizing process by the detail identifying method.

In FIG. 42, a list, for example, to be character recognized is scanned by a scanner, and the read character image is binarized into a binary monochrome image in step S150.

Then, in step S151, a character segment is extracted from the binary image obtained in step S150.

In step S152, a character segment which is not associated with the character segment of an unknown character is detected from a plurality of character segments stored in the segment dictionary.

In step S153, the character segment retrieved from the segment dictionary is associated with the character segment of the unknown character.

In step S154, a check point is selected from the representative points on the character segment of the unknown character, and the check information about the check point is computed.

In step S155, the character segment retrieved from the segment dictionary is compared with the character segment of the unknown character according to the check information computed in step S154, and a candidate for the character corresponding to the unknown character is determined by determining whether or not the check information about the character segment retrieved from the segment dictionary matches the check information about the character segment of the unknown character.

Then in step S156, when a candidate for the character is determined in the process of determining a candidate for the unknown character, the character category corresponding to the character segment retrieved in step S153 is output as a recognition result. If a candidate for the character is not determined, control is passed to step S157, and it is determined whether or not there is an unprocessed character segment which is not associated with the character segment of the unknown character. If there is an unprocessed character segment in the segment dictionary, then control is returned to step S152 and the above described process is repeated.

If there is not an unprocessed character segment, which is not associated with the character segment of an unknown character, in the segment dictionary, then it is determined that the input unknown character cannot be recognized, and 'unrecognized' is output as the recognition result.

The detail identifying method is disclosed by Tokukaihei 6-309501.

Described below is an embodiment of the box-touching character recognizing unit 13 shown in FIG. 9.

FIG. 43 shows the character completing process performed by the box-touching character recognizing unit 13.

In this character completing process, only a character box is extracted from the binary image of the box-touching character. At this time, the box-touching portion of the character stroke touching the character box for the box-touching character becomes obscure, and the character stroke is divided into a plurality of portions. Therefore, the geometric structure of labelled character strokes such as the distance, direction, etc. of the divided portions of the character is evaluated, and the character is completed.

For example, as shown in FIG. 43A, label 1 is assigned to the binary image of the character pattern 131 representing '3' and the character box 132 touching the character. Then, the character pattern 131 indicating '3' is divided into 3 portions as shown in FIG. 43B by extracting the character box 132 from the binary image shown in FIG. 43A, and by removing the character box 132. Thus, the three character strokes are generated with labels 1, 2, and 3 assigned.

The geometric structure such as the distance, direction, etc. of the three labelled character strokes assigned labels 1, 2, and 3 is evaluated and the character is completed. Thus, the three character strokes assigned labels 1, 2, and 3 are linked, and a character completed pattern 132 indicating '3' with label 1 is generated as shown in FIG. 43C.

A recognizing process is performed on the character restored in the character completing process as a candidate for a character to be recognized. In this recognizing process, the character is collated with the standard pattern entered in the character category dictionary, and a code of a character category indicating the smallest difference is output.

FIG. 44 shows the re-completing process performed by the box-touching character recognizing unit 13.

In this re-completing process, if the character stroke parallel with the character box touches the character box and is removed when the character box is removed, then the character stroke is interpolated. The box-touching character is extracted based on the linkage using the labels, and the character stroke parallel with the character box can be interpolated by detecting the matching in linkage between the completed character pattern completed by the character completing process and the box-touching character.

For example, a binary image of a character pattern 141 indicating '7' touching a character box 142 as shown in FIG. 44A is assigned label 1. The character box 142 is extracted from the binary image shown in FIG. 44A, and the character box 142 is removed. As shown in FIG. 44B, the character pattern 141 indicating '7' is divided into 3 portions and three character strokes are generated with labels 1, 2 and 3 assigned.

The geometric structure such as the distance, direction, etc. of the three labelled character strokes assigned labels 1, 2, and 3 is evaluated and the character is completed. Thus, the three character strokes assigned labels 1 and 2 are linked, and a character completed pattern 142 formed of two character strokes assigned with labels 1 and 2 is generated as shown in FIG. 44C.

In the character completing process, the character is completed only between the portion assigned label 1 and the portion assigned label 2 as shown in FIG. 44B. However, the character is not completed between the portion assigned label 1 and the portion assigned label 3 as shown in FIG. 44B. The character is completed in the re-completing process between the portion assigned label 1 and the portion assigned label 3 as shown in FIG. 44B.

In the re-completing process, a character stroke parallel with the character box is interpolated by preliminarily extracting the box-touching character based on the linkage using labels, and by detecting the matching in linkage between the pattern shown in FIG. 44C and the box-touching character. That is, the patterns assigned labels 1 and 2 as shown in FIG. 44C have been linked before removing the character box as shown in FIG. 44A. Therefore, the patterns assigned labels 1 and 2 as shown in FIG. 44C are linked using the character stroke parallel with the character box.

Thus, the binary image '7' divided into two character strokes assigned labels 1 and 2 as shown in FIG. 44C can be completed, and a re-completed pattern 143 indicating '7' with label 1 is generated as shown in FIG. 44D.

The recognizing process is performed on the character restored in the character completing process as a candidate for a character to be recognized. In this recognizing process, the character is collated with the standard pattern entered in the character category dictionary, and a code of a character category indicating the smallest difference is output.

That is, in the example shown in FIG. 44, the character completed pattern 142 shown in FIG. 44C is recognized as belonging to the category of the character リ. The character completed pattern 143 shown in FIG. 44D is recognized as belonging to the category of the character '7'. After it is determined that '7' indicates a smaller difference than リ, the character is finally recognized as '7' and the character code is output.

Described below is the case where the recognizing process is performed by the box-touching character recognizing unit 13 shown in FIG. 7 by referring to the knowledge table 14.

FIG. 45 shows an example of recognizing a box-touching character by learning a pair of a character and its misread character and entering it in the knowledge table 14.

Figure 45A:
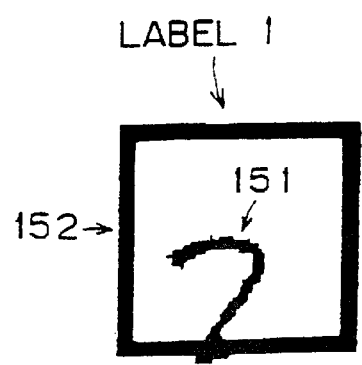
FIGS. 45A through 45C show examples of a completed misread character by the box-touching character recognizing unit FIG. 7.

In this example, as shown in FIG. 45A, label 1 is assigned to the binary image of the character pattern 151 representing '2' and the character box 152 touching the character. Then, the character pattern 151 indicating '2' is divided into 2 partial patterns with labels 1 and 2 as shown in FIG. 45B by extracting the character box 152 from the binary image shown in FIG. 45A, and by removing the character box 152.

Figure 45B:
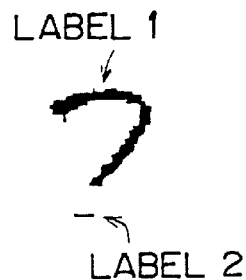
Figure 45C:
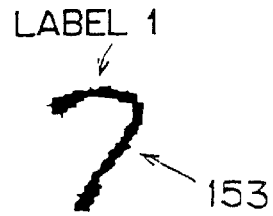

As shown in FIG. 45C, the two partial patterns with labels 1 and 2 shown in FIG. 45B are linked and the character completed pattern 153 is generated in the character completing process.

In this case, the lower stroke of the character pattern 151 indicating '2' touches the lower side of the character box 152, and the touching portion of the character almost completely overlaps the character box 152. Therefore, even the re-completing process cannot complete the lower stroke of the character pattern 151 indicating '2', and, there is a high possibility that the character '2' can be misread as '7'.

Thus, the box-touching character is not partly written outside the character box, but completely overlaps the character box. Therefore, if it can be misread as any other character, the box-touching character should be correctly recognized by entering it through learning a pair of a character and its misread character.

Described below is the method of recognizing a box-touching character by entering a pair of the character and its misread character.

Figure 46:
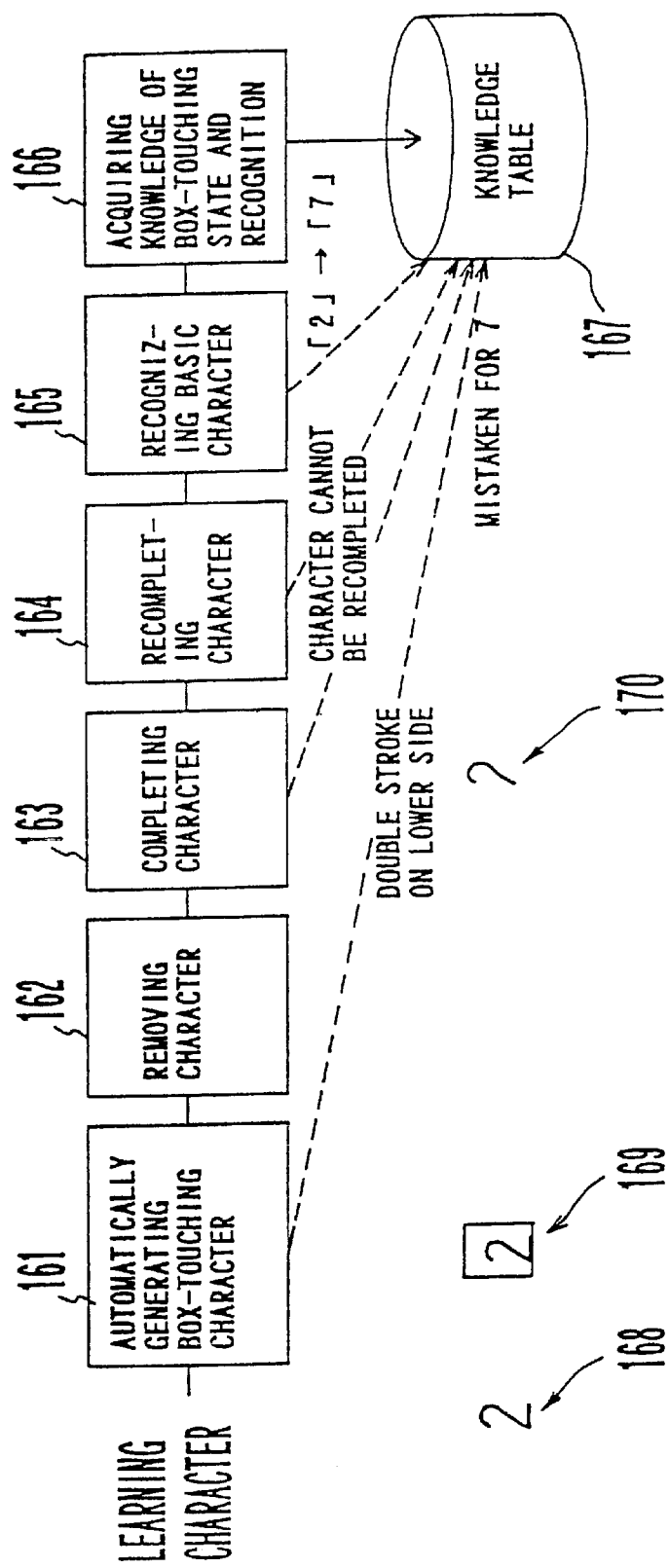
FIG. 46 is a block diagram showing an example of the method of learning a character by the box-touching character recognizing unit FIG. 7.

FIG. 46 is a block diagram showing the configuration for learning a pair of a character and its misread character in the box-touching character recognizing unit 13 shown in FIG. 7.

An automatic box-touching character generating unit 161 generates a box-touching character by making a character box overlap a learning character input as not touching the character box. By the method of changing the learning character relative to its character box, a plurality of box-touching characters can be generated for a single learning character. In FIG. 46, a learning character 168 indicating '2' is input to the automatic box-touching character generating unit 161, and a box-touching character 169 is generated with the lower stroke of the character '2' overlapping the lower side of the character box. The information generated by the automatic box-touching character generating unit 161 is entered in a knowledge table 167.

There can be two variations of characters with a learning character overlapping its character box, that is, a variation of a character relative to its character box, and a variation of a character box. The variation of a character relative to its character box can be, for example, a displacement, a variation in size, a variation in pose, etc. The variation of a character box can be, for example, a variation in pose, a variation in width of a character box, a variation in size, a convexity and concavity of a character box, etc.

The following parameters indicates the amount of a change in each of the above described variations. The x axis indicates the vertical direction and the y axis indicates the horizontal axis.

1. Variation of a character relative to its character box
Displacement: dx, dy
where dx (position indicated by black dot in FIG. 47) and dy (position indicated by x in FIG. 47) respectively indicate the difference in position of the center of gravity of the character and the character box between the x and y directions.
Variation in size: dsx, dsy
where dsx and dsy indicate the size of a character in the x and y directions respectively.
Variation in pose: dα
where dα indicates the angle of the pose of the character to the vertical line.
2. Variation in character box
Variation in pose: fα
where fα indicates the angle of the pose of the character box to the vertical line.
Variation in width of character box: w
where w indicates the width of the character box.
Variation in size: fsx, fsy
where fsx and fsy indicate the size of the character in the x and y directions respectively.
Convexity and concavity of character box: fδ
where fδ is a parameter for controlling, for example, the concavity and convexity of a character box with the deterioration, etc. of the quality of a printed character box on a facsimile taken into account. Assuming that the circumference of the character box is represented by L, fδ is represented by the array fδ [L] in size L. In this array, each element fδ [i] (i=1, 2, 3, . . . ) is an integer in the range of −β−+β determined by a random number.

Based on the above described type and amount of variation, a box-touching character is generated by providing a learning character with an operation F (dx, dy, dsx, dsy, dα, w, fsx, fsy, fα, fδ).

FIG. 47 shows an example of generating a box-touching character by assigning a character box 172 to a learning character 171 indicating '7'.

As indicated by (A) shown in FIG. 47, providing a changing operation F (dx, dy, dsx, dsy, dα, w, fsx, fsy, fα, fδ) for the learning character 171 indicating '7' generates a box-touching character '7' touching the character box 172 as indicated by (B) shown in FIG. 47.

That is, a box-touching character can be generated by performing the changing operation F (dx, dy, dsx, dsy, dα, w, fsx, fsy, fα, fδ) for the learning character 171 and the character box 172 to make the learning character 171 and the character box 172 overlap each other. At this time, the changing operation F (dx, dy, dsx, dsy, dα, w, fsx, fsy, fα, fδ) is performed while, for example, fixing the position of the center of gravity of the character box 172.

FIG. 48 shows an example of each type of a box-touching character generated for the learning character '3' with the size variation fsx in the x direction and the size variation fsy in the y direction fixed and the size of character box fixed.

(A) in FIG. 48 indicates an example of the type of variation 'displacement', where the amount of the change is dx=0, and dy>0. In this case, the character '3' is partly outside the lower side of the character box (lower displacement).

(B) in FIG. 48 indicates an example of the type of variation 'displacement', where the amount of the change is dsx=fsx, and dsy=fsy. In this case, the character '3' touches the upper, lower, left, and right sides of the character box '3'. The rectangle circumscribing '3' equals the character box.

(C) in FIG. 48 indicates an example of the type of 'variation in pose of a character', where the amount of the change is dα=10 degrees.

(D) in FIG. 48 indicates an example of the type of 'variation in pose of a character box', where the amount of the change is fα=−10 degrees.

(E) in FIG. 48 indicates an example of the type of 'variation in width of a character box', where the amount of the change is w=5.

(F) in FIG. 48 indicates an example of the type of 'variation in concavity and convexity of a character box', where each element fδ[i] of the amount of change fδ[L] is controlled.

Next, a character box removing unit 162 shown in FIG. 46 extracts only the character box from the box-touching character generated by the automatic box-touching character generating unit 161, and outputs to a character completing unit 163 the image data on the obscure character obtained by removing the character box.

The character completing unit 163 evaluates and completes the geometric structure such as the distance, direction, etc. of the labelled character strokes on the image data from which the character box has been removed by the character box removing unit 162. FIG. 46 shows an example of generating a character completed pattern 170 by completing a box-touching character by the character completing unit 163 after removing the character box from the box-touching character 169 generated by the automatic box-touching character generating unit 161.

A re-completing unit 164 preliminarily extracts the box-touching character based on the linkage using labels in the area where the character completing unit 163 has not completed the image data, and completes a character stroke parallel with the character box by detecting the matching in linkage between the pattern completed by the character completing unit 163 and the box-touching character.

The character completed pattern completed by the character completing unit 163 and the re-completed pattern completed by the re-completing unit 164 are input to a basic character recognizing unit 165.

The basic character recognizing unit 165 performs a character recognizing process on the character completed pattern completed by the character completing unit 163 and the re-completed pattern re-completed by the re-completing unit 164; Then, the basic' character recognizing unit 165 outputs the recognition result about each learning character to a character box touching state and recognition knowledge acquiring unit 166.

The character box touching state and recognition knowledge acquiring unit 166 compares a recognition result output from the basic character recognizing unit 165 with preliminarily provided solution data and obtains the recognition ratio for the entire sample data. Then, the character box touching state and recognition knowledge acquiring unit 166 enters in the knowledge table 167 this recognition ratio as reliability, and the combination of the misread. (misrecognized) character and the correct character as a pair of a character and its misread character. The above described pair of a character and its misread character are entered in, for example, character codes. The character box touching state and recognition knowledge acquiring unit 166 also extracts a parameter indicating the feature of the state of a character and a character box touching the character, and enters the feature in the knowledge table 167.

Thus, the knowledge table 167 contains for each character category the recognition ratio, together with the pair of a character and its misread character, for the character in various touching states between the character and the character box.

FIG. 49 shows an example of the knowledge table 167 generated through learning a character.

In FIG. 49, the knowledge table 167 contains, for example, a character and its misread character (2 and 7) and the reliability of 77% together with the amount of change dy=5 and W=5 in 'displacement at a lower position', etc. If the box-touching character '2' indicates the amount of change dy=5 and W=5 in 'displacement at a lower position', then the basic character recognizing unit 165 can misrecognize '2' for '7' at the probability of 23%. Even if the basic character recognizing unit 165 misreads '2' for '7' in this case, it is determined by referring to the knowledge table 167 that the reliability is 77$ and there is still the probability of 22% that the character is actually '2'.

Similarly, the character box touching state and recognition knowledge acquiring unit, 166 enters in the knowledge table 167 the 'amount of change', 'width of the sides of a character box', a 'character and its misread character', and a reliability.

The pair (L1, L2) of a character and its misread character indicates that the character 'L1' may be actually misrecognized as 'L2'. The character codes for characters 'L1' and 'L2' are entered for the corresponding characters 'L1' and 'L2'.

In addition to the amount of change dy=5 and W=5 in displacement at a lower position shown in FIG. 49, the knowledge table 167 also enters each of the variations shown in FIG. 47 such as 'variation in pose of a character relative to its character box' (in this case, touching at the left side) for each character category as shown in FIG. 50.

As shown in FIG. 50, dx='−3'~'+3', dy=5, w=5, dsy=1, dα='−10'−'+10 ', fα='−10 '~'+10' are entered for variations of 'displacement at a lower position'. Thus, the amount of change entered in the knowledge table 167 as 'displacement at a lower position' can be the displacement dx in the x direction, the displacement dy in the y direction, and other values. Similarly, dx='−3'~'+3', dy='−3'~'+3', w=5, dsy=1, dα='−20'−'+20', fα='−10'~'+10' are entered for a 'variation of pose of a character touching the left side of the character box'.

A character recognizing method is followed on a pair (L1, L2) of a character and its misread character whose reliability is equal to or lower than a predetermined threshold (for example, 90%) in a way that the reliability is equal to or higher than the predetermined threshold. The learned character recognizing method is entered in the knowledge table 167.

For example, the reliability of the character recognition of the box-touching character '2' in the state of 'displacement at a lower position' with dy=5 and w=5 is 77% as shown in FIG. 49. Since there is a high probability that the character is misread as '7', the character completed pattern completed by the character completing unit 163 or the character re-completed pattern re-completed by the re-completing unit 164 is entered in the knowledge table 167 after learning that, for example, the recognition ratio can be improved by recognizing the pattern again by emphasizing a specified area.

The method of emphasizing a specified area for a pair (2 and 7) of a character and its misread character is described by referring to FIG. 51.

Figure 51A:
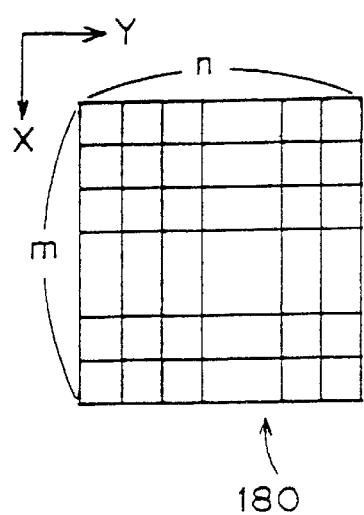
FIGS. 51A and 51B show examples of the re-recognized area emphasized by the box-touching character recognizing unit shown in FIG. 7.
Figure 51B:
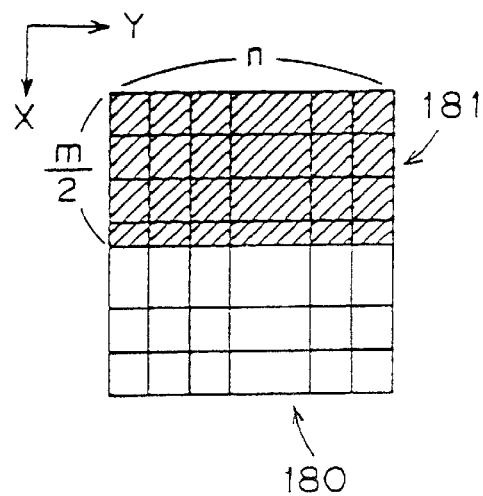

First, as shown in FIG. 51A, a circumscribing rectangle 180 circumscribing the character completed pattern completed by the character completing unit 163 or the re-completed pattern re-completed by the re-completing unit 164 is divided into m×n divided areas in m columns by n rows. Then, with diagonal lines shown in FIG. 51B, the upper half m/2×n area of the circumscribing rectangle 180 is emphasized to recognize the character again.

That is, the feature parameter of the m/2×n area is extracted, and it is checked whether the character completed pattern completed by the character completing unit 163 or the re-completed pattern re-completed by the re-completing unit 164 is '2' or '7'. The area emphasizing method improves the recognition up to 95%. The knowledge table 167 shown in FIG. 49 contains, in the line of a pair of a character and its misread character (2, 7), the 'highlighted area' as a re-recognizing method the 'm/2×n' area as a re-recognition area, and '95%' as the re-recognition reliability.

The area emphasizing method is also effective for the box-touching character shown in FIG. 52A. FIG. 52A is an example that the lower portion of the character pattern indicating '2' touches a character box 182.

In this case, the character completing unit 163 obtains a character completed pattern 183 similar to '7' shown in FIG. 52B. A circumscribing rectangle 184 shown in FIG. 52C is computed corresponding to the character completed pattern 183. If, as shown in FIG. 51, the circumscribing rectangle 184 is divided into m×n areas, and the upper half m/2×n partial area 185 is especially emphasized when the character is recognized, then there is a high probability that the character completed pattern 183 can be recognized as '2'. That is, it is learned that a solution (reliability) can be obtained at a high rate, and the above described area emphasizing method is entered in the knowledge table 167 as a re-recognizing method for the pair (2 and 7) of a character and its misread character by touching a character box.

Figure 53:
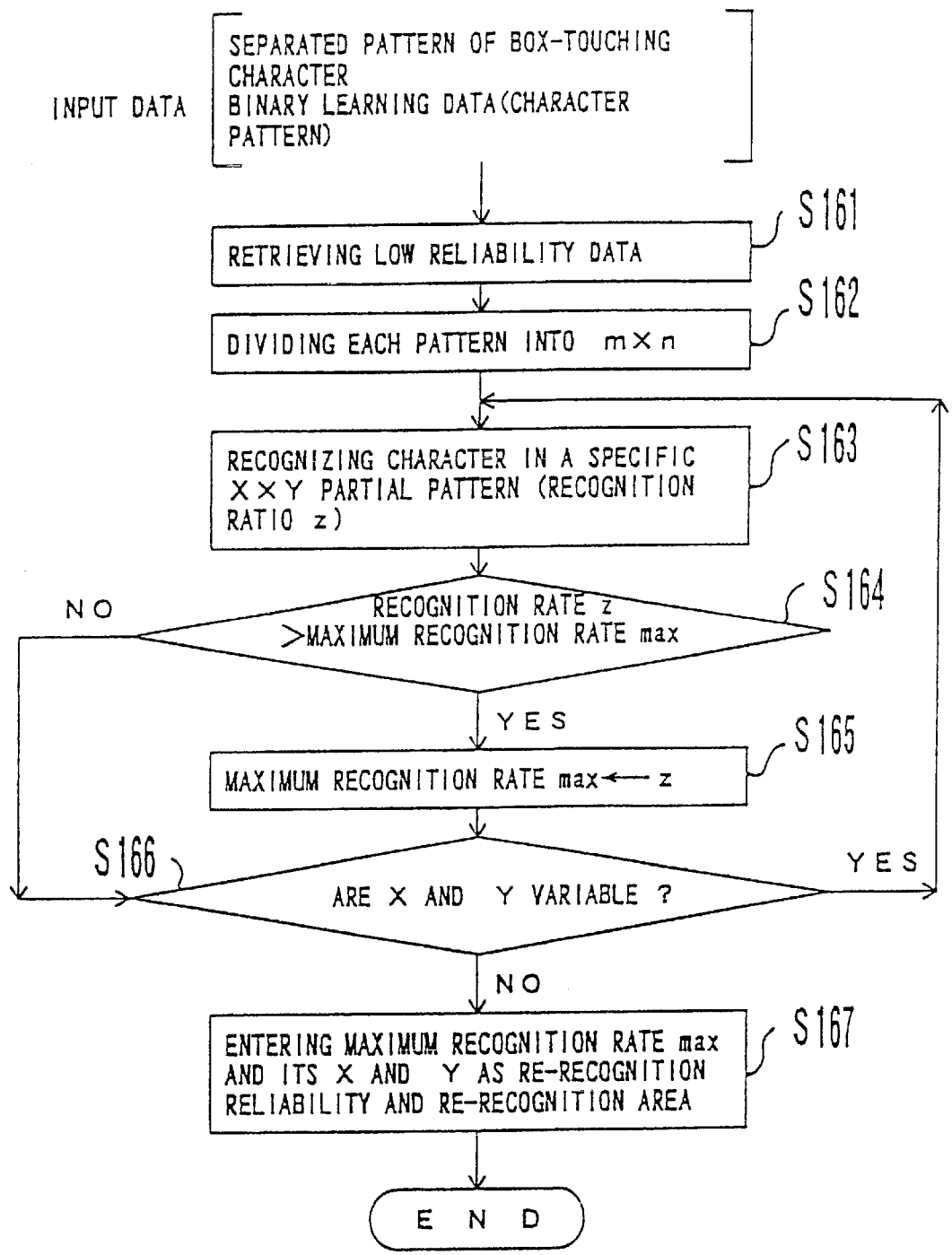
FIG. 53 is a flowchart showing the re-recognizing process using an emphasized area by the box-touching character recognizing unit shown in FIG. 7.

FIG. 53 is a flowchart showing the method of re-recognizing a character pattern by emphasizing a specific area.

In FIG. 53, the data of a pair of a character and its misread character indicating a lower reliability is retrieved from the knowledge table 167 in step S161. Corresponding to the left character of the pair of the character and its misread character, a character pattern as binary learning data, and the character completed pattern completed by the character completing unit 163 or the re-completed pattern re-completed by the re-completing unit 164 are input.

The character completed pattern or the re-completed pattern is prescribed by an amount-of-change parameter entered in the knowledge table 167, and can be represented by plural forms of patterns even in the same category.

The character pattern as the learning data input in step S161, and the character completed pattern completed by the character completing unit 163 or the re-completed pattern re-completed by the re-completing unit 164 are divided into m×n areas in step S162.

IN step S163, a character recognizing process is performed on the X×Y partial pattern in the m×n area, and the recognition ratio z is obtained.

The above described X×Y partial pattern is a re-recognition area where X and Y indicates the length in the X and Y directions respectively in the m×n area, and $X \leq m$ and $Y \leq n$. The above described recognition ratio z indicates the probability that a correct solution can be output with characters recognized using the above described X×Y partial patterns.

That is, the character recognition result of the partial pattern of a character pattern as learning data is regarded as a solution. The character recognition result on plural partial patterns about the character completed pattern completed by the character completing unit 163 or the re-completed pattern re-completed by the re-completing unit 164 is compared with the character recognition result on the partial pattern of the character pattern as learning data. As a result, the recognition ratio z of the partial pattern about the character completed pattern completed by the character completing unit 163 or the re-completed pattern re-completed by the re-completing unit 164 is obtained.

Then, in step S164, it is discriminated whether or not the recognition ratio z is larger than the maximum recognition ratio max. The maximum recognition ratio max is a variable storing the maximum value of the recognition ratio z obtained while a partial pattern of X×Y varies. First, an initial value is set (for example, '0')

If the recognition ratio z is larger than the maximum recognition ratio max, then control is passed to step S165 to substitute the recognition ratio z for the maximum recognition ratio max, and control is passed to step S166 to check whether or not the lengths X and Y is variable. If the recognition ratio z is equal to or smaller than the maximum recognition ratio max in step S164, then control is immediately passed to step S166.

Changing the lengths X and Y is changing the size of the lengths X and Y, and also includes a position change in the m×n area of the partial pattern of X×Y.

If it is discriminated in step S166 that the lengths X and Y are variable, control is returned to step S163, the lengths X and Y are changed, and a new partial pattern of X×Y is determined, and characters are recognized in the partial pattern.

The processes in step S163 through S166 are repeated until it is determined in step S166 that the lengths X and Y cannot be changed. If it is determined in step S166 that the lengths X and Y cannot be changed, the maximum identification ratio max and the partial pattern of X×Y from which the maximum identification ratio max has been obtained are entered in the knowledge table 167 as a re-recognition reliability and a re-recognition area respectively. The 'area emphasis' is entered as a re-recognizing method in the knowledge table 167.

FIG. 53 is a flowchart showing an example of learning the method of re-recognizing a character using the area emphasizing method. The character re-recognizing method can also be learned by any other methods than the area emphasizing method.

Figure 54:
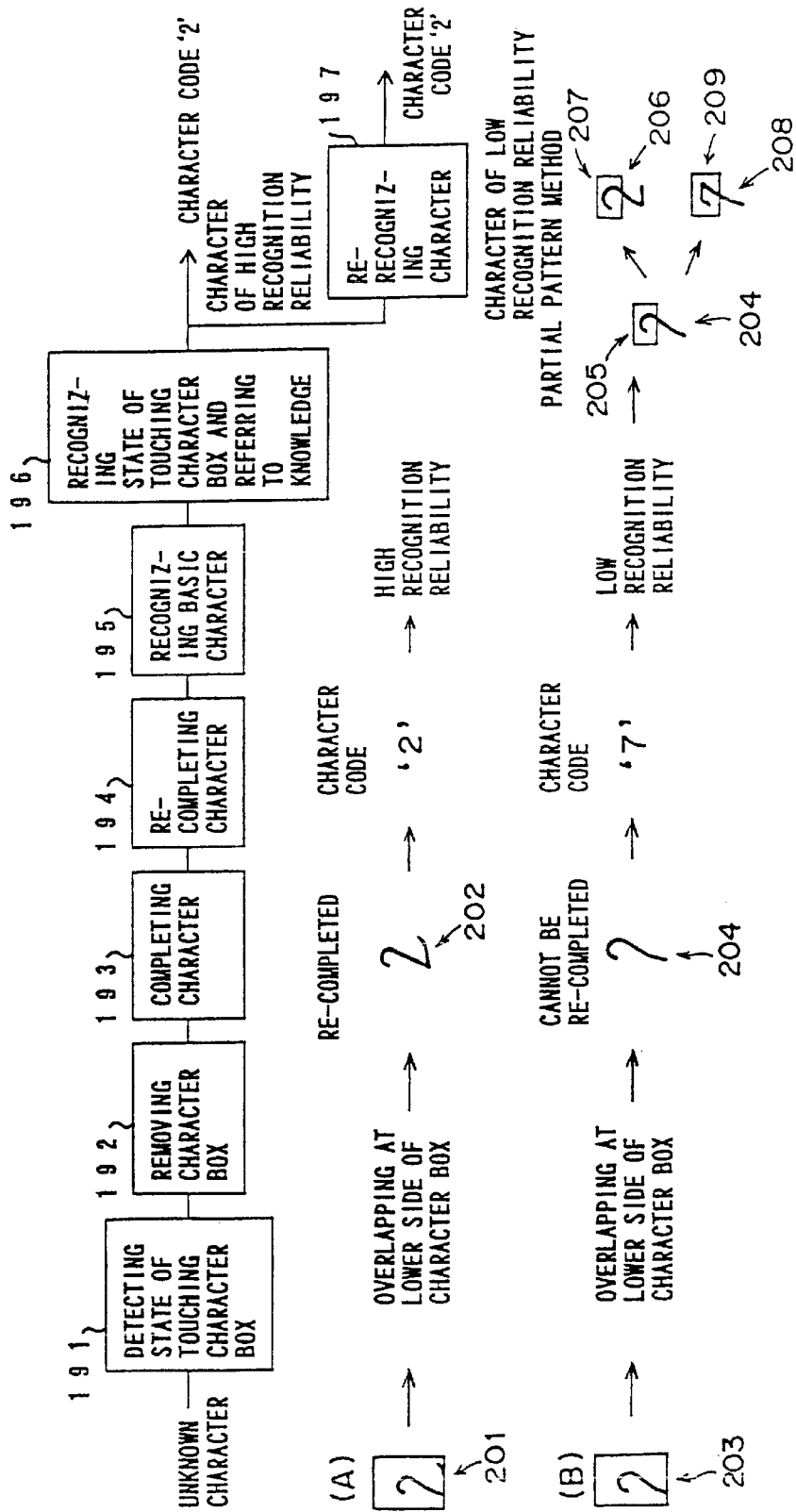
FIG. 54 is a block diagram showing an example of the character re-recognizing method for use with the box-touching character recognizing unit shown in FIG. 7.

FIG. 54 is a block diagram showing the configuration with which a box-touching character is recognized according to the knowledge table 167 obtained through learning.

In FIG. 54, a box-touching state detecting unit.191 detects the touching state between a character box and a character when an unknown box-touching character is input. This example shows the lower portion of a box-touching character 'pattern 201 ('2') partially overlapping the lower side of the character box as indicated by (A) shown in FIG. 54 and the lower portion of a box-touching character pattern 203 ('2') completely overlapping the lower side of the character box as indicated by (B) shown in FIG. 54. The box-touching state detecting unit 191 detects the box-touching character pattern 201 and box-touching character pattern 203.

A character box removing unit 192 removes a character box from the box-touching character pattern detected by the box-touching state detecting unit 191. A character completing unit 193 evaluates and completes the geometric structure such as the distance, direction, etc. of the labelled character strokes on the character pattern from which the character box has been removed by the character box removing unit 192.

A re-completing-unit 194 preliminarily extracts the box-touching character based on the linkage using labels in the area where the character completing unit 193 has not completed the image data, and completes a character stroke parallel with the character box by detecting the matching in linkage between the pattern completed by the character completing unit 193 and the box-touching character. A re-completed pattern 202 shows a pattern completed in the re-completing process performed by the re-completing unit 194 on the box-touching character pattern 201 indicated by (A) shown in FIG. 54. A re-completed pattern 204 shows a pattern which cannot be completed in the re-completing process performed by the re-completing unit 194 on the box-touching character pattern 203 indicated by (B) shown in FIG. 54.

The basic character recognizing unit 195 performs a character recognizing process on the character completed pattern completed by the character completing unit 193 and the re-completed pattern re-completed by the re-completing unit 194. As a result, the character code of '2' is output for the re-completed pattern 202 indicated by (A) shown in FIG. 54, and the character code of '7' is output for the re-completed pattern 204 indicated by (B) shown in FIG. 54. The character codes obtained as the recognition result are output to a character box touching state and recognition knowledge acquiring unit 196.

The character box touching state and recognition knowledge acquiring unit 196 obtains the type of variation according to the positional information about the rectangle circumscribing the character completed pattern completed by the character completing unit 193 or the re-completed pattern re-completed by the re-completing unit 194, and according to the positional information and width information about the character box extracted from the box-touching character pattern 201 indicated by (A) shown in FIG. 54 or the box-touching character pattern 203 indicated by (B) shown in FIG. 54.

That is, a change to a character relative to its character box such as the displacement, variation in size, variation in pose, etc. as shown in FIG. 47, or a change to a character box such as a variation in pose, variation in width of a character box, convexity and concavity of a character box, etc. is obtained. Furthermore computed is the amount of change dx, dy, dsx, dsy, dα, w, fsx, fsy, fα, or fδ for the type of each variation as obtained above.

Then, the knowledge table 167 is searched using, as key items, the computed variation type information, amount-of-change information, and a character code input from the basic character recognizing unit 195. It is checked whether or not the knowledge table 167 stores a line containing the variation type information, amount-of-change information, and a pair of a character and its misread character matching the key items.

If the line matching the key item exists, then it is discriminated whether or not the reliability stored in the line is equal to or larger than a predetermined threshold. If it is smaller than the threshold, then the character completed pattern completed by the character completing unit 193 or the re-completed pattern re-completed by the re-completing unit 194 is output to a character re-recognizing unit 197. The characters are recognized again by the re-recognizing method entered in the line.

That is, a box-touching character in unknown image data is re-recognized by a method other than the method by the basic character recognizing unit 195 using the character completed pattern completed by the character completing unit 193, the re-completed pattern re-completed by the re-completing unit 194, or binary image data of an unknown character. Then a character code obtained in the re-recognizing process is output.

For example, when the basic character recognizing unit 195 outputs the character code of '7' as a recognition result on a re-completed pattern 204 re-completed by the re-completing unit 194, the character box touching state and recognition knowledge acquiring unit 196 obtains the type of variation and an amount of change according to the positional information about the rectangle circumscribing the re-completed pattern 204, and the positional information and width information about the character box extracted from the box-touching character pattern 203. As a result, the 'displacement at a lower position' is computed as the type of variation. 'dy=5' is obtained as the amount of change in the 'displacement at a lower position'. 'w=5' is computed as the width of the character box.

Then, the character box touching state and recognition knowledge acquiring unit 196 searches the knowledge table 167 shown in FIG. 49 using the 'displacement at a lower position' as the type of variation, 'dy=5' as an amount of displacement at a lower position, 'w=5' as the width of a character, and the character code of '7' received from the basic character recognizing unit 195 as a key item. As a searching result, the lines corresponding to the key items store a pair (2 and 7) of a character and its misread character, and the reliability of the character code '7' recognized by the basic character recognizing unit 195 is 770, thereby referring to that the character '2' is misread for '7' at the probability of 23%.

In this case, since the reliability entered in the lines corresponding to these key items is lower than a predetermined threshold, the character re-recognizing unit 197 re-recognizes the box-touching character pattern 203 contained in the unknown image data by a method other than the method followed by the basic character recognizing unit 195. At this time, the character re-recognizing unit 197 refers to the line corresponding to the key item on the knowledge table 167 to specify the re-recognizing method.

That is, the character re-recognizing unit 197 is informed of the 'area emphasizing method' as a re-recognizing method, and of an upper half m/2×n area 205 of the re-completed pattern 204 as a re-recognition area when the 'area emphasizing process' is performed. It is also informed of the re-recognition reliability of 95%.

The character re-recognizing unit 197 re-recognizes only the upper half area 205 of the re-completed pattern 204 by the re-recognizing method entered in the knowledge table 167. The character re-recognizing unit 197 is informed that the upper half area 205 of the re-completed pattern 204 matches a partial area 207 of a character pattern 206 corresponding to the character code '2' at a probability of 95%, and matches a partial area 209 of a character pattern 208 corresponding to the character code '7' at a probability of 5%, and outputs the character code '2' as a recognition result of the character touching the character box of the box-touching character pattern 203 of an unknown character.

Figure 55:
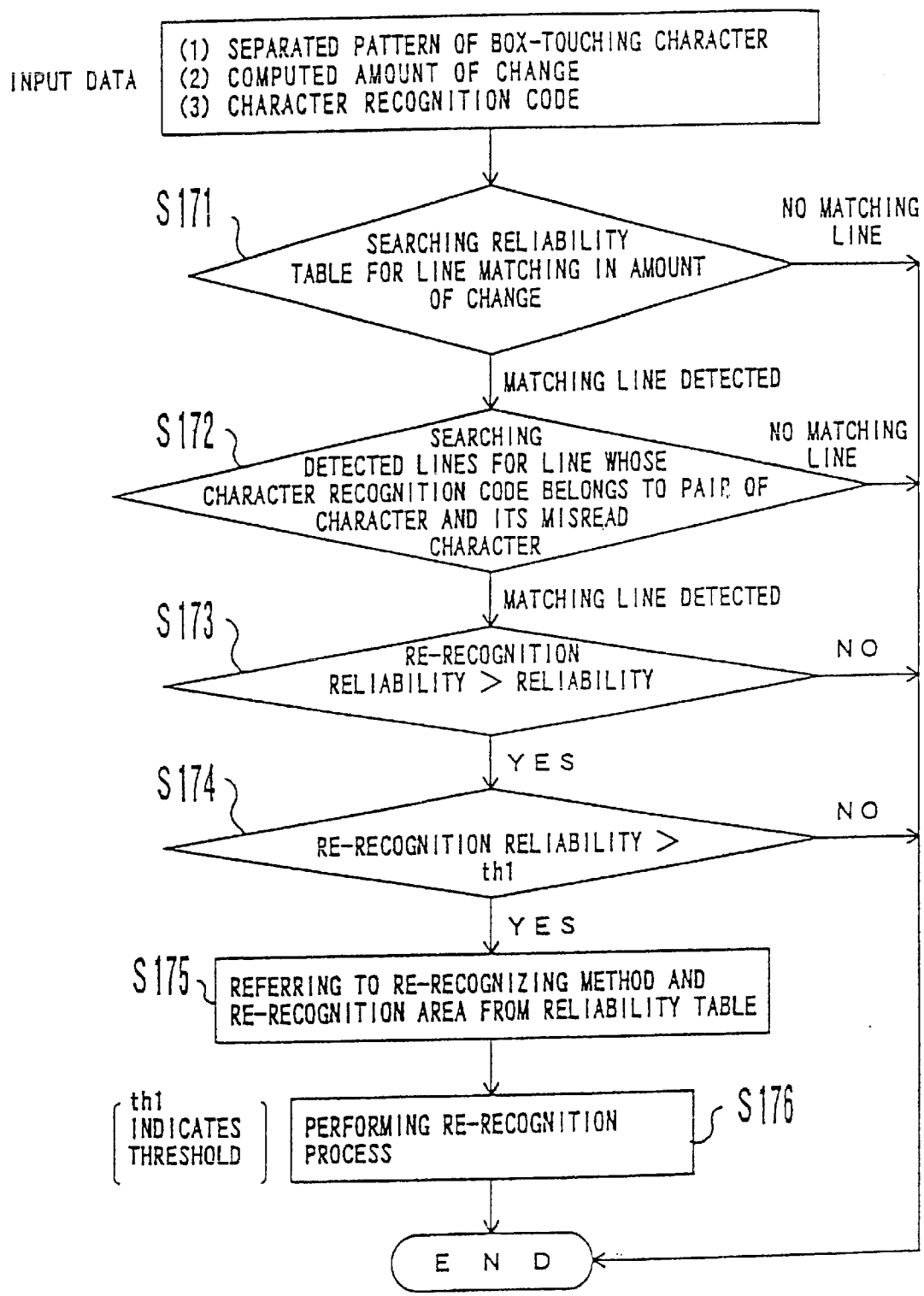
FIG. 55 is a block diagram showing the character re-recognizing process for use with the box-touching character recognizing unit shown in FIG. 7.

FIG. 55 is a flowchart showing the operations of the character box touching state and recognition knowledge acquiring unit 196.

In FIG. 55, an amount of change to a character relative to its character box is computed based on the character box extracted from an unknown box-touching character pattern and the character pattern separated from the box-touching character pattern, and the knowledge table 167 is searched using the amount of change as a key item in step S171. Then, it is checked whether or not the knowledge table 167 stores a line containing the amount of change matching the computed amount of change.

When the amount of change to the character '2' indicating the displacement at a lower position is obtained as, for example, dx=5 and w=5, the top line on the knowledge table 167 is detected as shown in FIG. 49.

If a line containing a matching amount of change exists, control is passed to step S172, and it is determined whether or not the line containing, the matching amount of change stores the line containing in the pair of a character and its misread character the character code (character recognition code) input from the basic character recognizing unit 195.

The top line on the knowledge table 167 is detected with the character '2' indicating the displacement at a lower position as shown in FIG. 49.

In step S173, if the line containing the matching amount of change stores the line containing in the pair of a character and its misread character the character code input from the basic character recognizing unit 195, the re-recognition reliability entered in the corresponding line on the knowledge table 167 is compared with the reliability computed by the basic character recognizing unit 195. It is determined whether or not the re-recognition reliability entered in the corresponding line on the knowledge table 167 is larger than the reliability computed by the basic character recognizing unit 195.

For the character '2' displaced at its lower position, the re-recognition reliability entered in the top line on the knowledge table 167 shown in FIG. 49 and the reliability computed by the basic character recognizing unit 195 are '95%' and '77%' respectively. Thus, it is determined that the re-recognition reliability entered in the corresponding line on the knowledge table 167 is larger than the reliability computed by the basic character recognizing unit 195.

If the re-recognition reliability entered in the corresponding line on the knowledge table 167 is larger than the reliability computed by the basic character recognizing unit 195, control is passed to step S174 and it is determined whether or not the re-recognition reliability entered in the corresponding line on the knowledge table 167 is larger than a predetermined threshold th1. If it is larger than the threshold th1, then control is passed to step S175, and the re-recognizing method and the re-recognizing area entered in the line on the knowledge table 167 and detected in step S172 are referred to.

Next, in step S176, a re-recognition area shown on the knowledge table 167 is detected from the character completed pattern completed by the character completing unit 193 or the re-completed pattern re-completed by the re-completing' unit 194, and a character recognizing process is performed on the detected area by the re-recognizing method shown on the knowledge table 167. Then, the character code obtained in the character recognizing process is output.

If the threshold th1 is lower than '95%', then the character code of '2' is finally output by performing the character re-recognizing process by the area emphasizing method using the upper half 'm/2×n' area on the completed pattern of the character '2', which indicates the displacement at its lower position and is input by the basic character recognizing unit 195.

Described below is an embodiment of the character string recognizing unit 15 shown in FIG. 7.

The character string recognizing unit 15 does not determine in a heuristic manner the threshold when the character is integrated on the parameter as a feature value used when a character is detected one by one from a character string extracted in the layout analysis in step S2 shown in FIG. 8. The threshold is determined as a statistically reasonable value.

Practically, a parameter value and a statistic data are obtained on the successful or unsuccessful integration of a character corresponding to the parameter. Each parameter is not individually evaluated, but is counted as an element in a multiple-dimensional space, and the discriminate phase is obtained by the multivariate analysis to discriminate the two groups (cases) in the multiple-dimensional space for both cases where the integration is successfully performed and unsuccessfully performed.

That is, sample data comprising P feature values indicating the features of a pattern is divided into two groups, that is, a first group as successfully retrieved and a second group as unsuccessfully retrieved. The discriminant phase between the first and second groups is generated in the P-dimensional space.

The discriminant phase can be obtained by, for example, the discriminant analysis method. That is, when the discriminant phase is formed by a linear discriminant function, the coefficient vector of the discriminant function is expressed as follows.

$$\Sigma^{-1}(\mu_1 - \mu_2) \tag{3}$$

where
$\Sigma$ indicates the variance co-variance matrix of the first and second groups;
$\mu_1$ indicates the mean vector of the first group; and
$\mu_2$ indicates the mean vector of the second group.

The discriminant function having the coefficient vector in equation (3) is generated in a way that an equal distance can be set from each center of gravity of the first and second groups.

The coefficient vector of the discriminant function can also be computed based on the standard that the ratio of the inter-group variation between the first and second groups to the intra-group variation can be the largest possible.

The process of detecting a character from a character string is performed separately by the statistic process of integrating character patterns by referring to the positions, sizes, arrays, etc. of the circumscribing rectangles of character patterns, and by the non-statistic process of observing the forms of character patterns to correctly process the superscript strokes, separate-stroke characters, etc.

In the statistic process, a detection parameter is used. The detection parameter refers to the position and ratio of vertical to horizontal size of a rectangle circumscribing a pattern, ratio of character size to an average character size, width of overlap between patterns, density of character string, etc.

Figure 56:
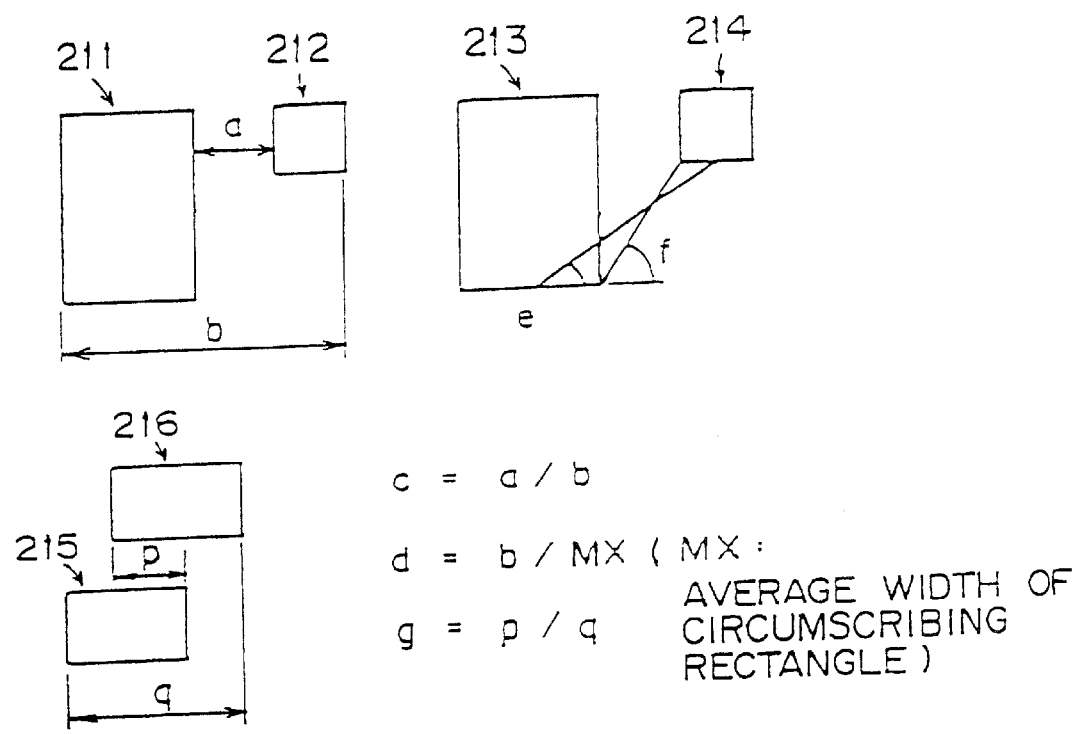
FIG. 56 shows the graphic meaning of a parameter in the statistic process performed by the character st ring recognizing unit shown in FIG. 7.

Samples of detection parameters are listed below as shown in FIG. 56.

1) distance a between the right side of the circumscribing rectangle 211 and the left side of the circumscribing rectangle 212
2) distance b between the left side of the circumscribing rectangle 211 and the right side of the circumscribing rectangle 212
3) ratio c of the distance a between the right side of the circumscribing rectangle 211 and the left side of the circumscribing rectangle 212 to the distance b between the left side of the circumscribing rectangle 211 and the right side of the circumscribing rectangle 212
4) ratio d of the distance b between the left side of the circumscribing rectangle 211 and the right side of the circumscribing rectangle 212 to an average width MX of circumscribing rectangles
5) angle a made between the lower side of the circumscribing rectangle 213 and the line connecting the mid-point of the lower side of the circumscribing rectangle 213 to the mid-point of the lower side of the circumscribing rectangle 214
6) angle f made between the lower side of the circumscribing rectangle 213 and the line connecting the right-bottom vertex of the circumscribing rectangle 213 to the left-bottom vertex of the circumscribing rectangle 214
7) when the circumscribing rectangle 215 overlaps the circumscribing rectangle 216;
ratio g of the distance p between the right side of the circumscribing rectangle 215 and the left side of the circumscribing rectangle 216 to the distance q between the left side of the circumscribing rectangle 215 and the right side of the circumscribing rectangle 216.

That is, $$c = a/b \tag{4}$$

$$d = b/MX \tag{5}$$

$$g = p/q \tag{6}$$

The statistic process is described below by referring to the flowchart shown in FIG. 57.

In step S181, the rectangle circumscribing the link pattern is retrieved.

It is checked in step S182 whether or not there is another circumscribing rectangle to the right of the circumscribing rectangle retrieved in step S181. If there is no circumscribing rectangle to the right of the circumscribing rectangle retrieved in step S181, then the circumscribing rectangle retrieved in step S181 is removed from the objects of the statistic process.

If it is determined in step S182 that there is another circumscribing rectangle to the right of the circumscribing rectangle retrieved in step S181, then control is passed to step S184.

In step S183, the average character size of the rectangle circumscribing a character string is computed. When the size of the rectangle circumscribing a character string is computed, the exact average character size cannot be immediately computed because each character has not been detected yet.

For example, a provisional average character size is computed by temporarily integrating the rectangle circumscribing a link pattern. A temporary integration is performed when, for example, the vertical-horizontal ratio P of the integrated link pattern satisfies the following equation.

$$N(=0.8)<P<M(=1.2)$$

An average character size is computed after the temporary integration. The average character size of a rectangle circumscribing a character string tan also be obtained by generating a frequency histogram for each size of a circumscribing rectangle.

Then, the parameters a through g shown in FIG. 56 are computed in step S184.

In the non-statistic process, separate-stroke characters and superscript strokes in a character string are processed respectively in the separate-stroke-character process and the superscript-stroke process.

In the separate-stroke-character process, the pose and density of a pattern, the size of an integrated pattern obtained by integrating adjacent patterns, and the distance between the patterns are used as detection parameters.

Figure 58:
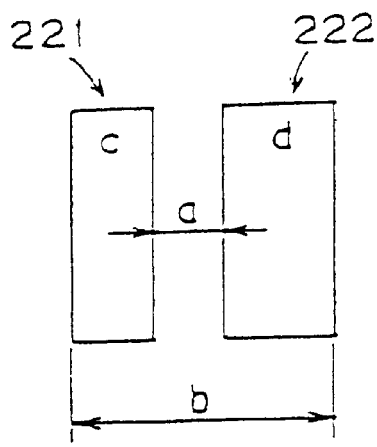
FIG. 58 shows the graphic meaning of a parameter in the delimiting character process performed by the character string recognizing unit shown in FIG. 7.

For example, the following values are used as the detection parameters as shown in FIG. 58.

8) ration p of the distance a between the right side of the circumscribing rectangle 221 and the left side of the circumscribing rectangle 222 to the distance b between the left side of the circumscribing rectangle 221 and the right side of the circumscribing rectangle 222

9) ratio q of the distance b between the left side of the circumscribing rectangle 221 and the right side of the circumscribing rectangle 222 to an average width MX of circumscribing rectangles 10) ratio r of the product of the area c of the circumscribing rectangle 21 and the area d of the circumscribing rectangle 22 to the square of the product of the average width MX of circumscribing rectangles and the average height MY of the circumscribing rectangles.

That is, $$p=a/b \quad (7)$$

$$q=b/MX \quad (8)$$

$$r=(c \times d)/(MX \times MY)^2 \quad (9)$$

Figure 59:
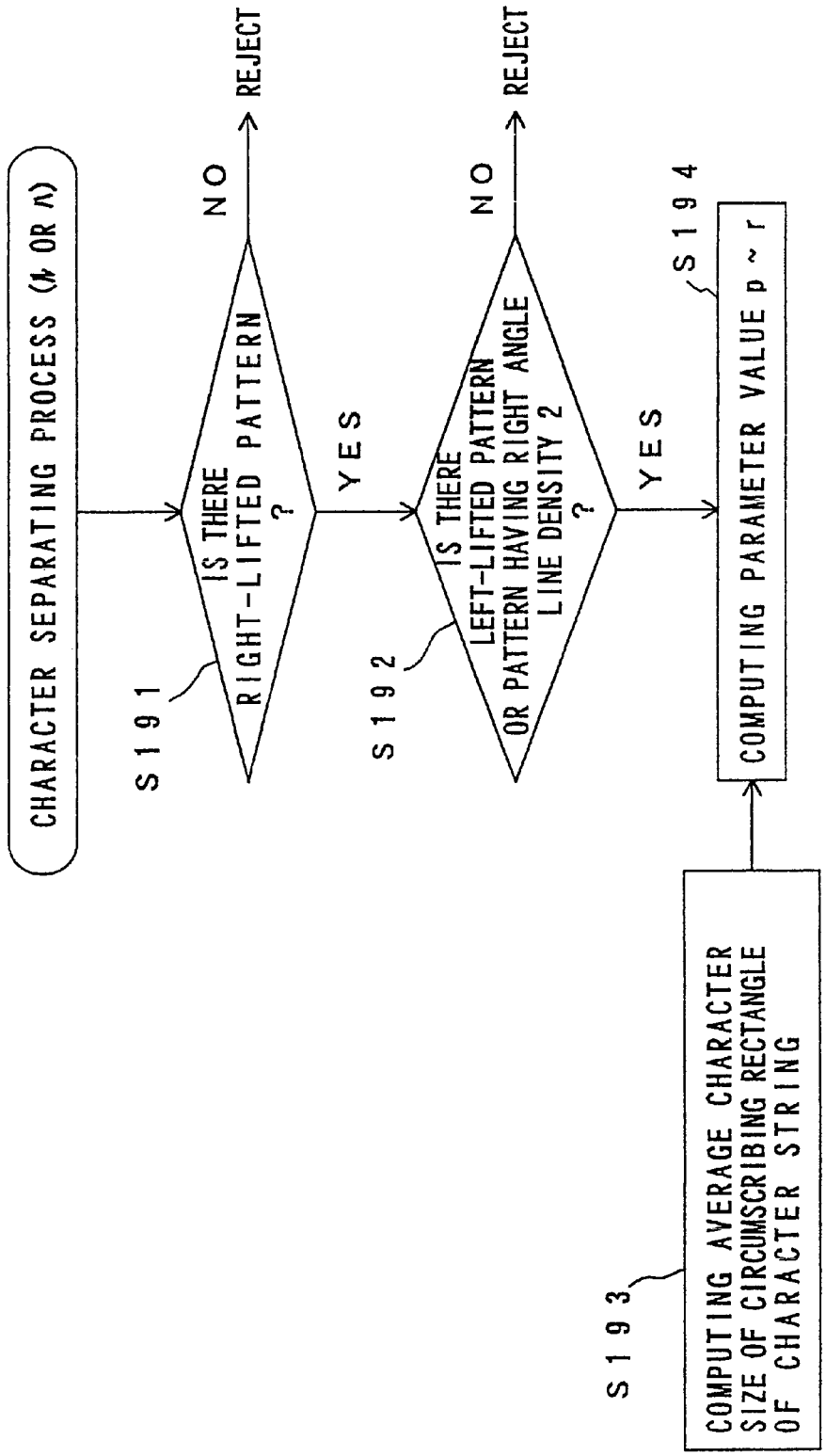
FIG. 59 is a flowchart showing the delimiting character process per formed by the character string recognizing unit shown in FIG. 7.

The separate-stroke-character process is described below by referring to the flowchart shown in FIG. 59. This separate-stroke-character process is to detect a separate-stroke character in a link pattern formed by two or more separate strokes such as jレ, /\, etc.

In step S191, it is determined whether or not a right-lifted pattern exists in link patterns. If there is no right-lifted pattern, the separate-stroke-character process is not performed.

If a right-lifted pattern is detected in step S191, then control is passed to step S192 and it is determined whether or not there is a left-lifted pattern adjacent to the right of the above described right-lifted pattern, that is, a pattern of, for example, /\, or a pattern adjacent to the right of the above described right-lifted pattern and intersecting another pattern (right angle line density) two times when it is searched for in the vertical direction, that is, a pattern of, for example, jレ. Unless the pattern refers to a pattern in the form of /\ or jレ, the separate-stroke character process is not performed in this case.

If it is determined in step S192 that the pattern refers to a pattern in the form of /\ or jレ control is passed to step S194.

In addition to step S191 and S192, an average character size of a character string in a circumscribing rectangle is computed in step S193.

After the above described step S192 and S193 have been completed, the values of the parameters p through r shown in FIG. 54 are computed instep S194.

In the superscript-stroke process, a candidate for a pattern with superscript strokes is checked to use the size of the adjacent patterns integrated, the distance between these patterns, and the ratio of the size of the characters to the size of an average character as detection parameters.

That is, the following values are used as the detection parameters as shown in FIG. 56.

11) ratio p of the distance a between the right side of the circumscribing rectangle 231 and the left side of the circumscribing rectangle 232 to the distance b between the left side of the circumscribing rectangle 231 and the right side of the circumscribing rectangle 232

12) ratio q of the distance b between the left side of the circumscribing rectangle 231 and the right side of the circumscribing rectangle 232 to an average width MX of circumscribing rectangles 13) ratio r of the product of the area c of the circumscribing rectangle 231 and the area d of the circumscribing rectangle 232 to the square of the product of the average width MX of circumscribing rectangles and the average height MY of the circumscribing rectangles is used as a detection parameter.

That is, parameters p through r can be expressed as in equations (7) through (9).

Figure 61:
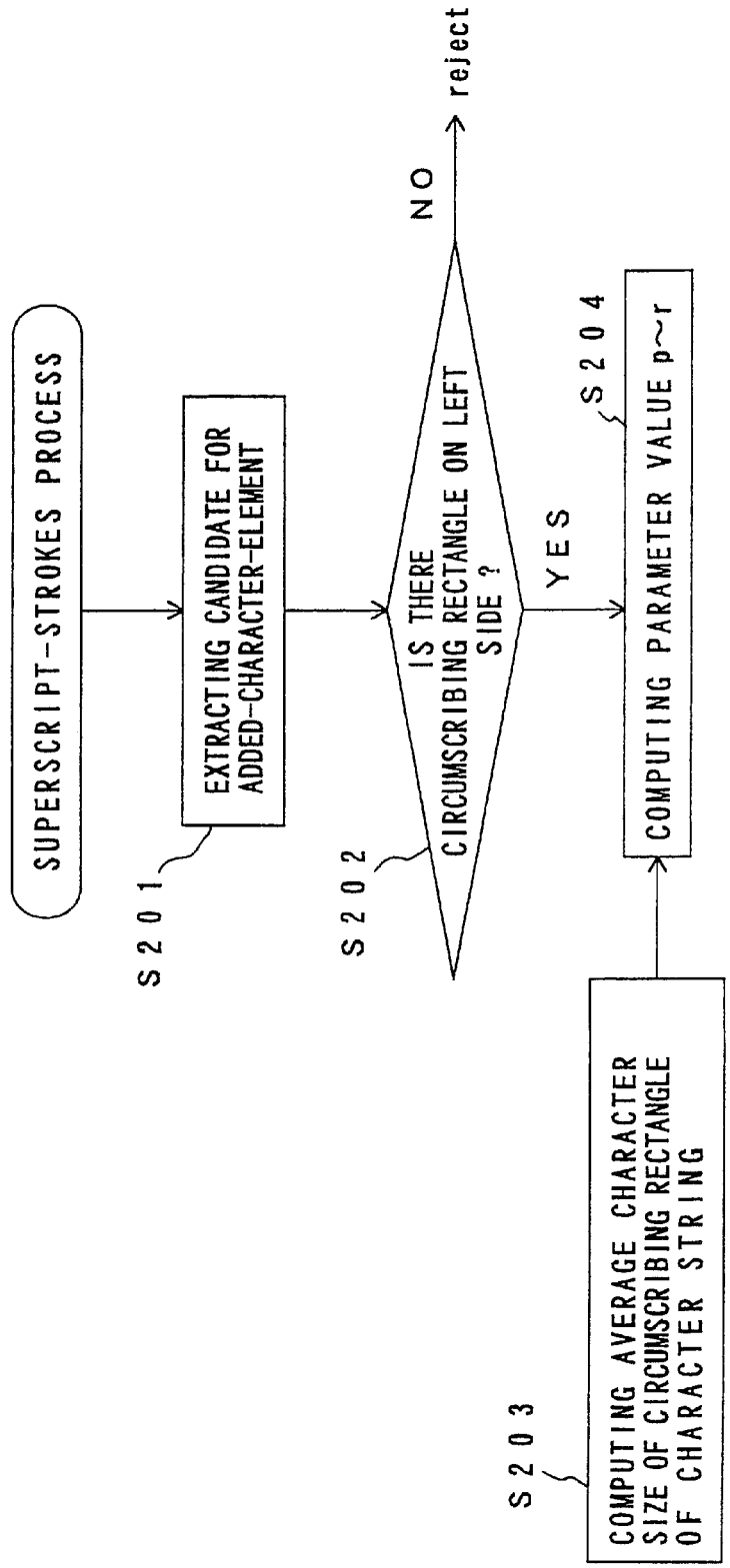
FIG. 61 is a flowchart showing the superscript-stroke process performed by the character string recognizing unit shown in FIG. 7.

The superscript-stroke process is described below by referring to the flowchart shown in FIG. 61.

First, in step S201, a pattern of a candidate for a superscript stroke is extracted. For example, when two adjacent link patterns are extracted by a link pattern extracting unit 1, and when the ratio of the size of the integrated pattern of the two adjacent patterns to an average character size of the circumscribing rectangle of a character string is equal to or smaller than a predetermined threshold, that is ¼, the pattern is extracted as a candidate for a pattern with superscript strokes.

It is checked in step S202 whether or not there is an adjacent circumscribing rectangle to the left of the pattern which is a candidate for a character with superscript stokes. Unless there is an adjacent circumscribing rectangle to the left of the pattern which is a candidate for a character with superscript strokes, then the candidate for a character with superscript strokes is removed from the objects to be processed in the superscript-stroke process.

If it is determined in step S202 that there is an adjacent circumscribing rectangle to the left of the pattern which is a candidate for a character with superscript strokes, then control is passed to step S204.

Figure 60:
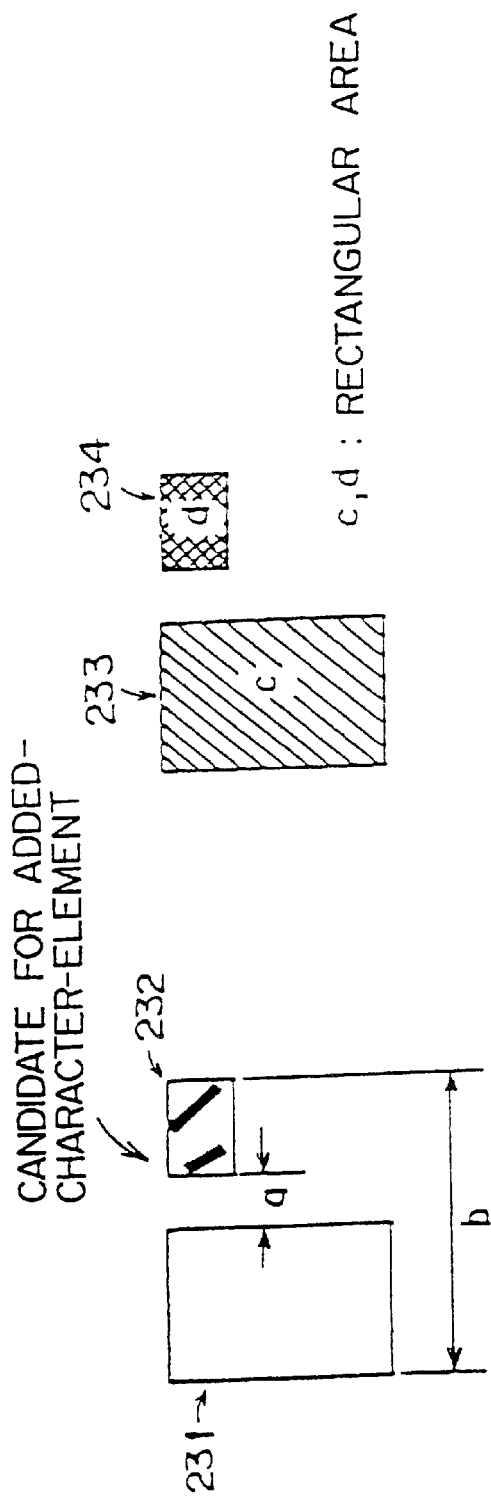
FIG. 60 shows the graphic meaning of a parameter in the superscript-stroke process performed by the character string recognizing unit shown in FIG. 7.

In step S203, in addition to the above described step S201 and S202, an average character size of a rectangle circumscribing a character string is computed. When the processes in step S202 and S203 are completed, the values of the parameters p through r shown in FIG. 60 are computed in step S204.

Next, a discriminant phase is set to compute the reliability in detecting a character from an unknown handwritten character string using learning data. If the number of parameters is n, then two groups are generated in the n-dimensional space to store in each group the characters detected successfully and unsuccessfully.

Figure 62:
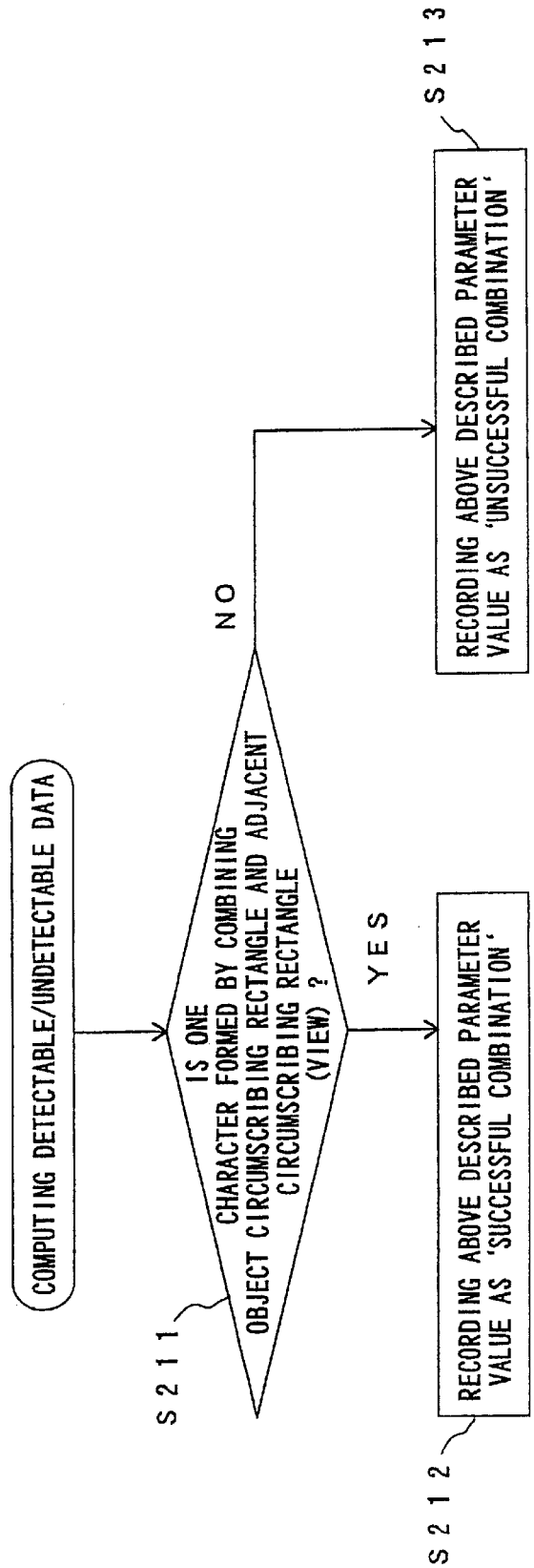
FIG. 62 is a flowchart showing the process of computing the character-detection-possibility data of the character string recognizing unit shown in FIG. 7.

FIG. 62 is a flowchart showing the method of computing data on successful and unsuccessful detection.

In FIG. 62, it is visually determined about the preliminarily collected learning data whether or not the object circumscribing rectangle and the adjacent circumscribing rectangle can be integrated into a single character in step S211. If the object circumscribing rectangle and the adjacent circumscribing rectangle can be integrated into a single character, then control is passed to step S212. If the object circumscribing rectangle and the adjacent circumscribing rectangle cannot be integrated into a single character, then control is passed to step S213.

In step S212, when the object circumscribing rectangle and the adjacent circumscribing rectangle can be integrated into a single character, the values of the parameters of the object circumscribing rectangle and the adjacent circumscribing rectangle are recorded. The parameters of the object circumscribing rectangle and the adjacent circumscribing rectangle can be the parameters a through g shown in FIG. 52 in the statistic process, and can be the parameters p through r shown in FIGS. 58 and 60 in the non-statistic process.

In step S213, when the object circumscribing rectangle and the adjacent circumscribing rectangle cannot be successfully integrated into a single character, the values of the parameters of the object circumscribing rectangle and the adjacent circumscribing rectangle are recorded.

Then, the values of the detection parameters in the statistic process and non-statistic process are computed about an unknown character string. A distance from a discriminant phase obtained from the learning data is computed on the point in a multiple-dimensional space determined by the value of the parameter. The obtained distance is quantified as the detection reliability.

Figure 63:
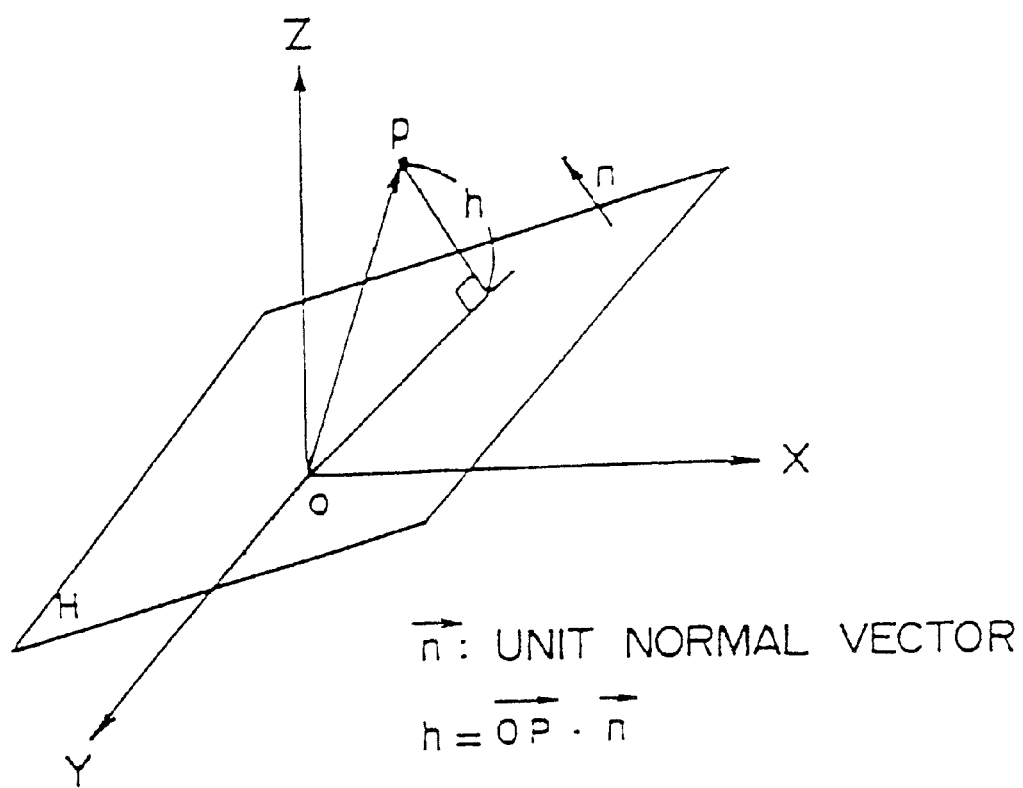
FIG. 63 shows the method of quantizing the character detection reliability of the character string recognizing unit shown in FIG. 7.

For example, when the number of feature parameters is 3, H indicates the discriminant phase for use in discriminating the two groups, that is, successfully detected characters and unsuccessfully detected characters, and n indicates the unit normal vector of the discriminant phase H as shown in FIG. 63. If the value of a parameter equals the vector value of p, the distance h between the discriminant phase and the point p in the 3-dimensional space corresponding to the parameter value can be expressed as follows.

$$h = OP \cdot n \quad (10)$$

where OP is a vector from the origin 0 in the 3 dimensional space to the point p in the 3-dimensional space.

Whether the distance h from the discriminant phase H is positive or negative determines to which group, that is, successfully detected group or unsuccessfully detected group, the value of the parameter belongs, and determines to what extent the value of the parameter is away from the discriminant phase H.

Figure 64:
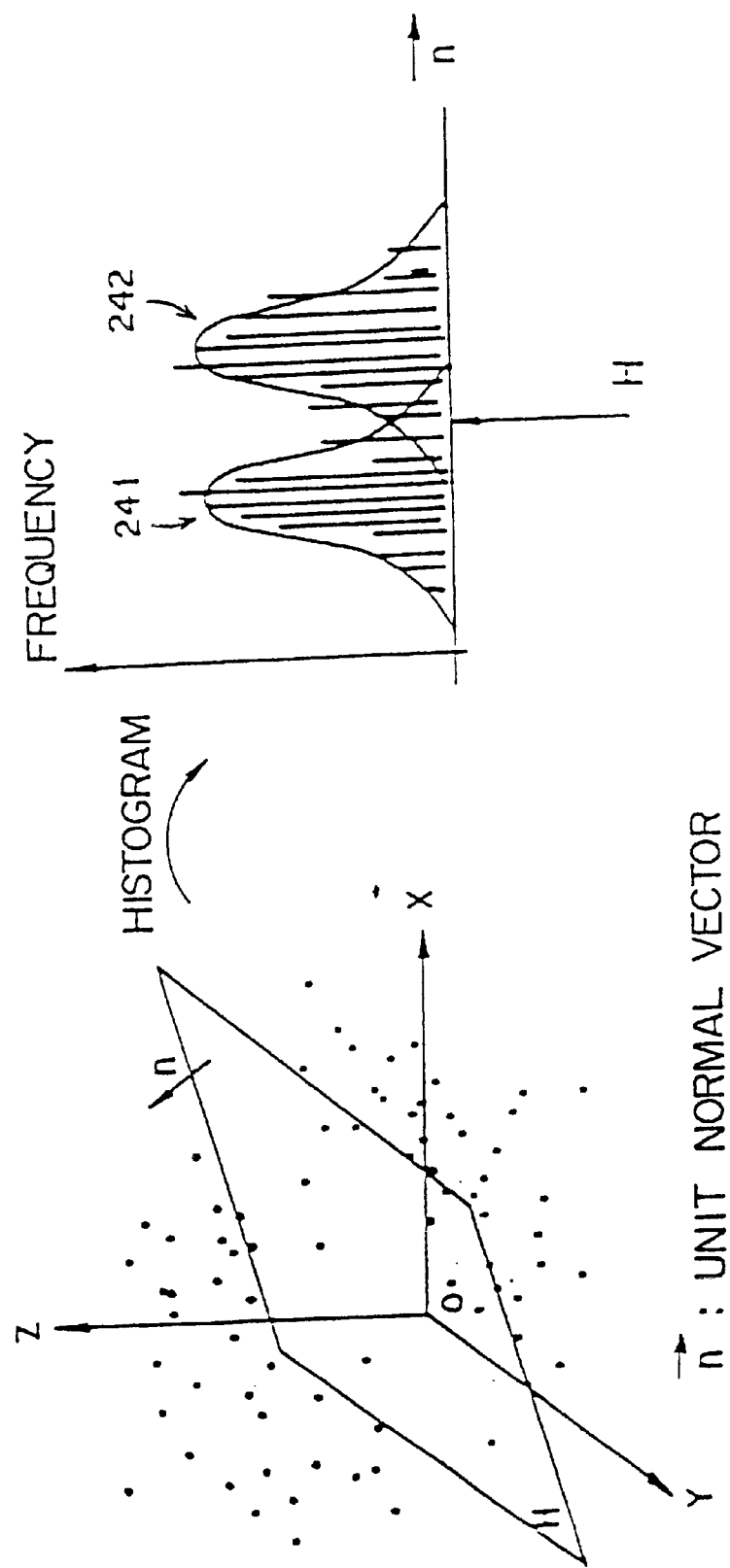
FIG. 64 shows the method of generating the frequency distribution of the character string recognizing unit shown in FIG. 7.

As shown in FIG. 64, a successfully detected histogram 241 and an unsuccessfully detected histogram 242 are obtained for the entire parameters of the learning data in the multiple-dimensional space based on the distance h from the discriminant phase H. Normally, since the histogram distributions 241 and 242 are normal distributions, the histogram distributions 241 and 242 are approximated at a normal distribution. In these normal distributions, partially overlapping areas normally exist.

According to the present invention, it is determined whether or not the patterns are to be integrated in consideration of the reliability of the detection of the adjacent pattern having a detection parameter positioned at the overlapping area.

Figure 65:
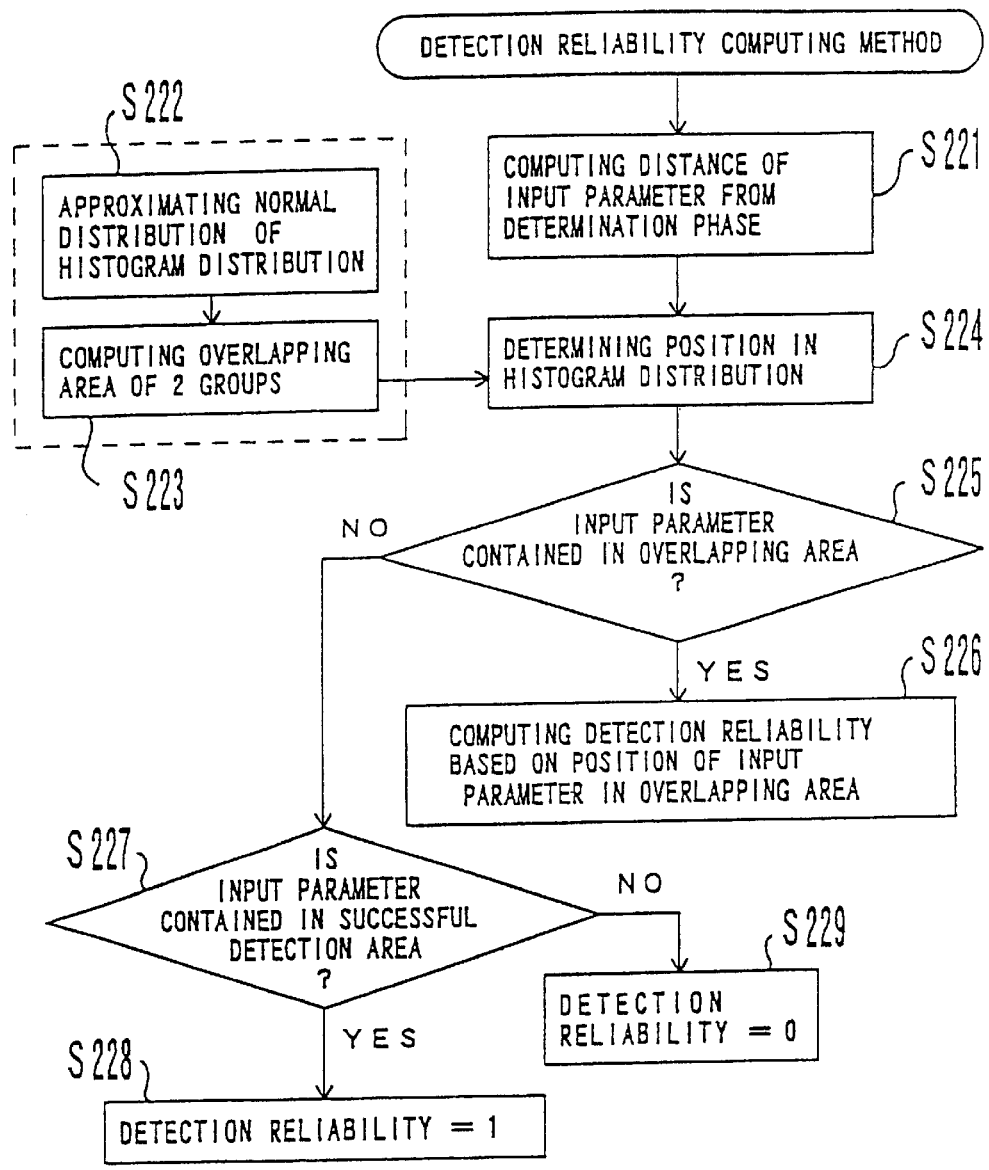
FIG. 65 is a flowchart showing the method of computing the character detection reliability of the character string recognizing unit shown in FIG. 7.

FIG. 65 is a flowchart showing an example of the method of computing the detection reliability.

In FIG. 65, the distance h from the discriminant phase H to a point in a multiple-dimensional space determined by a plurality of parameters is computed by the above described equation (10) in step S221.

Figure 66:
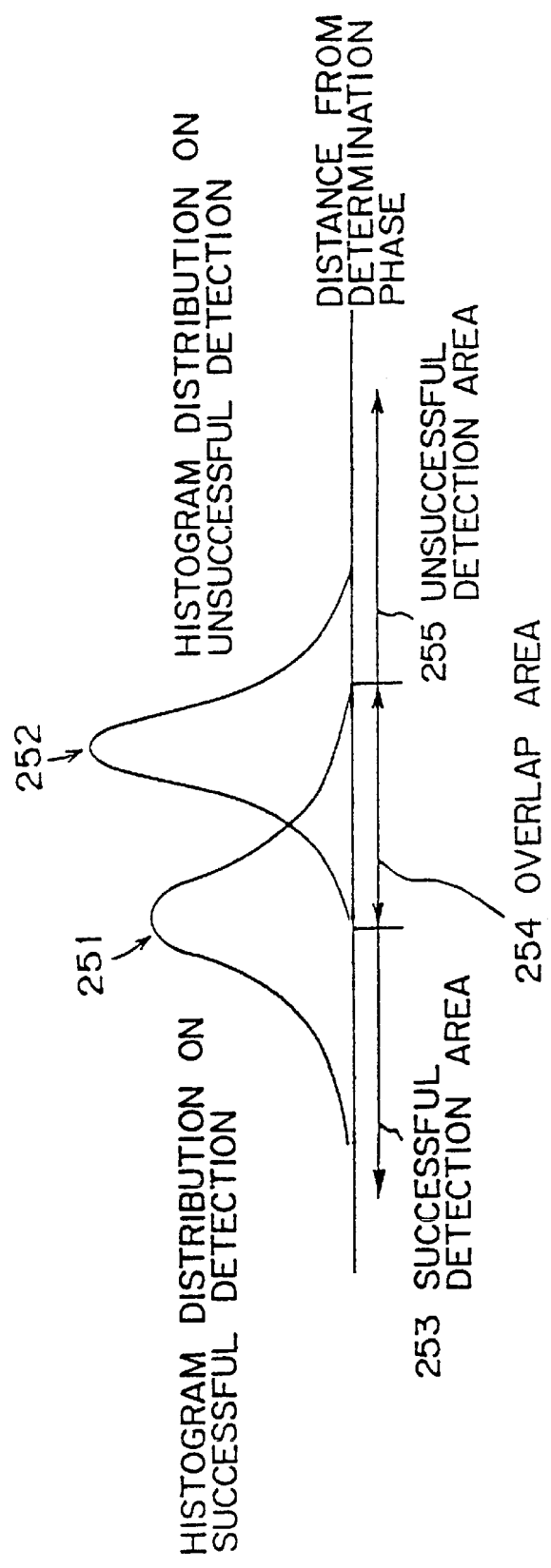
FIG. 66 shows an example of a histogram distribution about the success and failure in character detection by the character string recognizing unit shown in FIG. 7.

In step S222, the histogram distribution of a plurality of parameter values obtained from the learning data is approximated using the normal distribution. That is, as shown in FIG. 66, the histogram distribution of successfully detected patterns is approximated using a successfully detected pattern normal distribution 251, and the histogram distribution of unsuccessfully detected patterns is approximated using an unsuccessfully detected pattern normal distribution 252.

In step S223, the overlap areas of the two groups is computed. For example, the overlap area between the successfully detected pattern normal distribution 251 and the unsuccessfully detected pattern normal distribution 252 is computed as a 2-group overlap area 254 as shown in FIG. 62. At this time, an area 253 other than the 2-group overlap area 254 in the successfully detected pattern normal distribution 251 is set as a successfully detected area. Similarly, an area 255 other than the 2-group overlap area 254 in the unsuccessfully detected pattern normal distribution 252 is set as an unsuccessfully detected area.

The position of the value of the parameter input for an unknown character in the histogram distribution is determined in step S224.

In step S225, if the value of the parameter input for the unknown character is included in the 2-group overlap area 254 as a determination result of the position of the value of the parameter input for the unknown character in the histogram distribution, then control is passed to step S226. Then, the detection reliability is computed based on the value of the parameter input for the unknown character in the 2-group overlap area 254.

If it is determined in step S225 that the value of the parameter input for the unknown character is not included in the 2-group overlap area 254, then control is passed to step S226, and it is determined whether or not the value of the parameter input for the unknown character is included in the successfully detected area 253.

If it is determined that the value of the parameter input for the unknown character is included in the successfully detected area 253, then control is passed to step S228, and the detection reliability is set to '1'. If it is determined that the value of the parameter input for the unknown character is not included in the successfully detected area 253, then control is passed to step S229, and the detection reliability is set to '0'.

For example, if the distance from the discriminant phase to the value of the parameter input for the unknown character is included in the 2-group overlap area 254 as a result of computing the distance from the discriminant phase to the value of the parameter input for the unknown character, then the detection reliability is computed based on the distance from the discriminant phase to the value of the parameter input for the unknown character. If the distance from the discriminant phase to the value of the parameter input for the unknown character is included in the successfully detected area 253, then the detection reliability is set to '1'. If the distance from the discriminant phase to the value of the parameter input for the unknown character is included in the unsuccessfully detected area 255, then the detection reliability is set to '0'.

Figure 67:
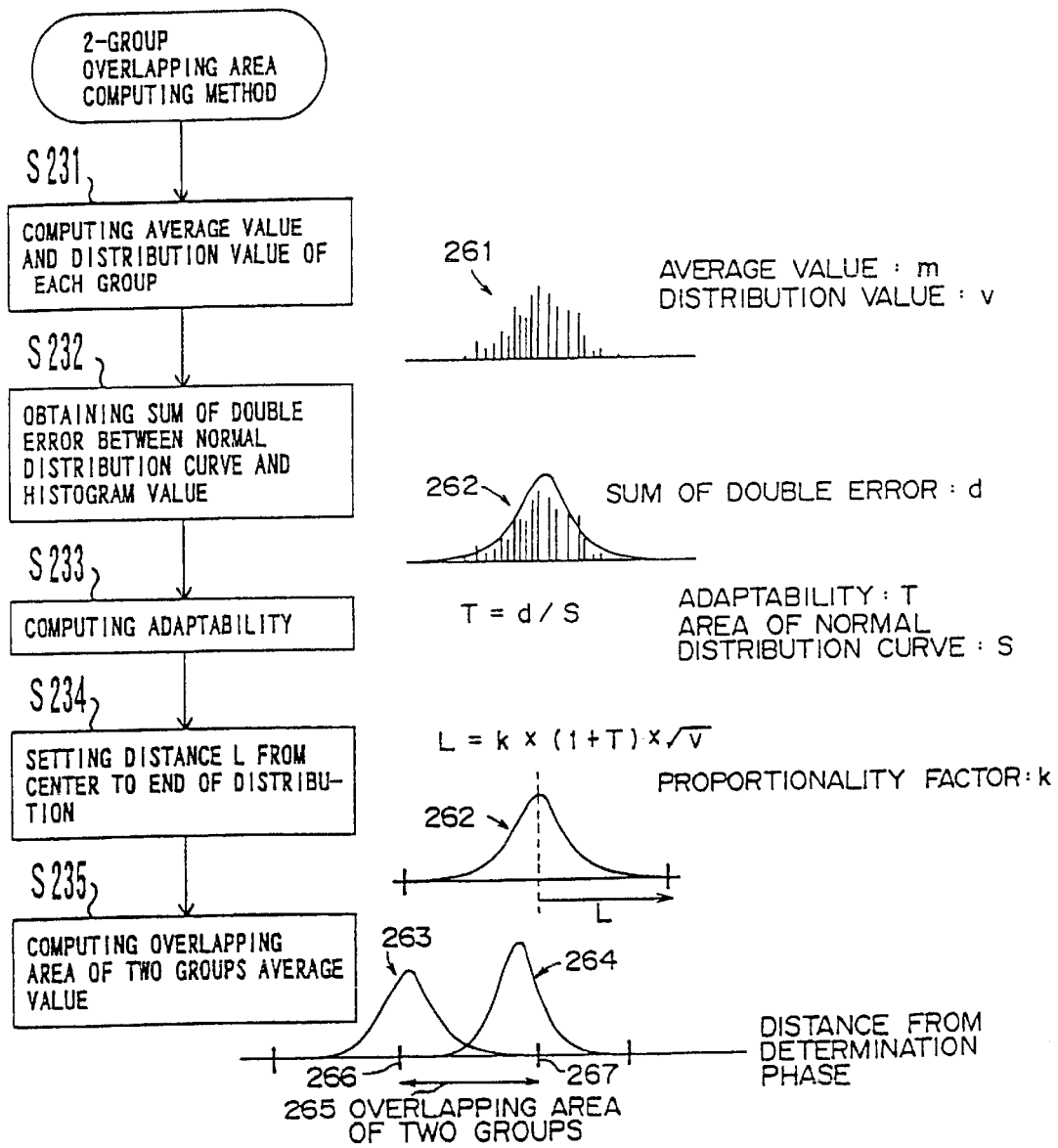
FIG. 67 shows the method of computing the overlapping area of the success and failure in character detection by the character string recognizing unit shown in FIG. 7.

FIG. 67 is a flowchart showing an example of computing the 2-group overlap area.

As shown in FIG. 67, an average value m and a distribution value v of a histogram 261 is computed in step S231 about the histogram distribution of successfully detected patterns and unsuccessfully detected patterns obtained from the learning data.

The sum d of squares error between a normal distribution curve 262 and the histogram 261 about the histogram 261 is computed in step S232 about the histogram distribution of successfully detected patterns and unsuccessfully detected patterns.

In step S233, the adaptability T is computed by the following equation (11).

$$T = d/S \qquad (11)$$

where S indicates the area of the normal distribution curve 262.

in step S234, the distance L from the center to the end of the normal distribution curve 262 is computed by the following equation (12)

$$L = k \times (1+T) \times v^{1/2}$$

where k indicates a constant of proportionality, and $v^{1/2}$ equals a standard deviation.

In step S235, the area from a right end 267 of a normal distribution curve 263 to a left end 266 of a normal distribution curve 264 is set as a 2-group overlap area 265.

Next, it is determined whether or not a recognizing process is performed based on the detection reliability obtained in the process shown in FIG. 65. In this case, for example, the recognizing process is not performed on a candidate for a detected character having high detection reliability, but is performed on a candidate for a detected character having low detection reliability.

For a plurality of candidates for detected characters, a character to be detected is selected in consideration of the detection reliability as well as the recognition reliability. As a result, a candidate for a character which partially appears a character, but entirely appears a wrong character string can be removed from characters to be detected. For example, the entire detection reliability R is expressed as follows.

$$R = \Sigma(j \cdot \alpha_1 + \beta_i) \qquad (13)$$

where $\alpha_1$ indicates the detection reliability of adjacent patterns or detection determined portion, $\beta_i$ indicates the recognition reliability, and j indicates a weight coefficient.

Then, a character having a larger entire reliability R is selected as the final character to be detected from the candidates for a plurality of characters to be detected.

Figure 68:
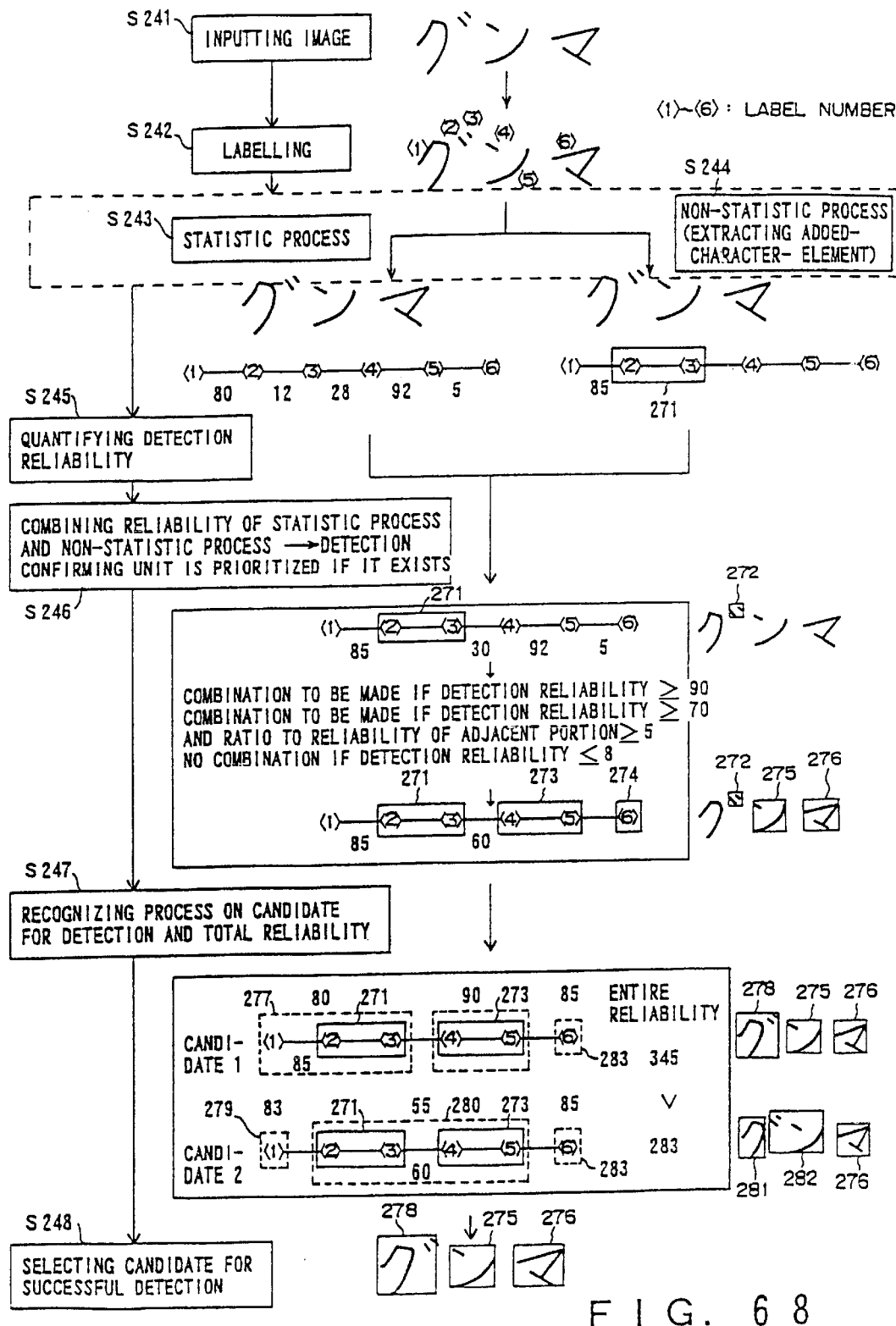
FIG. 68 shows the flow of the process of detecting a character by the character string recognizing unit shown in FIG. 7.

FIG. 68 shows the case where each character is detected from a character string ' '. In this case, before the character string ' ' is detected, the discriminant phase for the statistic and non-statistic processes and the normal distribution curve of a histogram value are individually obtained using learning data.

In the statistic process, parameters c, e, and f shown, in FIG. 55 are used as the parameters for use in determining successful or unsuccessful detection of a character string. The discriminant phase obtained using the learning data is expressed as follows.

$$0.84 \times 0 + 0.43 \times 1 + 0.33 \times 2 - 145.25 = 0 \qquad (14)$$

The average value m of the histogram distribution indicating a successful detection of learning data shown in FIG. 67 is 128.942. The standard deviation is 34.77. The adaptability T is 0.12 according to equation (11). Assuming that the constant of proportionality k is 2, the distance from the center to the end of the distribution is 77.8 according to equation (12).

The average value m of the histogram distribution indicating an unsuccessful detection of learning data shown in FIG. 67 is 71.129. The standard deviation is 36.26. The adaptability T is 0.35 according to equation (11). Assuming that the constant of proportionality k is 2, the distance from the center to the end of the distribution is 92.2 according to equation (10).

In FIG. 68, the input pattern of an unknown character is read from an input image in step S241.

Then, in step S242, a link pattern is extracted using labels, and the label numbers <1> through <6> are assigned as shown in FIG. 68 to each of the extracted link patterns.

In step S245, the detection reliability is quantified based on the statistic process in step S243 and the non-statistic process in step S244.

In the statistic process in step S243, the detection reliability obtained when adjacent link patterns are integrated is computed based on the distance h from the discriminant phase to the point in the 3-dimensional space having the parameter values c, e, and f. For example, this detection reliability a can be expressed as follows.

$$\alpha = (h - w_1)/(w_2 - w_1) \times 10 \qquad (15)$$

where $w_1$ indicates the leftmost position of the 2-group overlap area $w_2$ indicates the rightmost position of the 2-group overlap area For example, the detection reliability obtained when the pattern assigned the label number <1> is integrated into the pattern assigned the label number <2> is 80. The detection reliability obtained when the pattern assigned the label number <2> is integrated into the pattern assigned the label number <3> is 12. The detection reliability obtained when the pattern assigned the label number <3> is integrated into the pattern;assigned the label number <4> is 28. The detection reliability obtained when the pattern assigned the label number <4> is integrated into the pattern assigned the label number <5> is 92. The detection reliability obtained when the pattern assigned the label number <5> is integrated into the pattern assigned the label number <6> is 5.

In the non-statistic process in step S244, the detection reliability of the pattern ' ' with the superscript strokes is computed based on the distance h from the discriminant phase to the point in the 3-dimensional space having the parameter values p through r in FIG. 60.

For example, the detection reliability obtained when the pattern assigned the label number <1> is integrated into the superscript-character-pattern of a detection determined portion 271 comprising the patterns assigned the label numbers <2> and <3> is 85.

FIG. 65 shows the method of computing the detection reliability in the non-statistic process in step S244.

In step S251, a pattern 272 is extracted as a candidate for superscript strokes. For example, the pattern can be a candidate for superscript strokes when there are two adjacent link patterns, and when the ratio of the size of the integrated patterns to the average character size of the rectangle circumscribing the character string is lower than a predetermined threshold.

In step 252, it is determined whether or not there is a circumscribing rectangle 281 adjacent to the left of the pattern 272 which is a candidate for superscript strokes. If it is determined that there is a circumscribing rectangle 281 adjacent to the left of the pattern 272 which is a candidate for superscript strokes, then control is passed to step S253 and the values of the parameters p through r shown in FIG. 50 are output.

Figure 69:
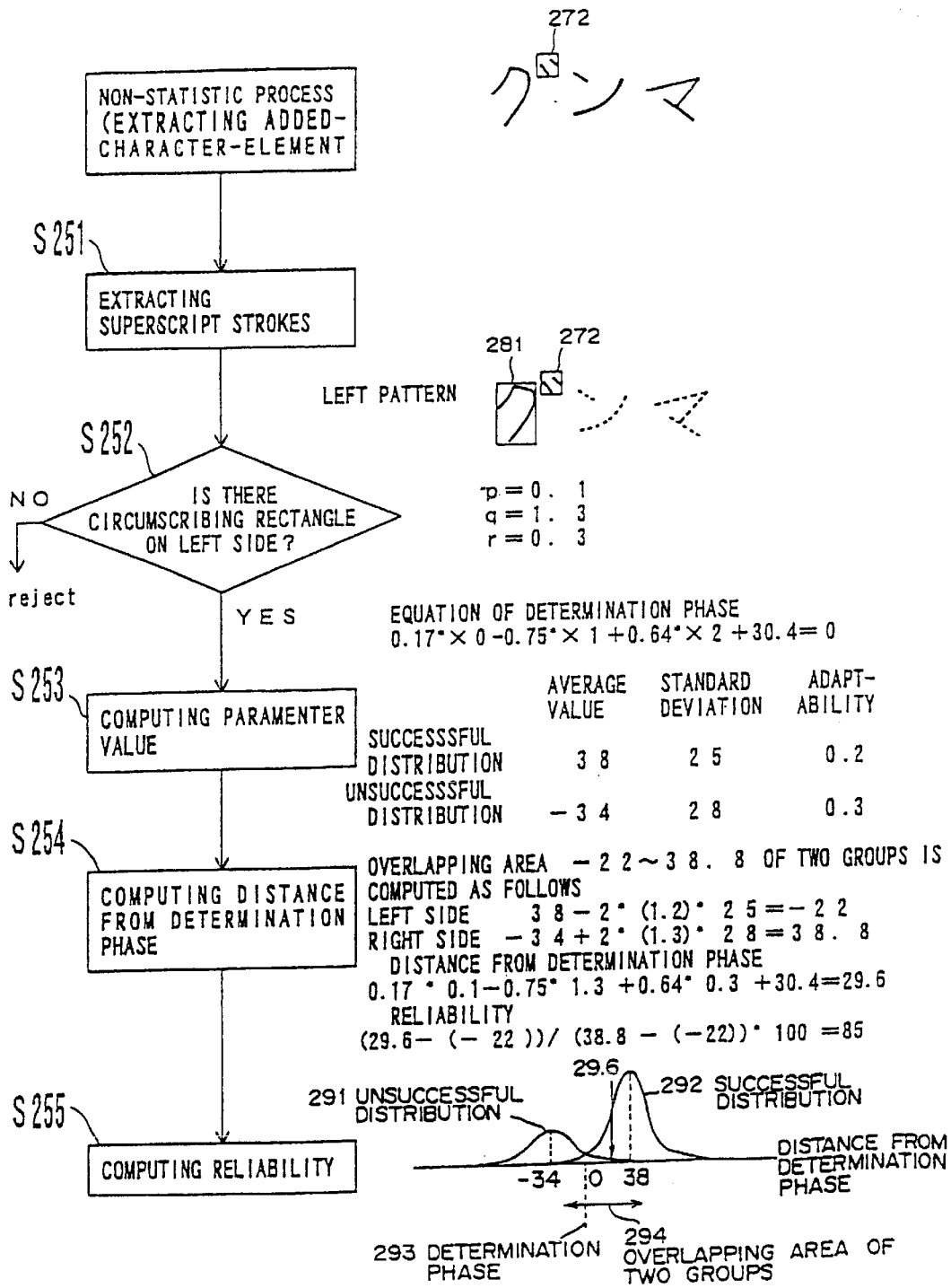
FIG. 69 shows the flow of the process of detecting a character in a non-statistic process performed by the character string recognizing unit shown in FIG. 7.

In the example shown in FIG. 69, the following equations are expressed.

$$p = a/b = 0.1 \qquad (16)$$

$$q = b/MX = 1.3 \qquad (17)$$

$$r = (c \times d)/(MX \times MY)^2 = 0.3 \qquad (18)$$

where

- a indicates the distance between the right side of the circumscribing rectangle 281 and the left side of the circumscribing rectangle 272;
- b indicates the distance between the left side of the circumscribing rectangle 281 and the right side of the circumscribing rectangle 272;
- c indicates the area of the circumscribing rectangle 281;
- d indicates the area of the circumscribing rectangle 272;
- MX indicates an average width of a circumscribing rectangle, and
- MY indicates an average height of a circumscribing rectangle.

In step S254, the distance from a discriminant phase 293 to a point in the 3-dimensional space having the values of the parameters p through r is computed.

To compute the distance from a discriminant phase 293 to a point in the 3-dimensional space having the values of the parameters p through r, the discriminant phase 293 is computed based on the learning pattern. The discriminant phase 293 can be obtained by equation (3) based on, for example, a histogram distribution 292 indicating successful detection of a character string of a learning pattern and a histogram distribution 291 indicating unsuccessful detection of the learning data. The equation for the discriminant phase 293 using the parameters p through r for use in extracting superscript strokes is expressed by the following equation referring to a plane in a 3-dimensional space.

$$0.17 \times x_0 + 0.75 \times x_1 + 0.64 \times x_2 + 30.4 = 0 \qquad (19)$$

Therefore, the distance h from the discriminant phase 293 is computed by substituting the values obtained by equations (16) through (18) for equation (19) as follows.

$$h = 0.17 \times 0.1 - 0.75 \times 1.3 + 0.64 \times 0.3 + 30.4 = 29.6 \qquad (20)$$

The average value m of the histogram distribution 292 indicating a successful detection of learning data is 38. The standard deviation is 25. The adaptability T is 0.2 according to equation (11).

The average value m of the histogram distribution 291 indicating an unsuccessful detection of learning data shown is −34. The standard deviation is 28. The adaptability T is 0.3 according to equation (11).

The left end $w_1$ of the histogram distribution 292 indicating successful detection of learning data is computed as follows by equation (12) with the constant of proportionality K assumed to be 2.

$$w_1 = 38 - 2 \times (1 + 0.2) \times 25 = -22 \qquad (21)$$

The right end $w_2$ of the histogram distribution 291 indicating unsuccessful detection of learning data is computed as follows by equation (12) with the constant of proportionality K assumed to be 2.

$$w_2 = -34 + 2 \times (1 + 0.3) \times 28 = 38.8 \qquad (22)$$

Therefore, a 2-group overlap area 294 is positioned at the distance of −22 through 38.8 from the discriminant phase.

Next, the detection reliability a is computed in step S255. The detection reliability a is computed by substituting the values obtained by equations (20) through (22) for equation (15) as follows.

$$\alpha = (29.6 - (-22))/(38.8 - (-22)) \times 100 = 85 \qquad (23)$$

Thus, detection determined portion 271 is generated by integrating the patterns assigned the label numbers <2> and <3>.

In step S246 shown in FIG. 68, the reliability of the statistic and non-statistic processes is synthesized. At this time, the detection determined portion, if any, is prioritized. As a result, the reliability of the detection determined portion 271 is synthesized by priority.

As a result, the detection reliability obtained by integrating the pattern assigned the label number <1> into the pattern of the detection determined portion 271 is 85. The detection reliability obtained by integrating the pattern of the detection determined portion 271 into the pattern assigned the label number <4> is 30. The detection reliability obtained by integrating the pattern assigned the label number <4> into the pattern assigned the label number <5> is 92. The detection reliability obtained by integrating the pattern assigned the label number <5> into the pattern assigned the label number <6> is 5.

Patterns are integrated if the detection reliability is higher than a predetermined threshold (for example, 90) or if the detection reliability is higher than a predetermined threshold (for example, 70) and the ratio of the reliability to the detection reliability of the adjacent detected pattern is higher than a predetermined value (for example, 5).

Patterns are not integrated if the detection reliability is lower than a predetermined threshold (for example, 8).

For instance, since the detection reliability obtained by integrating the pattern assigned the label number <1> into the pattern of the detection determined portion 271 is 85, and the ratio of the reliability to the detection reliability of the adjacent pattern assigned the label number <4> is 85/30=2.8, the pattern assigned the label number <1> is not integrated into the pattern of the detection determined portion 271. The detection reliability obtained by integrating the pattern of the detection determined portion 271 into the pattern assigned the label number <4> is 30, and therefore, the pattern of the detection determined portion 271 is not integrated into the pattern assigned the label number <4>.

Since the detection reliability obtained by integrating the pattern assigned the label number <4> into the pattern assigned the label number <5> is 92, the pattern assigned the label number <4> is integrated into the pattern assigned the label number <5>. Since the detection reliability obtained by integrating the pattern assigned the label number <5> into the pattern assigned the label number <6> is 5, the pattern assigned the label number <5> is not integrated into the pattern assigned the label number <6>.

Thus, a circumscribing rectangle 275 corresponding to a detection determined portion 273 obtained by integrating the pattern assigned the label number <4> into the pattern assigned the label number <5> and a circumscribing rectangle 276 corresponding to the pattern assigned the label number <6> are generated.

Computed then is the detection reliability obtained when the pattern of the newly generated detection determined portion 273 is integrated into the pattern of the detection determined portion 271. The detection reliability is 60 in the example shown in FIG. 68.

In step 247, a detection candidate 1 and a detection candidate 2 are extracted when the patterns are completely integrated based on the detection reliability. Then, a recognizing process is performed on each character of the detection candidates 1 and 2. The detection reliability α and β of a character in the detection candidates 1 and 2 is obtained for each character, and the sum of the detection reliability α and β is defined as the entire reliability R.

For example, if the circumscribing rectangles 275, 276, and 278 are detected as a detection candidate 1, then the recognition reliability β obtained when a character recognizing process is performed on the pattern in a circumscribing rectangle 278 is 80, the recognition reliability β obtained when a character recognizing process is performed on the pattern in a circumscribing rectangle 275 is 90, the recognition reliability β obtained when a character recognizing process is performed on the pattern in a circumscribing rectangle 276 is 85.

Since the detection reliability α obtained when the pattern assigned the label number <1> is integrated into the pattern of the detection determined portion 271 is 85, the entire reliability R is 345 by equation (13) with the weight coefficient j assumed to be 1.

For example, if the circumscribing rectangles 276, 281, and 282 are detected as a detection candidate 2, then the recognition reliability β obtained when a character recognizing process is performed on the pattern in a circumscribing rectangle 281 is 83, the recognition reliability β obtained when a character recognizing process is performed on the pattern in a circumscribing rectangle 282 is 55, the recognition reliability β obtained when a character recognizing process is performed on the pattern in a circumscribing rectangle 276 is 85.

Since the detection reliability α is 60 when the pattern of the detection determined portion 271 is integrated into the pattern of the detection determined portion 273, the entire reliability R is 283.

In step S248, the detection candidate 1 or the detection candidate 2, whichever is larger in entire reliability R, is selected as a candidate for a successfully detected character. As a result, each of the characters ク, ソ, and マ can be correctly detected in the character string クソマ.

Described below is the operations of the obscure character recognizing unit 19 in FIG. 17.

Figure 70:
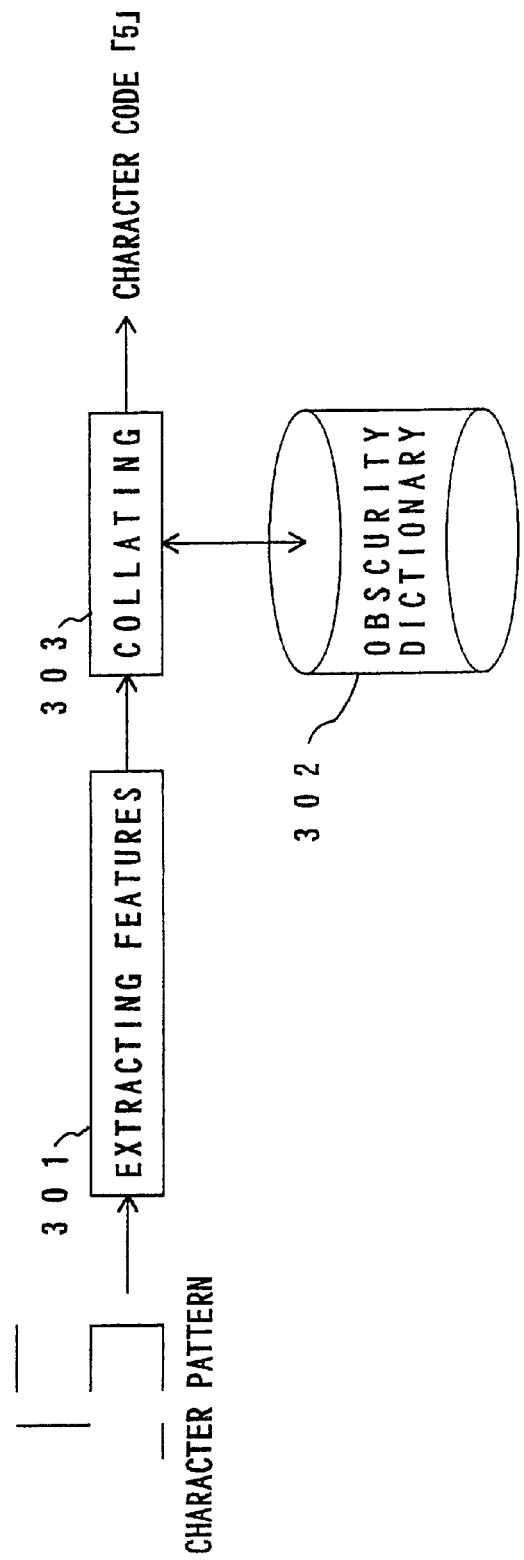
FIG. 70 is a block diagram showing an example of the configuration of the obscure character recognizing unit shown in FIG. 7.

FIG. 70 is a block diagram showing an embodiment of the configuration of the obscure character recognizing unit 19.

In FIG. 70, a feature extracting unit 301 extracts a feature of a character from an obscure character and represent the extracted feature by a feature vector. An obscure-character dictionary 302 stores a feature vector of each category of obscure characters. A collating unit 303 collates the feature vector of a character pattern extracted by the feature extracting unit 301 with the feature vector of each category stored in the obscure-character dictionary 302, and computes the distance $D_{ij}$ (i indicates a feature vector of an unknown character, and j indicates a feature vector of a category in the obscure-character dictionary 302) between the feature vectors in a feature space. As a result, the category j indicating the shortest distance $D_{ij}$ between the feature vectors is recognized as an unknown character i.

The distance $D_{ij}$ between the feature vectors in the feature space can be computed using, for example, an Euclidean distance $\Sigma(i-j)^2$, city block distance $\Sigma|i-j|$, an identification function such as a discriminant function, etc.

Using the distance $D_{ij1}$ from the first category and the distance $D_{ij2}$ from the second category, a table 1 relating to the first category j1, the second category j2, the distance between categories ($D_{ij2}-D_{ij1}$), and the reliability is preliminarily generated. Similarly, a table 2 relating to the distance $D_{ij1}$ from the first category, the first category j1, and the reliability is preliminarily generated. The data having lower reliability in the tables 1 and 2 is stored in the intermediate process result table.

The deformed character recognizing unit 21 shown in FIG. 7 can be designed similarly to the obscure character recognizing unit 19 except that the deformed character recognizing unit 21 uses a deformed-character dictionary storing feature vectors in each category of deformed characters.

Described below is an embodiment of the deletion line recognizing unit 26 shown in FIG. 7. The deletion line recognizing unit 26 generates, for example, a histogram containing sums of the numbers of picture elements in the horizontal direction for the candidate for a corrected character extracted by the correction analysis in step S4 in FIG. 8, and removes the horizontal lines in the area by recognizing that the horizontal lines exist in the areas where the histogram value exceeds a predetermined value.

Then, a character is recognized by completing an obscure portion with the horizontal lines removed and then collating the completed pattern with the dictionary. As a result, if a pattern is recognized as a character, then a candidate for a corrected character is regarded as a character with deletion lines. If a pattern is rejected, then a candidate for a corrected character is regarded as a normal character.

Figure 71:
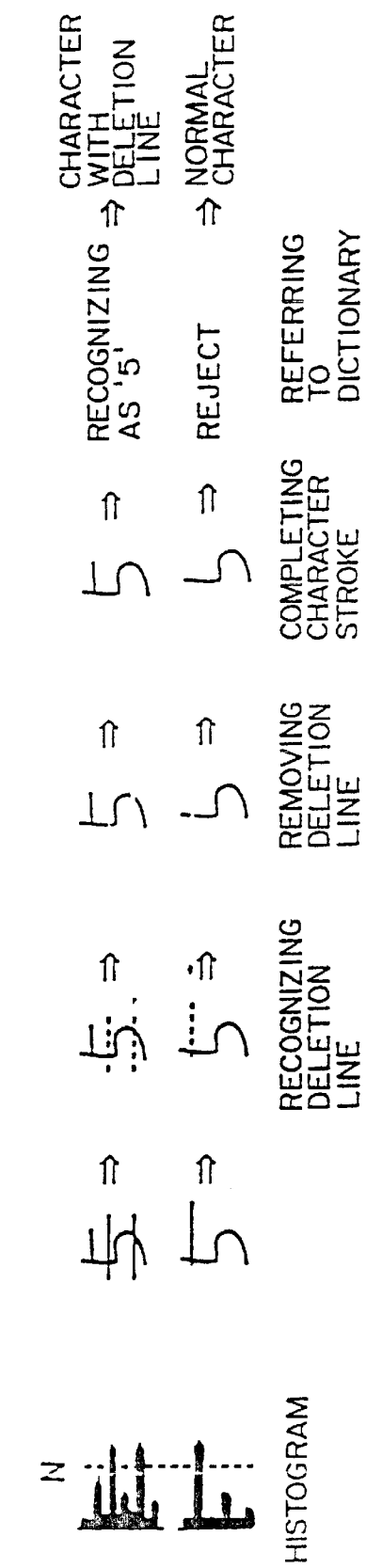
FIG. 71 shows an example of the process performed by the deletion line recognizing unit shown in FIG. 7.

For example, in FIG. 71, a character '5', which is a candidate for a corrected character, is input as being corrected with double horizontal lines. The input pattern is recognized as a corrected character after detecting double horizontal lines which indicate the horizontal histogram value equal to or larger than the threshold N and recognizing the completed pattern as the category of '5' after the double horizontal lines are removed. Assume that a character '5' is input as a candidate for a corrected character, and horizontal line indicating the horizontal histogram value equal to or larger than the threshold N is detected. If the horizontal line is removed from the character '5' and the pattern is rejected, then input pattern is not recognized as a corrected character.

Described below is an embodiment of the unique-character analyzing unit 23 shown in FIG. 7. The unique-character analyzing unit 23 clusters handwritten characters recognized as belonging to the same category into a predetermined number of clusters. When clusters belonging to different categories indicates a short distance from each other, the character category of the cluster containing a smaller number of elements is amended to the character category of the cluster containing a larger number of elements, thereby a handwritten character which has been misread for a wrong character category can be correctly read.

Figure 72:
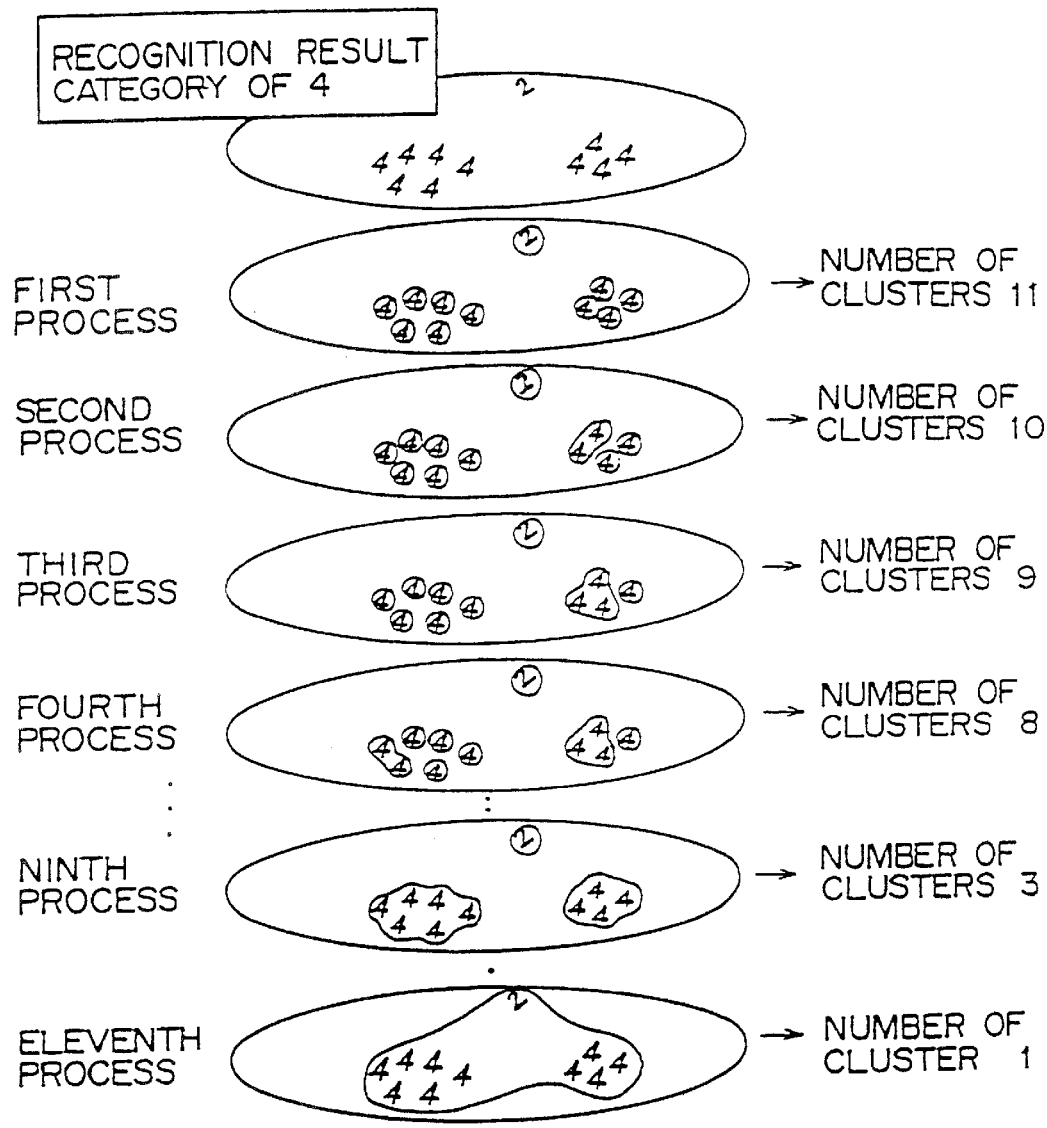
FIG. 72 shows the flow of the clustering process performed by the unique character analyzing unit shown in FIG. 7.

FIG. 72 shows the clustering process using a feature vector of a handwritten character recognized as belonging to the character category of '4'.

FIG. 72 shows the handwritten characters which has been determined as belonging to the recognition result category of '4' because the pattern indicates a shorter distance from the feature vector of the character category of '4' stored in the recognizing dictionary. In this recognizing process, the handwritten character '2' is mis-recognized as belonging to the recognition result category of '4'.

In the first clustering process, the handwritten character determined to belong the character category of '4' is individually regarded as a cluster. In the second clustering process, the distance of the feature vectors between the handwritten characters regarded as clusters is computed, and the characters indicating a short distance from each other in feature vector are integrated into one cluster. As a result, the number of the clusters is decreased by 1 from 11 to 10 as in the example shown in FIG. 72.

In the third and subsequent clustering processes, the number of clusters can be reduced by computing the distance of feature vectors between clusters and integrating the closest feature vectors, resulting in one cluster in the eleventh clustering process.

When clusters are integrated, those individually containing only one element are compared in distance with each other using, for example, a city block distance. The center-of-gravity method is used when clusters contain plural elements. In the center-of-gravity method, when the feature vector $x_i$ of the i-th element (i=1, 2, 3, ..., M) of the cluster containing M elements is expressed by $x_1=(x_{i1}, x_{i2}, x_{i3}, ..., x_{iN})$, the representative vector $x_m$ of the lusters is represented by an average of the feature vector $x_i$ of the elements of the clusters as follows.

$$Xm = \frac{1}{M}\sum_{i=1}^{M} X_i \quad (24)$$

Clusters containing plural elements are compared with each other by computing the city block distance between the representative vectors $x_m$.

If the clustering processes are repeated until the number of clusters is reduced to 1, the handwritten character '2' mis-recognized for belonging to the character category of '4' is regarded as belonging to the same character category as the handwritten character' correctly recognized as belonging to the character category of '4'. Therefore, a clustering aborting condition is set to abort the clustering processes.

The clustering aborting condition can be satisfied when
(1) the number of clusters reaches a predetermined value (for example, 3);
(2) the distance between, clusters exceeds a predetermined threshold when the clusters care integrated; and
(3) the increase ratio of the distance between clusters exceeds a predetermined threshold when the clusters are integrated.

FIG. 73 is a flowchart showing the clustering process;

As shown in FIG. 73, only the feature vector of the handwritten character recognized as belonging to a specific character category is extracted in step S261. Each of the extracted feature vectors of the handwritten characters is regarded as one cluster.

In step S262, the clustering aborting condition is set to abort the clustering processes.

In steps S263, two clusters closest to each other in all clusters are selected about a specific character.

It is determined in step S264 whether or not the cluster aborting conditions set in step S262 are satisfied. If the cluster aborting conditions set in step S262 are not satisfied, then control is passed to step S265, the two clusters selected in step S263 are integrated, control is returned to step S263, and clusters are repeatedly integrated.

If it is determined in step S264 that the clustering aborting conditions are satisfied after repeating the cluster integrating processes, then control is passed to step S266, and it is determined whether or not the clustering processes have been performed on all character categories. If all clustering processes have not been performed on all character categories, control is returned to step 261, and the clustering process is performed on the unprocessed character categories.

If it is determined in step S266 that the clustering processes have been performed on all character categories, then control is passed to step S267, and the clustering results are stored in the memory.

Next, a handwritten character mis-recognized for belonging to a different category is correctly read based on the clustering result obtained in the clustering process.

Figure 74:
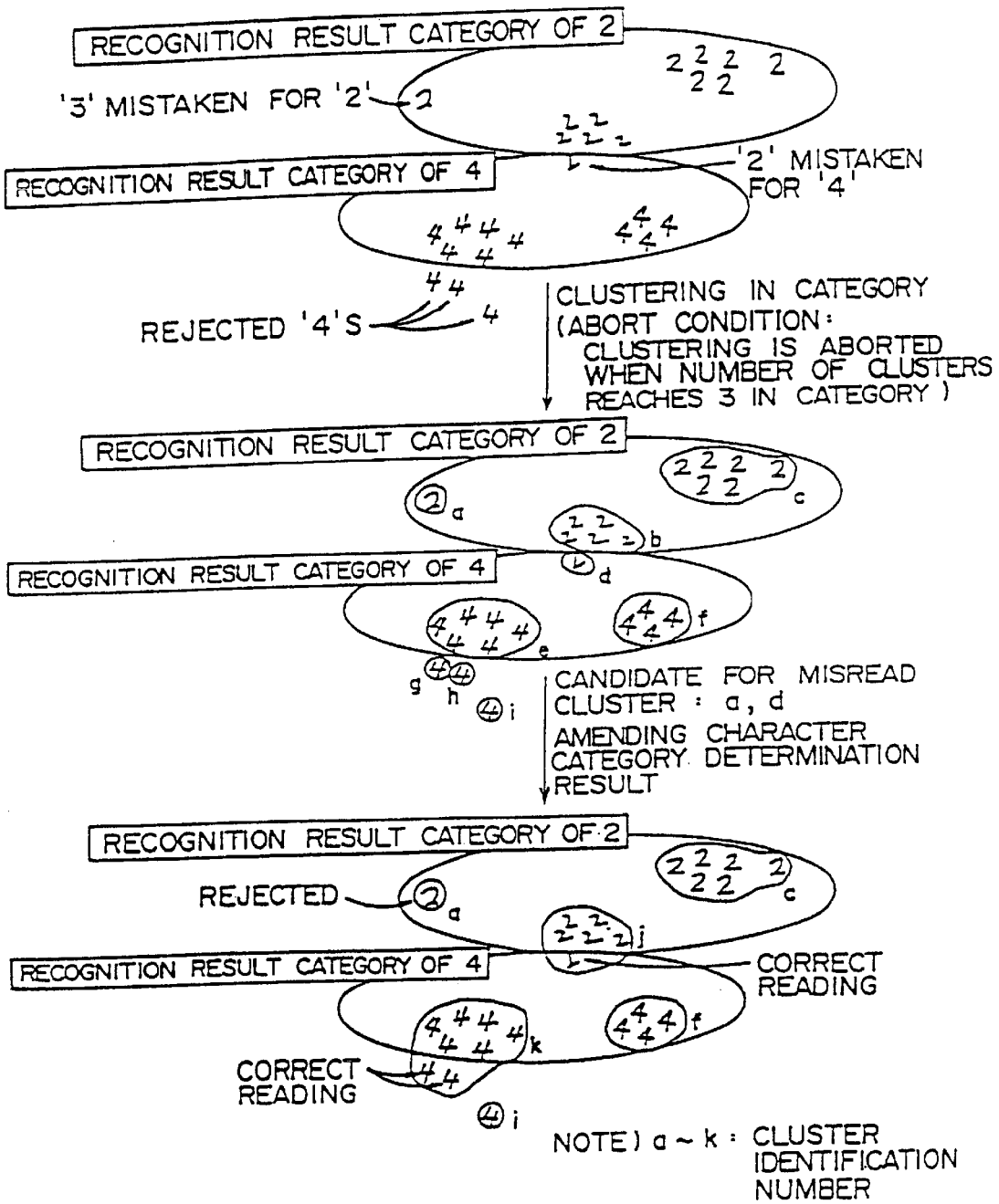
FIG. 74 shows the flow of the character category determination result correcting process performed by the unique character analyzing unit shown in FIG. 7.

FIG. 74 shows the process of correctly reading a handwritten character '2', which is mis-recognized for belonging to the character category of '4', as the character category '2'.

FIG. 74 shows the handwritten character determined to belong to the recognition result category of '2', and the handwritten character determined to belong to the recognition result category of '4'. The handwritten character '3' is mis-recognized for belonging to the recognition result category of '2', and the handwritten character '2' is mis-recognized for belonging to the recognition result category of '4'. The handwritten character '4' is rejected for not belonging to any recognition result category.

Performing the clustering process by setting the clustering aborting condition when the number of clusters in a specific category reaches 3 allows clusters a, b, and c to be generated for the recognition result category of '2' and clusters d, e, and f to be generated for the recognition result category of '4'. Clusters g, h, and i are generated for the three rejected handwritten characters '4'.

Then, clusters a, b, and c belonging to the recognition result category of '2' or clusters d, e, and f belonging to the recognition result category of '4' whichever contains a smaller number of characters is extracted as a candidate for a mis-read cluster.

The distances from mis-read candidate cluster a to each of other clusters b, c, d, e, and f, and the distances from mis-read candidate cluster d to each of other clusters a, b, c, e, and f are computed. Cluster b is extracted as the cluster closest to misread candidate cluster a. It is determined whether or not the distance between mis-read candidate cluster a and cluster b is shorter than a predetermined value. Since the distance between mis-read candidate cluster a and cluster b is not shorter than a predetermined value, mis-read candidate cluster a is rejected.

As a result, the handwritten character '3' mis-recognized for belonging to the recognition result category of '2' is removed from the recognition result category of '2'.

Cluster b is extracted as the cluster closest to mis-read candidate cluster d. It is determined whether or not the distance between mis-read candidate cluster d and cluster b is shorter than a predetermined value. Since the distance between mis-read candidate cluster d and cluster b is shorter than a predetermined value, mis-read candidate cluster d is integrated into cluster b to generate cluster j. It is determined that cluster j belongs to the recognition result category of '2' to which cluster b containing the larger number of elements belongs. Thus, the handwritten character '2' which has been mis-read for '4' and determined to belong to mis-read candidate cluster d can be correctly read.

Next, the distances between clusters g, h, and i rejected as not belonging to any recognition result category and other clusters a through f are computed. Cluster a is extracted as the cluster closest to cluster g. It is determined whether or not the distance between cluster g and cluster a is shorter than a predetermined value. Since the distance between cluster g and cluster a is shorter than a predetermined value, cluster g is integrated into cluster e.

Cluster e is extracted as the cluster closest to cluster h. It is determined whether or not the distance between cluster h and cluster e is shorter than a predetermined value, cluster h is integrated into cluster e. After integrating clusters g and h into cluster e, cluster k belongs to the recognition result category of '4' to which cluster e containing the larger number of elements belongs. Therefore, the handwritten character '4' which has been rejected as being unrecognizable can be correctly read.

Cluster e is extracted as the cluster closest to cluster i. It is determined whether or not the distance between cluster i and cluster e is shorter than a predetermined value. Since the distance between cluster i and cluster e is not shorter than a predetermined value, cluster i is not integrated into cluster e.

Figure 75:
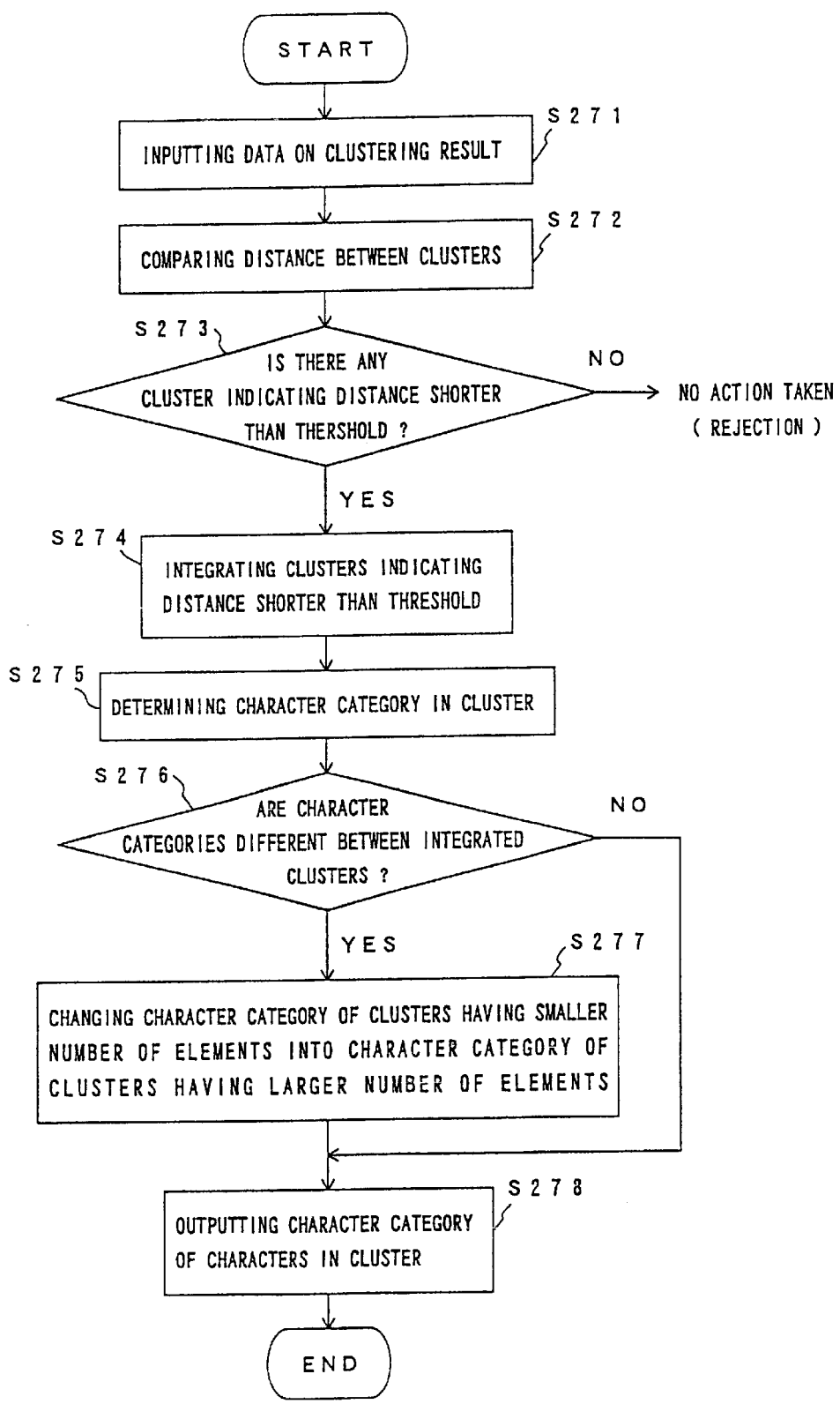
FIG. 75 is a flowchart showing the character category determination result correcting process performed by the unique character analyzing unit shown in FIG. 7.

FIG. 75 is a flowchart showing the character category recognition result amending process.

In FIG. 75, the data of the clustering result obtained in the clustering process shown in FIG. 73 is read from the memory in step S271.

Then, in step S272, the distance between clusters is computed and compared for all clusters in all categories obtained in the clustering process shown in FIG. 73.

In step S273, it is determined whether or not the distance between clusters is shorter than a predetermined threshold. If the distance between any clusters is shorter than a predetermined threshold, then control is passed to step S274, and the clusters are integrated. If the distance between any clusters is not shorter than a predetermined threshold, the clusters are rejected.

Assume that the threshold of the distance between the clusters in the integration of the clusters is a multiple of the constant of the distance between the vectors in one of, for example, two clusters whichever contains a larger number of elements. That is, when cluster A containing m elements is integrated into cluster B containing N (M>N) elements, the distance dth between the vectors in cluster A is expressed as follows.

$$d_t h = \frac{1}{M} \sum_{i=1}^{M-1} \sum_{\substack{j=i+1 \\ j \ne 1}}^{M} |xa_i - xa| \quad (25)$$

where xai (i=1, 2, . . . , M) indicates the feature vector in cluster A.

Therefore, the condition of integrating clusters can be represented as follows with the constant set to 1.5.

|xam−xbm|<1.5d$_t$h where xam indicates the representative vector of cluster A, xbm indicates the representative vector of cluster B.

Then, in step S275, the character categories are determined in all clusters integrated in step S274.

In step S276, it is determined whether or not the character categories of the integrated clusters are different from each other. If the character categories of the integrated clusters are different from each other, then control is passed to step S277, and the character category containing a smaller number of elements is amended to the character category of the cluster containing a larger number of elements. Then, control is passed to step S278. If the character categories of the clusters match, then step 5277 is skipped and control is passed to step S278.

Then, in step S278, a character category is output for a character in the cluster.

Figure 76:
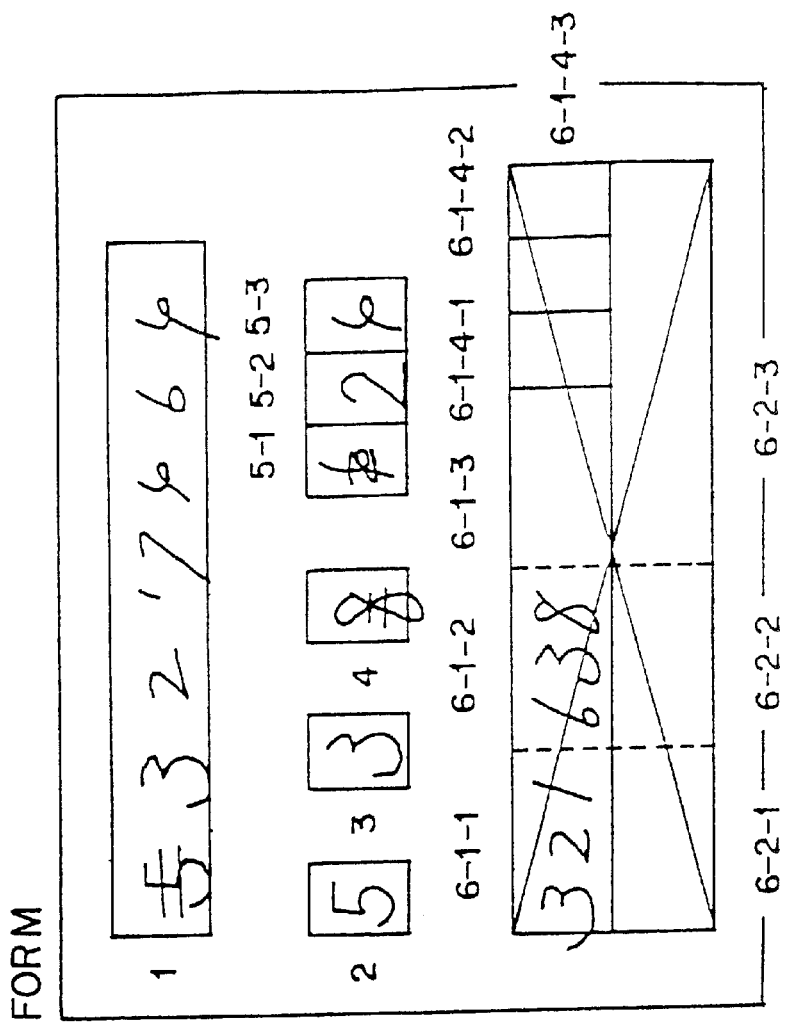
FIG. 76 shows an example of a list to be processed by the pattern recognizing apparatus according to the present invention.

The operations of the pattern recognizing apparatus according to the present invention is practically described by referring to the case where the form shown in FIG. 76 is processed.

FIG. 76 shows an example of the form input to the pattern recognizing apparatus according to an embodiment of the present invention.

The form shown in FIG. 76 contains a free-pitch 167 box having the box number 1; a one-character box having the box number 2, 3, or 4; a block character box having the box number 5; and an irregular table having the box number 6. The free-pitch box having the box number 1 contains the box-touching character '5' corrected with double horizon lines; the box-touching characters '3' and '2'; the box-touching obscure character '7'; the unique characters '4' and '6'; and the partly-outside-box unique character '4'.

The one-character box having the box number 2 contains '5'. The one-character box having the box number 3 contains '3'. The one-character box having the box number 4 contains the partly-outside-box characters '' corrected with double horizontal lines. In the block character boxes having the box number 5, the character box having the box number 5-1 contains the unique characters '' corrected with double horizontal lines, the character box having the box number 5-2 contains the box-touching character ', and the character box having the box number 5-3 contains the unique characters '4'.

In the irregular tables having the box number 6, the character box having the box number 6-1-1 contains the partly-outside-box characters '3', '2', and '1', the character box having the box number 6-1-2 contains the character 6, 3, and 8, and the character boxes having the box numbers 6-1-3, 6-14-1, 6-14-2, 6-14-3, 6-2-1, 6-2-2, and 6-2-3 are kept blank. The entire irregular table having the character box number 6 is corrected with the mark 'X'.

Next, the environment recognizing system 11 shown in FIG. 7 performs the process shown in FIGS. 9 through 12, thereby extracting the state of an input image from the form shown in FIG. 76.

For example, the free-pitch character box having the box number 1, one-character boxes having the box numbers 2, 3, and 4, the block character box having the box number 5, and the irregular table having the box number 6 are extracted from the form shown in FIG. 76 by performing the layout analysis shown in FIG. 10. Additionally, eight patterns are extracted as candidates for characters from the free-pitch box having the box number 1. A pattern is extracted as a candidate for a character from each of the one character boxes having the box numbers 2, 3, and 4 7 Three patterns are extracted as candidates for characters from the block character box having the box number 5. Three patterns are extracted as candidates for characters from the character box having the box number 6-1-1. Three patterns are extracted as candidates for characters from the character box having the box number 6-1-2. No patterns are extracted as candidates for characters from the character boxes having the box numbers 6-1-3, 6-1-4-1, 6-1-4-2, 6-1-4-3, 6-2-1, 6-2-2, and 6-2-3.

To extract a character string from the form shown in FIG. 76, the text extracting method shown in FIGS. 18 and 19 is used. To extract a ruled line from the form shown in FIG. 76, the ruled line extracting method shown in FIGS. 20 and 26 is used. To extract a character box or a table from the form shown in FIG. 76, the box extracting method shown in FIGS. 27 and 28 is used.

The first second, fifth, and eighth patterns extracted from the free-pitch box having the box number 1 are regarded as candidates for box-touching characters. The patter extracted from the one character box having the box number 4, the pattern extracted from the character box having the box number 5-2, the first pattern extracted from the character box having the box number 6-1-1 are also regarded as candidates for box-touching characters.

To extract a candidate for a box-touching character from the form shown in FIG. 76, the box-touching character extracting method shown in FIGS. 31 and 32 is used.

Through the quality analysis shown in FIG. 11, obscure, deformed, and high-quality characters are detected in the form shown in FIG. 76. In this example, the quality of images is normal, but obscure, deformed, or high-quality characters are not detected.

A candidate for a corrected character is extracted from the list shown in FIG. 76 through the correction analysis shown in FIG. 12. In this example, the first pattern extracted from the free-pitch box having the box number 1, the patterns extracted from the one character boxes having the box numbers 2 and 4, the pattern extracted from the character box having the box number 5-1, and the pattern extracted from the irregular table having the box number 6 are regarded as candidates for corrected characters.

To extract a candidate for a corrected character from the form shown in FIG. 76, the feature extracting method shown in FIG. 34 is used, for example.

Next, the environment recognizing system 11 generates an intermediate process result table containing the state extracted from the form in the processes shown in FIGS. 9 through 12 for each of the candidates for the characters extracted from the input image.

FIG. 77 shows the intermediate process result table containing the state extracted from the form in the processes in FIGS. 9 through 12.

In FIG. 77, the column of the character box having the box number 1 contains 'free-pitch' for the type of box and '8' for the number of characters. The column for the first pattern in the box having the box number 1 contains 'YES' indicating the existence of a box-touching character, 'YES 2' indicating the existence of deletion lines, and 'NORMAL' indicating the quality. The column for the second pattern in the box having the box number 1 contains 'YES' indicating the existence of a box-touching character, 'NO' indicating the non-existence of deletion lines, and 'NORMAL' indicating the quality. The column for the eighth pattern in the box having the box number 1 contains 'YES' indicating the existence of a box-touching character, 'NO' indicating the non-existence of deletion lines, and 'NORMAL' indicating the quality.

'YES 1' indicating the existence of the deletion lines refers to the existence of a candidate for deletion lines for a plurality of characters. 'YES 2' indicating the existence of the deletion lines refers to the existence of a candidate for deletion lines for a single character.

The column of the character box having the box number 2 contains 'one-character' for the type of box, 'NO' indicating the non-existence of a box-touching character, 'YES 2' indicating the existence of deletion lines, 'NORMAL' indicating the quality, and '1' indicating the number of characters. The column of the character box having the box number 3 contains 'one-character' for the type of box, 'NO' indicating the non-existence of a box-touching character, 'NO' indicating the non-existence of deletion lines, 'NORMAL' indicating the quality, and '1' indicating the number of characters. The column of the character box having the box number 4 contains 'one-character' for the type of box, 'YES' indicating the existence of a box-touching character, 'YES 2' indicating the existence of deletion lines, 'NORMAL' indicating the quality, and '1' indicating the number of characters.

The column of the character box having the box number 5 contains 'INDIVIDUAL CHARACTER BOXES' indicating the type of box, '3' indicating the number of characters. The column of the character box having the box number 5-1 contains 'NO' indicating the non-existence of a box-touching character, 'YES 2' indicating the existence of deletion lines, 'NORMAL' indicating the quality, and '1' indicating the number of characters. The column of the character box having the box number 5-2 contains 'YES' indicating the existence of a box-touching character, 'NO' indicating the non-existence of deletion lines, 'NORMAL' indicating the quality, and '1' indicating the number of characters.

The column of the character box having the box number 6 contains 'TABLE' indicating the type of character box. The column of the character box having the box number 6-1-1 contains 'FREE-PITCH' indicating the type of character box, 'YES' indicating the existence of a box-touching character, 'YES 1' indicating the existence of deletion lines, and 'NORMAL' indicating the quality. The column of the character box having the box number 6-2-2 contains 'FREE-PITCH' indicating the type of character box, 'NO' indicating the non-existence of a box-touching character, 'YES 1' indicating the existence of deletion lines, and 'NORMAL' indicating the quality.

The environment recognizing system 11 performs the process shown in FIG. 13 based on the state extracted from the form in the process shown in FIGS. 9 through 12.

That is, the environment recognizing system 11 determines which process is to be called by referring to the process order control rules, the process performed by the basic character recognizing unit 17, character string recognizing unit 15, box-touching character recognizing unit 13, obscure character recognizing unit 19, or deformed character recognizing unit 21 of the character recognizing unit 12 shown in FIG. 7, or the process performed by the deletion line recognizing unit 26 or noise recognizing unit 28 of the non-character recognizing unit 25. The determined process is entered in the column 'CALLING PROCESS' of the intermediate process result table shown in FIG. 77. Then, it determines, by referring to the process order table, in what order the process entered in the column 'CALLING PROCESS' of the intermediate process result table shown in FIG. 77 should be performed. The determined order is entered in the column 'PROCESS ORDER' of the intermediate process result table shown in FIG. 77.

The process order control rule can be specified as follows.

(A1) If a column indicating the state of the intermediate process result table contains 'YES' for a specific process object and the process corresponding to the state has not been performed, then the process corresponding to the state is entered in the column 'CALLING PROCESS' of the intermediate process result table.

(A2) If all columns indicating the states of the intermediate process result table contains 'NO' or 'NORMAL' for a specific process object and the process to be performed by the basic character recognizing unit 17 has not been performed, then "BASIC" is entered in the column 'CALLING PROCESS' of the intermediate process result table.

(A3) If there are a plurality of processes corresponding to the state entered in the intermediate process result table for a process object, then the process order table for use in determining the order of a plurality of processes is accessed to rearrange the order of the 'CALLING PROCESS'.

(A4) If a process corresponding to the state entered in the intermediate process result table has been performed on a process object, then the completed process is entered in the column 'COMPLETION OF PROCESS', information about the suspension or completion of the next instruction or process is entered in the column 'PROCESS INSTRUCTION' of the intermediate process result table, and the order in the column 'CALLING PROCESS' of the intermediate process result table is rearranged according to the information.

FIG. 78 shows an example of the process order table.

In FIG. 78, the process order table stores the following procedures.

(B1) If only one process is entered in the column 'CALLING PROCESS' of the intermediate process result table for a process object, then the process is entered in the column 'PROCESS ORDER' of the intermediate process result table.

(B2) If 'BLACK-CHARACTER-BOX/FREE-PITCH' is entered in the column 'CALLING PROCESS' of the intermediate process result table for a process object, then 'BLACK-CHARACTER-BOX→FREE-PITCH' is entered in the column 'PROCESS ORDER' of the intermediate process result table.

(B3) If 'DELETION LINES (YES 2)/BLACK-CHARACTER-BOX' is entered in the column 'CALLING PROCESS' of the intermediate process result table for a process object, then 'BLACK-CHARACTER-BOX→CHARACTER DELETION LINES' is entered.

(B4) If 'BLACK-CHARACTER-BOX/FREE-PITCH/DELETION (YES 2)' is entered in the column 'CALLING PROCESS' of the intermediate process result table for a process object, then 'BLACK-CHARACTER-BOX→CHARACTER DELETION LINES FREE→PITCH' is entered in the column 'PROCESS ORDER' of the intermediate process result table.

(B5) If 'BLACK-CHARACTER-BOX/FREE-PITCH/DELETION (YES 1)' is entered in the column 'CALLING PROCESS' of the intermediate process result table for a process object, then 'DELETION LINES→BLACK-CHARACTER-BOX→FREE-PITCH' for a plurality of characters is entered in the column 'PROCESS ORDER' of the intermediate process result table.

(B6) If 'FREE-PITCH/DELETION (YES 1)' is entered in the column 'CALLING PROCESS' of the intermediate process result table for a process object, then 'PLURAL-CHARACTER DELETION LINES→FREE-PITCH' is entered in the column 'PROCESS ORDER' of the intermediate process result table.

(B7) If 'PROCESSES A, B, AND C' is entered in the column 'CALLING PROCESS' of the intermediate process result table for a process object, 'PROCESS B→PROCESS A→PROCESS C' is entered in the column 'PROCESS ORDER' of the intermediate process result table, and 'PROCESS B' is entered in the column 'COMPLETION OF PROCESS' of the intermediate process result table, then the column 'PROCESS ORDER' of the intermediate process result table is updated into 'PROCESS A→PROCESS C'.

(B8) If 'PROCESSES A, B, AND C' is entered in the column 'CALLING PROCESS' of the intermediate process result table for a process object, 'PROCESS B→PROCESS A→PROCESS C' is entered in the column 'PROCESS ORDER' of the intermediate process result table, 'PROCESS B' is entered in the column 'COMPLETION OF PROCESS' of the intermediate process result table, and 'SKIPPING TO PROCESS C' is entered in the column 'PROCESS INSTRUCTION' of the intermediate process result table, then the column 'PROCESS ORDER' of the intermediate process result table is updated into 'PROCESS C'.

(B9) If 'PROCESSES A, B, AND 'C' is entered in the column 'CALLING PROCESS' of the intermediate process result table for a process object, 'PROCESS B→PROCESS A→PROCESS C' is entered in the column 'PROCESS ORDER' of the intermediate process result table, 'PROCESS B' is entered in the column 'COMPLETION OF PROCESS' of the intermediate process result table, and 'INVERTING ORDER BETWEEN PROCESSES C AND A' is entered in the column 'PROCESS INSTRUCTION' of the intermediate process result table, then the column 'PROCESS ORDER' of the intermediate process result table is-updated into 'PROCESS C→PROCESS A'.

(B10) If 'PROCESSES B, AND A' is entered in the column 'CALLING PROCESS' of the intermediate process result table for a process object, 'PROCESS A' is entered in the column 'COMPLETION OF PROCESS' of the intermediate process result table, and 'TERMINATION' is entered in the column 'PROCESS INSTRUCTION' of the intermediate process result table, then 'TERMINATION' is entered in the column 'PROCESS ORDER' of the intermediate process result table.

FIG. 79 shows an example of entering in the column 'CALLING PROCESS' the process to be called based on the state of an input image entered in the intermediate process result table shown in FIG. 77, and of entering in the column 'PROCESS ORDER' the order of performing the process entered in the column 'CALLING PROCESS'.

In FIG. 79, the column of the character box having the box number 1 contains 'FREE-PITCH' for the type of box. The column for the first pattern in the box having the box number 1 contains 'YES' indicating the existence of a box-touching character, and 'YES 2' indicating the existence of deletion lines. Therefore, according to (A1) in the process order control rule, 'BLACK-CHARACTER-BOX/FREE-PITCH/DELETION LINE (YES 2)' is entered in the column 'CALLING PROCESS', (B4) of the process order table is referred to according to (A3) of the process order control rule, and 'BLACK-CHARACTER-BOX→ONE-CHARACTER DELETION LINE→FREE-PITCH' is entered in the column 'PROCESS ORDER'.

The column for the eighth pattern in the box having the box number 1 contains 'YES' indicating the existence of a box-touching character, 'NO' indicating the non-existence of deletion lines, and 'NORMAL' as 'QUALITY'. Therefore, according to (A1) in the process order control rule, 'BLACK-CHARACTER-BOX/FREE-PITCH' is entered in the column 'CALLING PROCESS', (B2) of the process order table is referred to according to (A3) of the process order control rule, and 'BLACK-CHARACTER-BOX→FREE-PITCH' is entered in the column 'PROCESS ORDER'.

The column for the second pattern in the box having the box number 1 contains 'YES' indicating the existence of a box-touching character, 'NO' indicating the non-existence of deletion lines, and 'NORMAL' as 'QUALITY'. Therefore, according to (A1) in the process order control rule, 'BLACK-CHARACTER-BOX/FREE-PITCH' is entered in the column 'CALLING PROCESS', (B2) of the process order table is referred to according to (A3) of the process order control rule, and 'BLACK-CHARACTER-BOX→FREE-PITCH' is entered in the column 'PROCESS ORDER'.

The column of the character box having the box number 2 contains 'ONE CHARACTER' for the type of box, 'NO' indicating the non-existence of a box-touching character, 'YES 2' indicating the existence of deletion lines, and 'NORMAL' indicating the quality. Therefore, according to (A1) in the process order control rule, 'DELETION LINE (YES 2)' is entered in the column 'CALLING PROCESS', and 'ONE-CHARACTER DELETION LINE' is entered in the column 'PROCESS ORDER' according to (A1) in the process order control rule.

The column of the character box having the box number 3 contains 'ONE CHARACTER' for the type of box, 'NO' indicating the non-existence of a box-touching character, 'NO' indicating the non-existence of deletion lines, and 'NORMAL' indicating the quality. Therefore, according to (A2) in the process order control rule, 'BASIC' is entered in the column 'CALLING PROCESS', and 'BASIC' is entered in the column 'PROCESS ORDER' according to (A1) in the process order control rule.

The column of the character box having the box number 4 contains 'ONE CHARACTER' for the type of box, 'YES' indicating the existence of a box-touching character, 'YES 2' indicating the existence of deletion lines, and 'NORMAL' indicating the quality. Therefore, according to (A1) in the process order control rule, 'BLACK-CHARACTER-BOX/ DELETION LINE (YES 2)' is entered in the column 'CALLING PROCESS', (B3) of the process order table is referred to and 'BLACK-CHARACTER-BOX→ONE-CHARACTER DELETION LINE' is entered in the column 'PROCESS ORDER' according to (A3) in the process order control rule.

The column of the character box having the box number 5 contains 'INDIVIDUAL CHARACTER BOXES' for the type of box. The column of the character box having the box number 5-1 contains 'NO' indicating the nonexistence of a box-touching character, 'YES 2' indicating the existence of deletion lines, and 'NORMAL' indicating the quality. Therefore, according to (A1) in the process order control rule, 'DELETION LINE (YES 2)' is entered in the column 'CALLING PROCESS', and 'ONE-CHARACTER DELETION LINE' is entered in the column 'PROCESS ORDER' according to (A1) of the process order control rule.

The column of the character box having the box number 5-2 contains 'YES' indicating the existence of a box-touching character, 'NO' indicating the nonexistence of deletion lines, and 'NORMAL' indicating the quality. Therefore, according to (AI) in the process order control rule, 'BLACK-CHARACTER-BOX' is entered in the column 'CALLING PROCESS', and 'BLACK-CHARACTER-BOX' is entered in the column 'PROCESS ORDER' according to (AZ) of the process order control rule.

The column of the character box having the box number 5-3 contains' NO' indicating the non-existence of a box-touching character, 'NO' indicating the nonexistence of deletion lines, and 'NORMAL' indicating the quality. Therefore, according to (A2) in the process order control rule, 'BASIC' is entered in the column 'CALLING PROCESS', and 'BASIC' is entered in the column 'PROCESS ORDER' according to (A1) in the process order control rule.

The column of the character box having the box number 6 contains 'TABLE' indicating the type of character box. The column of the character box having the box number 6-1-1 contains 'FREE-PITCH' indicating the type of character box, 'YES' indicating the existence of a box-touching character, 'YES 1' to (A1) in the process order control rule, 'BLACK-CHARACTER-BOX/FREE-PITCH/DELETION LINE (YES 1)' is entered in the column 'CALLING PROCESS', (B5) of the process order table is referred to according to (A3) of the process order control rule, and 'PLURAL-CHARACTER DELETION LINE→BLACK-CHARACTER-BOX→FREE-PITCH' is entered in the column 'PROCESS ORDER'.

The column of the character box having the box number 6-2-2 contains 'FREE-PITCH' indicating the type of character box, 'NO' indicating the non-existence of a box-touching character, 'YES 1' indicating the existence of deletion lines, and 'NORMAL' indicating the quality. Therefore, according to (A1) in the process order control rule, 'FREE-PITCH/DELETION LINE (YES 1)' is entered in the column 'CALLING PROCESS', (B6) of the process order table is referred to according to (A3) of the process order control rule, and 'PLURAL-CHARACTER DELETION LINE→FREE-PITCH' is entered in the column 'PROCESS ORDER'.

Next, the first recognizing process shown in FIG. 78 is performed by referring to the process execution rule based on the intermediate process result table shown in FIG. 79 with the data entered in the columns 'CALLING PROCESS' and 'PROCESS ORDER'. The completed recognizing process is entered in the column 'COMPLETION OF PROCESS' on the intermediate process result table, and the reliability obtained in the recognizing process is entered in the column 'RELIABILITY' on the intermediate process result table.

The column 'PROCESS ORDER' on the intermediate process result table is updated according to (B7) through (B9) on the process order table shown in FIG. 78. If the next process is specified according to the process execution rule, the process is entered in the column 'PROCESS INSTRUCTION' on the intermediate process result table.

The process execution rule can be described as follows.

(C1) If there is a process entered in the column 'PROCESS ORDER' on the intermediate process result table for a process object, then a process assigned the highest priority is performs. If the performed process has been completed, the completed process is entered in the column 'COMPLETION OF PROCESS' on the intermediate process result table, and the process is deleted from the column 'PROCESS ORDER' on the intermediate process result table. If the next process is specified, the process is entered in the 'PROCESS INSTRUCTION' on the intermediate process result table.

(C2) If a process is performed and it is determined that a pattern is a character pattern, not a non-character pattern, and the character code is computed with the reliability at or above a predetermined value, then calling a character recognizing process through the 'PERSONAL HANDWRITING FEATURES' is entered in the column 'PROCESS INSTRUCTION' on the intermediate process result table.

(C3) If a process is performed and it is determined that a pattern is a deletion line, an the deletion line is computed with the reliability at and above a predetermined value, then 'TERMINATION' is entered in the column 'PROCESS INSTRUCTION' on the intermediate process result table and the subsequent processes entered in the column 'PROCESS ORDER' on the intermediate process result table are aborted and the process is terminated.

(C4) If the column 'PROCESS ORDER' on the intermediate process result table starts with the entry 'FREE-PITCH' and the processes of the same box number for other process object before the 'FREE-PITCH' have not been processed, then the column 'PROCESS ORDER' of all process objects of the same box number starts with the entry 'FREE-PITCH' and all processes 'FREE-PITCH' for all process objects of the same box number are simultaneously performed.

(C5) If all processes entered in the column 'PROCESS ORDER' on the intermediate process result table have been completed and 'TERMINATION' or 'PERSONAL HANDWRITING FEATURES' is entered in the column 'PROCESS INSTRUCTION' on the intermediate process result table for all process objects, then the character recognizing process is called and performed through the 'PERSONAL HANDWRITING FEATURES' on the process object for which the 'PERSONAL HANDWRITING FEATURES' is entered in the column 'PROCESS INSTRUCTION'. If the character recognizing process has been performed through the 'PERSONAL HANDWRITING FEATURES', then 'TERMINATION' is entered in the column 'PROCESS INSTRUCTION' on the intermediate process result table.

(C6) If 'TERMINATION' is entered in the column 'PROCESS ORDER' on the intermediate process result table for all process objects, then all processes are terminated and the recognition results are output.

FIG. 80 shows an example of performing a recognizing process by referring to the process execution rule based on the intermediate process result table shown in FIG. 79; entering the reliability obtained in the recognizing process in the column 'RELIABILITY' on the intermediate process result table; updating the column 'PROCESS ORDER' on the intermediate process result table based on the process execution rule; and entering data in the column 'PROCESS INSTRUCTION' on the intermediate process result table.

Since 'BLACK-CHARACTER-BOX' is specified far the first pattern in the column 'PROCESS ORDER' of the character box having the box number 1 on the intermediate process result table shown in FIG. 79, the process of the box-touching character recognizing unit 13 shown in FIG. 3 is performed on the first pattern extracted from the free-pitch character box having the box number 1 as shown in FIG. 76 corresponding to 'BLACK-CHARACTER-BOX' according to the process execution rule (C1).

The box-touching character recognizing unit 13 recognizes a character by completing or re-completing the character for the pattern from which its character box is removed as shown in FIGS. 43 and 44. If a pattern cannot be recognized at acceptable reliability even after the character completing or re-completing process, then the knowledge table 14 is referred to and a character re-completing process is performed on the learning character shown in FIGS. 46 through 55 to successfully recognize a box-touching character.

If the recognition reliability of the first pattern extracted from the free-pitch box having the box number 1 shown in FIG. 76 is computed as 20% in the character recognizing process performed by the box-touching character recognizing unit 13, then the first pattern extracted from the free-pitch box having the box number 1 as shown in FIG. 76 is regarded as a non-character and 'REJECT' is entered in the column 'CHARACTER CODE' on the intermediate process result table, and '20%' is entered in the column 'RELIABILITY' on the intermediate process result table.

'BLACK-CHARACTER-BOX' is entered in the column 'COMPLETION OF PROCESS' on the intermediate process result table, and the column 'PROCESS ORDER' on the intermediate process result table is updated to 'ONE-CHARACTER DELETION LINE→FREE-PITCH'.

Next, since 'BLACK-CHARACTER-BOX' is specified for the second pattern in the column 'PROCESS ORDER' of the character box having the box number 1 on the intermediate process result table shown in FIG. 79, the process of the box-touching character recognizing unit 13 shown in FIG. 7 is performed on the second pattern extracted from the free-pitch character box having the box number 1 as shown in FIG. 76 corresponding to 'BLACK-CHARACTER-BOX' according to the process execution rule (C1), and a character recognizing process is performed on a box-touching character.

The second pattern extracted from the free-pitch box having the box number 1 shown in FIG. 76 is recognized as the character category 3 with the recognition reliability of 60% in the character recognizing process performed by the box-touching character recognizing unit 13, then '3' is entered in the column 'CHARACTER CODE' on the intermediate process result table, arid '60%' is entered in the column 'RELIABILITY' on the intermediate process result table.

'BLACK-CHARACTER-BOX' is entered in the column 'COMPLETION OF PROCESS' on the intermediate process result table, and the column 'PROCESS ORDER' on the intermediate process result table is updated to 'FREE-PITCH'.

Next, since 'BLACK-CHARACTER-BOX' is specified for the eighth pattern in the column 'PROCESS ORDER' of the character box having the box number 1 on the intermediate process result table shown in FIG. 79, the process of the box-touching character recognizing unit 13 shown in FIG. 7 is performed on the eighth pattern extracted from the free-pitch character box having the box number 1 as shown in FIG. 76 corresponding to 'BLACK-CHARACTER-BOX' according to the process execution rule (C1), and a character recognizing process is performed on a box-touching character.

The eighth pattern extracted from the free-pitch box having the box number 1 shown in FIG. 76 is recognized as the character category 4 with the recognition reliability of 95% in the character recognizing process performed by the box-touching character recognizing unit 13, then '4' is entered in the column 'CHARACTER CODE' on the intermediate process result table, and '95V is entered in the column 'RELIABILITY' on the intermediate process result table.

'BLACK-CHARACTER-BOX' is entered in the column 'COMPLETION OF PROCESS' on the intermediate process result table, and the column 'PROCESS ORDER' on the intermediate process result table is updated to 'FREE-PITCH'.

Next, since 'ONE-CHARACTER DELETION LINE' is specified in the column 'PROCESS ORDER' of the character box having the box number 2 on the intermediate process result table shown in FIG. 79, the process of the deletion line recognizing unit 26 shown in FIG. 7 is performed on the pattern extracted from the one-character box having the box number 2 as shown in FIG. 76 corresponding to 'ONE-CHARACTER DELETION LINE' according to the process execution rule (C1).

The deletion line recognizing unit 26 removes horizontal lines indicating the histogram value equal to or larger than a predetermined value from a pattern extracted as a candidate for a corrected character as shown in FIG. 71. If the pattern from which the horizontal lines are removed is recognized as a character, then the pattern extracted as the candidate for the corrected character can be recognized as a corrected character by recognizing the removed horizontal lines as deletion lines. If the pattern from which the horizontal lines indicating the histogram value equal to or larger than the predetermined value are removed is rejected, then the removed horizontal lines are not regarded as deletion lines but a portion of a character. Thus, the pattern extracted as a candidate for a corrected character is recognized as a normal character.

In the deletion line recognizing process performed by the deletion line recognizing unit 26, the recognition reliability of the pattern extracted from the one-character box having a box number 2 shown in FIG. 76 is computed as 10%. The pattern extracted from the one-character box having a box number 2 shown in FIG. 76 is not regarded as a corrected character, '10%' is entered in the column 'RELIABILITY' on the intermediate process result table, and 'BASIC' is entered in the column 'PROCESS INSTRUCTION' on the intermediate process result table.

'DELETION LINE' is entered in the column 'COMPLETION OF PROCESS' on the intermediate process result table, and 'BASIC' is entered in the column 'PROCESS ORDER' on the intermediate process result table.

Next, since 'BASIC' is specified in the column 'PROCESS ORDER' of the character box having the box number 3 on the intermediate process 'result table shown in FIG. 79, the process of the basic character recognizing unit 17 shown in FIG. 7 is performed on the pattern extracted from the one-character box having the box number 3 as shown in FIG. 76 corresponding to 'BASIC' according to the process execution rule (C1).

The basic character recognizing unit 17 computes the distance between feature vectors in a feature space by extracting the feature of an input unknown character as shown in FIG. 35, representing the feature of the unknown character by a feature vector, and collating the vector with the feature vector of each category preliminarily stored in the basic dictionary. Thus, the character category indicating the shortest distance between the feature vectors is recognized as an unknown character.

The basic character recognizing unit 17 computes the deformation of an unknown character by computing the number of convexity and concavity on the outline of the unknown character. If the unknown character indicates large deformation and reduces the recognition ratio, then the knowledge table 18 is referred to and a character recognizing process is performed by the detail identifying method shown in FIGS. 37 through 42:

The pattern extracted from the one-character box having the box number 3 shown in FIG. 76 is recognized as the character category 3 with the recognition reliability of 95% in the character recognizing process performed by the basic character recognizing unit 17, then '3' is entered in the column 'CHARACTER CODE' on the intermediate process result table, and '95%' is entered in the column 'RELIABILITY' on the intermediate process result table.

'BASIC' is entered in the column 'COMPLETION OF PROCESS' on the intermediate process result table, and the column 'PROCESS ORDER' is blank on the intermediate process result table.

Next, since 'BLACK-CHARACTER-BOX' is first specified in the column 'PROCESS ORDER' of the character box having the box number 4 on the intermediate process result table shown in FIG. 79, the process of the box-touching character recognizing unit 13 shown in FIG. 7 is performed on the pattern extracted from the one-character box having the box number 4 as shown in FIG. 76 corresponding to 'BLACK-CHARACTER-BOX' according to the process execution rule (C1). Then, a character recognizing process is performed on a box-touching character.

If the recognition reliability of the pattern extracted from the one-character box having the box number 4 shown in FIG. 76 is computed as 15% in the character recognizing process performed by the box-touching character recognizing unit 13, then the pattern extracted from the one-character box having the box number 4 as shown in FIG. 76 is regarded as a non-character and 'REJECT' is entered in the column 'CHARACTER CODE' on the intermediate process result table, and '15%' is entered in the column 'RELIABILITY' on the intermediate process result table.

'BLACK-CHARACTER-BOX' is entered in the column 'COMPLETION OF PROCESS' on the intermediate process result table, and the column 'PROCESS ORDER' on the intermediate process result table is updated to 'ONE-CHARACTER DELETION LINE'.

Next, since 'ONE-CHARACTER DELETION LINE' is specified in the column 'PROCESS ORDER' of the character box having the box number 5-1 on the intermediate process result table shown in FIG. 79, the process of the deletion line recognizing unit 26 shown in FIG. 3 is performed on the pattern extracted from the one-character box having the box number 5-1 as shown in FIG. 76 corresponding to 'ONE-CHARACTER DELETION LINE' according to the process execution rule (C1). Then, a recognizing process is performed on a pattern extracted as a candidate for a corrected character.

In the deletion line recognizing process performed by the deletion line recognizing unit 26, the recognition reliability of the pattern extracted from the one-character box having a box number 5-1 shown in FIG. 76 is computed as 950. The pattern extracted from the box having a box number 5-1 shown in FIG. 76 is regarded as a corrected character, '95%' is entered in the column 'RELIABILITY' on the intermediate process result table, and 'DELETION LINE' is entered in the column 'COMPLETION OF PROCESS' on the intermediate process result table.

'TERMINATION' is entered in the column 'PROCESS INSTRUCTION' on the intermediate process result table, and the column 'PROCESS ORDER' is blank on the intermediate process result table.

Next, since 'BLACK-CHARACTER-BOX' is specified in the column 'PROCESS ORDER' of the character box having the box number 5-2 on the intermediate process result table shown in FIG. 79, the process of the box-touching character recognizing unit 13 shown in FIG. 7 is performed on the pattern extracted from the box having the box number 5-2 as shown in FIG. 76 corresponding to 'BLACK-CHARACTER-BOX' according to the process execution rule (C1). Then, a character recognizing process is performed on a box-touching character.

The lower stroke of the pattern extracted from the character box having the box number 5-2 shown in FIG. 76 touches the character box. Since the pattern cannot be recognized with high reliability in the character completing process shown in FIG. 43 or the character re-completing process shown in FIG. 44, a pair of a character and its misread character (2, 7) can be obtained by referring to the knowledge table 167 shown in FIG. 49, and a character can be re-recognized by the area emphasizing method shown in FIG. 51.

The pattern extracted from the box having the box number 5-2 shown in FIG. 76 is recognized as the character category 2 with the recognition reliability of 95% in the character recognizing process performed by the box-touching character recognizing unit 13, then '2' is entered in the column 'CHARACTER CODE' on the intermediate process result table, and '95%' is entered in the column 'RELIABILITY' on the intermediate process result table.

'BLACK-CHARACTER-BOX' is entered in the column 'COMPLETION OF PROCESS' on the intermediate process result table, and the column 'PROCESS ORDER' is blank on the intermediate process result table.

Next, since 'BASIC' is specified in the column 'PROCESS ORDER' of the character box having the box number 5-3 on the intermediate process result table shown in FIG. 79, the process of the basic character recognizing unit 17 shown in FIG. 7 is performed on the pattern extracted from the one-character box having the box number 5-3 as shown in FIG. 76 corresponding to 'BASIC' according to the process execution rule (C1). Then, a character recognizing process is performed on a basic character.

The pattern extracted from the box having the box number 5-3 shown in FIG. 76 is recognized as the character category 6 with the recognition reliability of 90% in the character recognizing process performed by the basic character recognizing unit 17, then '6' is entered in the column 'CHARACTER CODE' on the intermediate process result table, and '90%' is entered in the column 'RELIABILITY' on the intermediate process result table.

'BASIC' is entered in the column 'COMPLETION OF PROCESS' on the intermediate process result table, and the column 'PROCESS ORDER' is blank on the intermediate process result table.

Next, since 'PLURAL-CHARACTER DELETION LINE' is first specified in the column 'PROCESS ORDER' of the character box having the box number 6-1-1 on the intermediate process result table shown in FIG. 79, the process of the deletion line recognizing unit 26 shown in FIG. 7 is performed corresponding to 'PLURAL-CHARACTER DELETION LINE' according to the process execution rule (C1). Then, a recognizing process is performed on deletion lines.

In the deletion line recognizing process performed by the deletion line recognizing unit 26, the recognition reliability of the deletion line extracted from the table having a box number 6-1-1 shown in FIG. 76 is computed as 98%. The pattern extracted from the box having a box number 6-1-1 shown in FIG. 76 is regarded as a corrected character, 'DELETION LINE' is entered in the column 'CHARACTER CODE', '98%' is entered in the column 'RELIABILITY' on the intermediate process result table, and 'DELETION LINE' is entered in the column 'COMPLETION OF PROCESS' on the intermediate process result table.

According to the process execution rule (C3), 'TERMINATION' is entered in the column 'PROCESS INSTRUCTION' on the intermediate process result table, and the column 'PROCESS ORDER' is blank on the intermediate process result table.

Next, since 'PLURAL-CHARACTER DELETION LINE' is first specified in the column 'PROCESS ORDER' of the character box having the box number 6-2-2 on the intermediate process result table shown in FIG. 79, the process of the deletion line recognizing unit 26 shown in FIG. 7 is performed corresponding to 'PLURAL-CHARACTER DELETION LINE' according to the process execution rule (C1). Then, a recognizing process is performed on deletion lines.

In the deletion line recognizing process performed by the deletion line recognizing unit 26, the recognition reliability of the deletion line extracted from the table having the box number 6-2-2 shown in FIG. 76 is computed as 98%. The pattern extracted from the box having the box number 6-2-2 shown in FIG. 76 is regarded as a corrected character, 'DELETION LINE' is entered in the column 'CHARACTER CODE', '98%' is entered in the column 'RELIABILITY' on the intermediate process result table, and 'DELETION LINE' is entered in the column 'COMPLETION OF PROCESS' on the intermediate process result table.

According to the process execution rule (C3), 'TERMINATION' is entered in the column 'PROCESS INSTRUCTION' on the intermediate process result table, and the column 'PROCESS ORDER' is blank on the intermediate process result table.

The intermediate process result table shown in FIG. 80 is generated by performing the above described processes. Since the process to be called is entered in the column 'PROCESS ORDER' on the intermediate process result table shown in FIG. 80, the processes are continued according to the process execution rule (C1).

FIG. 81 shows the result obtained by continuing the recognizing process based on the intermediate process result table shown in FIG. 80.

Since 'ONE-CHARACTER DELETION LINE' is specified for the first pattern in the column 'PROCESS ORDER' of the character box having the box number 1 on the intermediate process result table shown in FIG. 80, the process of the deletion line recognizing unit 26 shown in FIG. 1 is performed on the first pattern extracted from the free-pitch character box having the box number 1 as shown in FIG. 76 corresponding to 'ONE-CHARACTER DELETION LINE' according to the process execution rule (C1), and the corrected character recognizing process is performed.

In the deletion line recognizing process performed by the deletion line recognizing unit 26, the recognition reliability of the first pattern extracted from the free-pitch character box having the box number 1 shown in FIG. 76 is computed as 96%. The first pattern extracted from the free-pitch box having the box number 1 shown in FIG. 76 is regarded as a corrected character, 'DELETION LINE' is entered in the column 'CHARACTER CODE' on the intermediate process result table, and '96%' is entered in the column 'RELIABILITY' on the intermediate process result table, and 'BLACK-CHARACTER-BOX/DELETION LINE' is entered in the column 'COMPLETION OF PROCESS' on the intermediate process result table.

Then, 'TERMINATION' is entered in the column 'PROCESS INSTRUCTION' on the intermediate process result table, and the column 'PROCESS ORDER' on the intermediate process result table is blank.

Next, 'FREE-PITCH' is specified in the column 'PROCESS ORDER' of the second pattern-in the character box having the box number 1 on the intermediate process result table shown in FIG. 79. Therefore, the process of the character string recognizing unit 15 shown in FIG. 7 is performed corresponding to the 'FREE-PITCH' on all patterns extracted from the free-pitch box having the box number 1 to recognize a character with the detection reliability of a character taken into account according to the process execution rule (C4) when the columns 'PROCESS ORDER' of all patterns in the character box having the box number 1 contain 'FREE-PITCH' after extracting the second pattern from the free-pitch box having the box number 1 shown in FIG. 76 and waiting for the columns 'PROCESS ORDER' of all other patterns in the character box having the box number 1 to contain 'FREE-PITCH'.

Next, 'FREE-PITCH' is specified in the column 'PROCESS ORDER' of the eighth pattern in the character box having the box number 1 on the intermediate process result table shown in FIG. 79. Therefore, the process of the character string recognizing unit 15 shown in FIG. 7 is performed corresponding to the 'FREE-PITCH' on all patterns extracted from the free-pitch box having the box number 1 to recognize a character with the detection reliability of a character taken into account according to the process execution rule (C4) when the columns 'PROCESS ORDER' of all patterns in the character box having the box number 1 contain 'FREE-PITCH' after extracting the eighth pattern from the free-pitch box having the box number 1 shown in FIG. 76 and waiting for the columns 'PROCESS ORDER' of all other patterns in the character box having the box number 1 to contain 'FREE-PITCH'.

Then, the character recognizing process is performed by the character string recognizing unit 15 on all patterns extracted from the free-pitch box having the box number 1 shown in FIG. 76 when the columns 'PROCESS ORDER' of all patterns in the character box having the box number 1 contain 'FREE-PITCH'.

Relating to the first pattern extracted from the free-pitch box in the character box having the box number 1 shown in FIG. 76, the recognizing process is performed by the character string recognizing unit 15 on the second through eighth patterns extracted from the free-pitch box having the box number 1 shown in FIG. 76 after removing the first pattern extracted from the free-pitch box in the character box having the box number 1 shown in FIG. 76 from the process objects of the character string recognizing unit 15 because 'TERMINATION' is entered in the column 'PROCESS INSTRUCTION' of the first pattern in the character box having the box number 1 on the intermediate process result table shown in FIG. 81.

The character string recognizing unit 15 computes the recognition reliability based on the distance from the discriminant phase when a character is detected as shown in, for example, FIGS. 56 through 69, and defines that the maximum product of character detection reliability and character recognition reliability refers to a detected character.

In the recognizing process performed by the character string recognizing unit 15, the second pattern extracted from the free-pitch box having the box number 1 shown in FIG. 76 is recognized as a character category '3' with recognition reliability of 95%. '3' is entered in the column 'CHARACTER CODE' on the intermediate process result table, and '95%' is entered in the column 'RELIABILITY' on the intermediate process result table.

According to the process execution rule (C1), 'BLACK-CHARACTER-BOX/FREE-PITCH' is entered in the column 'COMPLETION OF PROCESS' on the intermediate process result table, and the column 'PROCESS ORDER' on the intermediate process result table becomes blank. According to the process execution rule (C4), 'PERSONAL HANDWRITING FEATURES' is entered in the column 'PROCESS INSTRUCTION' on the intermediate process result table.

The eighth pattern extracted from the free-pitch box in the character box having the box number 1 shown in FIG. 76 is recognized as a character category '4' with recognition reliability of 98%. '4' is entered in the column 'CHARACTER CODE' on the intermediate process result table, and '98%' is entered in the column 'RELIABILITY' on the intermediate process result table.

According to the process execution rule (C1), 'BLACK.-CHARACTER-BOX/FREE-PITCH' is entered in the column 'COMPLETION OF PROCESS' on the intermediate process result table, and the column 'PROCESS ORDER' on the intermediate process result table becomes blank. According to the process execution rule (C4), 'PERSONAL HANDWRITING FEATURES' is entered in the column 'PROCESS INSTRUCTION' on the intermediate process result table.

The third pattern extracted from the free-pitch box in the character box having the box number 1 shown in FIG. 76 is recognized as a character category '2'. The fourth and fifth patterns extracted from the free-pitch box in the character box having the box number 1 shown in FIG. 76 are integrated into a single character in the recognizing process by the character string recognizing unit 15 and recognized as a character category '7'. The sixth pattern extracted from the free-pitch box in the character box having the box number 1 shown in FIG. 76 is recognized as a character category '4'. The seventh pattern extracted from the free-pitch box in the character box having the box number 1 shown in FIG. 76 is recognized as a character category '6'.

As a result, '7' is input to the column 'NUMBER OF CHARACTERS' on the intermediate process result table shown in FIG. 81.

Next, since 'BASIC' is entered in the column 'PROCESS ORDER' of the character box having the box number 2 on the intermediate process result table shown in FIG. 80, the process of the basic character recognizing unit 17 shown in FIG. 7 is performed corresponding to 'BASIC' on the pattern extracted from a one-character box having the box number 2 shown in FIG. 76 according to the process execution rule (C1).

In the character recognizing process performed by the basic character recognizing unit 17, the pattern extracted from the one-character box in the character box having the box number 2 shown in FIG. 76 is recognized as a character category '5' with recognition reliability of 97%. '5' is entered in the column 'CHARACTER CODE' on the intermediate process result table, and '97%' is entered in the column 'RELIABILITY' on the intermediate process result table.

'DELETION LINE (YES 2)/BASIC' is entered in the column 'CALLING PROCESS' on the intermediate process result table. 'DELETION LINE/BASIC' is entered in the column 'COMPLETION OF PROCESS' on the intermediate process result table. The column 'PROCESS ORDER' on the intermediate process result table becomes blank. Therefore, according to the process execution rule (C4), 'PERSONAL HANDWRITING FEATURES' is entered in the column 'PROCESS INSTRUCTION'.

Since the column 'PROCESS ORDER' of the character box having the box number 3 on the intermediate process result table shown in FIG. 80 becomes blank, 'PERSONAL HANDWRITING FEATURES' is entered in the column 'PROCESS INSTRUCTION' on the intermediate process results table according to the process execution rule (C4).

Next, since 'ONE-CHARACTER DELETION LINE' is entered in the column 'PROCESS ORDER' of the character box having the box number 4 on the intermediate process result table shown in FIG. 80, the process of the deletion line recognizing unit 26 shown in FIG. 76 is performed corresponding to 'ONE-CHARACTER DELETION LINE' on the pattern extracted from the one-character box having the box number 4 shown in FIG. 76 according to the process execution rule (C1). Thus, a recognizing process is performed on the pattern extracted as a candidate for a corrected character.

If the recognition reliability of the pattern extracted from the one-character box having the box number 4 shown in FIG. 76 is computed as 95% in the deletion line recognizing process performed by the deletion line recognizing unit 26, then the pattern extracted from the one-character box having the box number 4 as shown in FIG. 76 is regarded as a corrected character and '95%' is entered in the column 'RELIABILITY' on the intermediate process result table, and 'BLACK-CHARACTER-BOX/DELETION LINE' is entered in the column 'COMPLETION OF PROCESS' on the intermediate process result table.

'TERMINATION' is entered in the column 'PROCESS INSTRUCTION' on the intermediate process result table, and the column 'PROCESS ORDER' is blank on the intermediate process result table.

Since 'TERMINATION' is entered in the column 'PROCESS INSTRUCTION' of the box number having the box number 5-1 on the intermediate process result table shown in FIG. 80, no process is performed on the pattern extracted from the character box having the box number 5-1 shown in FIG. 76.

Since the column 'PROCESS ORDER' of the character box having the box number 5-2 on the intermediate process result table shown in FIG. 80 becomes blank, 'PERSONAL HANDWRITING FEATURES' is entered in the column 'PROCESS INSTRUCTION' on the intermediate process result table according to the process execution rule (C4).

Since the column 'PROCESS ORDER' of the character box having the box number 5-3 on the intermediate process result table shown in FIG. 80 becomes blank, 'PERSONAL HANDWRITING FEATURES' is entered in the column 'PROCESS INSTRUCTION' on the intermediate process result table according to the process execution rule (C4).

Since 'TERMINATION' is entered in the column 'PROCESS INSTRUCTION' of the box number having the box number 6-1-1 on the intermediate process result table shown in FIG. 80, no process is performed on the pattern extracted from the character box having the box number 6-2-2 shown in FIG. 76.

Since 'TERMINATION' is entered in the column 'PROCESS INSTRUCTION' of the box number having the box number 6-2-2 on the intermediate process result table shown in FIG. 80, no process is performed on the pattern extracted from the character box having the box number 6-1-1 shown in FIG. 76.

The intermediate process result table shown in FIG. 81 is generated by performing the above described processes. Since the 'PERSONAL HANDWRITING FEATURES' is entered in a column 'PROCESS INSTRUCTION' on the intermediate process result table shown in FIG. 81, the processes are continued according to the process execution rule (C5).

FIG. 82 shows the result obtained by continuing the recognizing process based on the intermediate process result table shown in FIG. 81.

Since 'TERMINATION' is entered in the column 'PROCESS INSTRUCTION' of the first pattern in the character box having the box number, 1 on the intermediate process result table shown in FIG. 80, no process is performed on the first pattern extracted from the free-pitch box having the box number 1 shown in FIG. 76.

Since 'PERSONAL HANDWRITING FEATURES' is entered in the column 'PROCESS INSTRUCTION' of the second pattern in the character box having the box number 1 on the intermediate process result table shown in FIG. 81, the process of the unique character analyzing unit 23 shown in FIG. 7 is performed corresponding to 'PERSONAL HANDWRITING FEATURES' on the second pattern extracted from the free-pitch box having the box number 1 shown in FIG. 76 according to the process execution rule (C5).

For example, the unique character analyzing unit 23 clusters the characters handwritten by the same writer into categories as shown in FIGS. 72 through 75. The second cluster, which is close to the first cluster of written characters obtained by the clustering process, belongs to a category different from that of the first cluster, and has a smaller number of elements, is integrated into the first cluster so that the category of the handwritten characters belonging to the second cluster can be amended to the category of the first clusters.

In the analyzing process performed by the unique character analyzing unit 23, the second pattern extracted from the free-pitch box having the character box number 1 shown in FIG. 76 is recognized as character category 3 with the recognition reliability of 97%. '3' is entered in the column 'CHARACTER CODE' on the intermediate process result table, and '97%' is entered in the column 'RELIABILITY' on the intermediate process result table.

'BLACK-CHARACTER-BOX/FREE-PITCH/PERSONAL HANDWRITING FEATURES' is entered in the column 'COMPLETION OF PROCESS', and 'TERMINATION' is entered in the column 'PROCESS INSTRUCTION'.

Since 'PERSONAL HANDWRITING FEATURES' is entered in the column 'PROCESS INSTRUCTION' of the eighth pattern in the character box having the box number 1 on the intermediate process result table shown in FIG. 81, the process of the unique character analyzing unit 23 shown in FIG. 7 is performed corresponding to 'PERSONAL HANDWRITING FEATURES' on the eighth pattern extracted from the free-pitch box having the box number 1 shown in FIG. 76 according to the process execution rule (C5).

In the analyzing process performed by the unique character analyzing unit 23, the eighth pattern extracted from the free-pitch box having the character box number 1 shown in FIG. 76 is recognized as character category 4 with the recognition reliability of 98%. '4' is entered in the column 'CHARACTER CODE' on the intermediate process result table, and '98%' is entered in the column 'RELIABILITY' on the intermediate process result table.

'BLACK-CHARACTER-BOX/FREE-PITCH/PERSONAL HANDWRITING FEATURES' is entered in the column'COMPLETION OF PROCESS', and 'TERMINATION' is entered in the column 'PROCESS INSTRUCTION'.

Since 'PERSONAL HANDWRITING FEATURES' is entered in the column 'PROCESS INSTRUCTION' in the character box having the box number 2 on the intermediate process result table shown in FIG. 81, the process of the unique character analyzing unit 23 shown in FIG. 7 is performed corresponding to 'PERSONAL HANDWRITING FEATURES' on the pattern extracted from the one-character box having the box number 2 shown in FIG. 76 according to the process execution rule (C5).

In the analyzing process performed by the unique character analyzing unit 23, the pattern extracted from the one-character box having the character box number 2 shown in FIG. 76 is recognized as character category 5 with the recognition reliability of 97%. '5' is entered in the column 'CHARACTER CODE' on the intermediate process result table, and '97%' is entered in the column 'RELIABILITY' on the intermediate process result table.

'DELETION LINE/BASIC/PERSONAL HANDWRITING FEATURES' is entered in the column 'COMPLETION OF PROCESS', and 'TERMINATION' is entered in the column 'PROCESS INSTRUCTION'.

Since 'PERSONAL HANDWRITING FEATURES' is entered in the column 'PROCESS INSTRUCTION' in the character box having the box number 3 on the intermediate process result table shown in FIG. 81, the process of the unique character analyzing unit 23 shown in FIG. 7 is performed corresponding to 'PERSONAL HANDWRITING FEATURES' on the pattern extracted from the one-character box having the box number 3 shown in FIG. 76 according to the process execution rule (C5).

In the analyzing process performed by the unique character analyzing unit 23, the pattern extracted from the one-character box having the box number 3 shown in FIG. 76 is recognized as character category 3 with the recognition reliability of 97%. '3' is entered in the column 'CHARACTER CODE' on the intermediate process result table, and '97%' is entered in the column 'RELIABILITY' on the intermediate process result table.

'BASIC/PERSONAL HANDWRITING FEATURES' is entered in the column 'COMPLETION OF PROCESS', and 'TERMINATION' is entered in the column 'PROCESS INSTRUCTION'.

Since 'TERMINATION' is entered in the column 'PROCESS' INSTRUCTION' of the box number having the box number 4 on the intermediate process result table shown in FIG. 81, no process is performed on the pattern, extracted from the character box having the box number 4 shown in FIG. 76.

Since 'TERMINATION' is entered in the column 'PROCESS INSTRUCTION' of the box number having the box number 5-1 on the intermediate process result table shown in FIG. 81, no process is performed on the pattern extracted from the character box having the box number 5-1 shown in FIG. 76.

Since 'PERSONAL HANDWRITING FEATURES' is entered in the column 'PROCESS INSTRUCTION' in the character box having the box number 5-2 on the intermediate process result table shown in FIG. 81, the process of the unique character analyzing unit 23 shown in FIG. 7 is performed corresponding to 'PERSONAL HANDWRITING FEATURES' on the pattern extracted from the character box having the box number 5-2 shown in FIG. 76 according to the process execution rule (C5).

In the analyzing process performed by the unique character analyzing unit 23, the pattern extracted from the character box having the box number 5-2 shown in FIG. 76 is recognized as character category 2 with the recognition reliability of 97%. '2' is entered 15 in the column 'CHARACTER CODE' on the intermediate process result table, and '97%' is entered in the column 'RELIABILITY' on the intermediate process result table.

'BLACK-CHARACTER-BOX/PERSONAL HANDWRITING FEATURES' is entered in the column 'COMPLETION OF PROCESS', and 'TERMINATION' is entered in the column 'PROCESS INSTRUCTION'.

Since 'PERSONAL HANDWRITING FEATURES' is entered in the column 'PROCESS INSTRUCTION' in the character box having the box number 5-3 on the intermediate process result table shown in FIG. 81, the process of the unique character analyzing unit 23 shown in FIG. 7 is performed corresponding to 'PERSONAL HANDWRITING FEATURES' on the pattern extracted from the character box having the box number 5-3 shown in FIG. 76 according to the process execution rule (C5).

In the analyzing process performed by the unique character analyzing unit 23, the pattern extracted from the character box having the box number 5-3 shown in FIG. 76 is recognized as character category 4 with the recognition reliability of 96%. '4' is entered in the column 'CHARACTER CODE' on the intermediate process result table, and '96%' is entered in the column 'RELIABILITY' on the intermediate process result table.

'BASIC/PERSONAL HANDWRITING FEATURES' is entered in the column 'COMPLETION OF PROCESS', and 'TERMINATION' is entered in the column 'PROCESS INSTRUCTION'.

Since 'TERMINATION' is entered in the column 'PROCESS INSTRUCTION' of the box number having the box number 6-1-1 on the intermediate process result table shown in FIG. 81, no process is performed on the pattern extracted from the character box having the box number 6-1-1 shown in FIG. 76.

Since 'TERMINATION' is entered in the column 'PROCESS INSTRUCTION' of the box number having the box number 6-2-2 on the intermediate process result table shown in FIG. 81, no process is performed on the pattern extracted from the character-box having the box number 6-2-2 shown in FIG. 76.

The intermediate process result table shown in FIG. 82 is generated by performing the above described processes. Since 'TERMINATION' is entered in the column 'PROCESS INSTRUCTION' on the intermediate process result table shown in FIG. 82 for all process objects, all processes terminate according to the process execution rule (,C6).

As described above, the character recognizing unit 12 and non-character recognizing unit 25 perform appropriate recognizing processes to process the state of the input image recognized by the environment recognizing system 11 according to the embodiments of the present invention.

For example, when the environment recognizing system 11 extracts a character touching the ruled line, it uses the box-touching character recognizing unit 13 for exclusively performing a recognizing process on a box-touching character. When the environment recognizing system 11 extracts a free-pitch character string, it uses the character string recognizing unit 15 for exclusively performing a recognizing process on a free-pitch character string. When the environment recognizing system 11 extracts an obscure character, it uses the obscure character recognizing unit 19 for exclusively performing a recognizing process on an obscure character. When the environment recognizing system 11 extracts a deformed character, it uses the deformed character recognizing unit 21 for exclusively performing a recognizing process on a deformed character. When the environment recognizing system 11 extracts a non-character, it uses the non-character recognizing unit 25 for exclusively performing a recognizing process on a non-character.

The reliability on the recognition result from the character recognizing unit 12 or non-character recognizing unit 25 is computed. For a character or non-character with low reliability, the environment recognizing system 11, character recognizing unit 12, and non-character recognizing unit 25 mutually feed back data to re-perform other processes. When high reliability is obtained or there are no executable processes to be performed, the entire process terminates.

Thus, according to the embodiments of the present invention, a recognizing process can be performed with the features and identifying methods to be used when characters are recognized adaptively amended depending on the environment in which characters are written. Therefore, a high-precision character recognition can be realized corresponding to various environments of documents and forms.

Furthermore, character recognition results can be confirmed with high reliability by outputting only character codes as recognition results, simultaneously outputting environment recognition results and character recognition results, and outputting character recognition results when the environment recognition results and character recognition results match each other.

Since the non-character recognizing unit 25 can be provided exclusively for performing a non-character recognizing process independent of I a character recognizing process, the reliability in the character and non-character recognizing processes can be improved.

Furthermore, since a recognizing process cart be performed independently of the environment, the recognition reliability can be improved by increasing the volume of the dictionary and knowledge in each recognizing process.

Described below is the pattern recognizing apparatus according to the third embodiment of the present invention.

The pattern recognizing apparatus according to the third embodiment correctly rejects deletion lines apparently indicating the deletion of a character to prevent it from being mis-read, but does not mistakenly reject a character other than a character with deletion lines, thereby recognizing a character with high reliability without a heavy load to a user.

Figure 83:
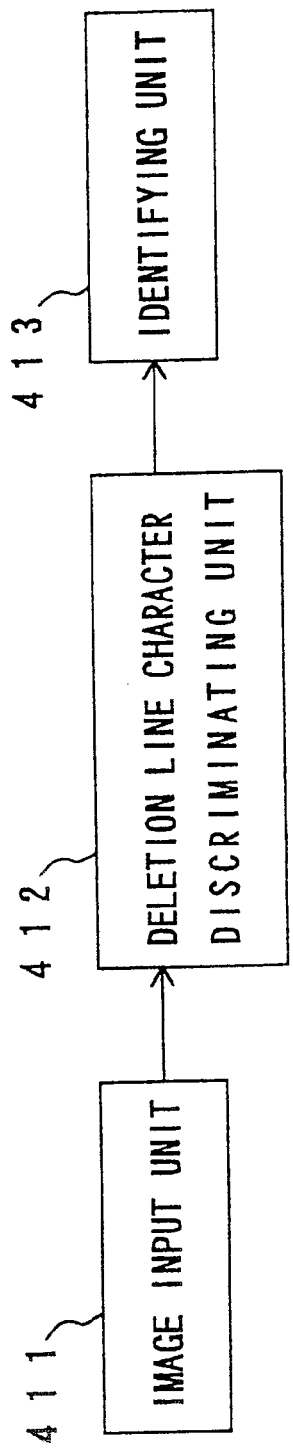
FIG. 83 is a block diagram showing the function of the pattern recognizing apparatus according to the third embodiment of the present invention.

The third embodiment shown in FIG. 83 comprises an image input unit 411 for receiving an image, detecting a character pattern from the input image, and pre-processing the detected pattern; a deletion line character discriminating unit 412 for discriminating a character with deletion lines of either simple deletion lines formed simply by horizontal lines indicating the deletion of the character or complicated deletion lines formed by complicated strokes; or a normal character without deletion lines; and an identifying unit 413 for identifying a character.

'Inputting an image' refers to inputting an original image representing a character. For example, when a character on a form is to be recognized, the character pattern on the form is transmitted to the read area of an opto-electrical converter to read the character pattern, convert it into an electrical signal, and output a digital signal through binarization, etc.

'Detecting a character' refers to detecting only a character portion from the form data of the input digital image and separating each character from others.

'Pre-processing' refers to removing noises, standardizing, the position, size, pose, line-thinness, etc. of a character.

Discriminating a character with deletion lines can be a pre-process.

A 'character with deletion lines' refers to a character provided with deletion lines indicating the deletion of the character. According to the third embodiment, deletion lines can be simple deletion lines or complicated deletion lines.

A 'simple deletion line' refers to a deletion line formed by a horizontal line assumed to indicate the deletion of a character. The simple deletion line can be one or more horizontal lines.

A 'horizontal line' is not always a correctly-horizontal line, but includes a line drawn in the horizontal direction with permitted allowance in slope.

Thus, a character with an apparent horizontal deletion line can be deleted without fail and misreading can be reduced.

In the embodiment described later, horizontal deletion lines are discriminated by a contiguous projection.

A 'complicated deletion line' refers to a complicated line or stroke drawn on a character to be deleted. To determine whether or not a line is a complicated deletion line, the amount of complexity is extracted by the pattern recognizing apparatus shown in FIG. 84.

'Identifying a character' refers to extracting a feature, inputting the obtained feature vector, and computing the state of matching between the feature vector and a standard feature vector, that is, a preliminarily stored identifying dictionary. The category of the standard feature vector indicating the highest similarity is output as a recognition result.

According to the present embodiment, a discriminating process is performed on a character with a simple deletion line or a complicated deletion line so that a normal character can be identified.

Therefore, such deletion lines as a predetermined horizontal line, an apparent deletion line simple and a little irregular from the predetermined horizontal line, and an apparent deletion line complicated and quite different from the simple deletion line can be discriminated as deletion lines without fail.

Figure 84:
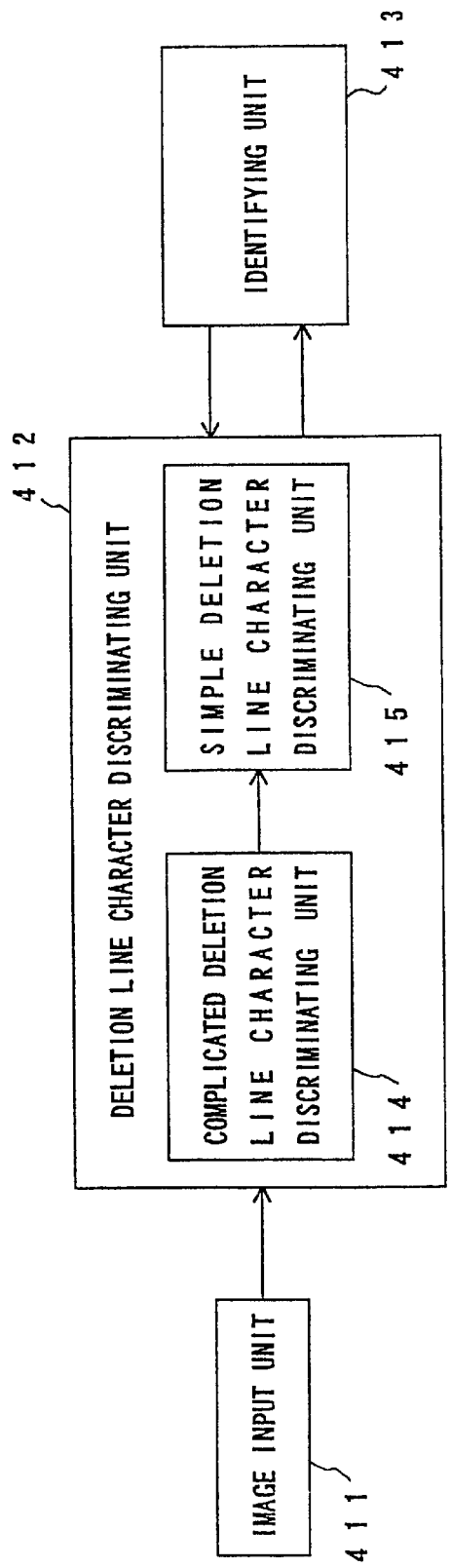
FIG. 84 is a block diagram showing the function of the pattern recognizing apparatus according to the fourth embodiment of the present invention.

FIG. 84 is a block diagram showing the configuration of the pattern recognizing apparatus according to the fourth embodiment of the present invention.

In FIG. 84, the deletion line character discriminating unit 412 comprises a complicated deletion line character discrimination process unit 414 for discriminating a character with a complicated deletion line and a simple deletion line character discriminating unit 415 for discriminating a character with a simple deletion line by determining whether or not a candidate for a character with a simple deletion line can be identified as a character when the candidate for the simple deletion line is removed from the candidate for the character with the simple deletion line when the plural-character deletion line character determination process unit 414 determines that the pattern is not a character with a complicated deletion line.

According to the pattern recognizing apparatus shown in FIG. 84, a character with a simple deletion line can be discriminated only when it is determined that the character is not provided with a complicated deletion line after first determining whether or not the character is a character with a complicated deletion line. Therefore, the pattern recognizing apparatus avoids misreading a character for a character without a deletion line when it cannot be identified as a character after removing a simple deletion line from it, thereby discriminating with high reliability a candidate for a character with a deletion line.

Figure 85:
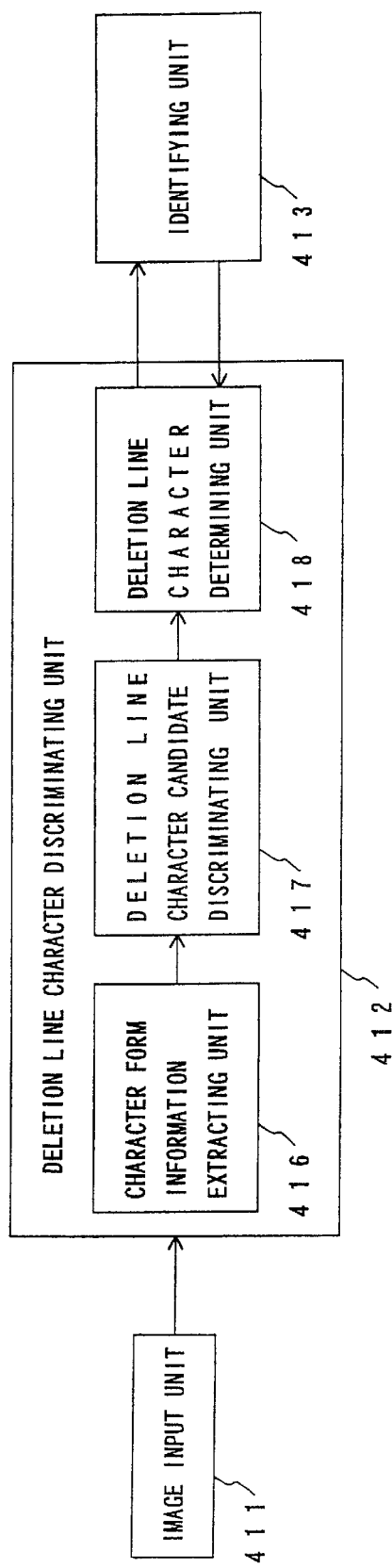
FIG. 85 is a block diagram showing the function of the pattern recognizing apparatus according to the fifth embodiment of the present invention.

FIG. 85 is a block diagram showing the configuration of the pattern recognizing apparatus according to the fifth embodiment of the present invention.

In FIG. 85, the deletion line character discriminating unit 412 comprises a character form information extracting unit 416 for extracting character form information comprising at least one of the picture element number histogram, obtained by the contiguous projection in which the black picture elements in the object horizontal scanning line and the contiguous lines in a predetermined range above and below the object line are added up and counted in the horizontal direction, and the amount of complexity indicating the complexity of drawings from the detected and pre-processed character pattern; a deletion line character candidate discriminating unit 417 for discriminating a candidate, for a character with a simple deletion line or a character with a complicated deletion line according to the character form information extracted by the character form information extracting unit 416; and a deletion line character determining unit 418 for determining a character with a simple deletion line when the character can be identified as a character by the identifying unit 413 after removing a candidate for a deletion line from the candidate for a character with a simple deletion line.

The 'character form information' comprises at least one of the 'picture-element-number histogram obtained by a contiguous projection performed in the horizontal direction' and 'amount of complexity'.

A 'predetermined range' refers to a range of contiguous lines above and below the object horizontal line. For example, the range can contain the three lines, that is, the object horizontal line and the lines immediately above and below the object line according to the embodiment described later.

If the 'predetermined range' is set narrow, then only lines in the horizontal direction can be recognized as simple deletion lines. If it is set larger, then even a line making an angle with the horizontal line can be recognized as a simple deletion line. However, if it is set too large, the peak of the picture element histogram becomes dull and the horizontal lines cannot be correctly determined. Therefore, the range is appropriately set depending on experiences and experiments.

In a 'contiguous projection in the horizontal direction', the number of black picture elements is counted by adding up the black picture elements in the lines in a predetermined range containing an object horizontal scanning line and the contiguous lines above and below the object line.

An 'amount of complexity' can be represented by, for example, the line density in a predetermined direction, Euler number, number of black picture elements, etc.

According to the present embodiment, a character with a simple deletion line is discriminated by the picture-element-number histogram obtained by a contiguous projection in the horizontal direction, and a character with a complicated deletion line is discriminated by the amount of complexity.

The above described amount of complexity or the picture-element-number histogram obtained by the contiguous projection in the horizontal direction can be obtained objectively, easily, rapidly, and with high reliability. Therefore, a character with a deletion line can be easily discriminated at a high speed and with high reliability.

Figure 86:
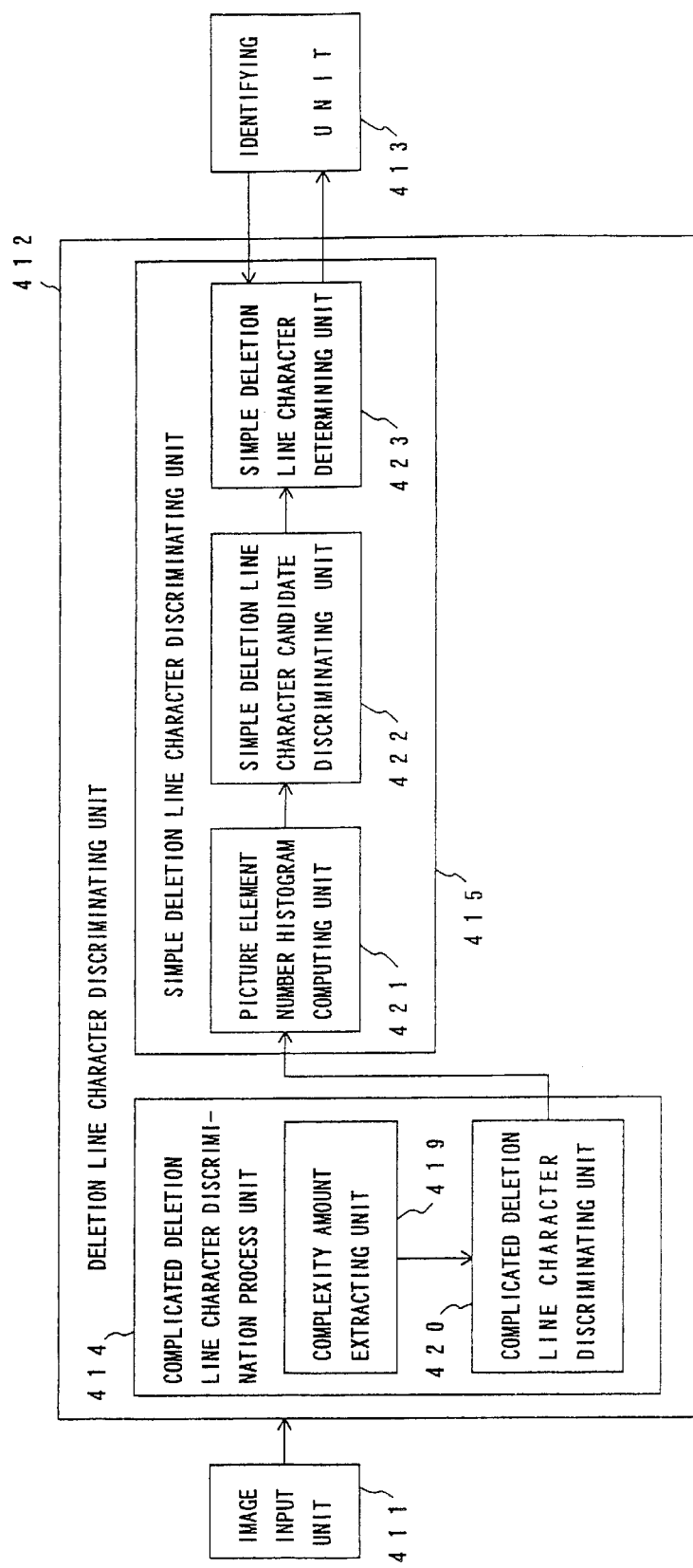
FIG. 86 is a block diagram showing the function of the pattern recognizing apparatus according to the sixth embodiment of the present invention.

FIG. 86 is a block diagram showing the configuration of the pattern recognizing apparatus according to the sixth embodiment of the present invention.

In FIG. 86, the complicated deletion line character discrimination process unit 414 comprises a complexity amount extracting unit 419 for extracting the amount of complexity indicating the complexity of drawings, and a complicated deletion line character discriminating unit 420 for determining a character with a complicated deletion line based on the extracted amount of complexity. The simple deletion line character discriminating unit 415 comprises a 25 picture element number histogram computing unit 421 for computing the picture element number histogram by the contiguous projection in which the black picture elements in the object horizontal scanning line and the contiguous lines in a predetermined range above and below the object line are added up and counted in the horizontal direction; a simple deletion line character candidate discriminating unit 422 for discriminating a candidate for a character with a simple deletion line based on the computed number of picture elements, and a simple deletion line character determining unit 423 for determining a character with a simple deletion line when the character can be identified as a character by the identifying unit 413 after removing a candidate for a deletion line from the candidate for a character with a simple deletion line.

According to the pattern recognizing apparatus shown in FIG. 86, a character with a deletion line can be discriminated based on the picture element number histogram obtained by the contiguous projection in the horizontal direction and the amount of complexity.

Therefore, in addition to the effect obtained by the pattern recognizing apparatus shown in FIG. 84, the character with a deletion line can be discriminated with high reliability.

FIG. 87 is a block diagram showing the configuration of the pattern recognizing apparatus according to the seventh embodiment of the present invention.

In FIG. 87, the simple deletion line character determining unit 423 comprises a deletion line removing unit 424 for removing a candidate for a deletion line from a discriminated candidate for a character with a simple deletion line and transmitting the result to the identifying unit 413; a storage unit 426 for storing an original image of a candidate for a character with a simple deletion line before removing the candidate for a deletion line; and a deletion line character determining unit 425 for defining a candidate for a character with a simple deletion line as a character with a simple deletion line when the candidate for the character with a simple deletion line can be identified as a character even after removing the deletion line from the character, and for defining the candidate for a character with a simple deletion line stored in the storage unit 426 as a normal character and transmitting it to the identifying unit 413 when the candidate for the character with a simple deletion line cannot be identified as a character after removing the deletion line from the character.

According to the pattern recognizing apparatus shown in FIG. 87, the original image before removing by the deletion line removing unit 424 a candidate for a deletion line from a candidate for a character with a deletion line is temporarily stored in the storage unit 426.

Therefore, if the candidate, from which the candidate for a deletion line is removed, for a character with a deletion line cannot be identified as a character, then the original image of the candidate for a character with a deletion line is read from the storage unit 426 and transmitted to the identifying unit 413 for identification of a character. Thus, a character can be identified at a high speed with a simple configuration according to the present invention.

Figure 88:
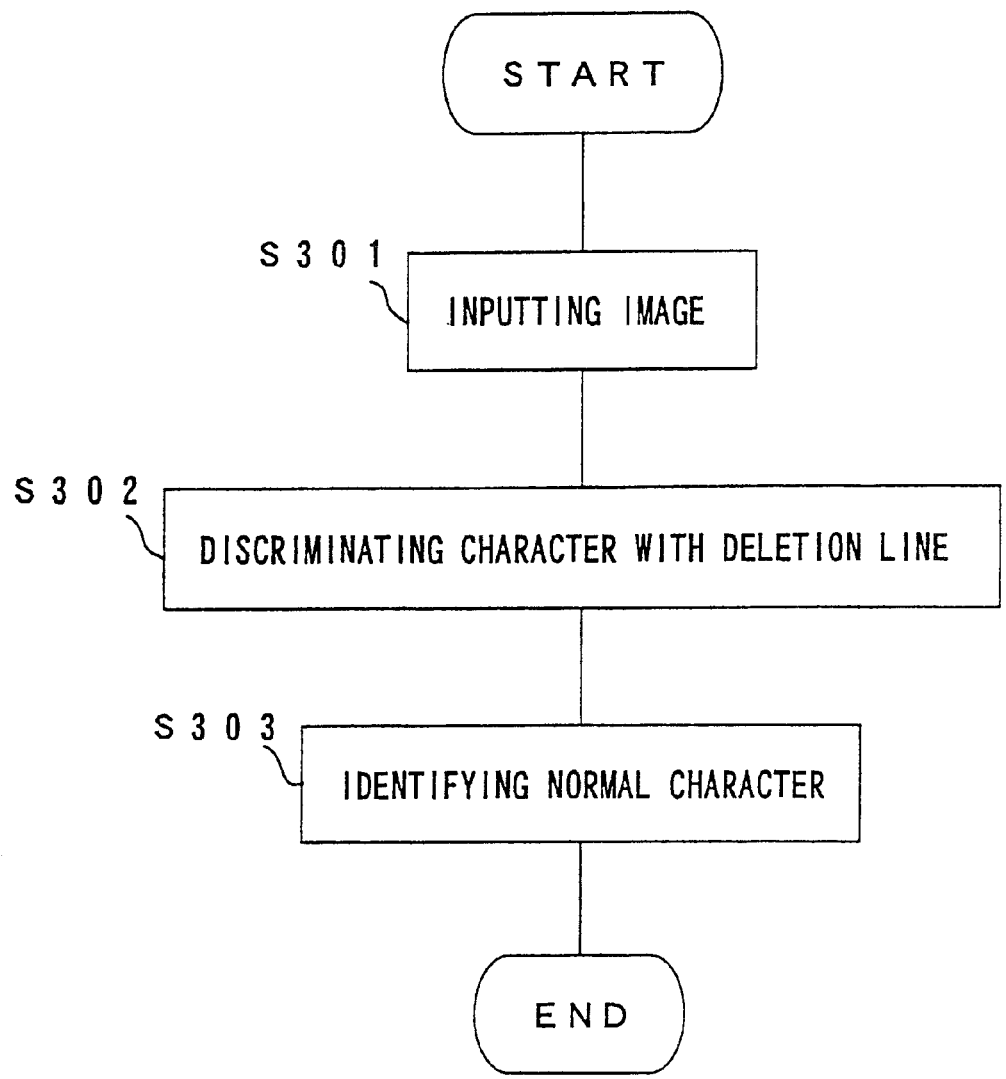
FIG. 88 is a flowchart showing the operations performed by the pattern recognizing apparatus according to the eighth embodiment of the present invention.

FIG. 88 is a flowchart showing the operations of the pattern recognizing apparatus according to the eighth embodiment of the present invention:

In FIG. 88, an image is input, a character pattern is detected from the input image, and the result is pre-processed in step S301. Then, a discriminating process is performed in step S302 on the detected and pre-processed character pattern as to whether the current character is a character with a deletion line provided with either a simple deletion line formed by only a horizontal line or a complicated deletion line drawn by a complicated stroke to indicate the deletion of the character or a normal character without a deletion line. Thus, a normal character without a deletion line can be identified as a character in step S303.

According to the pattern recognizing apparatus shown in FIG. 88, it is determined whether the current character is a character with a deletion line provided with either a simple deletion line or a complicated line or a normal character without a deletion line. Thus, a normal character can be identified as a character.

Therefore, since the user can recognize a character with a simple configuration and high reliability because a character with an apparent deletion line can be removed without fail even if the user is not familiar with the deletion lines or is not provided with any instruction about deletion lines.

Thus, the restrictions on the entries of a form, etc. can be reduced and the load to the user can also be reduced considerably.

Figure 89:
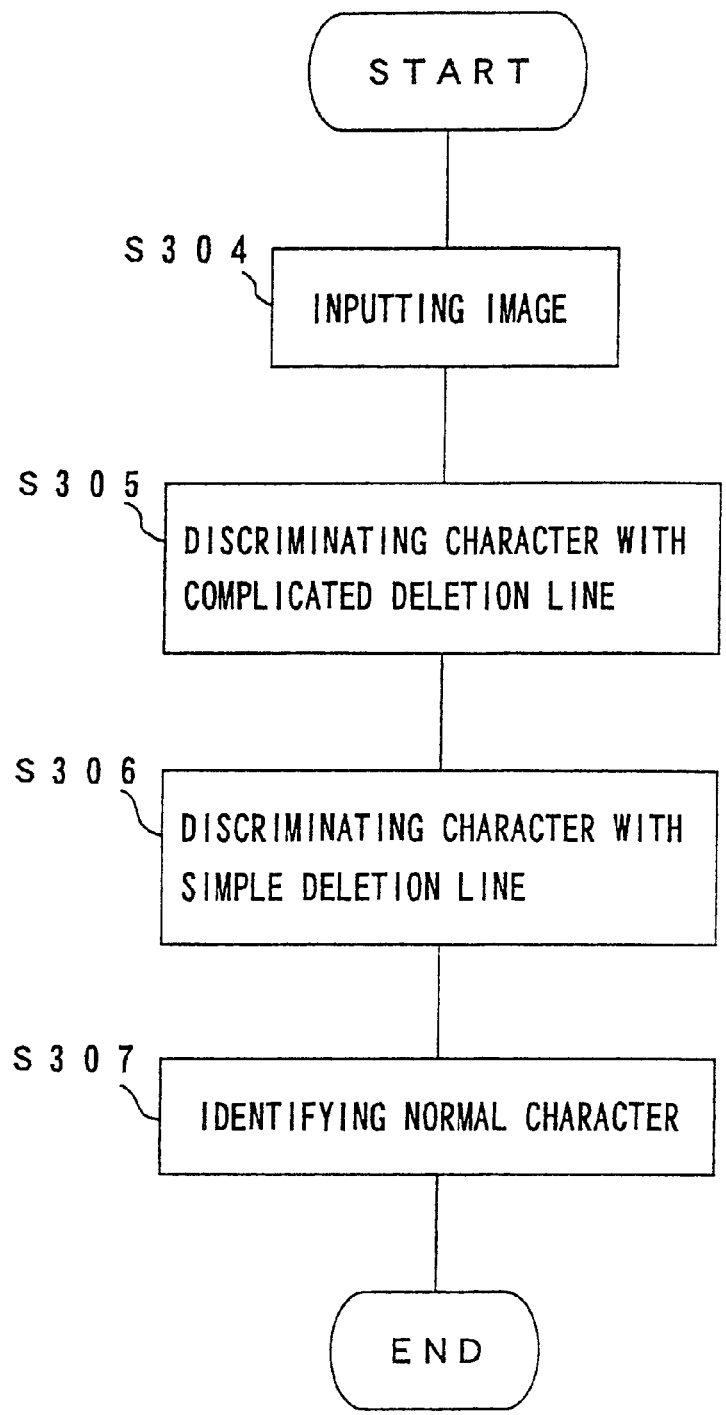
FIG. 89 is a flowchart showing the operations performed by the pattern recognizing apparatus according to the ninth embodiment of the present invention.

FIG. 89 is a flowchart showing the operations of the pattern recognizing apparatus according to the ninth embodiment of the present invention.

In FIG. 89, an image is input, a character pattern is detected from the input image, and the result is pre-processed in step S304. Then, a discriminating process is performed in step S305 to discriminate a character with a complicated deletion line having a complicated form on the detected and pre-processed character pattern. If it is determined that the current character is not a character with a complicated deletion line, then it is determined whether the current character is a character with a simple deletion line formed by only a horizontal line to indicate the deletion of the character or a normal character without a deletion line in step S306. Thus, a normal character without a deletion line can be identified as a character in step S307.

Thus, according to the pattern recognizing apparatus shown in FIG. 89, when a discriminating process is performed on a character with a deletion line, it is first performed on a character with a complicated deletion line. Only if it is determined that the current character is not a character with a complicated deletion line, the discriminating process is performed on a candidate for a character with a simple deletion line.

Therefore, a character can be discriminated efficiently and rapidly.

A candidate for a character with a simple deletion line is defined as a character with a simple deletion line when the character can be identified as a character even after removing a candidate for a deletion line from the candidate for a character. If the candidate for the character cannot be identified as a character, it is defined as a normal character.

Since a complicated deletion line has been removed, a character with a complicated deletion line is not mixed among normal characters and is not misread for a wrong character.

Furthermore, since it is determined whether or not a candidate for a character with a simple deletion line can be identified as a character, the determination as to whether or not the candidate is a character with a deletion line can be made correctly with high reliability.

Figure 90:
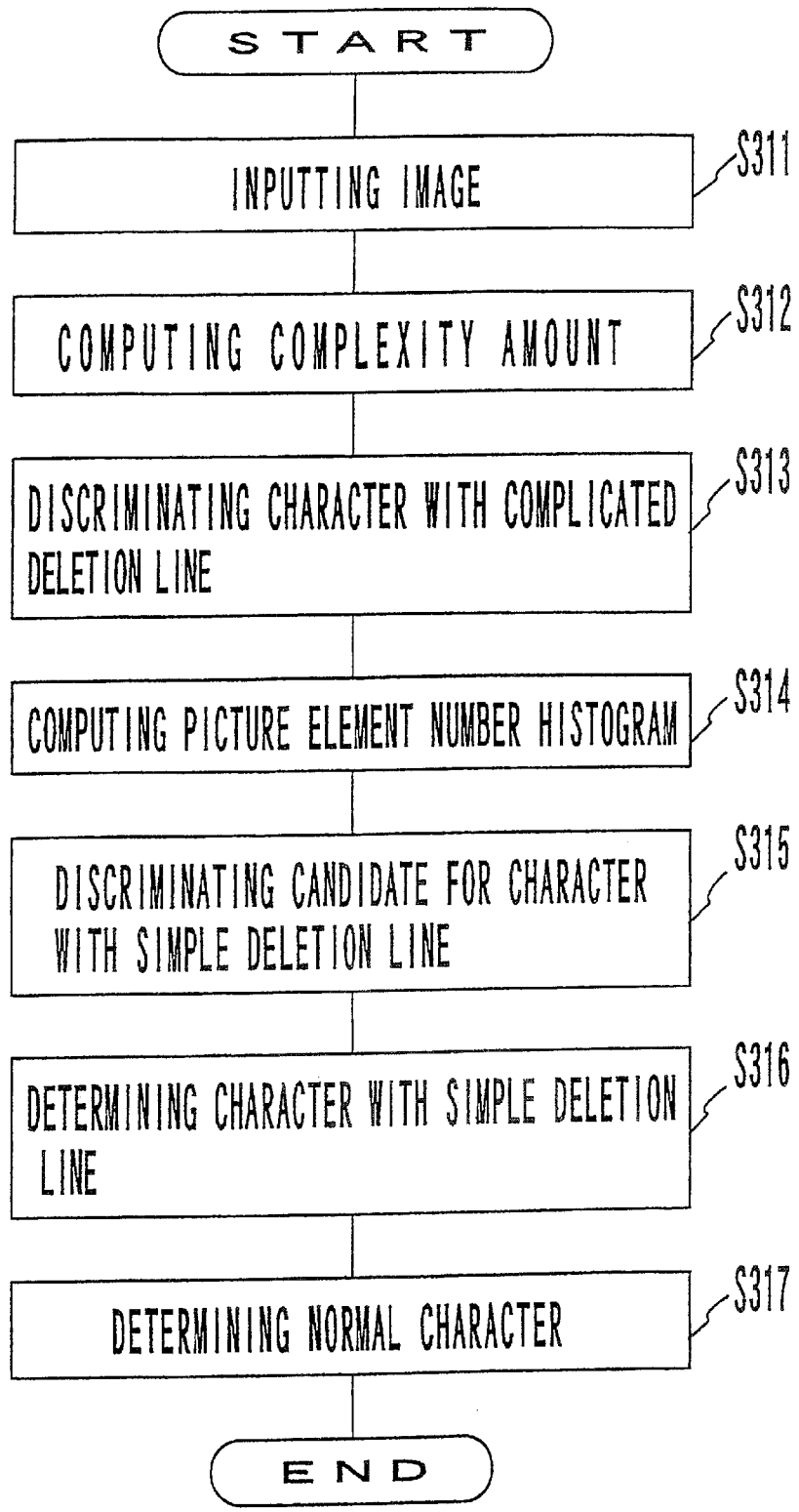
FIG. 90 is a flowchart showing the operations performed by the pattern recognizing apparatus according to the tenth embodiment of the present invention.

FIG. 90 is a flowchart showing the operations of the pattern recognizing apparatus according to the tenth embodiment of the present invention.

In FIG. 90, an image is input, a character pattern is detected from the input image, and the detected result is pre-processed in step S311. The amount of complexity of the detected and pre-processed character is computed in step S312. Based on the amount of complexity, a discriminating process about a character with a complicated deletion line represented by a complicated stroke is performed in step S313. If it is determined that the character is not provided with a complicated deletion line, then the picture element number histogram is obtained by the contiguous projection in which the black picture elements in the object horizontal scanning line and the contiguous lines in a predetermined range above and below the object line are added up and counted in the horizontal direction in step S314. Then, the discriminating process is performed about the candidate for a character with a simple deletion line in step S315. If a candidate for a deletion line is removed from a candidate for a character with a simple deletion line and the result can be identified as a character, then the candidate is defined as a character with a simple deletion line. If it cannot be identified as a character, the candidate is defined as a normal character in step S316, and it is determined in step S317 whether or not the defined normal character can be identified as a character.

Thus, according to the pattern recognizing apparatus shown in FIG. 90, a discriminating process is performed about a character with a simple deletion line or a character with a complicated deletion line by extracting the amount of complexity or performing the contiguous projection.

Therefore, a discriminating process can be easily and correctly performed with a simple configuration at a high speed.

Figure 91:
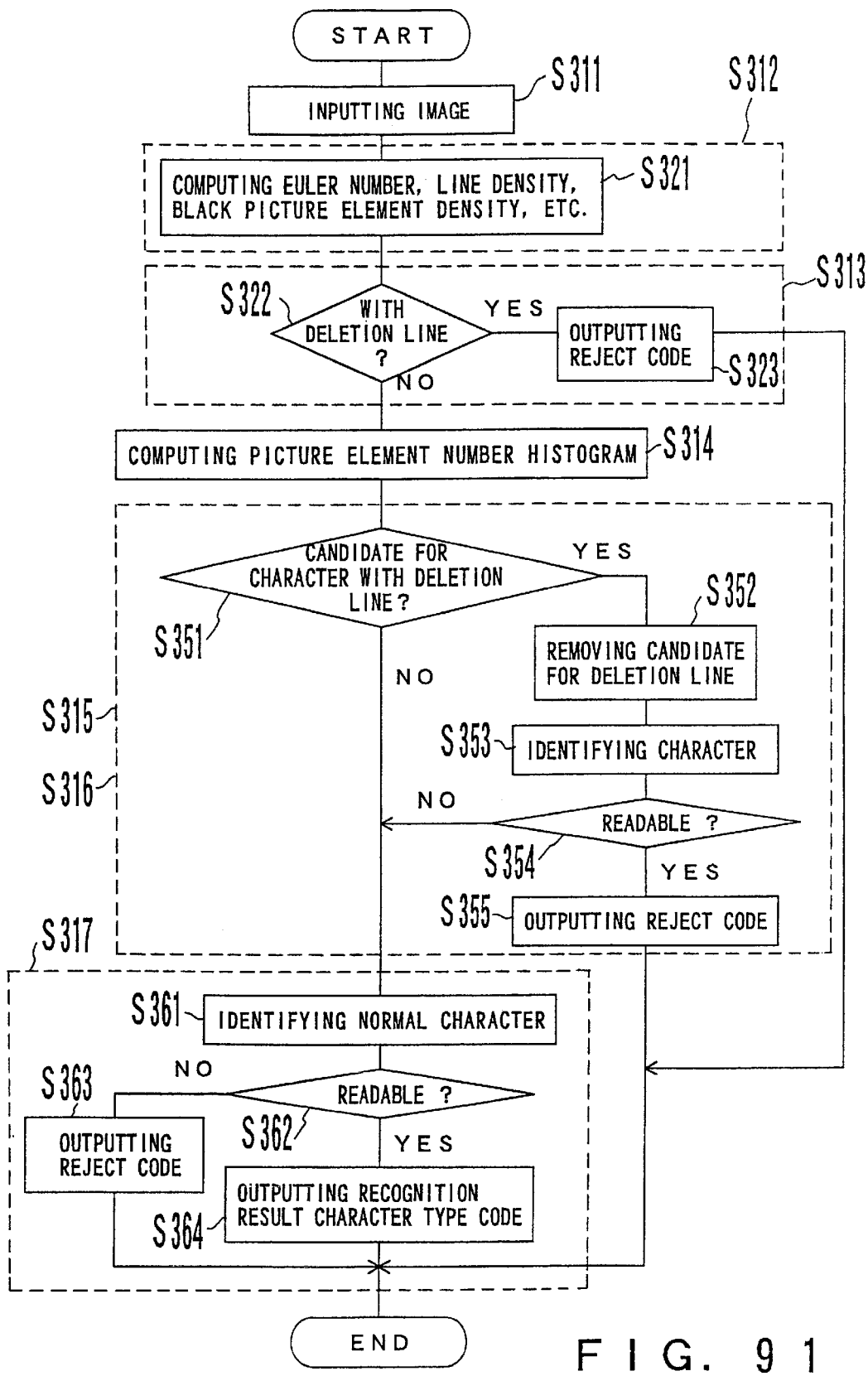
FIG. 91 is a flowchart showing the operations performed by the pattern recognizing apparatus according to the eleventh embodiment of the present invention.

FIG. 91 is a flowchart showing the operations of the pattern recognizing apparatus according to the eleventh embodiment of the present invention.

In FIG. 91, the amount of complexity such as an Euler number, the line density, the density of black picture elements, etc. is computed in step S321 about the detected and pre-processed character. A determination as to whether or not the current character is provided with a complicated deletion line is made using a predetermined threshold in step S322 on the computed amount of complexity. If it is determined that the current character is a character with a complicated deletion line, then a reject code is output in step S323. If it is not determined that the current character is provided with a complicated deletion line, then a horizontal direction contiguous projection histogram is computed in step S314, and it is determined whether or not a candidate for a character with a simple deletion line exists in step S351. If there is a candidate for a deletion line, it is removed as a candidate for a character with a simple deletion line in step S352. If the candidate for a deletion line is removed from the candidate for a character with a simple deletion line, and the result can be identified as a character, the candidate for a character with a simple deletion line is defined as a character with a simple deletion line. If the result cannot be identified as a character, it is determined whether or not the current character is a character with a simple deletion line in step S351 when it is defined as determines a normal character a normal character (step S353 and S354). In the process (S317) of identifying a normal character, the defined normal character is checked whether or not it can be identified as a character in step S361 and S262. If it cannot be identified as a character, then a reject code is output in step S363. If it can be identified as a character, the result of the recognition is output (step S364).

Figure 92:
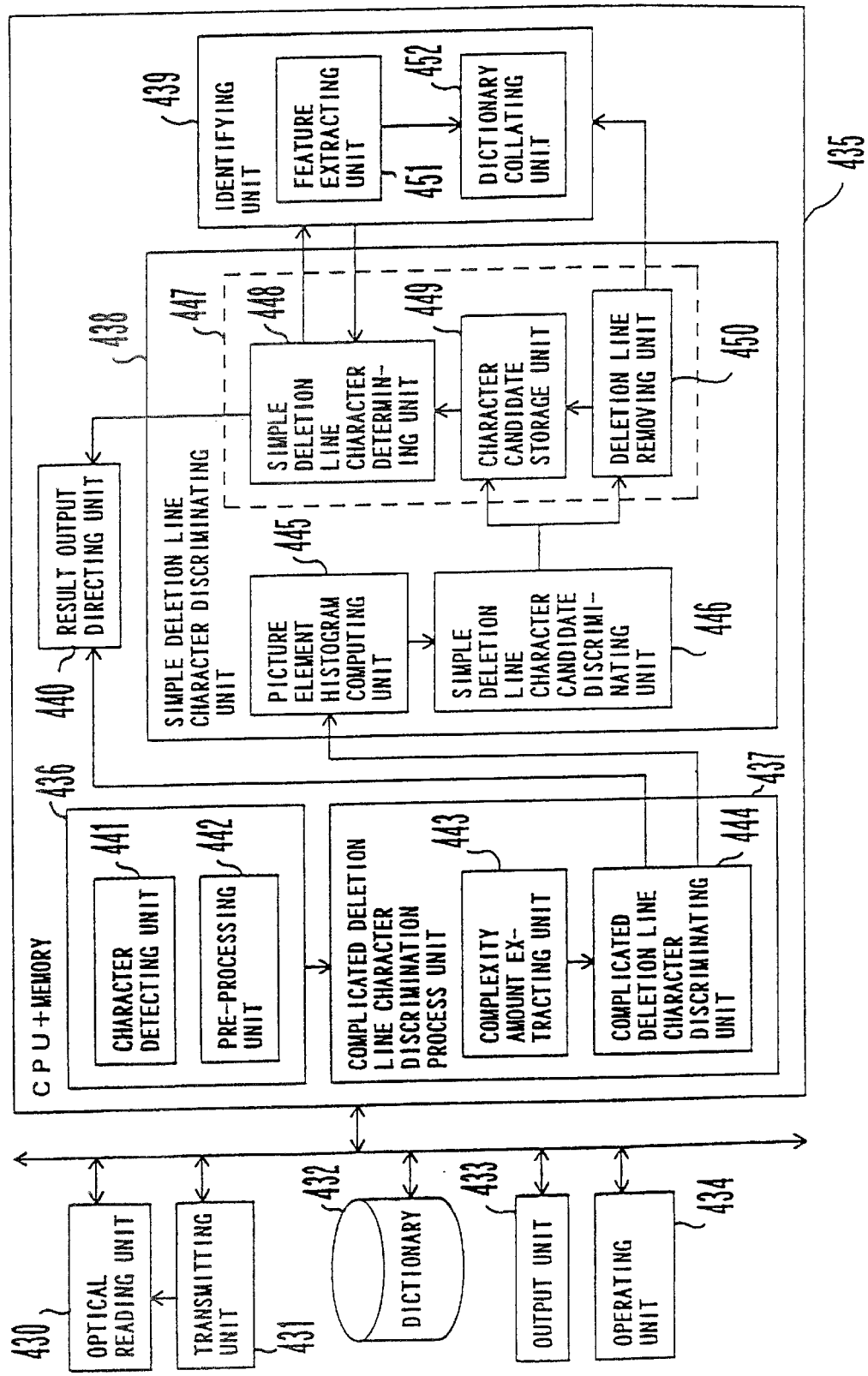
FIG. 92 is a block diagram showing the function of the pattern recognizing apparatus according to the twelfth embodiment of the present invention.

FIG. 92 is a block diagram showing the configuration of the pattern recognizing apparatus according to the twelfth embodiment of the present invention.

In FIG. 92, the apparatus comprises an optical reading unit 430 for optically reading transmitted character pattern entered in a form, converting the, character pattern into an electrical signal, and outputting a digital signal through binarization, etc.; a transmitting unit 431 for transmitting the form to the optical reading area of the optical reading unit 430; a dictionary 432 storing the standard feature vector of a character; a display unit for displaying a character on a screen; an output unit 433 for printing a character on paper; an operating unit 434 for performing various operations; and a CPU and memory 435 having various functions for character recognition.

As shown in FIG. 92, the CPU and memory 435 comprises a character detecting and preprocessing unit 436 for detecting and pre-processing a character from an input image; a complicated deletion line character discrimination process unit 437 for performing a discriminating process on a character with a complicated deletion line represented by a complicated stroke; a simple deletion line character discriminating unit 438 for performing a discriminating process on, a candidate for a character with a simple deletion line formed only by a horizontal line indicating the deletion of a character when it is determined by the complicated deletion line character determination process unit 437 that the character is not provided with a complicated deletion line; an identifying unit 439 for identifying a character; and a result output directing unit 440 for rejecting the character if it is discriminated as a character with a deletion line, outputting a character identification result if the character is discriminated as a normal character, and giving a direction to output the rejection if the character is discriminated as a normal character but cannot be identified as a character.

As shown in FIG. 92, the character detecting and preprocessing unit 436 comprises a character detecting unit 441 for detecting only the character portion from the form image of an input digital image and separating characters from each other, and a pre-processing unit 442 for removing a noise from a detected character signal and standardizing the position, size, etc. of a character.

The optical reading unit 430, transmitting unit 431, and character detecting and preprocessing unit 436 correspond to an image input unit.

The complicated deletion line character discrimination process unit 437 comprises a complexity amount extracting unit 443 for extracting the amount of complexity from a character pattern; and a complicated deletion line character discriminating unit 444 for discriminating whether or not the character pattern is a character with a complicated deletion line based on the extracted amount of complexity.

The 'amount of complexity' can be the line density in a predetermined direction, an Euler number, black picture element density, etc.

The 'line density in a predetermined direction' refers to-a value obtained by counting the portions changing from white picture elements into black picture elements (or black picture elements into white picture elements) when an image in a rectangle is scanned in a predetermined direction. For example, if a character pattern is formed by a character '2' with a deletion line 501 as indicated by (A) in FIG. 93, the line density in the vertical direction as indicated by (D) in FIG. 93 is 6.

The 'predetermined direction' normally refers to the vertical or horizontal direction to a character.

The 'Euler number' E is represented by E=C–H by subtracting the number H of holes from the number of link elements C where C indicates the number of link elements connected to one another in an image, and H indicates the number of holes in the image.

Figure 93:
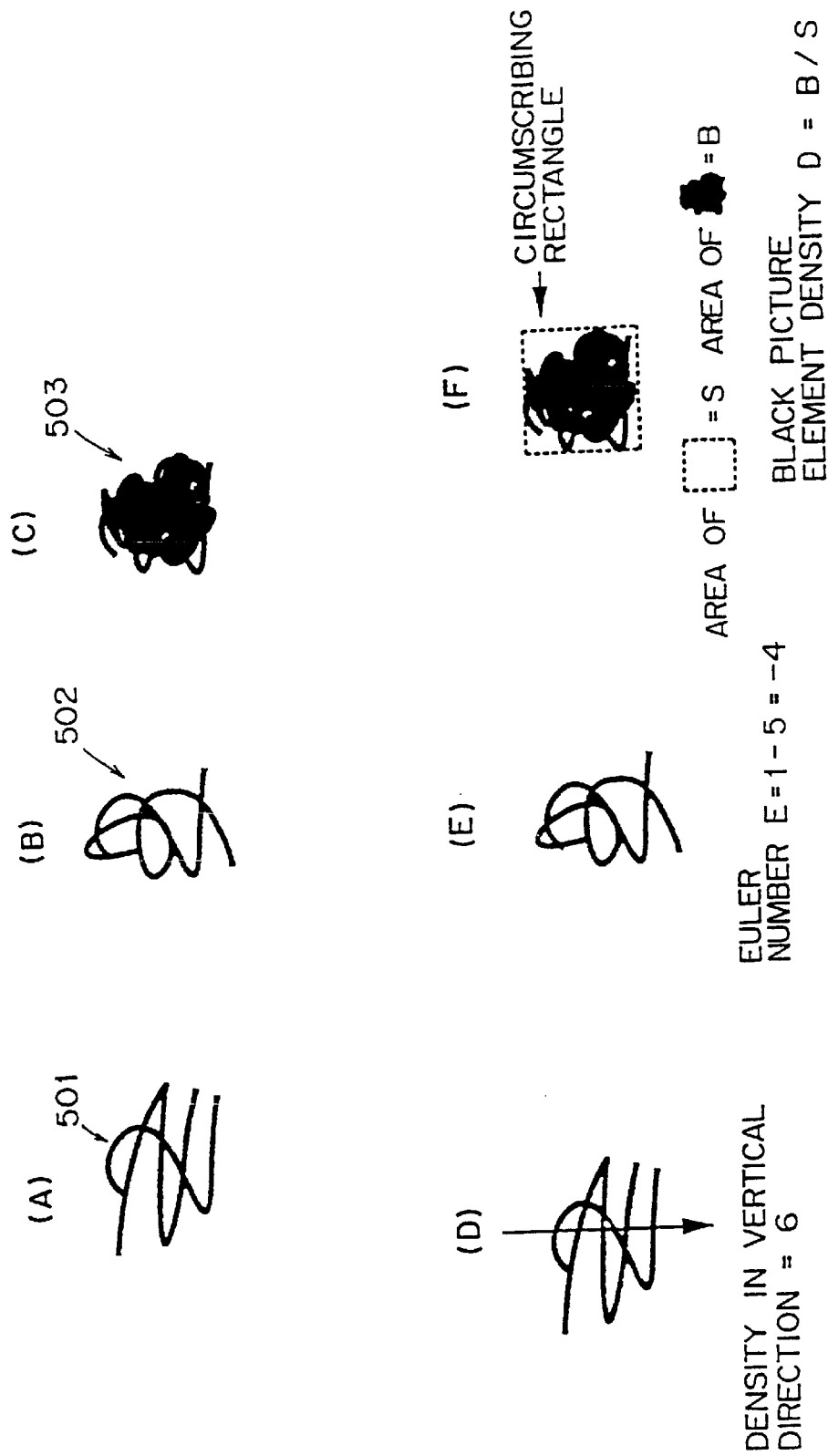
FIG. 93 shows the amount of the complexity of the pattern recognizing apparatus according to an embodiment of the present invention.

For example, if a character pattern is formed by a character '2' with a deletion line 502 as indicated by (B) in FIG. 93, the Euler number E=–4 as indicated by (E) in FIG. 93.

The 'black picture element density' D=B/S indicates the ratio of the area S (total number of picture elements) of a circumscribing rectangle of an object image to the total number B of black picture element in the circumscribing rectangle of the object image.

For example, if a character pattern is formed by a character '2' with a deletion line 503 as indicates by (C) in FIG. 93, the black picture element density D is represented by D=B/S as indicated by (F) in FIG. 93.

(A) through (C) in FIG. 93 shows examples of characters with complicated deletion line.

A complicated deletion line character discriminating unit 444 performs a discriminating process based on the amount of complexity such as the line density, Euler number, or black picture element density, etc. of the extracted feature or an appropriate combination of them.

General tendency of the extracted amount of complexity and a normal character or a character with a deletion line is as follows.

| feature/tendency | normal character | character with deletion line |
|---|---|---|
| maximum line density | small | large |
| Euler number | small abstract value (2~–1) | negative value large absolute value |
| back picture element density | small | large |

It is determined based on the amount of complexity whether or not the current character is provided with a deletion line by preliminarily setting a threshold, etc.

The simple deletion line character discriminating unit 438 shown in FIG. 92 comprises a picture element histogram computing unit 445 for computing the picture element number histogram computing unit 445 for computing the picture elements in the object horizontal scanning line and the contiguous lines in a predetermined range above and below the object line are added up and counted in the horizontal direction; a simple deletion line character candidate discriminating unit 446 for performing a discriminating process about a candidate for a character with a simple deletion line based on the computed number of picture elements; and a simple deletion line character determining unit 447 for determining a character with a simple deletion line if the identifying unit 439 identifies a character when a candidate for a deletion line is removed from the discriminated candidate for a character with a simple deletion line.

The 'contiguous projection in the horizontal direction' refers to adding up and counting in the horizontal direction the black picture elements in the object horizontal scanning line and the contiguous lines in a predetermined range above and below the object line.

According to the aspect of the present embodiment, a predetermined range contains 3 lines.

The simple deletion line character candidate discriminating unit 446 determines a candidate for a character with a simple horizontal deletion line having a peak whose picture element number histogram exceeds a predetermined threshold, and recognizes the corresponding line as a candidate for a deletion line.

As shown in FIG. 71, if the candidate for a character with a deletion line determined by the simple deletion line character candidate discriminating unit 446 and stripped of the candidate for a deletion line by the deletion line removing unit 450 can be identified as a character, then it is defined as a character with a deletion line by the simple deletion line character determining unit 448. If it cannot be identified as a character, then it is defined as a normal character (character without a deletion line). A candidate for a deletion line is removed by the deletion line removing unit 450 by an existing image processing method.

As shown in FIG. 92, the simple deletion line character determining unit 447 comprises a deletion line removing unit 450 for removing a candidate for a deletion line from the discriminated candidate for a character with a simple deletion line and transmitting the result to the identifying unit 439; the simple deletion line character determining unit 448 for determining the candidate for a character with a simple deletion line as a character with a simple deletion line when the discriminated candidate for a character with a simple deletion line is recognized as a character, and determining it as a normal character and transmitting it to the identifying unit 439 when it is not recognized as a character; and a character candidate storage unit 449 for storing the candidate for a character with a deletion line removed by the deletion line removing unit 450.

Furthermore, the identifying unit 439 comprises a feature extracting unit 451 for extracting the feature value of each character pattern and compressing data; and a dictionary collating unit 452 for collating a character pattern with a dictionary, that is, a standard feature vector of each character type.

Figure 94:
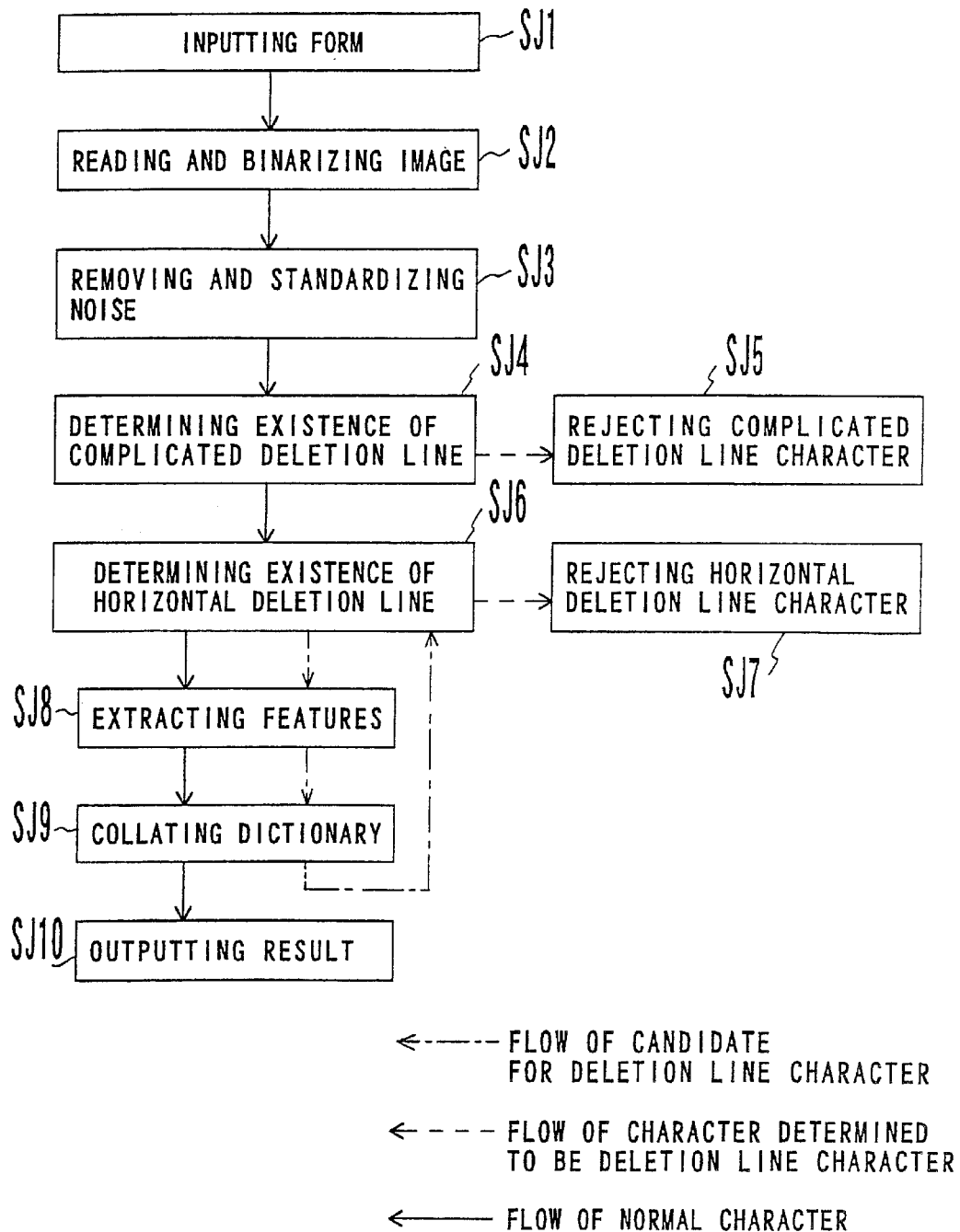
FIG. 94 is a flowchart showing the operations of the pattern recognizing apparatus shown in FIG. 92.
Figure 95:
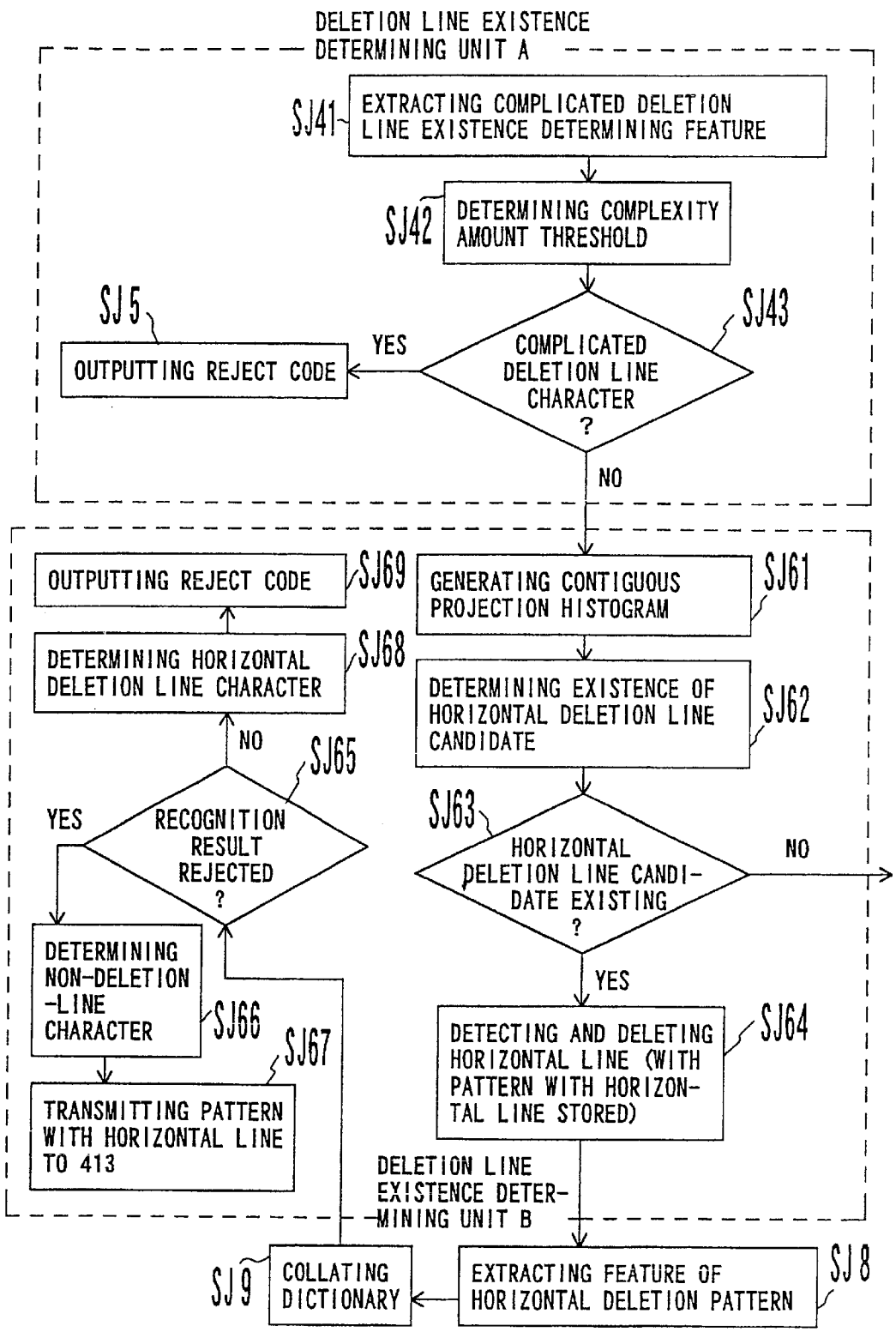
FIG. 95 is a flowchart showing the operations of the pattern recognizing apparatus shown in FIG. 92.

Then, the operations of the pattern recognizing apparatus shown in FIG. 92 are described by referring to FIGS. 94 and 95.

As shown in FIG. 94, the transmitting unit 431 transmits a form containing entered characters to the reading area of the optical reading unit 430 and has an OCR input the form in step SJ1.

In step SJ2, the optical reading unit 430 converts a character pattern on the form into an electrical signal in the opto-electrical conversion, and outputs it as a digital signal through binarization, etc.

The form can contain entered characters and their character boxes in the same color.

In step SJ3, the character detecting unit 441 detects a character portion from the digital signal and separates characters from one another. The preprocessing unit 442 standardizes the position, size, slope line thinness, etc.

In step SJ4, a complicated deletion line character discrimination process unit 437 performs a discriminating process about a character with a complicated deletion line. In step SJ5, it does not recognize the current character pattern as a character with a complicated deletion line.

The deletion line existence determining unit A shown in FIG. 95 shows the processes in step SJ4 and SJ5 indicating the contents of the process performed by the complicated deletion line character discrimination process unit 437.

In step SJ41, the complexity amount extracting unit 443 extracts the amount of complexity such as an Euler number, line density, black picture element density, etc. to determine whether or not the current character pattern is a character with a complicated deletion line.

Then, in step SJ42, the complicated deletion line character discriminating unit 444 determines using a predetermined threshold whether the object character pattern is a normal character or a character with a complicated deletion line.

For example, assuming that the threshold of the line density by the scanning in the horizontal direction is 2, the threshold of the line density by scanning in the vertical direction is 3, the threshold of an Euler number is −1, and the threshold of the black picture element density is 0.6, it is determined that the character pattern is not provided with a complicated deletion line when the line density by the scanning in the horizontal direction is equal to or smaller than 2, the line density by scanning in the vertical direction is equal to or smaller than 3, an Euler number is equal to or larger than −1, and the black picture element density is equal to or smaller than 0.6. Otherwise, the character pattern is discriminated as a character with a complicated deletion line.

If the character pattern is discriminated as a character with a complicated deletion line in step SJ43, a rejection code is output as a recognition result in step SJ5.

If the character pattern is not discriminated as a character with a complicated deletion line, control is passed to step SJ6 as shown in FIG. 94, and the simple deletion line character discriminating unit 438 performs a process of discriminating whether or not a horizontal line, that is, a single deletion line exists. If the pattern is discriminated as a character with a deletion line, then a rejection code is output as a recognition result in step SJ7.

The discriminating process is indicated by the deletion line existence determining unit B in FIG. 95.

As shown in FIG. 95, the picture element histogram computing unit 445 generates a horizontal direction contiguous projection histogram in step SJ61.

A contiguous histogram can be, for example, obtained by adding black picture elements for every n=3 lines along the horizontal line with each line shifted in the direction vertical to the horizontal simple deletion line as shown in FIG. 20. Therefore, even if the horizontal simple deletion line is not exactly horizontal, it can be correctly discriminated as a simple deletion line.

If the histogram indicates the peak exceeding the threshold N in step SJ62, the simple deletion line character candidate discriminating unit 446 determines that there is a candidate for a deletion line in step SJ63 and discriminates the pattern as a candidate for a character with a simple deletion line. If such a peak does not exist, it is determined that the pattern does not contain a candidate for a deletion line and the pattern is discriminated as a normal character. If a character size is standardized in a pre-process, N can be a fixed value. If it is not standardized in a pre-process, it is recommended that N is variable depending on the width of the rectangle circumscribing the object character. In this case, the ratio of the threshold N to the width of the circumscribing rectangle should be appropriately given as a fixed value.

In step SJ63, if the simple deletion line character candidate discriminating unit 446 discriminates the pattern as a candidate for a character with a deletion line, then control is passed to step SJ64, and the character candidate storage unit 449 stores a candidate for a character with a deletion line (before removing a deletion line). The deletion line removing unit 450 detects and deletes a horizontal simple deletion line of the candidate for a character with a deletion line.

A candidate for a deletion line is removed by an existing method, for example, a method of extracting a line through an n line run length, etc.

The feature extracting process is performed by the identifying unit 439 on a character pattern from which a deletion line has been removed in step SJ8. In step SJ9, the extracted feature is collated with the dictionary.

In the dictionary collation, the matching level is computed by referring to a given standard feature vector, and a character type with a feature vector indicating the highest similarity is output as a recognition result.

If it is determined that the collation result indicates rejection in step SJ65, the simple deletion line character determining unit 448 determines that the candidate for a character with a deletion line is a character without a deletion line in step SJ66, transmits the original image of the candidate for a character with a deletion line temporarily stored in the character candidate storage unit 449 to the identifying unit 439 which identifies a character in step SJ67. The result output directing unit 440 instructs the output unit 433 to output the identification result.

If it is determined that the pattern has been identified as a character after the collating process in step SJ65, then control is passed to step SJ68 and the simple deletion line character determining unit 448 discriminates the candidate for a character with a deletion line as a character with a deletion line, and the result output directing unit 440 outputs the recognition result as 'REJECT' to the output unit 433 in step SJ69.

The upper line in FIG. 71 shows an example of recognizing a candidate for a deletion line about a candidate for a character with a simple deletion line, identifying as '5' the pattern stripped of the candidate for a deletion line, and determining the pattern as a character with a deletion line. The lower line in FIG. 71 shows an example of recognizing a candidate for a deletion line in the candidate for a character with a simple deletion line, rejecting the pattern stripped of the candidate for a deletion line, and therefore discriminating the candidate for the original character with a simple deletion line as a normal character.

As described above, a determination is made about a character with a complicated deletion line based on the amount of complexity including all of the maximum line density in a predetermined direction, an Euler number, the black picture element density according to the present embodiment.

Therefore, the present embodiment realizes the discrimination of a character with a complicated deletion line with high reliability at a high speed.

Furthermore, according to the present embodiment, a candidate for a character with a simple deletion line can be discriminated by counting the number of picture elements in the contiguous projection method.

As a result, a candidate for a character with a deletion line including a line drawn in a roughly horizontal direction as well as a predicted horizontal simple deletion line can be easily and quickly discriminated with high reliability with a simple configuration.

As described above, misreading a character with a deletion line can be reduced by performing a deletion line existence determining process according to the aspect of the present embodiment. Additionally, a character deleted by a deletion line can be clearly rejected.

What is claimed is:

1. A pattern recognizing apparatus, comprising:

a character extractor that extracts a character from an input image;

a non-character extractor that extracts a non-character from an input image;

a character recognizer that recognizes a character;

a non-character recognizer that recognizes a non-character; and an environment recognizer that instructs the character recognizer to perform a recognition process when the character extractor extracts a character, and that instructs the non-character recognizer to perform a recognition process when the non-character recognizer extracts a non-character; wherein the environment recognizer computes a reliability indicating certainty about a recognition result obtained from the character recognizer when the character extractor extracts a character, and instructs the non-character recognizer to perform a recognition process with a character extracted by the character extractor regarded as a non-character when the reliability about the recognition result obtained from the character recognizer is smaller than a predetermined value.

2. A pattern recognizing apparatus, comprising:

a character extractor that extracts a character from an input image;

a non-character extractor that extracts a non-character from an input image;

a character recognizer that recognizes a character;

a non-character recognizer that recognizes a non-character; and an environment recognizer that instructs the character recognizer to perform a recognition process when the character extractor extracts a character, and that instructs the non-character recognizer to perform a recognition process when the non-character recognizer extracts a non-character; wherein the environment recognizer computes a reliability indicating certainty about a recognition result obtained from the non-character recognizer when the non-character extractor extracts a non-character, and instructs the character recognizer to perform a recognizing process with a non-character extracted by the non-character extractor regarded as a character when the reliability about the recognition result obtained from the non-character recognizer is smaller than a predetermined value.

* * * * *